US008208081B2

(12) United States Patent
Kitayama et al.

(10) Patent No.: US 8,208,081 B2
(45) Date of Patent: Jun. 26, 2012

(54) LIQUID CRYSTAL DISPLAY HAVING PIXEL INCLUDING MULTIPLE SUBPIXELS

(75) Inventors: Masae Kitayama, Tsu (JP); Fumikazu Shimoshikiryoh, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 610 days.

(21) Appl. No.: 12/310,403

(22) PCT Filed: Aug. 13, 2007

(86) PCT No.: PCT/JP2007/065833
§ 371 (c)(1),
(2), (4) Date: Feb. 24, 2009

(87) PCT Pub. No.: WO2008/023602
PCT Pub. Date: Feb. 28, 2008

(65) Prior Publication Data
US 2009/0268110 A1 Oct. 29, 2009

(30) Foreign Application Priority Data
Aug. 24, 2006 (JP) ................................ 2006-228475

(51) Int. Cl.
*G02F 1/1343* (2006.01)
*G02F 1/133* (2006.01)
*G02F 1/141* (2006.01)

(52) U.S. Cl. ................ 349/38; 349/33; 349/37; 349/39

(58) Field of Classification Search .................... 349/33, 349/37–39; 345/99
See application file for complete search history.

(56) References Cited

U.S. PATENT DOCUMENTS 4,345,249 A 8/1982 Togashi
(Continued)

FOREIGN PATENT DOCUMENTS

EP 1 564 714 A2 8/2005
(Continued)

OTHER PUBLICATIONS

International Search Report for PCT/JP2007/065833, mailed Sep. 18, 2007.

(Continued)

*Primary Examiner* — Nathanael R Briggs
(74) *Attorney, Agent, or Firm* — Nixon & Vanderhye P.C.

(57) ABSTRACT

Each pixel includes first and second subpixels and two switching elements provided for those subpixels. Each subpixel includes a liquid crystal capacitor and a storage capacitor. The storage capacitor counter electrodes of the first and second subpixels are electrically independent. A storage capacitor counter voltage applied to each storage capacitor counter electrode by way of its associated storage capacitor line has a first period (A) with a first waveform during one vertical scanning period. The first waveform oscillates between multiple voltage levels in a first cycle time ($P_A$) that is an integral number of times (and at least four times) as long as one horizontal scanning period (H). Each of the voltage levels has a flat portion with a duration TP. While the two switching elements are ON, a display signal voltage is applied to the respective subpixel electrodes and respective storage capacitor electrodes of the first and second subpixels. After the two switching elements have been turned OFF, voltages at the storage capacitor counter electrodes of the first and second subpixels change. And if an interval between a point in time when the two switching elements in ON state have just been turned OFF and a point in time when the storage capacitor counter voltage changes for the first time is βH, $TP/4 \leqq \beta < 3 \cdot TP/4$ is satisfied. Consequently, even if a still picture is presented, the difference in luminance between the subpixels is hardly sensible as unevenness, thus achieving good display quality.

1 Claim, 105 Drawing Sheets

U.S. PATENT DOCUMENTS

| | | | |
|---|---|---|---|
| 5,847,688 | A | 12/1998 | Ohi et al. |
| 6,724,452 | B1 | 4/2004 | Takeda et al. |
| 6,958,791 | B2 | 10/2005 | Shimoshikiryo |
| 7,113,159 | B2 | 9/2006 | Sawabe |
| 2001/0006410 | A1 | 7/2001 | Yamada et al. |
| 2001/0024257 | A1 | 9/2001 | Kubo et al. |
| 2003/0058211 | A1 | 3/2003 | Kim et al. |
| 2003/0227429 | A1 | 12/2003 | Shimoshikiryo et al. |
| 2003/0234904 | A1 | 12/2003 | Matsuda et al. |
| 2004/0061711 | A1 | 4/2004 | Kurumisawa et al. |
| 2004/0119924 | A1 | 6/2004 | Takeda et al. |
| 2004/0239698 | A1 | 12/2004 | Kamada et al. |
| 2005/0122441 | A1 * | 6/2005 | Shimoshikiryoh ............. 349/38 |
| 2006/0176322 | A1 | 8/2006 | Lee |
| 2008/0106660 | A1 | 5/2008 | Kitayama et al. |
| 2008/0158203 | A1 | 7/2008 | Irie et al. |
| 2009/0195487 | A1 | 8/2009 | Shimoshikiryoh et al. |

FOREIGN PATENT DOCUMENTS

| | | | |
|---|---|---|---|
| JP | 2003-255306 | | 9/2003 |
| JP | 2003-295160 | A | 10/2003 |
| JP | 2004-325571 | | 11/2004 |
| WO | 2006/049245 | A1 | 5/2006 |
| WO | 2006/070829 | A1 | 7/2006 |

OTHER PUBLICATIONS

Written Opinion of the International Searching Authority, mailed Sep. 18, 2007.

English translation of the International Preliminary Report on Patentability mailed Mar. 5, 2009 in corresponding PCT Application No. PCT/JP2007/065833.

Supplementary EP Search Report mailed Jan. 18, 2011 in EP application 10015233.9.

* cited by examiner b: Bright
d: Dark

*FIG. 5*
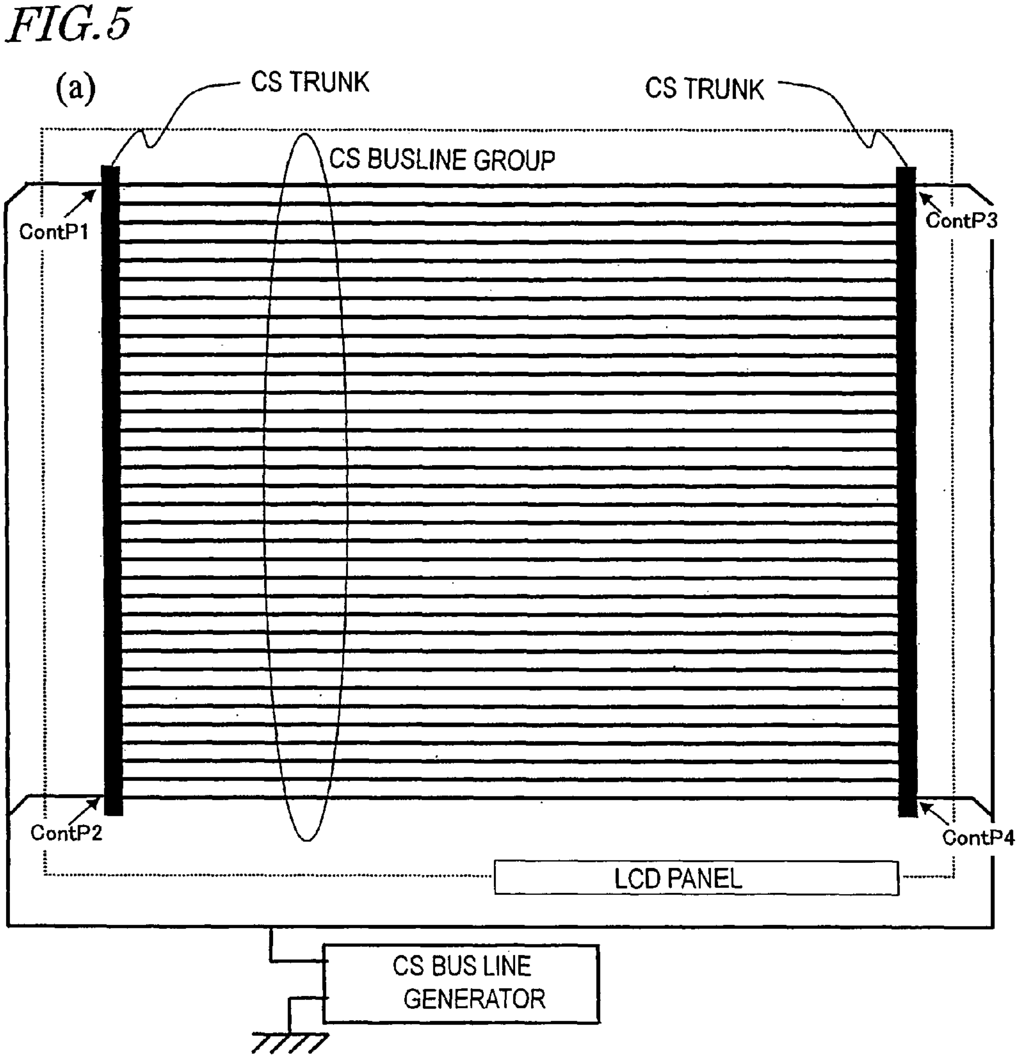
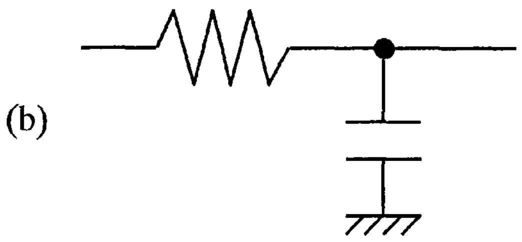
FIRST APPROXIMATION CIRCUIT OF
CS BUSLINE LOAD IMPEDANCE: CR LOW PASS FILTER b: Bright
d: Dark

■EXAMPLE #2 OF CS SIGNAL PROCESSING TO ALLOCATE H AND L LEVELS EVENLY

■EXAMPLE #3 OF CS SIGNAL PROCESSING TO ALLOCATE H AND L LEVELS EVENLY

■EXAMPLE #4 OF CS SIGNAL PROCESSING TO ALLOCATE H AND L LEVELS EVENLY

■EXAMPLE #2 OF CS SIGNAL PROCESSING TO ALLOCATE H AND L LEVELS EVENLY

■EXAMPLE #2 OF CS SIGNAL PROCESSING TO ALLOCATE H AND L LEVELS EVENLY

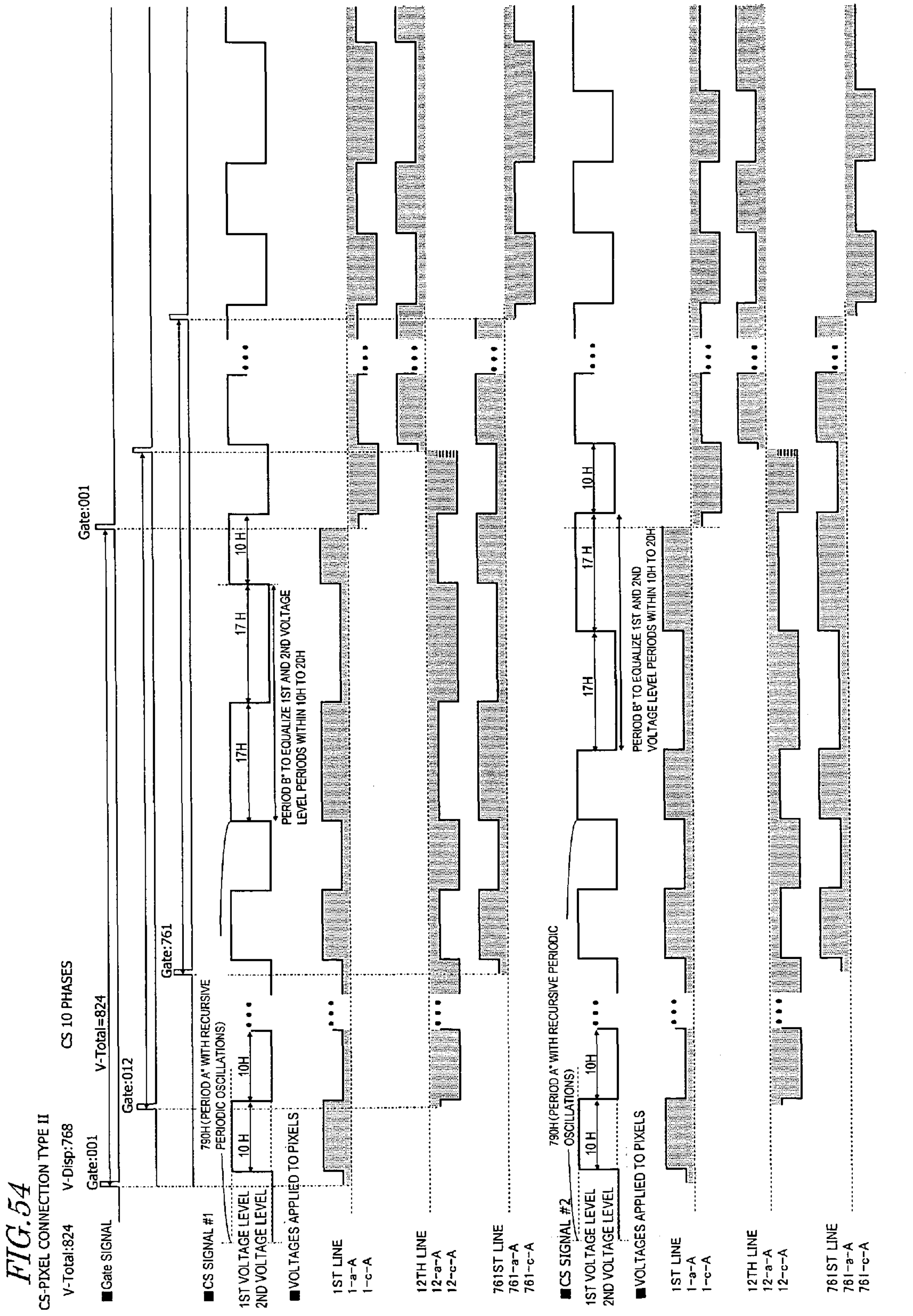
FIG.54
CS-PIXEL CONNECTION TYPE II
V-Total:824
V-Disp:768
CS 10 PHASES
Gate SIGNAL
Gate:001
Gate:012
V-Total=824
Gate:761
Gate:001
CS SIGNAL #1
1ST VOLTAGE LEVEL
2ND VOLTAGE LEVEL
790H (PERIOD A" WITH RECURSIVE PERIODIC OSCILLATIONS)
10 H
10H
17H
17 H
10 H
PERIOD B" TO EQUALIZE 1ST AND 2ND VOLTAGE LEVEL PERIODS WITHIN 10H TO 20H
VOLTAGES APPLIED TO PIXELS
1ST LINE
1-a-A
1-c-A
12TH LINE
12-a-A
12-c-A
761ST LINE
761-a-A
761-c-A
CS SIGNAL #2
1ST VOLTAGE LEVEL
2ND VOLTAGE LEVEL
790H (PERIOD A" WITH RECURSIVE PERIODIC OSCILLATIONS)
10 H
10H
17H
17 H
10 H
PERIOD B" TO EQUALIZE 1ST AND 2ND VOLTAGE LEVEL PERIODS WITHIN 10H TO 20H
VOLTAGES APPLIED TO PIXELS
1ST LINE
1-a-A
1-c-A
12TH LINE
12-a-A
12-c-A
761ST LINE
761-a-A
761-c-A

*FIG. 70*
(a)
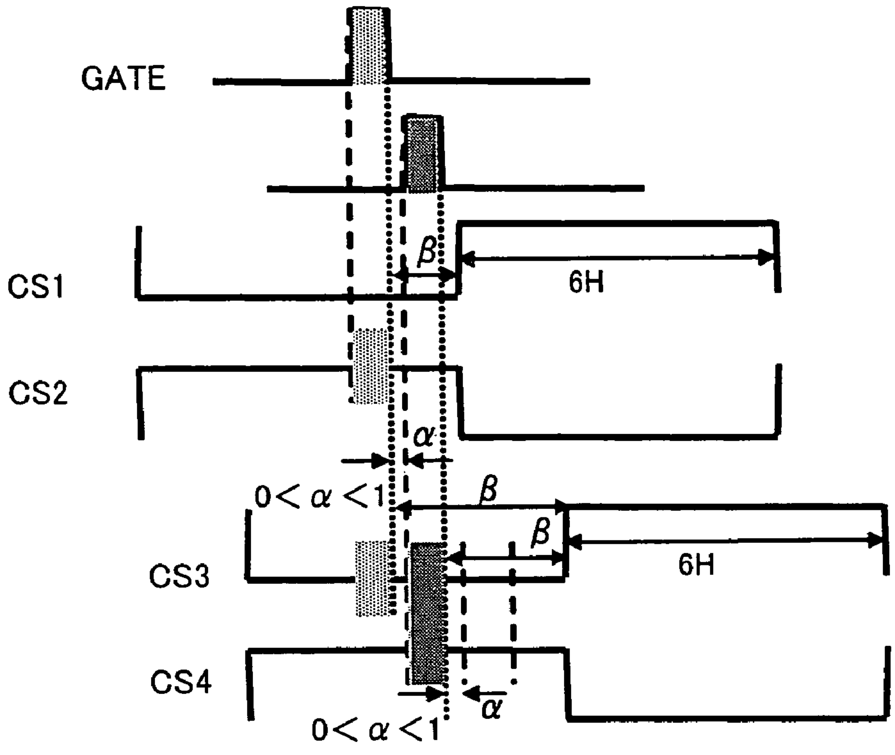
(b)
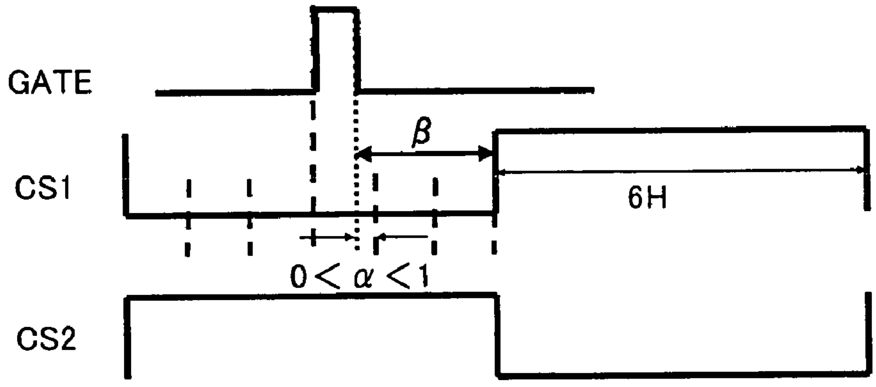

LIQUID CRYSTAL DISPLAY HAVING PIXEL INCLUDING MULTIPLE SUBPIXELS

This application is the U.S. national phase of International Application No. PCT/JP2007/065833, filed 13 Aug. 2007, which designated the U.S. and claims priority to Japan Application No. 2006-228475, filed 24 Aug. 2006, the entire contents of each of which are hereby incorporated by reference.

TECHNICAL FIELD

The present invention relates to a liquid crystal display device and a method for driving the device. More particularly, the present invention relates to a structure that can reduce the viewing angle dependence of the γ characteristic of a liquid crystal display device and a method for driving such a structure.

BACKGROUND ART

A liquid crystal display (LCD) is a flat-panel display that has a number of advantageous features including high resolution, drastically reduced thickness and weight, and low power dissipation. The LCD market has been rapidly expanding recently as a result of tremendous improvements in its display performance, significant increases in its productivity, and a noticeable rise in its cost effectiveness over competing technologies.

A twisted-nematic (TN) mode liquid crystal display device, which used to be used extensively in the past, is subjected to an alignment treatment such that the major axes of its liquid crystal molecules, exhibiting positive dielectric anisotropy, are substantially parallel to the respective principal surfaces of upper and lower substrates and are twisted by about 90 degrees in the thickness direction of the liquid crystal layer between the upper and lower substrates. When a voltage is applied to the liquid crystal layer, the liquid crystal molecules change their orientation directions into a direction that is parallel to the electric field applied. As a result, the twisted orientation disappears. The TN mode liquid crystal display device utilizes variation in the optical rotatory characteristic of its liquid crystal layer due to the change of orientation directions of the liquid crystal molecules in response to the voltage applied, thereby controlling the quantity of light transmitted.

The TN mode liquid crystal display device allows a broad enough manufacturing margin and achieves high productivity. However, the display performance (e.g., the viewing angle characteristic, in particular) thereof is not fully satisfactory. More specifically, when an image on the screen of the TN mode liquid crystal display device is viewed obliquely, the contrast ratio of the image decreases significantly. In that case, even an image, of which the grayscales ranging from black to white are clearly observable when the image is viewed straightforward, loses much of the difference in luminance between those grayscales when viewed obliquely. Furthermore, the grayscale characteristic of the image being displayed thereon may sometimes invert itself. That is to say, a portion of an image, which looks darker when viewed straight, may look brighter when viewed obliquely. This is a so-called "grayscale inversion phenomenon".

To improve the viewing angle characteristic of such a TN mode liquid crystal display device, an inplane switching (IPS) mode liquid crystal display device (see Patent Document No. 1), a multi-domain vertical aligned (MVA) mode liquid crystal display device (see Patent Document No. 2), an axisymmetric aligned (ASM) mode liquid crystal display device (see Patent Document No. 3), and a liquid crystal display device disclosed in Patent Document No. 4 were developed recently.

All of these were developed relatively recently as TN mode liquid crystal display devices with improved viewing angle characteristics. In a liquid crystal display device operating in each of these newly developed wide viewing angle modes, even when an image on the screen is viewed obliquely, the contrast ratio never decreases significantly or the grayscales never invert unlike the old-fashioned TN mode liquid crystal display devices.

Although the display qualities of LCDs have been further improved nowadays, a viewing angle characteristic problem in a different phase has surfaced just recently. Specifically, the γ characteristic of LCDs would vary with the viewing angle. That is to say, the γ characteristic when an image on the screen is viewed straight is different from the characteristic when it is viewed obliquely. As used herein, the "γ characteristic" refers to the grayscale dependence of display luminance. That is why if the γ characteristic when the image is viewed straight is different from the characteristic when the same image is viewed obliquely, then it means that the grayscale display state changes according to the viewing direction. This is a serious problem particularly when a still picture such as a photo is presented or when a TV program is displayed.

The viewing angle dependence of the γ characteristic is more significant in the MVA and ASM modes rather than in the IPS mode. According to the IPS mode, however, it is more difficult to make panels that realize a high contrast ratio when the image on the screen is viewed straight with good productivity rather than in the MVA and ASM modes. Taking these circumstances into consideration, it is particularly necessary to reduce the viewing angle dependence of the γ characteristic of MVA and ASM mode liquid crystal display devices, among other things.

To overcome such a problem, the applicant of the present application disclosed a liquid crystal display device that can reduce the viewing angle dependence of the γ characteristic (or an excessively high contrast ratio of white portions of an image, among other things) by dividing a single pixel into a number of subpixels, and a method for driving such a device. Such a display or drive mode will sometimes be referred to herein as "area-grayscale display", "area-grayscale drive", "multi-pixel display" or "multi-pixel drive".

Patent Document No. 5 discloses a liquid crystal display device in which storage capacitors Cs are provided for respective subpixels SP of a single pixel P. In the storage capacitors, the storage capacitor counter electrodes (which are connected to CS bus lines) are electrically independent of each other between the subpixels. And by varying the voltages applied to the storage capacitor counter electrodes (which will be referred to herein as "storage capacitor counter voltages"), mutually different effective voltages can be applied to the respective liquid crystal layers of multiple subpixels by utilizing a capacitance division technique.

Hereinafter, the pixel division structure of the liquid crystal display device 200 disclosed in Patent Document No. 5 will be described with reference to FIG. 76. In the following example, the liquid crystal display device is supposed to include TFTs as its switching elements. However, the liquid crystal display device may also include any other type of switching elements such as MIM elements. The same goes for a liquid crystal display device according to the present invention.

The pixel 10 is split into a subpixel 10*a* and another subpixel 10*b*. To the subpixels 10*a* and 10*b*, connected are their associated TFTs 16*a* and 16*b* and their associated storage capacitors (CS) 22*a* and 22*b*, respectively. The gate electrodes of the TFTs 16*a* and 16*b* are both connected to the same scan line 12. And the source electrodes of the TFTs 16*a* and 16*b* are connected to the same signal line 14. The storage capacitors 22*a* and 22*b* are connected to their associated storage capacitor lines (CS bus lines) 24*a* and 24*b*, respectively. The storage capacitor 22*a* includes a storage capacitor electrode that is electrically connected to the subpixel electrode 18*a*, a storage capacitor counter electrode that is electrically connected to the storage capacitor line 24*a*, and an insulating layer (not shown) arranged between the electrodes. The storage capacitor 22*b* includes a storage capacitor electrode that is electrically connected to the subpixel electrode 18*b*, a storage capacitor counter electrode that is electrically connected to the storage capacitor line 24*b*, and an insulating layer (not shown) arranged between the electrodes. The respective storage capacitor counter electrodes of the storage capacitors 22*a* and 22*b* are independent of each other and have such a structure as receiving mutually different storage capacitor counter voltages from the storage capacitor lines 24*a* and 24*b*, respectively.

Hereinafter, the principle on which mutually different effective voltages can be applied to the respective liquid crystal layers of the two subpixels 10*a* and 10*b* of the liquid crystal display device 200 will be described with reference to the accompanying drawings.

FIG. 77 schematically shows the equivalent circuit of one pixel of the liquid crystal display device 200. In this electrical equivalent circuit, the liquid crystal layers of the subpixels 10*a* and 10*b* are identified by the reference numerals 13*a* and 13*b*, respectively. A liquid crystal capacitor formed by the subpixel electrode 18*a*, the liquid crystal layer 13*a*, and the counter electrode 17 will be identified by Clca. On the other hand, a liquid crystal capacitor formed by the subpixel electrode 18*b*, the liquid crystal layer 13*b*, and the counter electrode 17 will be identified by Clcb. The same counter electrode 17 is shared by these two subpixels 10*a* and 10*b*.

The liquid crystal capacitors Clca and Clcb are supposed to have the same electrostatic capacitance CLC (V). The value of CLC (V) depends on the effective voltages (V) applied to the liquid crystal layers of the respective subpixels 10*a* and 10*b*. Also, the storage capacitors 22*a* and 22*b* that are connected independent of each other to the liquid crystal capacitors of the respective subpixels 10*a* and 10*b* will be identified herein by Ccsa and Ccsb, respectively, which are supposed to have the same electrostatic capacitance CCS.

In the subpixel 10*a*, one electrode of the liquid crystal capacitor Clca and one electrode of the storage capacitor Ccsa are connected to the drain electrode of the TFT 16*a*, which is provided to drive the subpixel 10*a*. The other electrode of the liquid crystal capacitor Clca is connected to the counter electrode. And the other electrode of the storage capacitor. Ccsa is connected to the storage capacitor line 24*a*. In the subpixel 10*b*, one electrode of the liquid crystal capacitor Clcb and one electrode of the storage capacitor Ccsb are connected to the drain electrode of the TFT 16*b*, which is provided to drive the subpixel 10*b*. The other electrode of the liquid crystal capacitor Clcb is connected to the counter electrode. And the other electrode of the storage capacitor Ccsb is connected to the storage capacitor line 24*b*. The gate electrodes of the TFTs 16*a* and 16*b* are both connected to the scan line 12 and the source electrodes thereof are both connected to the signal line 14.

Portions (a) through (f) of FIG. 78 schematically show the timings of respective voltages that are applied to drive the liquid crystal display device 200.

Specifically, portion (a) of FIG. 78 shows the voltage waveform Vs of the signal line 14; portion (b) of FIG. 78 shows the voltage waveform Vcsa of the storage capacitor line 24*a*; portion (c) of FIG. 78 shows the voltage waveform Vcsb of the storage capacitor line 24*b*; portion (d) of FIG. 78 shows the voltage waveform Vg of the scan line 12; portion (e) of FIG. 78 shows the voltage waveform Vlca of the pixel electrode 18*a* of the subpixel 10*a*; and portion (f) of FIG. 78 shows the voltage waveform Vlcb of the pixel electrode 18*b* of the subpixel 10*b*. In FIG. 75, the dashed line indicates the voltage waveform COMMON (Vcom) of the counter electrode 17.

Hereinafter, it will be described with reference to portions (a) through (f) of FIG. 78 how the equivalent circuit shown in FIG. 77 operates.

First, at a time T1, the voltage Vg rises from VgL to VgH to turn the TFTs 16*a* and 16*b* ON simultaneously. As a result, the voltage Vs on the signal line 14 is transmitted to the subpixel electrodes 18*a* and 18*b* of the subpixels 10*a* and 10*b* to charge the subpixels 10*a* and 10*b* with the voltage Vs. In the same way, the storage capacitors Csa and Csb of the respective subpixels are also charged with the voltage on the signal line.

Next, at a time T2, the voltage Vg on the scan line 12 falls from VgH to VgL to turn the TFTs 16*a* and 16*b* OFF simultaneously and electrically isolate the subpixels 10*a* and 10*b* and the storage capacitors Csa and Csb from the signal line 14. It should be noted that immediately after that, due to the feedthrough phenomenon caused by a parasitic capacitance of the TFTs 16*a* and 16*b*, for example, the voltages Vlca and Vlcb applied to the respective subpixel electrodes decrease by approximately the same voltage Vd to:

$$Vlca=Vs-Vd$$

$$Vlcb=Vs-Vd$$

respectively. Also, in this case, the voltages Vcsa and Vcsb on the storage capacitor lines are:

$$Vcsa=V\mathrm{com}-Vad$$

$$Vcsb=V\mathrm{com}+Vad$$

respectively.

Next, at a time T3, the voltage Vcsa on the storage capacitor line 24*a* connected to the storage capacitor Csa rises from Vcom−Vad to Vcom+Vad and the voltage Vcsb on the storage capacitor line 24*b* connected to the storage capacitor Csb falls from Vcom+Vad to Vcom−Vad. That is to say, these voltages Vcsa and Vcsb both change twice as much as Vad. As the voltages on the storage capacitor lines 24*a* and 24*b* change in this manner, the voltages Vlca and Vlcb applied to the respective subpixel electrodes change into:

$$Vlca=Vs-Vd+2\times Kc\times Vad$$

$$Vlcb=Vs-Vd-2\times Kc\times Vad$$

respectively, where Kc=CCS/(CLC(V)+CCS).

Next, at a time T4, Vcsa falls from Vcom+Vad to Vcom−Vad and Vcsb rises from Vcom−Vad to Vcom+Vad. That is to say, these voltages Vcsa and Vcsb both change twice as much as Vad again. In this case, Vlca and Vlcb also change from $$Vlca=Vs-Vd+2\times Kc\times Vad$$

$$Vlcb=Vs-Vd-2\times Kc\times Vad$$

into $$Vlca=Vs-Vd$$

$$Vlcb=Vs-Vd$$

respectively.

Next, at a time T5, Vcsa rises from Vcom−Vad to Vcom+Vad and Vcsb falls from Vcom+Vad to Vcom−Vad. That is to say, these voltages Vcsa and Vcsb both change twice as much as Vad again. In this case, Vlca and Vlcb also change from $$Vlca=Vs-Vd$$

$$Vlcb=Vs-Vd$$

into $$Vlca=Vs-Vd+2\times Kc\times Vad$$

$$Vlcb=Vs-Vd-2\times Kc\times Vad$$

respectively.

After that, every time a period of time that is an integral number of times, and at least four times, as long as one horizontal scanning period (or one horizontal write period) 1H has passed, the voltages Vcsa, Vcsb, Vlca and Vlcb alternate their levels at the times T4 and T5. Consequently, the effective values of the voltages Vlca and Vlcb applied to the subpixel electrodes become:

$$Vlca=Vs-Vd+Kc\times Vad$$

$$Vlcb=Vs-Vd-Kc\times Vad$$

respectively.

Therefore, the effective voltages V1 and V2 applied to the liquid crystal layers 13*a* and 13*b* of the subpixels 10*a* and 10*b* become:

$$V1=Vlca-V\text{com}$$

$$V2=Vlcb-V\text{com}$$

That is to say, $$V1=Vs-Vd+Kc\times Vad-V\text{com}$$

$$V2=Vs-Vd-Kc\times Vad-V\text{com}$$

respectively.

As a result, the difference ΔV12 (=V1−V2) between the effective voltages applied to the liquid crystal layers 13*a* and 13*b* of the subpixels 10*a* and 10*b* becomes ΔV12=2×Kc×Vad (where Kc=CCS/(CLC(V)+CCS)). Thus, mutually different voltages can be applied to the liquid crystal layers 13*a* and 13*b*.

FIG. 79 schematically shows the relation between V1 and V2. As can be seen from FIG. 79, the smaller the V1 value, the bigger ΔV12 in the liquid crystal display device 200. Since ΔV12 increases as the V1 value decreases in this manner, the excessively high contrast ratio can be reduced, among other things.

Patent Document No. 1: Japanese Patent Gazette for Opposition No. 63-21907

Patent Document No. 2: Japanese Patent Application Laid-Open Publication No. 11-242225

Patent Document No. 3: Japanese Patent Application Laid-Open Publication No. 10-186330

Patent Document No. 4: Japanese Patent Application Laid-Open Publication No. 2002-55343

Patent Document No. 5: Japanese Patent Application Laid-Open Publication No. 2004-62146 (corresponding to U.S. Pat. No. 6,958,791)

DISCLOSURE OF INVENTION

Problems to be Solved by the Invention

However, the present inventors discovered and confirmed via experiments that when the multi-pixel structure disclosed in Patent Document No. 5 was applied to either a high-definition LCD TV monitor or a large-screen LCD TV monitor, the viewing angle dependence of the γ characteristic could be certainly reduced but instead the following problem would arise. The entire disclosure of U.S. Pat. No. 6,958,791 is hereby incorporated by reference.

Specifically, if the oscillating voltage applied to the storage capacitor counter electrodes (through CS bus lines) has a short period of oscillation, then it would be increasingly difficult (and expensive) to make a circuit for generating the oscillating voltage, the power dissipation would increase too much, or the influence of waveform blunting due to the electrical impedance of the CS bus lines would be more and more significant. This is because as the definition or the size of a display panel increases, the oscillating voltage comes to have an even shorter period of oscillation. Furthermore, if a plurality of electrically independent CS trunks are arranged such that one period of oscillation of the oscillating voltage applied to the storage capacitor counter electrodes is extended so much as to overcome this problem, then it might debase the display quality as will be described later.

On top of that, when a still picture is presented, the difference in luminance between subpixels could be sensed as unevenness of the image.

In order to overcome the problems described above, the present invention has an object of providing a liquid crystal display device and its driving method that can avoid the deterioration in display quality even if the oscillating voltage supplied to the CS bus lines has an extended period of oscillation when the area ratio gray scale display technology is applied to a large-screen or high-definition LCD panel. Another object of the present invention is to provide a liquid crystal display device that achieves high display quality by making the difference in luminance between the subpixels hardly sensible as unevenness even in presenting a still picture and a method for driving such a device.

Means for Solving the Problems

A liquid crystal display device according to the present invention includes a plurality of pixels that are arranged in columns and rows so as to form a matrix pattern. Each pixel includes a liquid crystal layer and a plurality of electrodes for applying a voltage to the liquid crystal layer. Each pixel includes a first subpixel and a second subpixel, having liquid crystal layers to which mutually different voltages are applicable, and two switching elements that are provided for the first and second subpixels, respectively. Each of the first and second subpixels includes a liquid crystal capacitor formed by a counter electrode and a subpixel electrode that faces the counter electrode through the liquid crystal layer, and a storage capacitor formed by a storage capacitor electrode that is electrically connected to the subpixel electrode, an insulating layer, and a storage capacitor counter electrode that is opposed to the storage capacitor electrode with the insulating layer interposed between them. The counter electrode is a single electrode provided in common for the first and second subpixels, while the storage capacitor counter electrodes of the first and second subpixels are electrically independent of each other. A storage capacitor counter voltage to be applied to each storage capacitor counter electrode by way of its associated storage capacitor line has a first period (A) with a first waveform during one vertical scanning period. The first waveform oscillates between multiple voltage revels in a first cycle time ($P_A$) that is an integral number of times, and at least four times, as long as one horizontal scanning period (H).

Each of the multiple voltage levels has a flat portion with a duration TP. While the two switching elements are both ON, a display signal voltage is applied to the respective subpixel electrodes and respective storage capacitor electrodes of the first and second subpixels. After the two switching elements have been turned OFF, voltages at the respective storage capacitor counter electrodes of the first and second subpixels change. And if an interval between a point in time when the two switching elements in ON state have just been turned OFF and a point in time when the storage capacitor counter voltage changes for the first time is βH, the device satisfies the inequality $TP/4 \leqq \beta < 3 \cdot TP/4$.

Another liquid crystal display device according to the present invention includes a plurality of pixels that are arranged in columns and rows so as to form a matrix pattern. Each pixel includes a liquid crystal layer and a plurality of electrodes for applying a voltage to the liquid crystal layer. Each pixel includes a first subpixel and a second subpixel, having liquid crystal layers to which mutually different voltages are applicable, and two switching elements that are provided for the first and second subpixels, respectively. Each of the first and second subpixels includes a liquid crystal capacitor formed by a counter electrode and a subpixel electrode that faces the counter electrode through the liquid crystal layer, and a storage capacitor formed by a storage capacitor electrode that is electrically connected to the subpixel electrode, an insulating layer, and a storage capacitor counter electrode that is opposed to the storage capacitor electrode with the insulating layer interposed between them. The counter electrode is a single electrode provided in common for the first and second subpixels, while the storage capacitor counter electrodes of the first and second subpixels are electrically independent of each other. The device further includes a plurality of electrically independent storage capacitor trunks. Each storage capacitor trunk is electrically connected to the respective storage capacitor counter electrodes of either the first subpixels or the second subpixels of the pixels through storage capacitor lines. The storage capacitor trunks include an even number L of electrically independent storage capacitor trunks. A storage capacitor counter voltage to be supplied by way of each storage capacitor trunk to its associated storage capacitor line has a first period (A) with a first waveform during one vertical scanning period. The first waveform oscillates between multiple voltage levels in a first cycle time ($P_A$), which is either $K \cdot L$ or $2 \cdot K \cdot L$ times as long as one horizontal scanning period (H), where K is a positive integer and $K \cdot L$ or $2 \cdot K \cdot L$ is at least equal to four. While the two switching elements are both ON, a display signal voltage is applied to the respective subpixel electrodes and respective storage capacitor electrodes of the first and second subpixels. After the two switching elements have been turned OFF, voltages at the respective storage capacitor counter electrodes of the first and second subpixels change. And if an interval between a point in time when the two switching elements in ON state have just been turned OFF and a point in time when the storage capacitor counter voltage changes for the first time is βH, the device satisfies the inequality $P_A/4H-1-\mathrm{Int}(K/2) \leqq \beta < P_A/4H+\mathrm{Int}(K/2)$ in each pixel, where Int(x) is the integral part of an arbitrary real number x. $P_A/2$ is preferably an even number and the multiple voltage levels of the first waveform preferably last for the same period of time.

In one preferred embodiment, the first cycle time ($P_A$) is $2 \cdot L$ times as long as one horizontal scanning period (H) and the device satisfies one of the three inequalities $P_A/4H-2 \leqq \beta < P_A/4H-1$, $P_A/4H-1 \leqq \beta < P_A/4H$, and $P_A/4H \leqq \beta < P_A/4H+1$ in every pixel.

In this particular preferred embodiment, the first cycle time ($P_A$) is L times as long as one horizontal scanning period (H) and the device satisfies the inequality $P_A/4H-1 \leqq \beta < P_A/4H$ in every pixel.

In another preferred embodiment, four display states, in which either the luminance ranking of the first and second subpixels or the combination of polarities of the display signal voltages with respect to the counter electrode changes one after another, appear in each series of four vertical scanning periods.

In this particular preferred embodiment, one of the interval at which the first and second subpixels reverse their luminance ranking and the interval at which the polarity of the display signal voltage is inverted with respect to the counter electrode is two vertical scanning periods and the other interval is four vertical scanning periods.

In an alternative preferred embodiment, both the interval at which the first and second subpixels reverse their luminance ranking and the interval at which the polarity of the display signal voltage is inverted with respect to the counter electrode are four vertical scanning periods but have a phase difference of one vertical scanning period between them.

A liquid crystal display device according to the present invention includes a plurality of pixels that are arranged in columns and rows so as to form a matrix pattern. Each pixel includes a liquid crystal layer and a plurality of electrodes for applying a voltage to the liquid crystal layer. Each pixel includes a first subpixel and a second subpixel, having liquid crystal layers to which mutually different voltages are applicable. The first subpixel has higher luminance than the second subpixel at a particular gray scale. Each of the first and second subpixels includes: a liquid crystal capacitor formed by a counter electrode and a subpixel electrode that faces the counter electrode through the liquid crystal layer; and a storage capacitor formed by a storage capacitor electrode that is electrically connected to the subpixel electrode, an insulating layer, and a storage capacitor counter electrode that is opposed to the storage capacitor electrode with the insulating layer interposed between them. The counter electrode is a single electrode provided in common for the first and second subpixels, while the storage capacitor counter electrodes of the first and second subpixels are electrically independent of each other. The storage capacitor counter electrode of the first subpixel of an arbitrary one of the pixels and the storage capacitor counter electrode of the second subpixel of a pixel that is adjacent to the arbitrary pixel in a column direction are also electrically independent of each other. The device further includes a plurality of electrically independent storage capacitor trunks. Each storage capacitor trunk is electrically connected to the respective storage capacitor counter electrodes of either the first subpixels or the second subpixels of the pixels through storage capacitor lines. A storage capacitor counter voltage supplied through each storage capacitor trunk has a first period (A) with a first waveform and a second period (B) with a second waveform within one vertical scanning period (V-Total) of an input video signal. The sum of the first and second periods is equal to one vertical scanning period (V-Total=A+B). The first waveform oscillates between first and second voltage levels in a first cycle time $P_A$, which is an integral number of times as long as, and at least twice as long as, one horizontal scanning period (H). The second waveform is defined such that the effective value of the storage capacitor counter voltage has a predetermined constant value every predetermined number of consecutive vertical scanning periods, the number being equal to or smaller than 20.

In one preferred embodiment, the predetermined number of vertical scanning periods is equal to or smaller than four.

In another preferred embodiment, the predetermined constant value is equal to the average of the first and second voltage levels of the first waveform.

In still another preferred embodiment, the storage capacitor trunks include an even number L of electrically independent storage capacitor trunks. The first cycle time $P_A$ is either L times (=L·H), or 2·K·L times, as long as one horizontal scanning period, where K is a positive integer. And a part of the first cycle time at the first voltage level is as long as the other part of the first cycle time at the second voltage level.

In yet another preferred embodiment, the second waveform is defined such that the second waveform for one vertical scanning period has an effective value that is equal to the average of the first and second voltage levels.

In this particular preferred embodiment, the second waveform oscillates between third and fourth voltage levels in a second cycle time, which is a positive integral number of times as long as one horizontal scanning period.

In a specific preferred embodiment, the third voltage level is equal to the first voltage level and the fourth voltage level is equal to the second voltage level.

Alternatively or additionally, the second period is an even number of times as long as one horizontal scanning period, and a part of the second period at the third voltage level is as long as the other part of the second period at the fourth voltage level.

In an alternative preferred embodiment, the second period is an odd number of times as long as one horizontal scanning period. In the second period of one vertical scanning period, part of the second period at the third voltage level is shorter than the other part of the second period at the fourth voltage level by one horizontal scanning period. In the second period of the next vertical scanning period, part of the second period at the third voltage level is also shorter than the other part of the second period at the fourth voltage level by one horizontal scanning period.

In yet another preferred embodiment, the first period is a half-integral (an integer plus a half) number of times as long as the first cycle time.

In this particular preferred embodiment, if the pixels form a number N of pixel rows, an effective display period (V-Disp) is N times as long as one horizontal scanning period (if V-Disp=N·H), and the first cycle time is identified by $P_A$, the first period (A) satisfies $A=[\mathrm{Int}\{(N\cdot H-P_A/2)/P_A\}+½]\cdot P_A+M\cdot P_A$, where Int(x) is an integral part of an arbitrary real number x and M is an integer that is equal to or greater than zero.

In an alternative preferred embodiment, if one vertical scanning period (V-Total) is Q times as long as one horizontal scanning period (if V-Total=Q·H) where Q is a positive integer and if the first cycle time is identified by $P_A$, the first period (A) satisfies $A=[\mathrm{Int}\{(Q\cdot H-P_A/2)/P_A\}+½]\cdot P_A$, where Int(x) is an integral part of an arbitrary real number x.

Still alternatively, if one vertical scanning period (V-Total) is Q times as long as one horizontal scanning period (if V-Total=Q·H) where Q is a positive integer and if the first cycle time is identified by $P_A$, the first period (A) satisfies $A=[\mathrm{Int}\{(Q\cdot H-3\cdot P_A/2)/P_A\}+½]\cdot P_A$, where Int(x) is an integral part of an arbitrary real number x.

In yet another preferred embodiment, the storage capacitor counter voltage has its phase shifted by 180 degrees every vertical scanning period.

In yet another preferred embodiment, the storage capacitor trunks are an even number of storage capacitor trunks, which consist of multiple pairs of storage capacitor trunks, each pair supplying storage capacitor counter voltages, of which the oscillating phases are different from each other by 180 degrees.

A TV receiver according to the present invention includes a liquid crystal display device according to any of the preferred embodiments of the present invention described above.

An LCD driving method according to the present invention is a method for driving a liquid crystal display device, which includes a plurality of pixels that are arranged in columns and rows so as to form a matrix pattern. Each pixel includes a liquid crystal layer and a plurality of electrodes for applying a voltage to the liquid crystal layer. Each pixel includes a first subpixel and a second subpixel, having liquid crystal layers to which mutually different voltages are applicable. The first subpixel has higher luminance than the second subpixel at a particular gray scale. Each of the first and second subpixels includes: a liquid crystal capacitor formed by a counter electrode and a subpixel electrode that faces the counter electrode through the liquid crystal layer; and a storage capacitor formed by a storage capacitor electrode that is electrically connected to the subpixel electrode, an insulating layer, and a storage capacitor counter electrode that is opposed to the storage capacitor electrode with the insulating layer interposed between them. The counter electrode is a single electrode provided in common for the first and second subpixels, while the storage capacitor counter electrodes of the first and second subpixels are electrically independent of each other. The storage capacitor counter electrode of the first subpixel of an arbitrary one of the pixels and the storage capacitor counter electrode of the second subpixel of a pixel that is adjacent to the arbitrary pixel in a column direction are also electrically independent of each other. The device further includes a plurality of electrically independent storage capacitor trunks. Each storage capacitor trunk is electrically connected to the respective storage capacitor counter electrodes of either the first subpixels or the second subpixels of the pixels through storage capacitor lines. The method includes the step of providing storage capacitor counter voltages for the respective storage capacitor trunks. The storage capacitor counter voltage has a first period (A) with a first waveform and a second period (B) with a second waveform within one vertical scanning period (V-Total) of an input video signal. The sum of the first and second periods is equal to one vertical scanning period (V-Total=A+B). The first waveform oscillates between first and second voltage levels in a first cycle time $P_A$, which is an integral number of times as long as, and at least twice as long as, one horizontal scanning period (H). The second waveform is defined such that the effective value of the storage capacitor counter voltage has a predetermined constant value every predetermined number of consecutive vertical scanning periods, the number being equal to or smaller than 20.

In one preferred embodiment, the electrically independent storage capacitor trunks include an even number L of storage capacitor trunks. The step of providing storage capacitor counter voltages includes the steps of: calculating an integer Q, the product (Q·H) of which and one horizontal scanning period H is equal to one vertical scanning period (V-Total) of an input video signal; calculating A that satisfies either $A=[\mathrm{Int}\{(N-L/2)/L\}+½]\cdot L\cdot H+M\cdot L\cdot H$ or $A=[\mathrm{Int}\{(N-K\cdot L)/(2\cdot K\cdot L)\}+½]\cdot 2\cdot K\cdot L\cdot H+2\cdot M\cdot K\cdot L\cdot H$ (where Int(x) is an integral part of an arbitrary real number x, K is a positive integer, and M is an integer that is equal to or greater than zero) if the pixels form a number N of pixel rows, one horizontal scanning period is identified by H, and an effective display period (V-Disp) is N·H; calculating B that satisfies Q·H−A=B; and generating a storage capacitor counter voltage that has a first waveform in a first period with a length A and a second waveform in a second period with a length B. The first waveform oscillates between first and second voltage levels in a first cycle time $P_A$, which is either L·H or 2·K·L·H. The second waveform oscillates between third and fourth voltage levels. The average of the third and fourth voltage levels is equal to that of the first and second voltage levels. If B/H is an even number, the third voltage level last as long as the fourth voltage level. If B/H is an odd number, the third voltage level lasts shorter than the fourth voltage level by one horizontal scanning period in a vertical scanning period. And in the second period of the next vertical scanning period, the third voltage level also lasts shorter than the fourth voltage level by one horizontal scanning period.

In another preferred embodiment, the electrically independent storage capacitor trunks include an even number L of storage capacitor trunks. The step of providing storage capacitor counter voltages includes the steps of: calculating an integer Q, the product (Q·H) of which and one horizontal scanning period H is equal to one vertical scanning period (V-Total) of an input video signal; calculating A that satisfies either $A=[\mathrm{Int}\{(Q-L)/L\}+\frac{1}{2}]\cdot L\cdot H$ or $A=[\mathrm{Int}\{(Q-2\cdot K\cdot L)/(2\cdot K\cdot L)\}+\frac{1}{2}]\cdot 2\cdot K\cdot L\cdot H$ (where Int(x) is an integral part of an arbitrary real number x and K is a positive integer); calculating B that satisfies Q·H−A=B; and generating a storage capacitor counter voltage that has a first waveform in a first period with a length A and a second waveform in a second period with a length B. The first waveform oscillates between first and second voltage levels in a first cycle time $P_A$, which is either L·H or 2·K·L·H. The second waveform oscillates between third and fourth voltage levels. The average of the third and fourth voltage levels is equal to that of the first and second voltage levels. If B/H is an even number, the third voltage level last as long as the fourth voltage level. If B/H is an odd number, the third voltage level lasts shorter than the fourth voltage level by one horizontal scanning period in a vertical scanning period. And in the second period of the next vertical scanning period, the third voltage level also lasts shorter than the fourth voltage level by one horizontal scanning period.

In still another preferred embodiment, the electrically independent storage capacitor trunks include an even number L of storage capacitor trunks. The step of providing storage capacitor counter voltages includes the steps of: calculating an integer Q, the product (Q·H) of which and one horizontal scanning period H is equal to one vertical scanning period (V-Total) of an input video signal; calculating A that satisfies either $A=[\mathrm{Int}\{(Q-3\cdot L/2)/L\}+\frac{1}{2}]\cdot L$ or $A=[\mathrm{Int}\{(Q-3\cdot K\cdot L)/(2\cdot K\cdot L)\}+\frac{1}{2}]\cdot 2\cdot K\cdot L\cdot H$ (where Int(x) is an integral part of an arbitrary real number x and K is a positive integer); calculating B that satisfies Q·H−A=B; and generating a storage capacitor counter voltage that has a first waveform in a first period with a length A and a second waveform in a second period with a length B. The first waveform oscillates between first and second voltage levels in a first cycle time $P_A$, which is either L·H or 2·K·L·H. The second waveform oscillates between third and fourth voltage levels. The average of the third and fourth voltage levels is equal to that of the first and second voltage levels. If B/H is an even number, the third voltage level last as long as the fourth voltage level. If B/H is an odd number, the third voltage level lasts shorter than the fourth voltage level by one horizontal scanning period in a vertical scanning period. And in the second period of the next vertical scanning period, the third voltage level also lasts shorter than the fourth voltage level by one horizontal scanning period.

In yet another preferred embodiment, the storage capacitor counter voltage has its phase shifted by 180 degrees every vertical scanning period.

In yet another preferred embodiment, the step of calculating an integer Q, the product (Q·H) of which and one horizontal scanning period H is equal to one vertical scanning period (V-Total) of an input video signal is performed on the period before the previous vertical scanning period.

Effects of the Invention

The present invention provides a liquid crystal display device and its driving method that can avoid the deterioration in display quality even if the oscillating voltage supplied to CS bus lines has an extended period of oscillation particularly when the area ratio gray scale display technology is applied to a large-screen or high-resolution LCD panel. The present invention also provides a liquid crystal display device that achieves high display quality by making the difference in luminance between the subpixels hardly sensible as unevenness even in presenting a still picture and a method for driving such a device.

BRIEF DESCRIPTION OF DRAWINGS

FIG. 5(*a*) is a diagram schematically illustrating a configuration for supplying an oscillating voltage to the CS bus lines of a liquid crystal display device as a preferred embodiment according to the second aspect of the present invention, and FIG. 5(*b*) schematically shows an equivalent circuit that approximates the electrical load impedance thereof.

Figure 6:
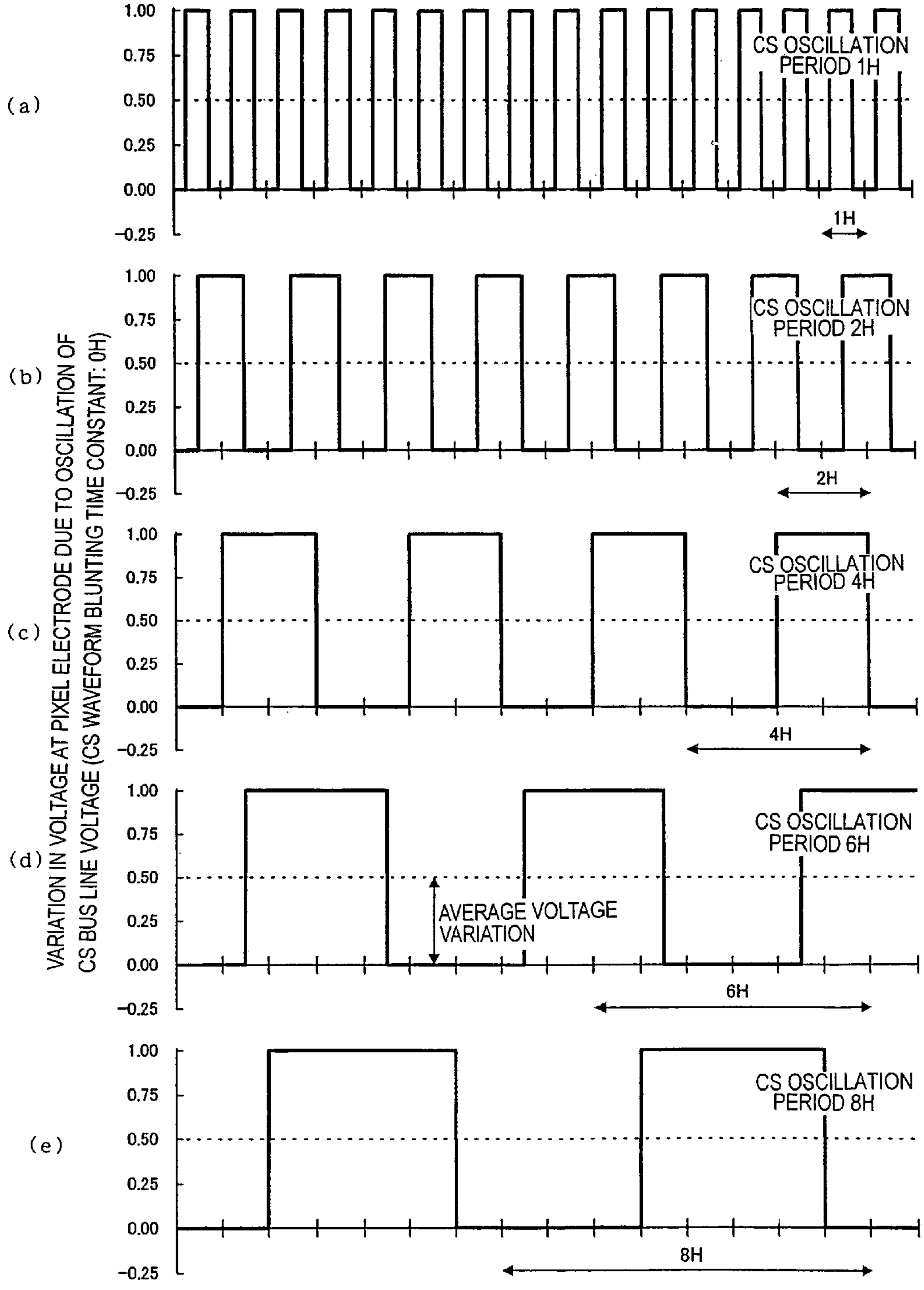

Portions (a) through (e) of FIG. 6 schematically show the waveforms of oscillating voltages to be applied to subpixel electrodes in a situation where there is no waveform blunting in the CS voltage.

Figure 7:
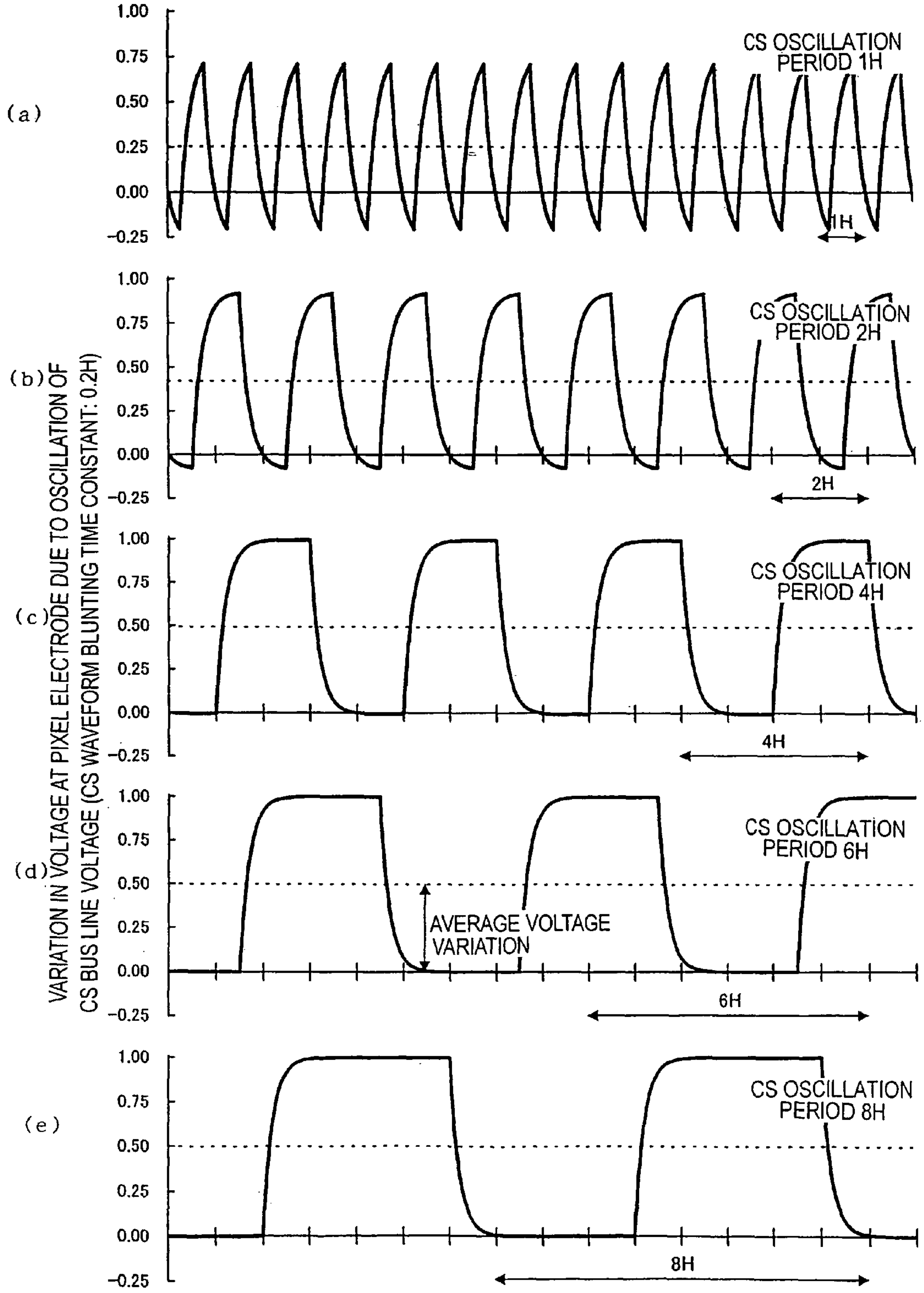

Portions (a) through (e) of FIG. 7 schematically show the waveforms of oscillating voltages to be applied to subpixel electrodes in a situation where waveform blunting has occurred when the CR time constant is 0.2H.

Figure 8:
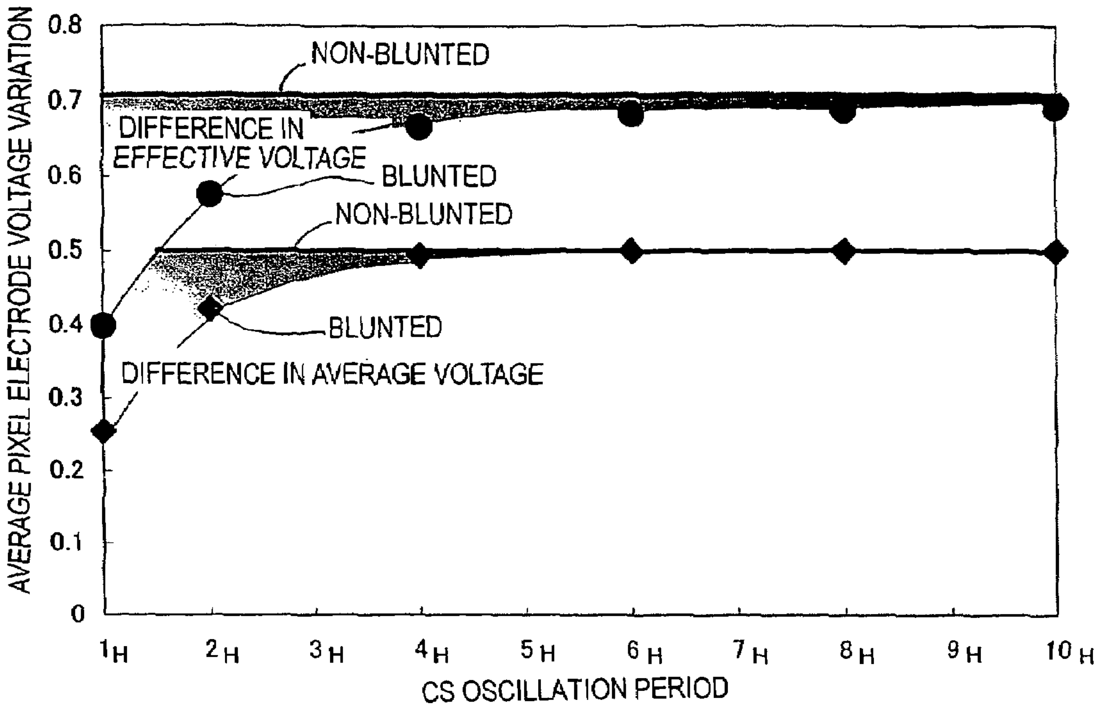

FIG. 8 shows how the average and effective values of the oscillating voltages, calculated based on the waveforms shown in FIGS. 6 and 7, change with one oscillation period of the CS bus line voltage.

Figure 9:
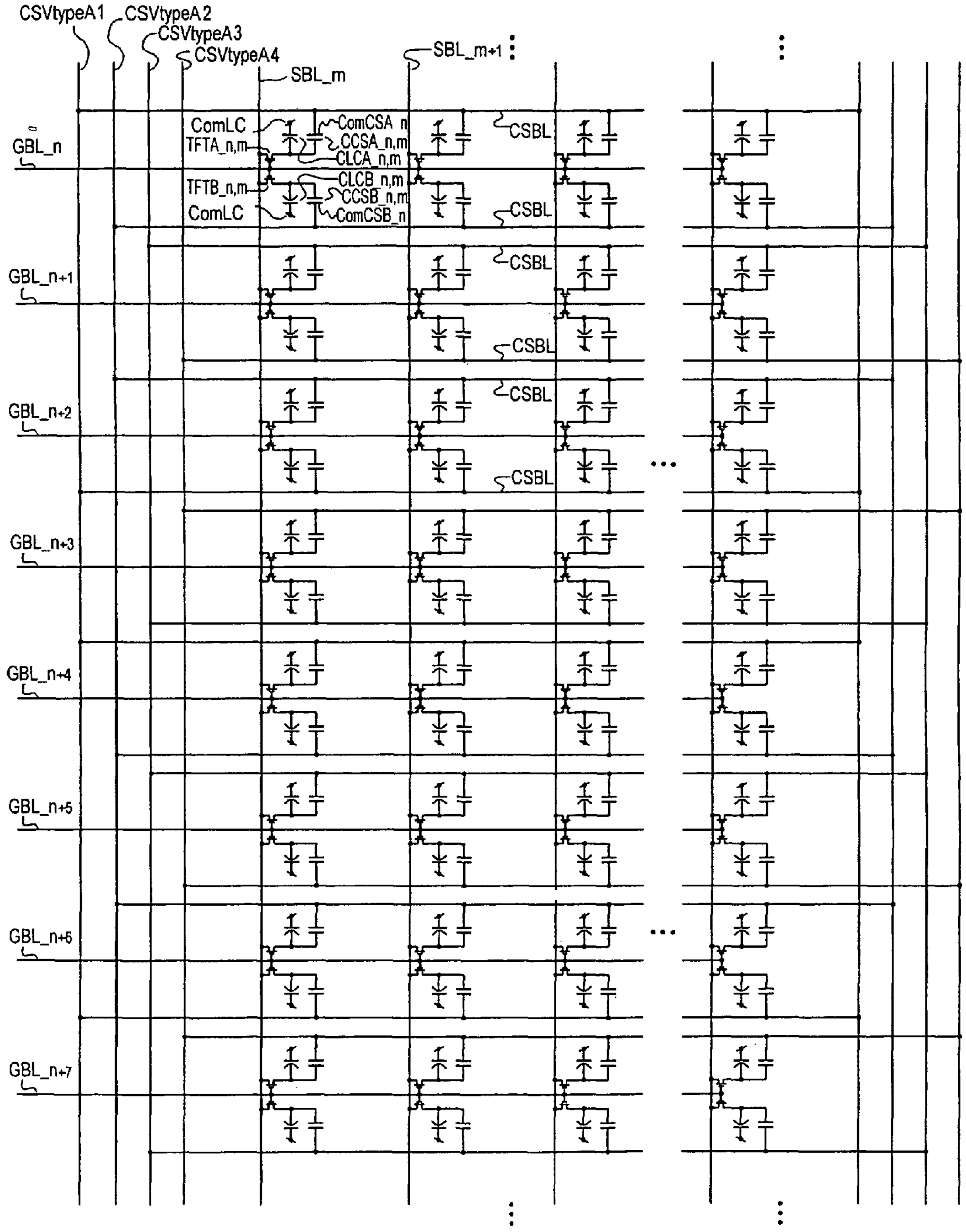

FIG. 9 schematically shows an equivalent circuit diagram of a liquid crystal display device with Type I arrangement according to a preferred embodiment of the present invention.

Figure 10A:
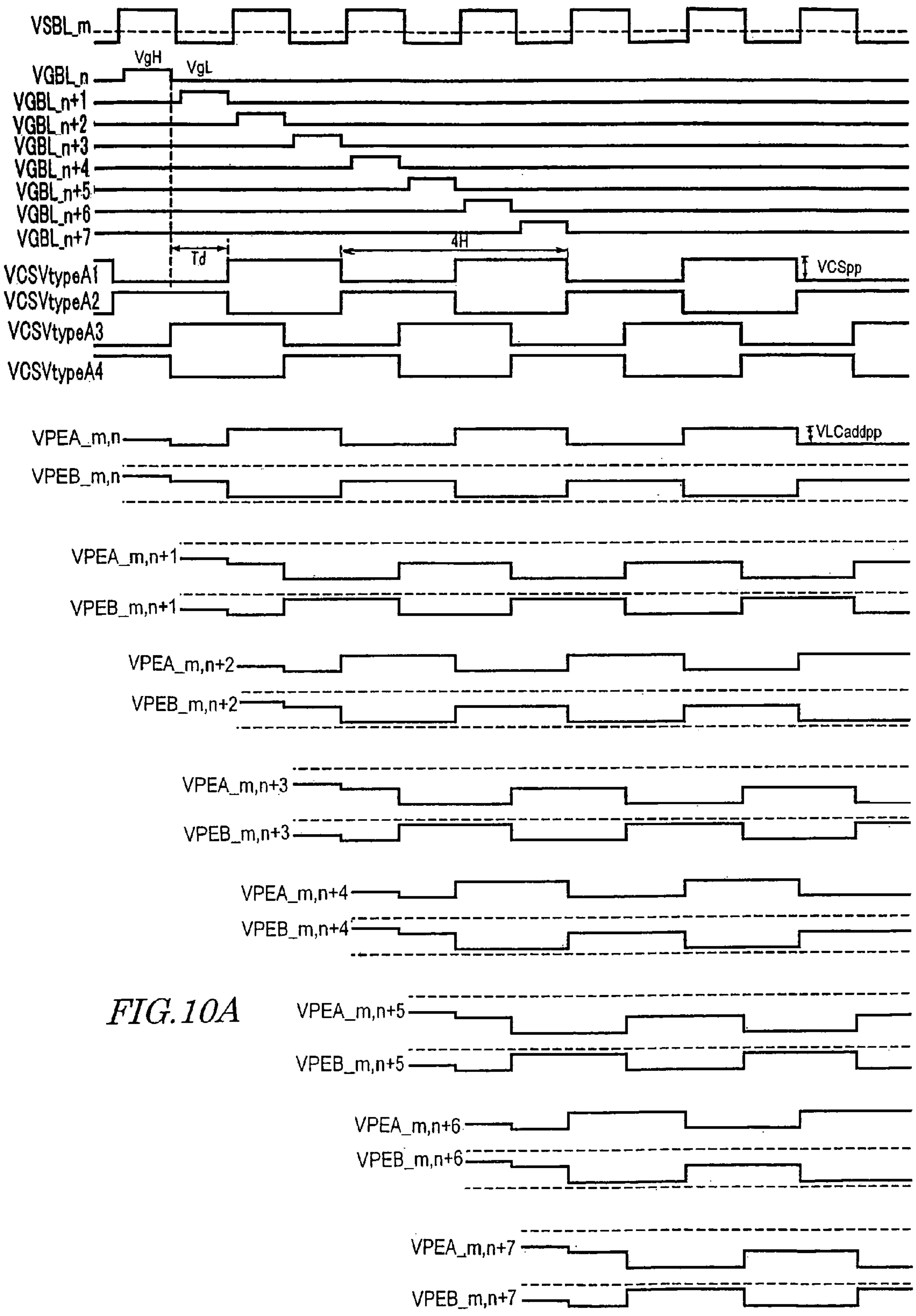

FIG. 10A shows the periods and phases of oscillation of oscillating voltages supplied to CS bus lines with respect to the voltage waveforms on gate bus lines and the voltages applied to subpixel electrodes in the liquid crystal display device shown in FIG. 9.

Figure 10B:
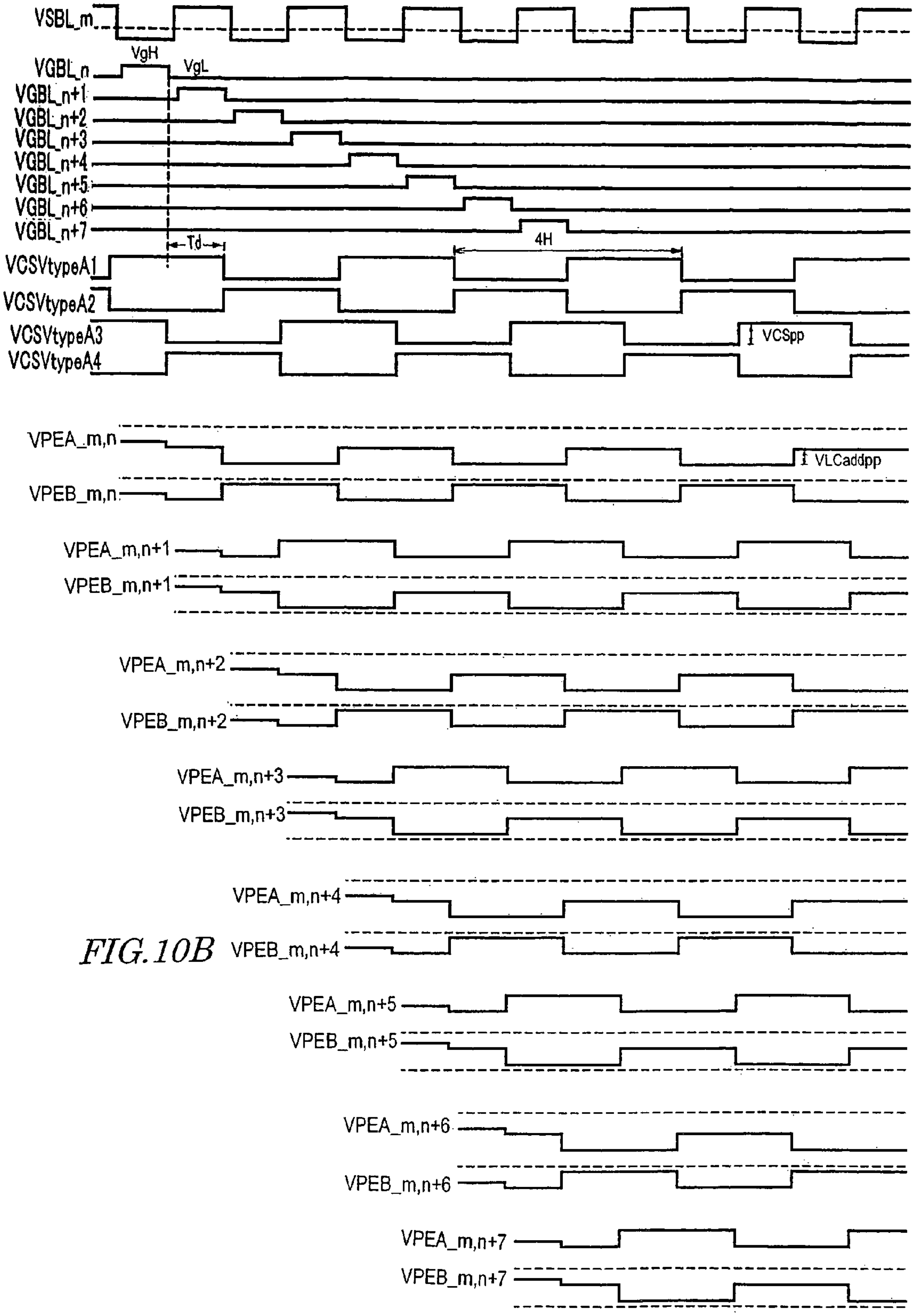

FIG. 10B shows the periods and phases of oscillation of oscillating voltages supplied to CS bus lines with respect to the voltage waveforms on gate bus lines and the voltages applied to subpixel electrodes in the liquid crystal display device shown in FIG. 9 (in which the voltage applied to the liquid crystal layer has its polarity inverted compared to FIG. 10A).

Figure 11A:
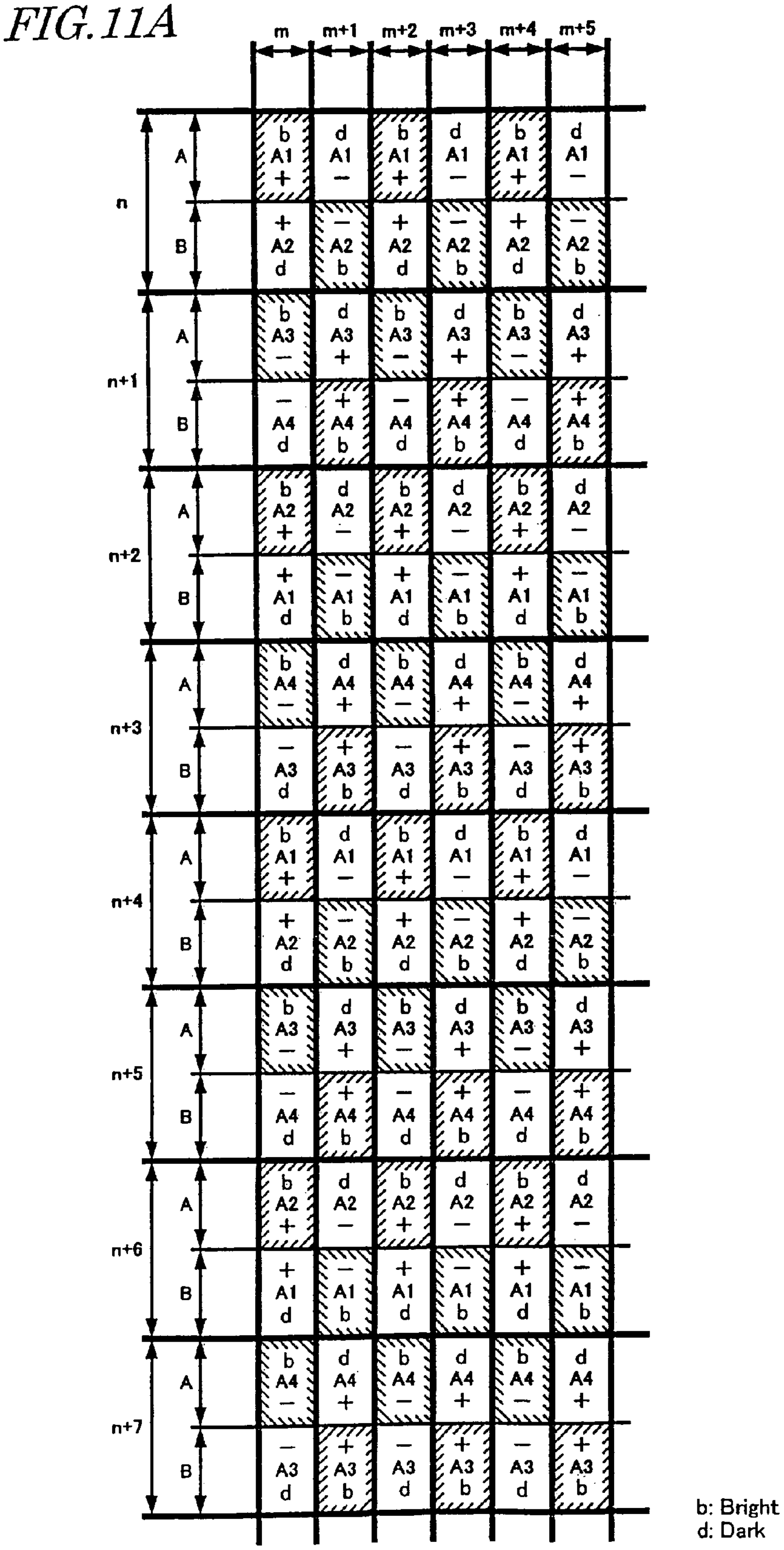

FIG. 11A is a schematic representation showing the drive state of the liquid crystal display device shown in FIG. 9 (in a situation where the voltages shown in FIG. 10A are used).

Figure 11B:
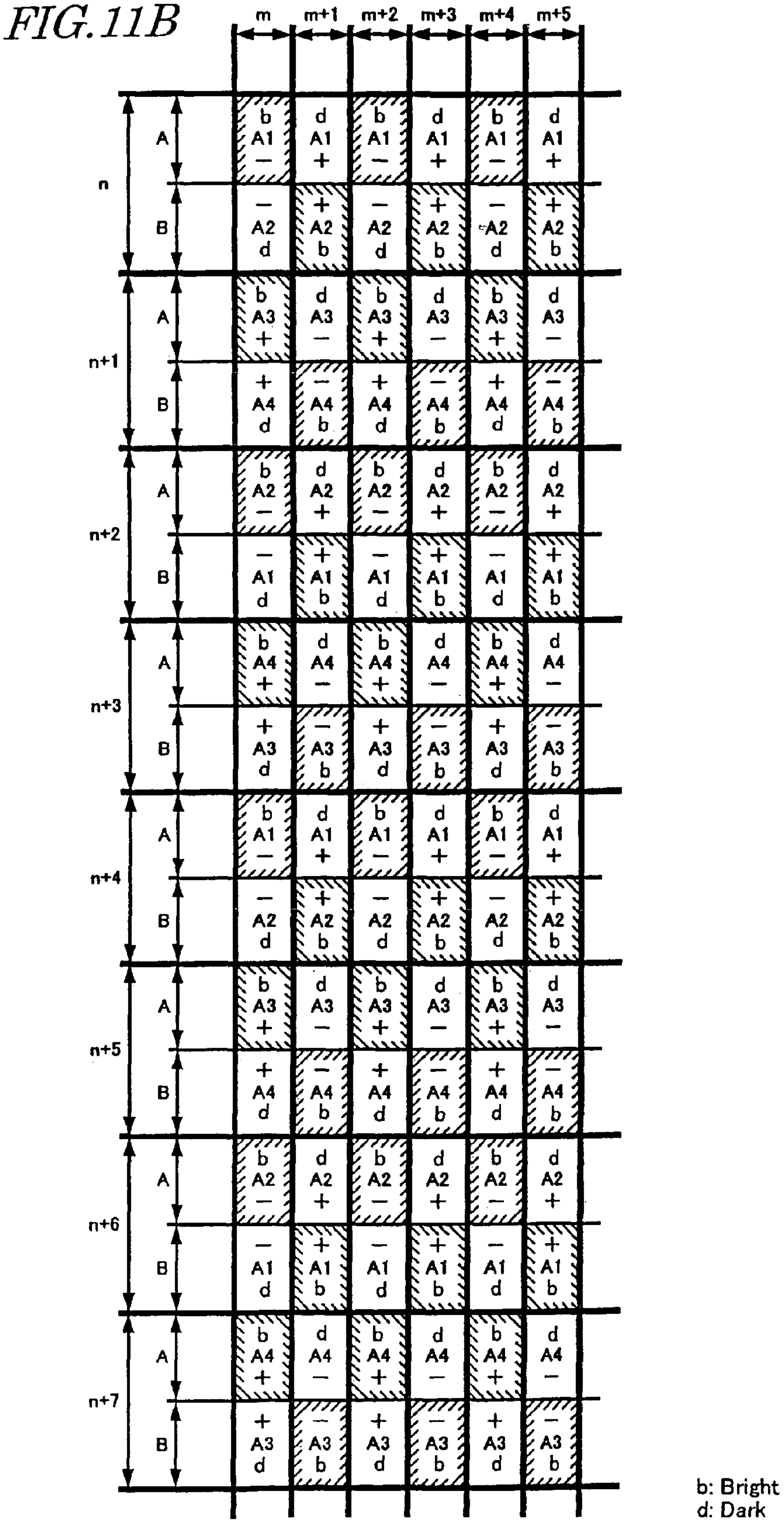

FIG. 11B is a schematic representation showing the drive state of the liquid crystal display device shown in FIG. 9 (in a situation where the voltages shown in FIG. 10B are used).

Figure 12:
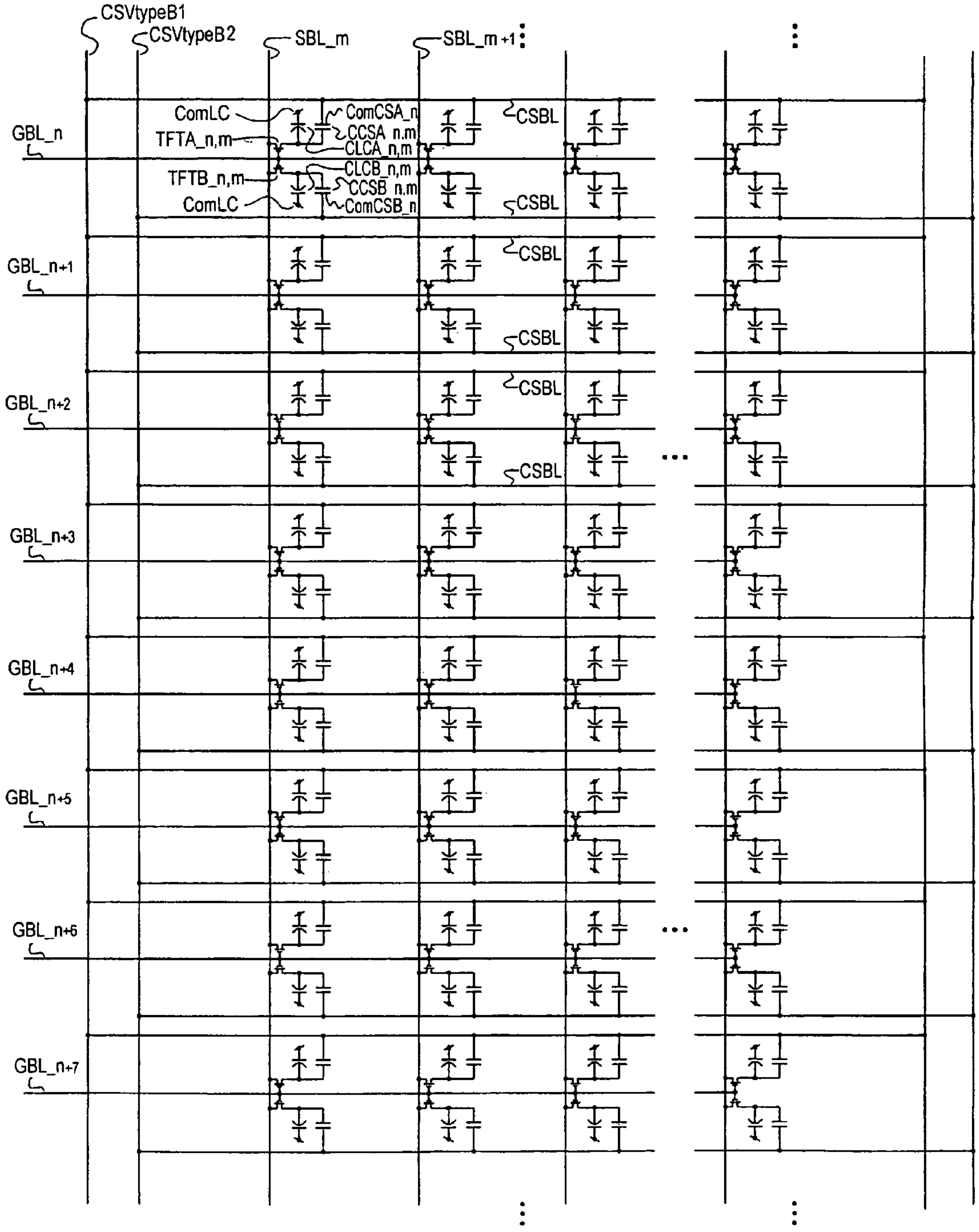

FIG. 12 schematically shows an equivalent circuit diagram of a liquid crystal display device with Type I arrangement according to another preferred embodiment of the present invention.

Figure 13A:
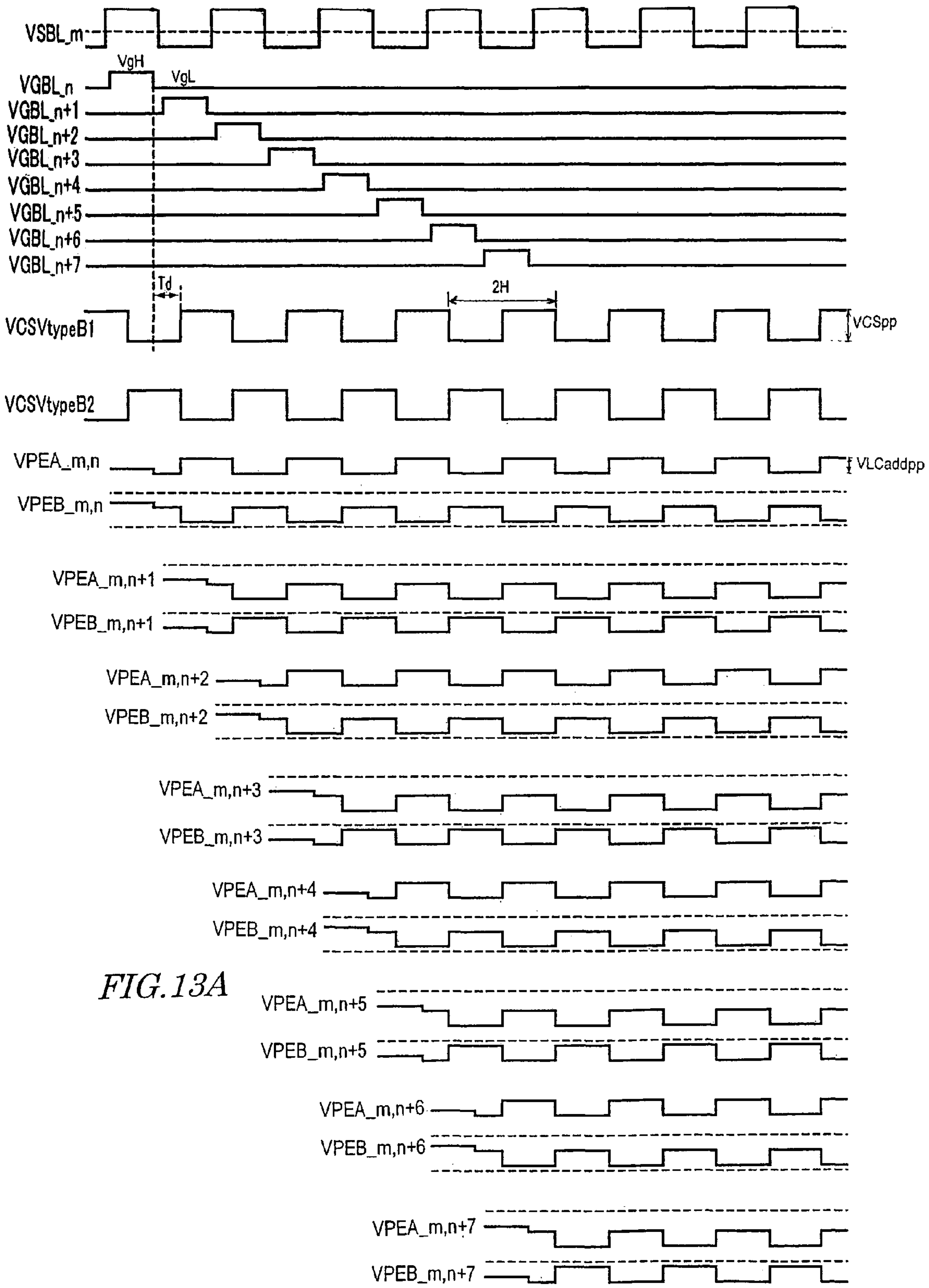

FIG. 13A shows the periods and phases of oscillation of oscillating voltages supplied to CS bus lines with respect to the voltage waveforms on gate bus lines and the voltages applied to subpixel electrodes in the liquid crystal display device shown in FIG. 12.

Figure 13B:
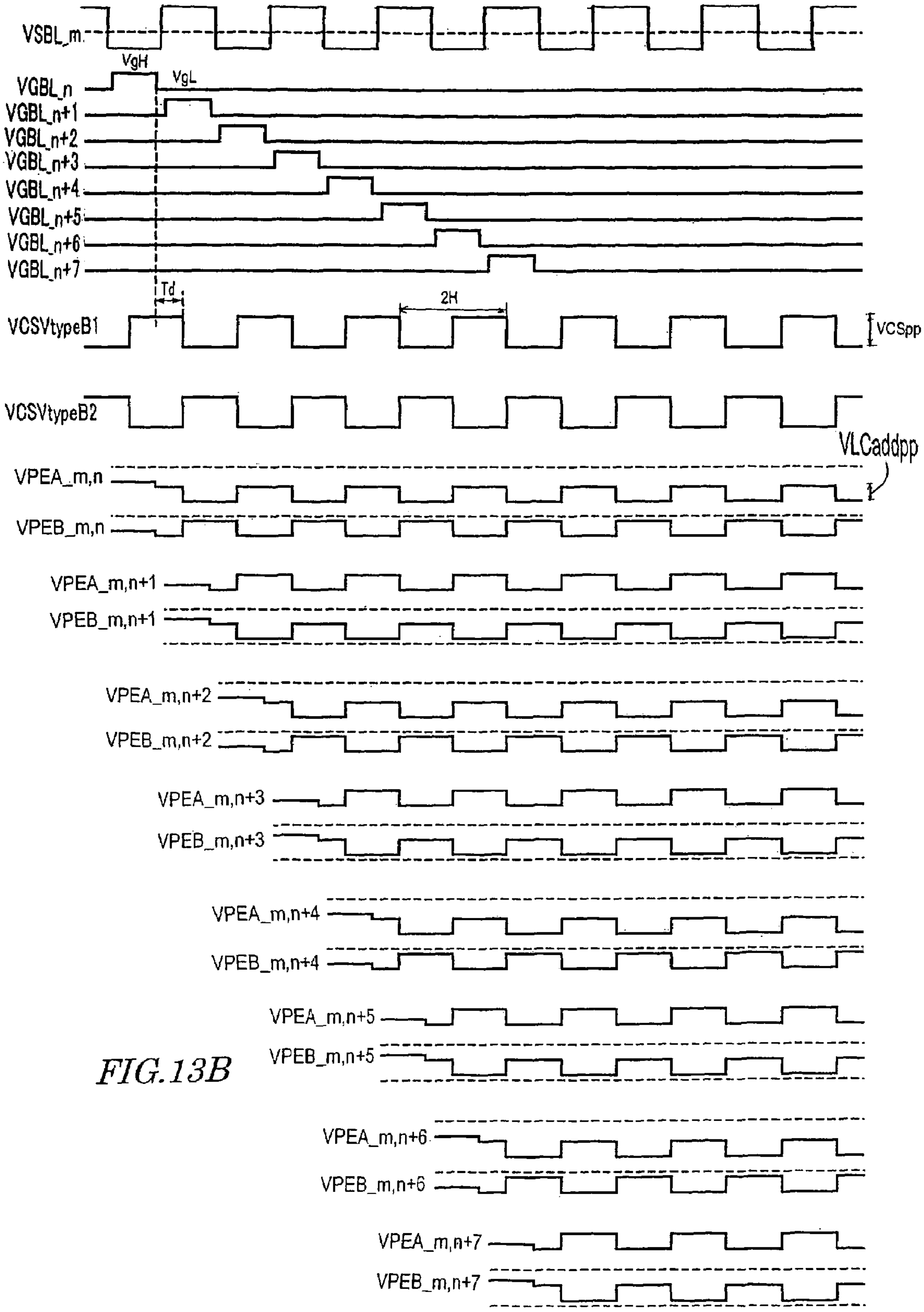

FIG. 13B shows the periods and phases of oscillation of oscillating voltages supplied to CS bus lines with respect to the voltage waveforms on gate bus lines and the voltages applied to subpixel electrodes in the liquid crystal display device shown in FIG. 12 (in which the voltage applied to the liquid crystal layer has its polarity inverted compared to FIG. 13A).

Figure 14A:
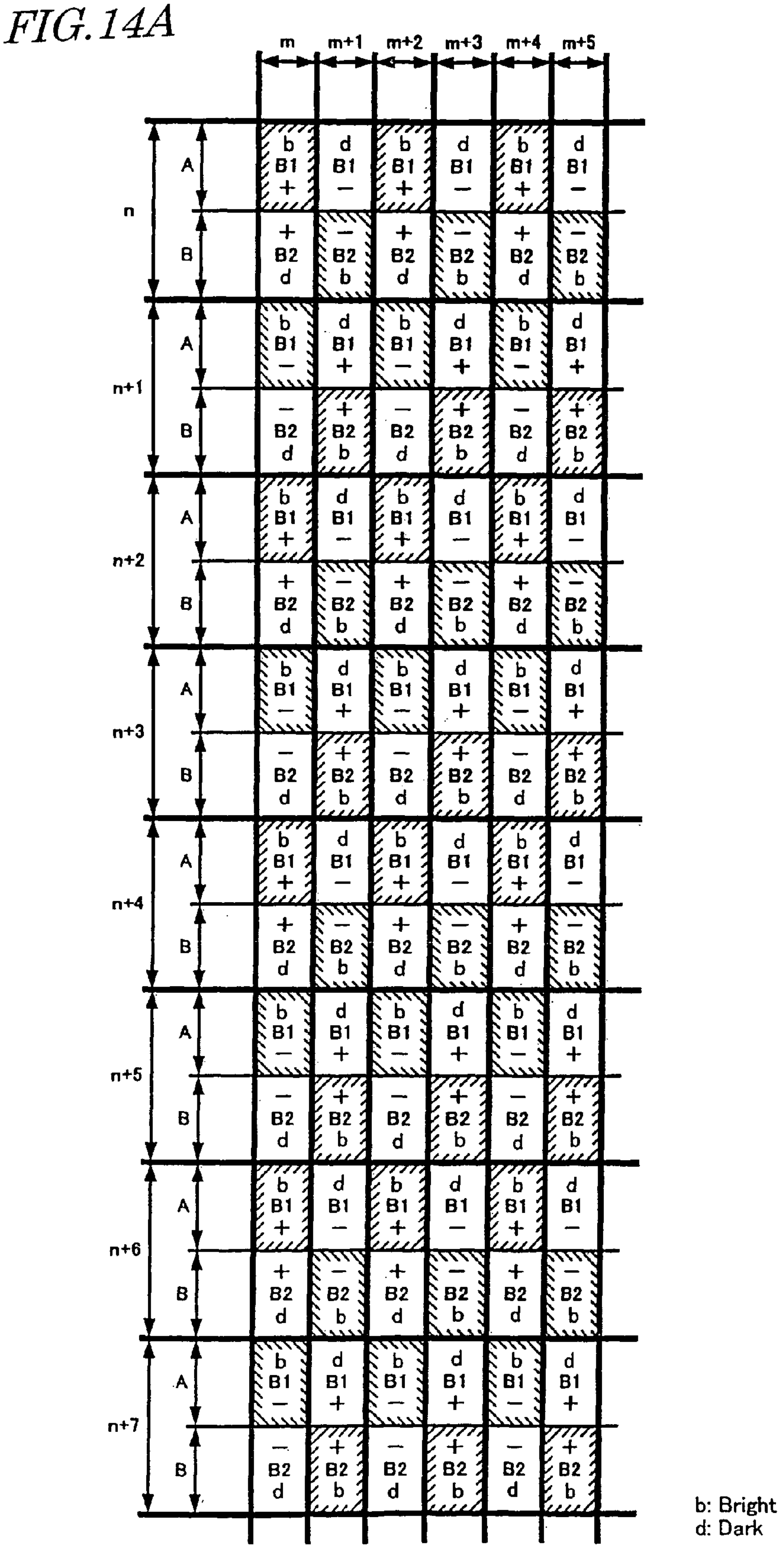

FIG. 14A is a schematic representation showing the drive state of the liquid crystal display device shown in FIG. 12 (in a situation where the voltages shown in FIG. 13A are used).

Figure 14B:
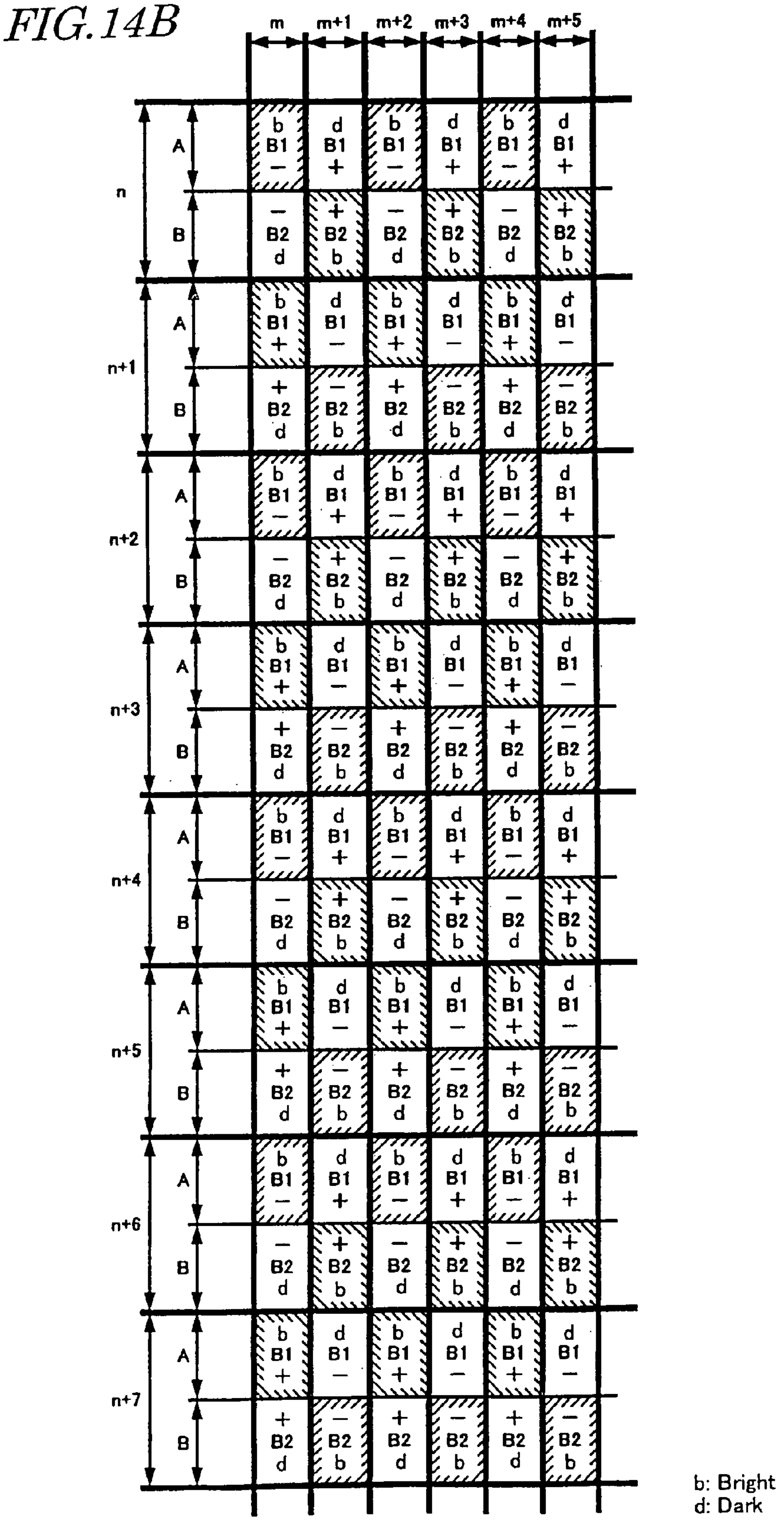

FIG. 14B is a schematic representation showing the drive state of the liquid crystal display device shown in FIG. 12 (in a situation where the voltages shown in FIG. 13B are used).

Figure 15:
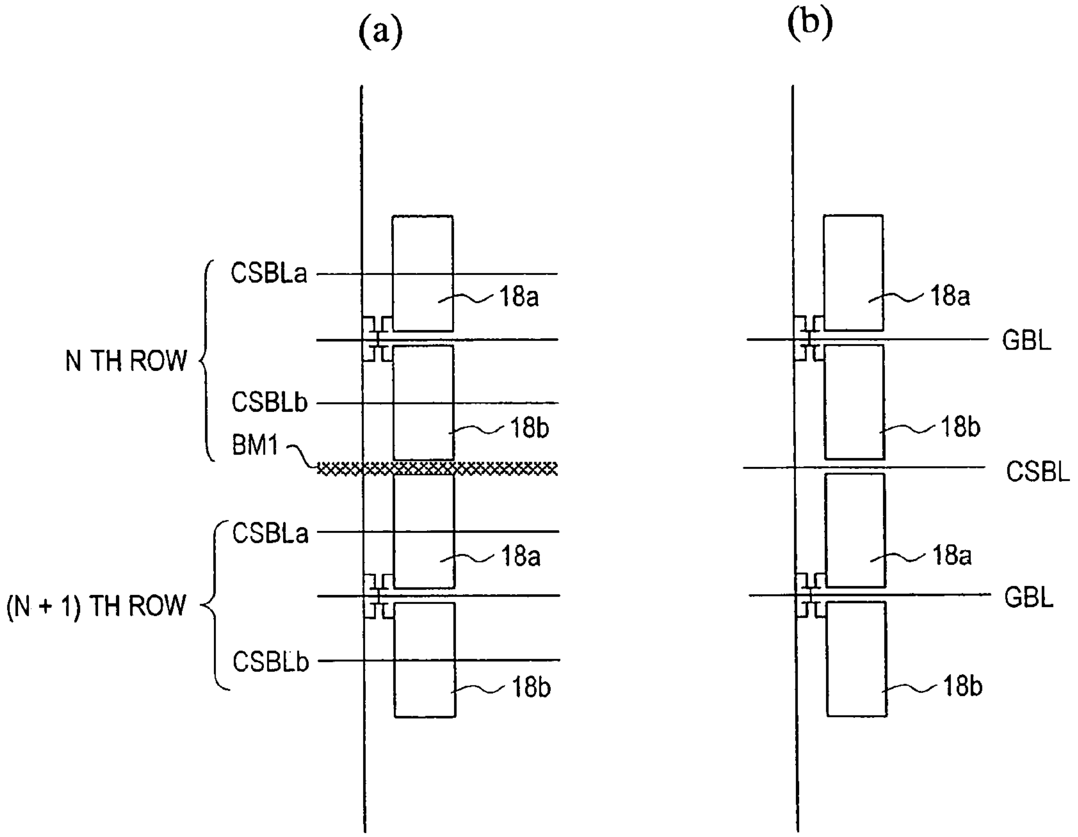

FIG. 15(*a*) schematically illustrates an exemplary arrangement of CS bus lines and an inter-pixel opaque layer in a liquid crystal display device with Type I arrangement according to a preferred embodiment of the present invention, and FIG. 15(*b*) schematically illustrates an exemplary arrangement of CS bus lines that function as an inter-pixel opaque layer in a liquid crystal display device with Type II arrangement according to a preferred embodiment of the present invention.

Figure 16A:
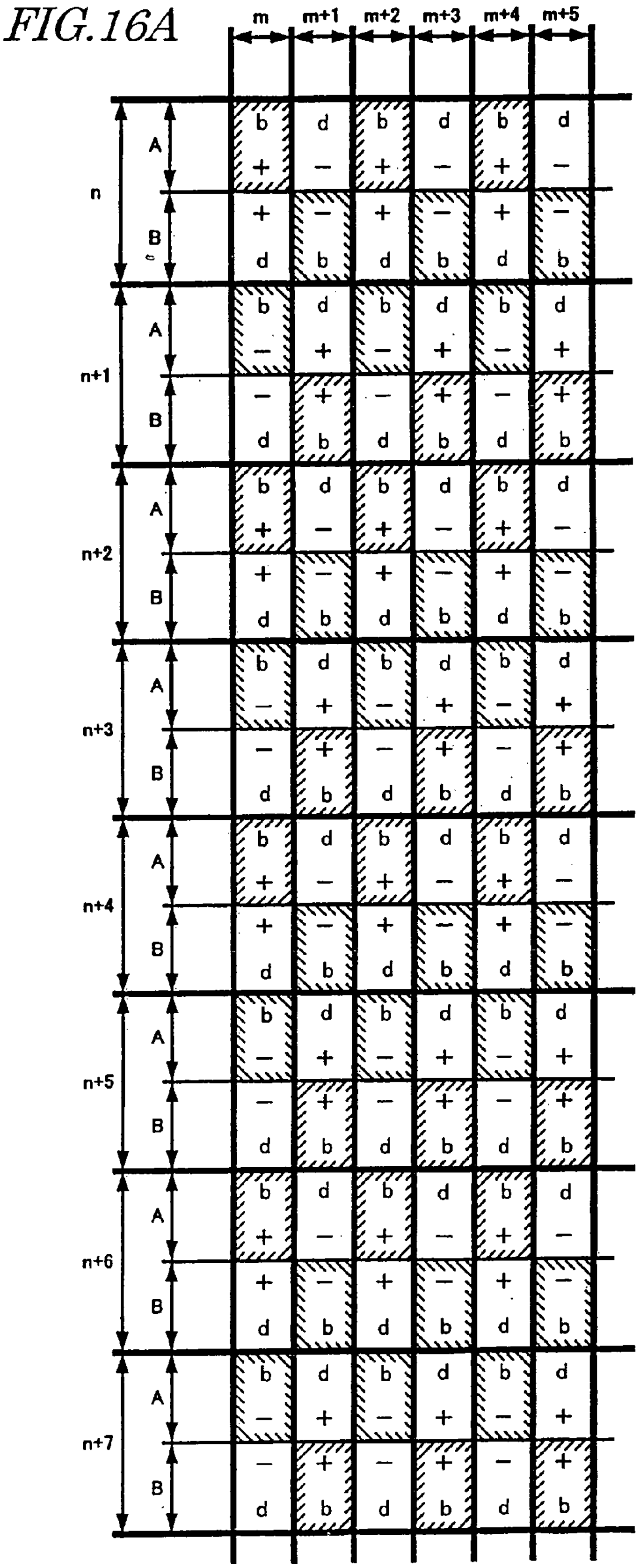

FIG. 16A schematically shows the drive state of a liquid crystal display device with Type II arrangement according to a preferred embodiment of the present invention.

Figure 16B:
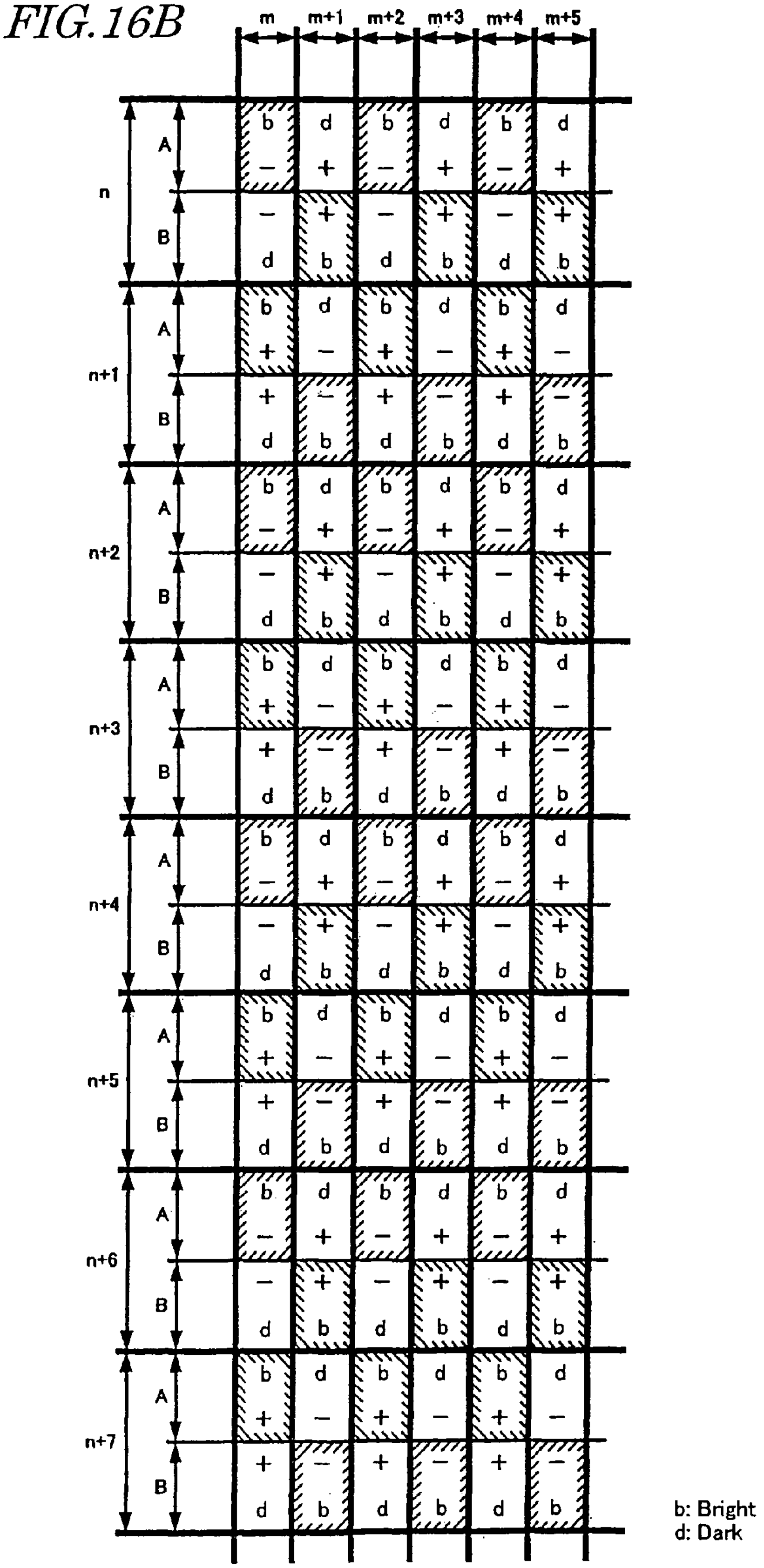

FIG. 16B schematically shows the drive state of a liquid crystal display device with Type II arrangement according to a preferred embodiment of the present invention (in which the electric field applied to the liquid crystal layer has its direction reversed compared to the drive state shown in FIG. 16A).

Figure 17:
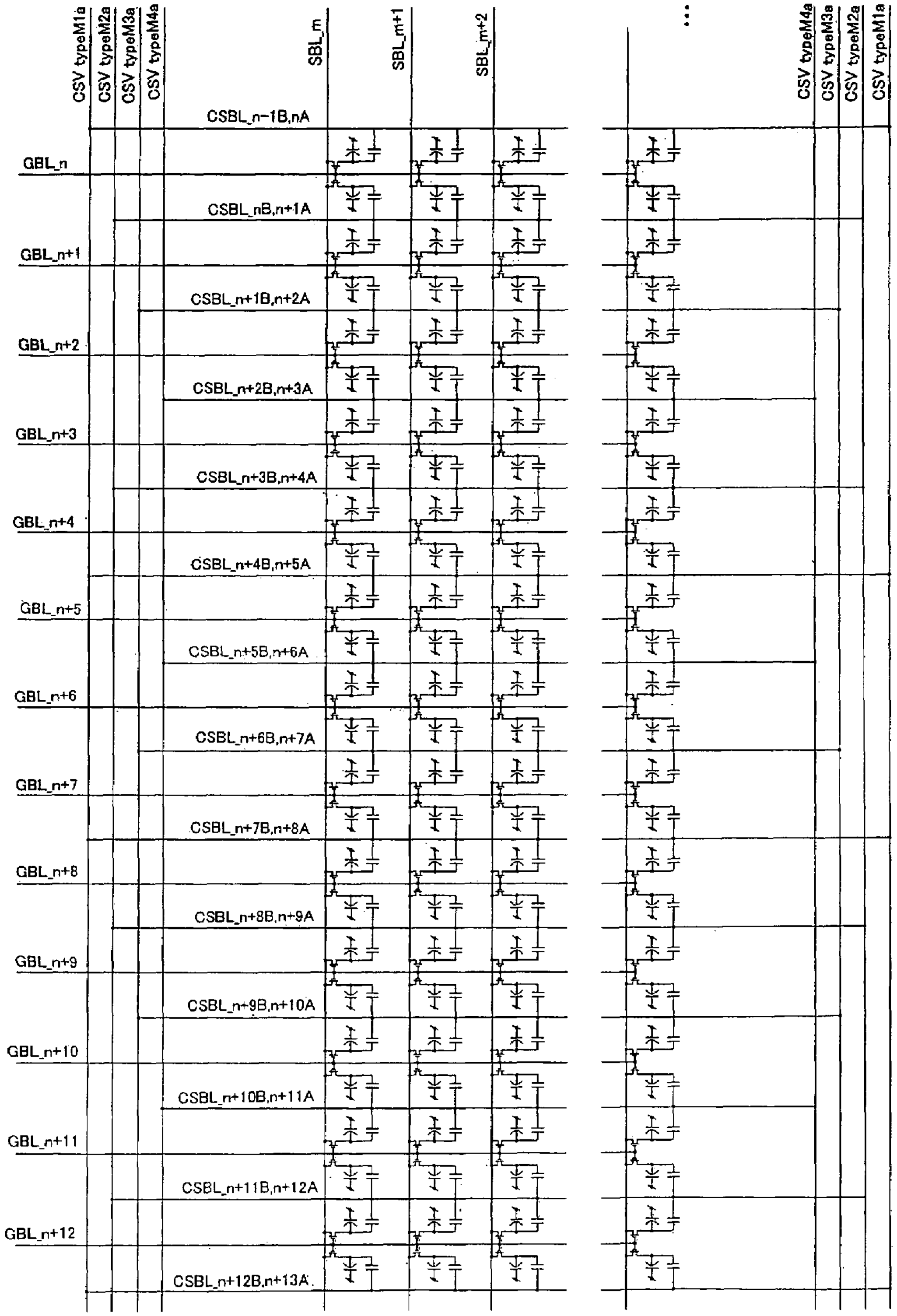

FIG. 17 schematically shows a matrix arrangement (including the connection pattern of CS bus lines) for a liquid crystal display device with Type II arrangement according to a preferred embodiment of the present invention.

Figure 18:
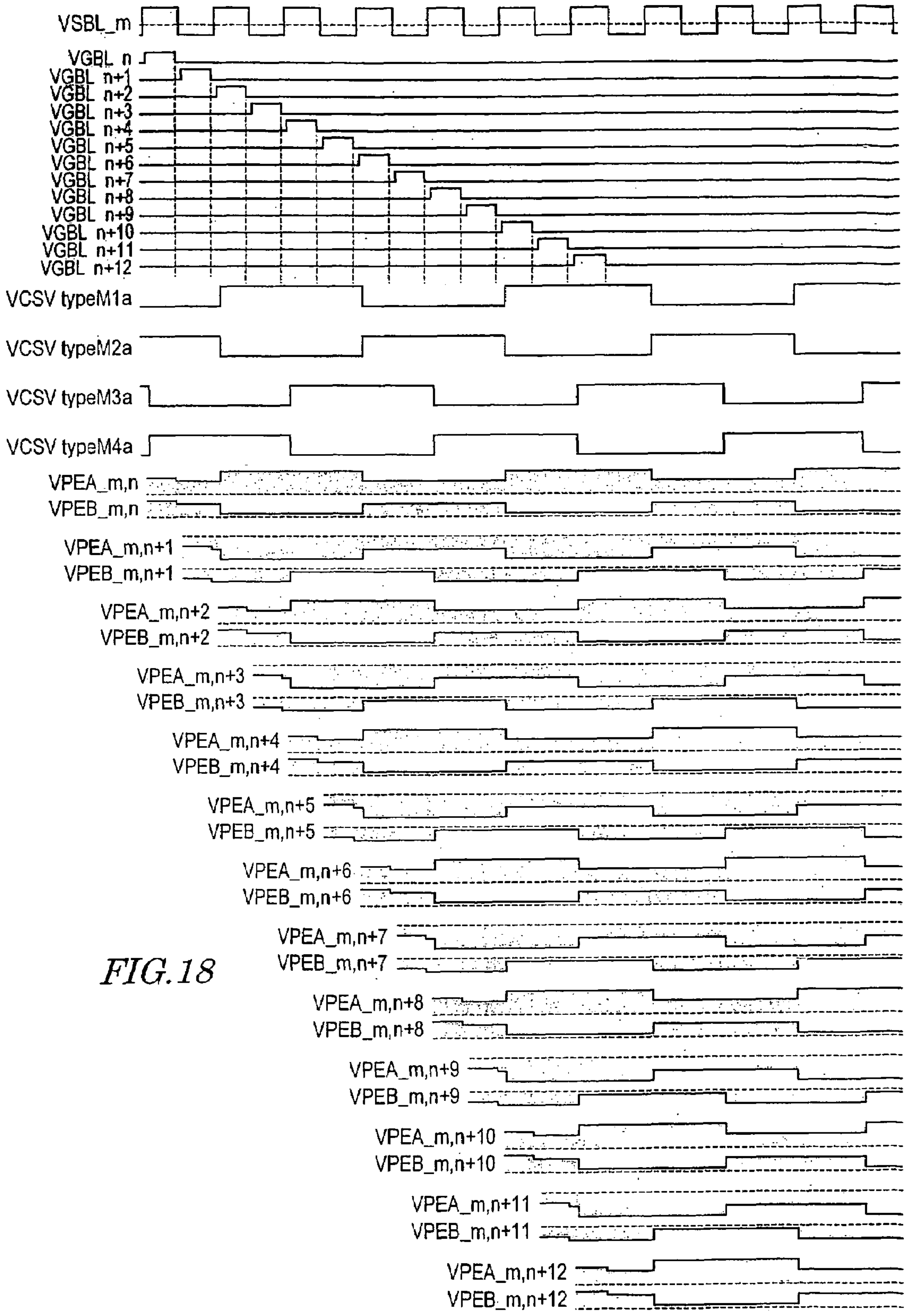

FIG. 18 schematically shows the waveforms of signals used to drive this liquid crystal display device shown in FIG. 17.

Figure 19:
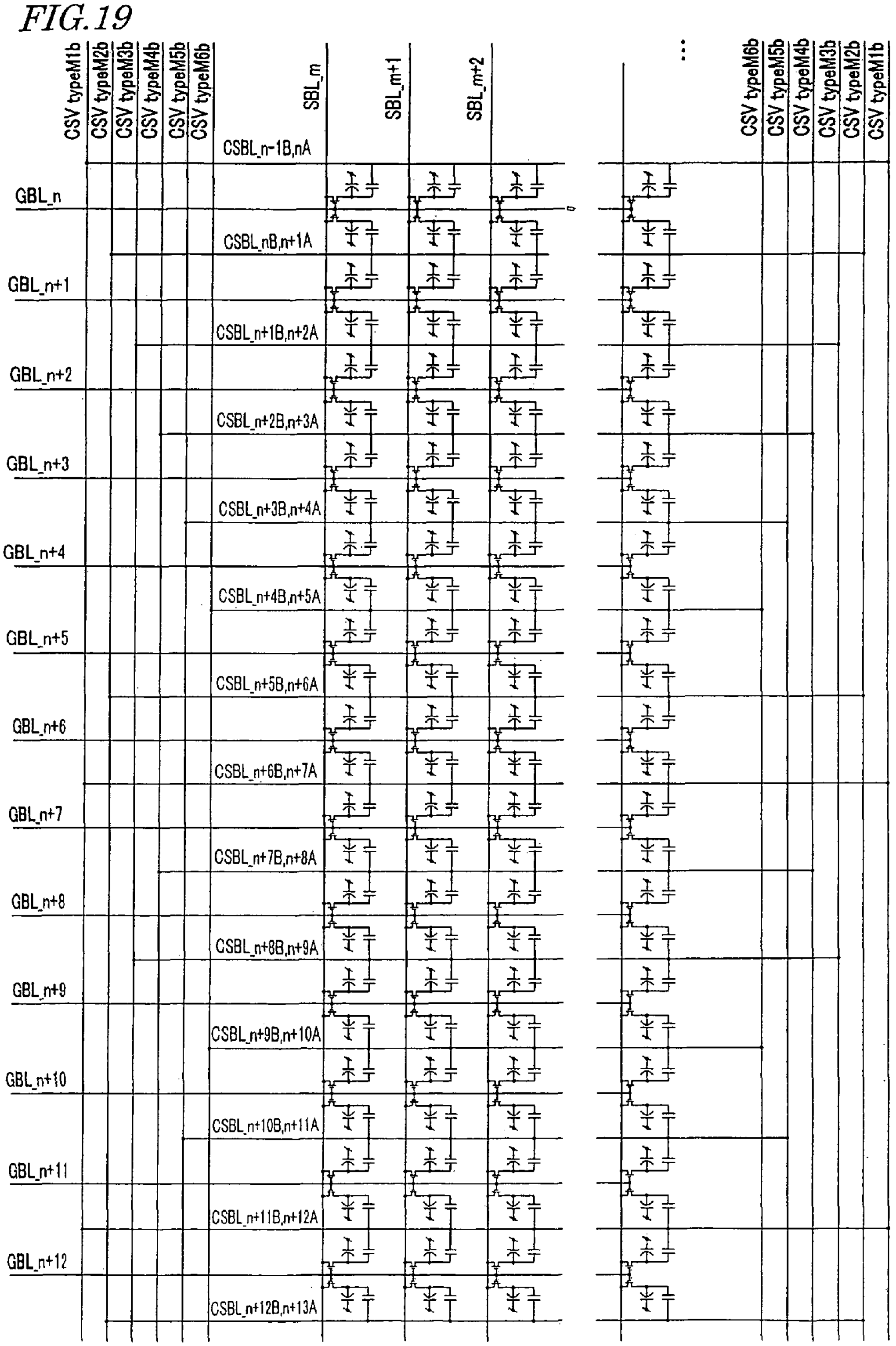

FIG. 19 schematically shows a matrix arrangement (including the connection pattern of CS bus lines) for a liquid crystal display device with Type II arrangement according to another preferred embodiment of the present invention.

Figure 20:
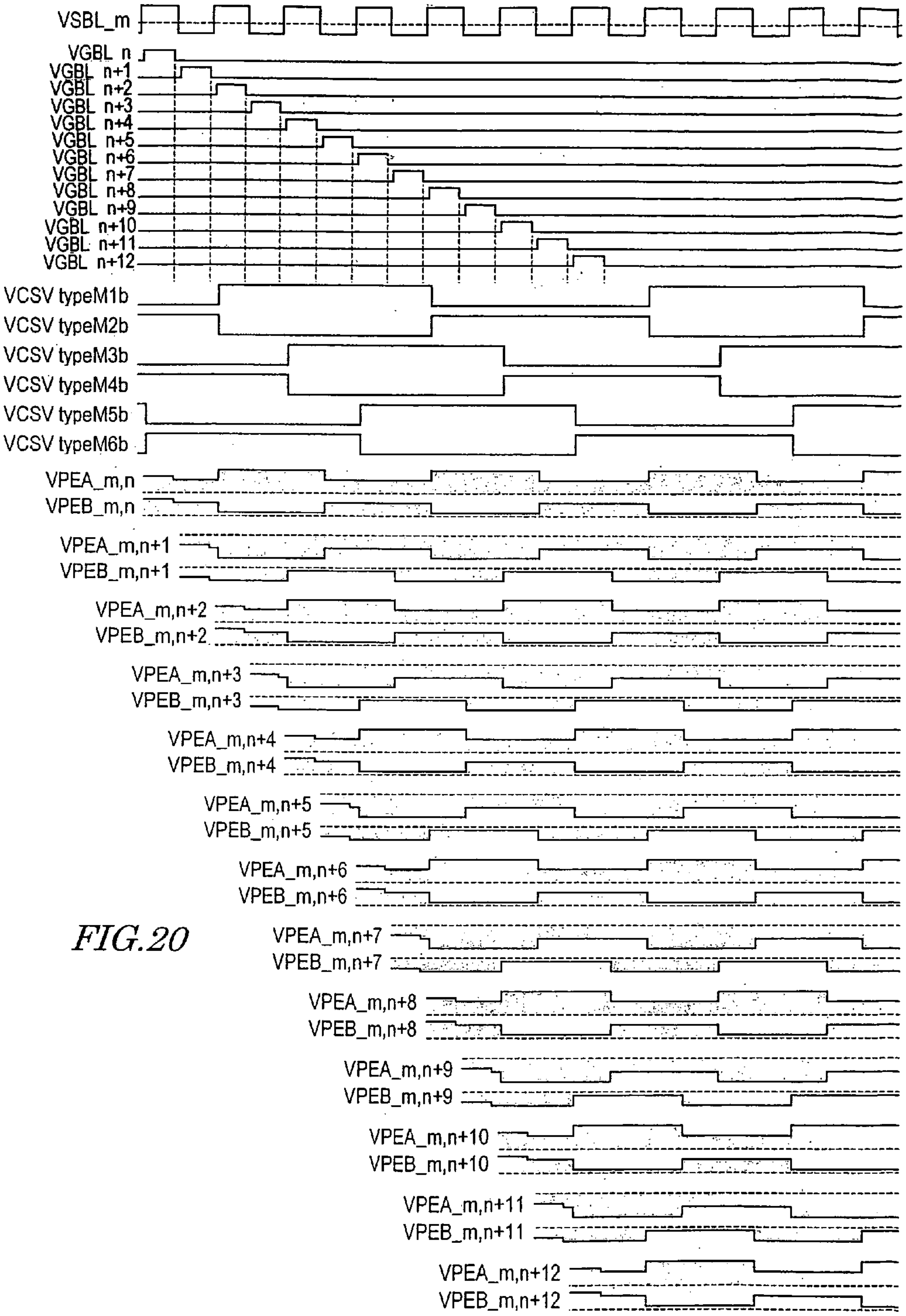

FIG. 20 schematically shows the waveforms of signals used to drive this liquid crystal display device shown in FIG. 19.

Figure 21:
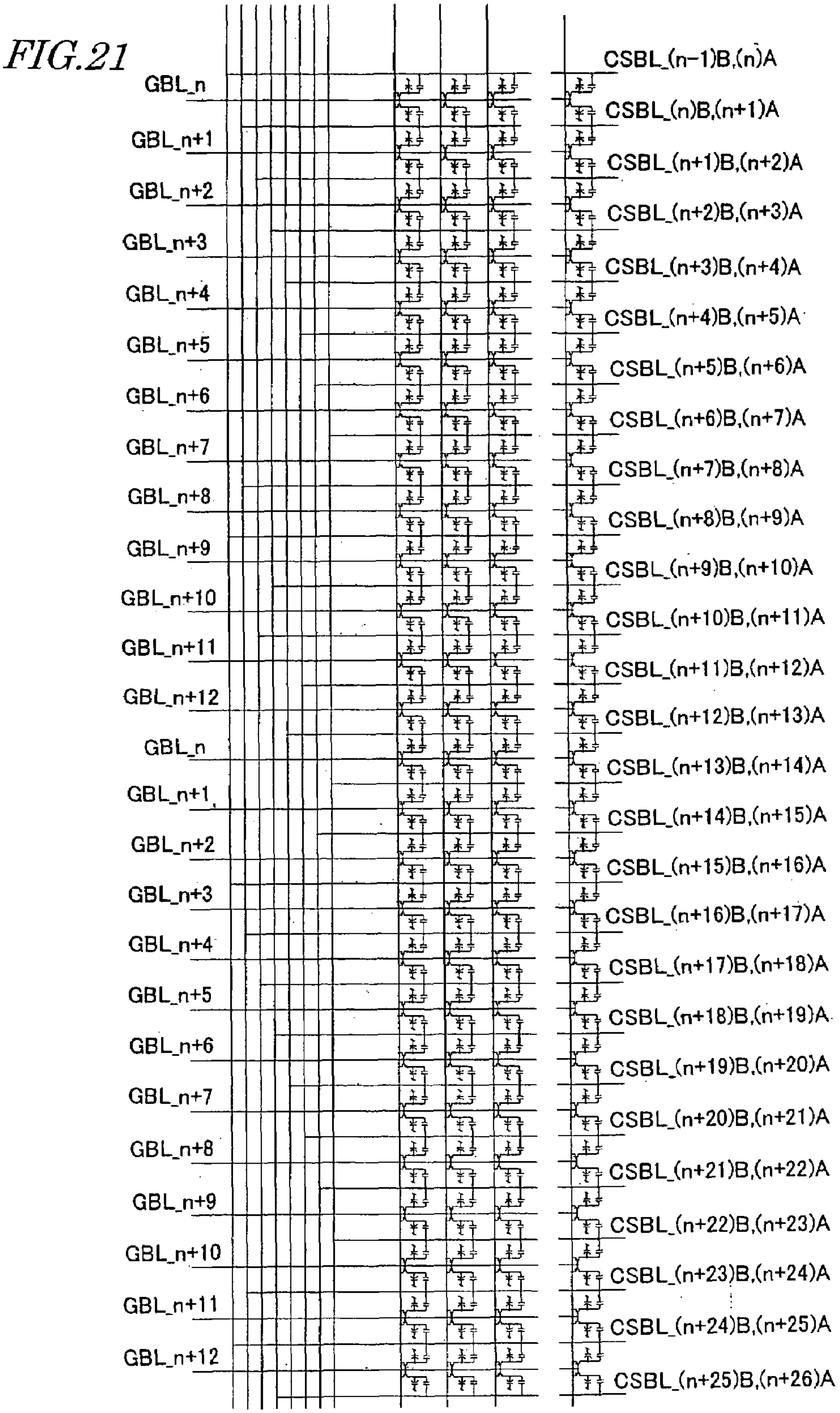

FIG. 21 schematically shows a matrix arrangement (including the connection pattern of CS bus lines) for a liquid crystal display device with Type II arrangement according to still another preferred embodiment of the present invention.

Figure 22:
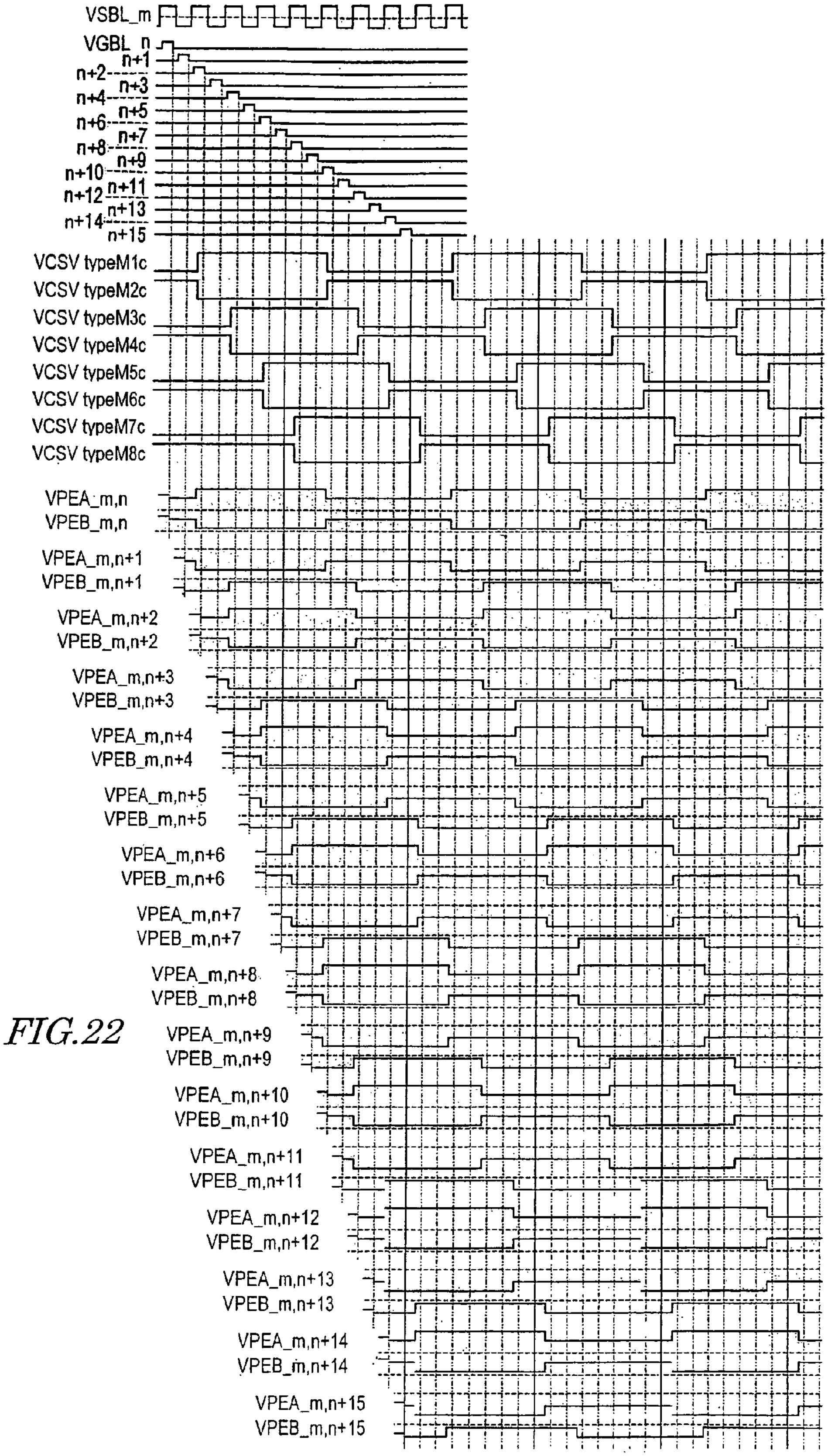

FIG. 22 schematically shows the waveforms of signals used to drive this liquid crystal display device shown in FIG. 21.

Figure 23:
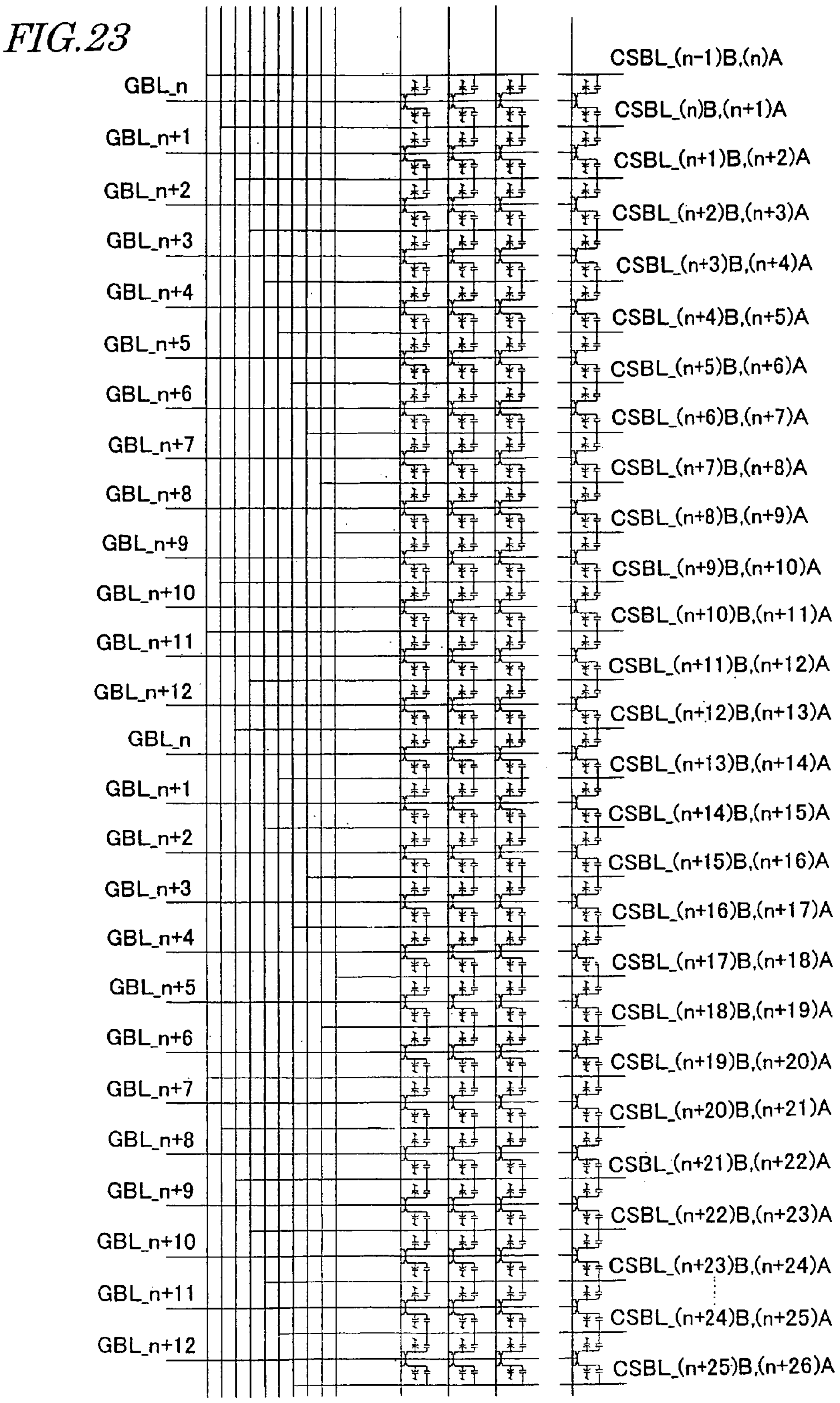

FIG. 23 schematically shows a matrix arrangement (including the connection pattern of CS bus lines) for a liquid crystal display device with Type II arrangement according to yet another preferred embodiment of the present invention.

Figure 24:
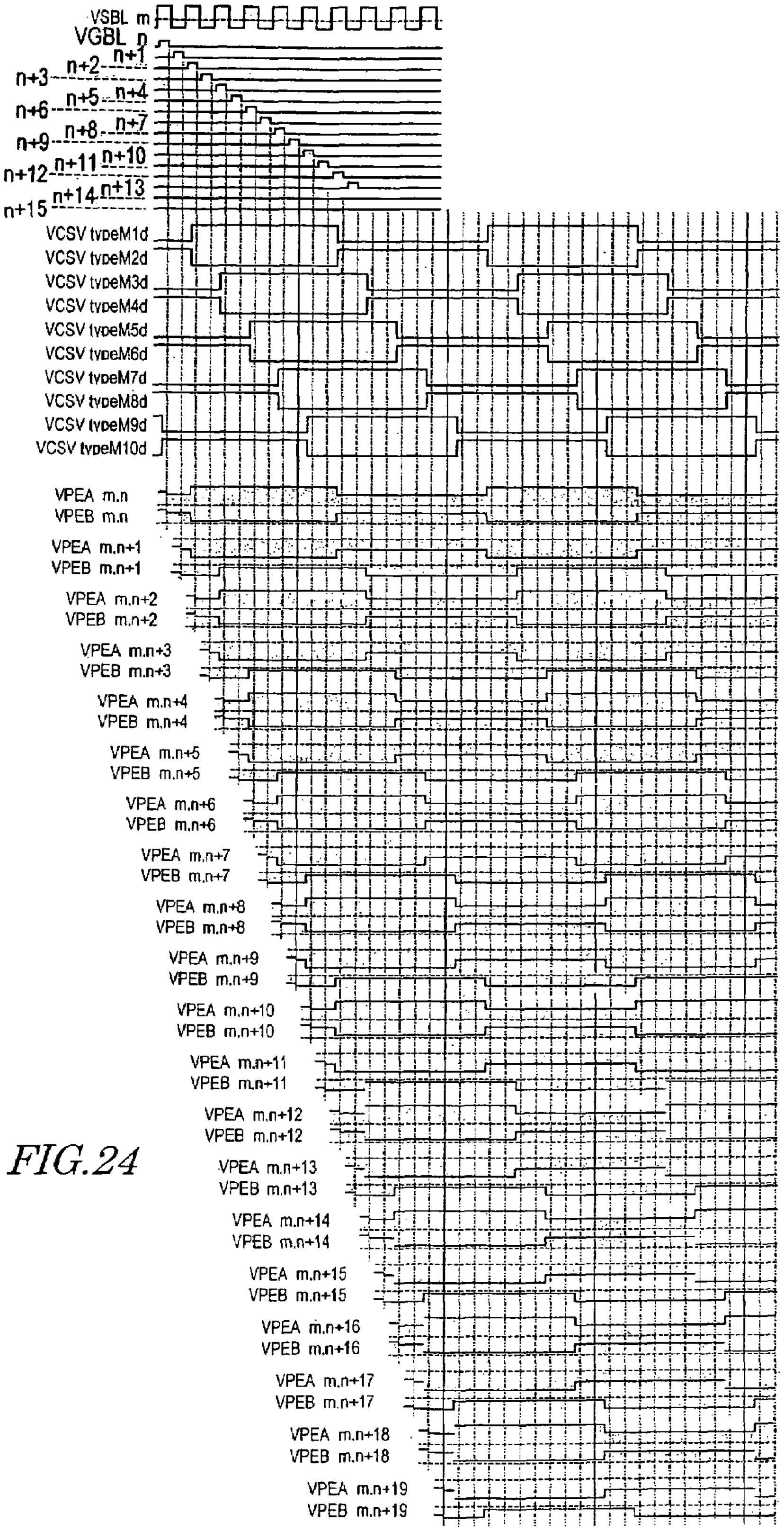

FIG. 24 schematically shows the waveforms of signals used to drive this liquid crystal display device shown in FIG. 23.

Figure 25:
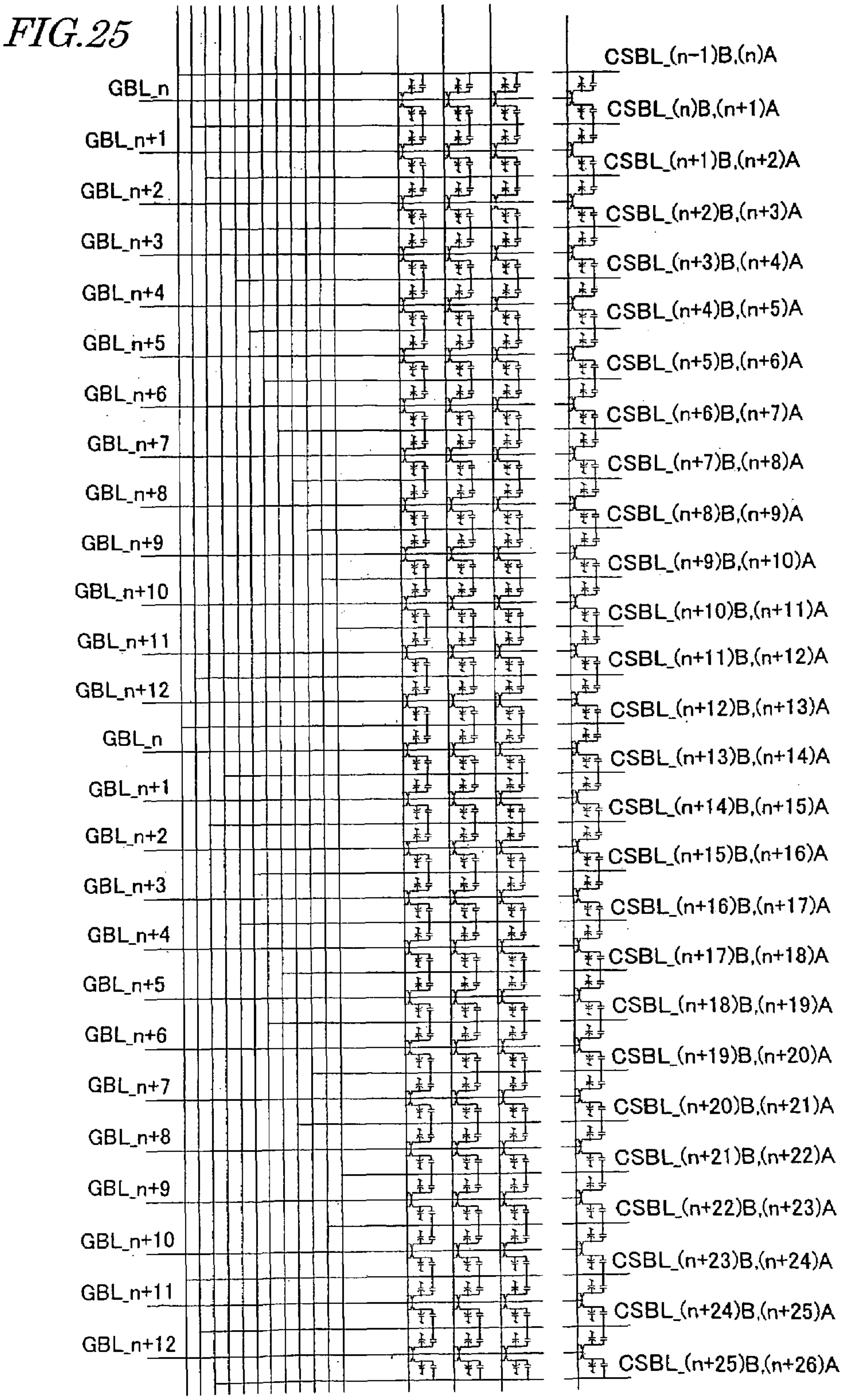

FIG. 25 schematically shows a matrix arrangement (including the connection pattern of CS bus lines) for a liquid crystal display device with Type II arrangement according to yet another preferred embodiment of the present invention.

Figure 26:
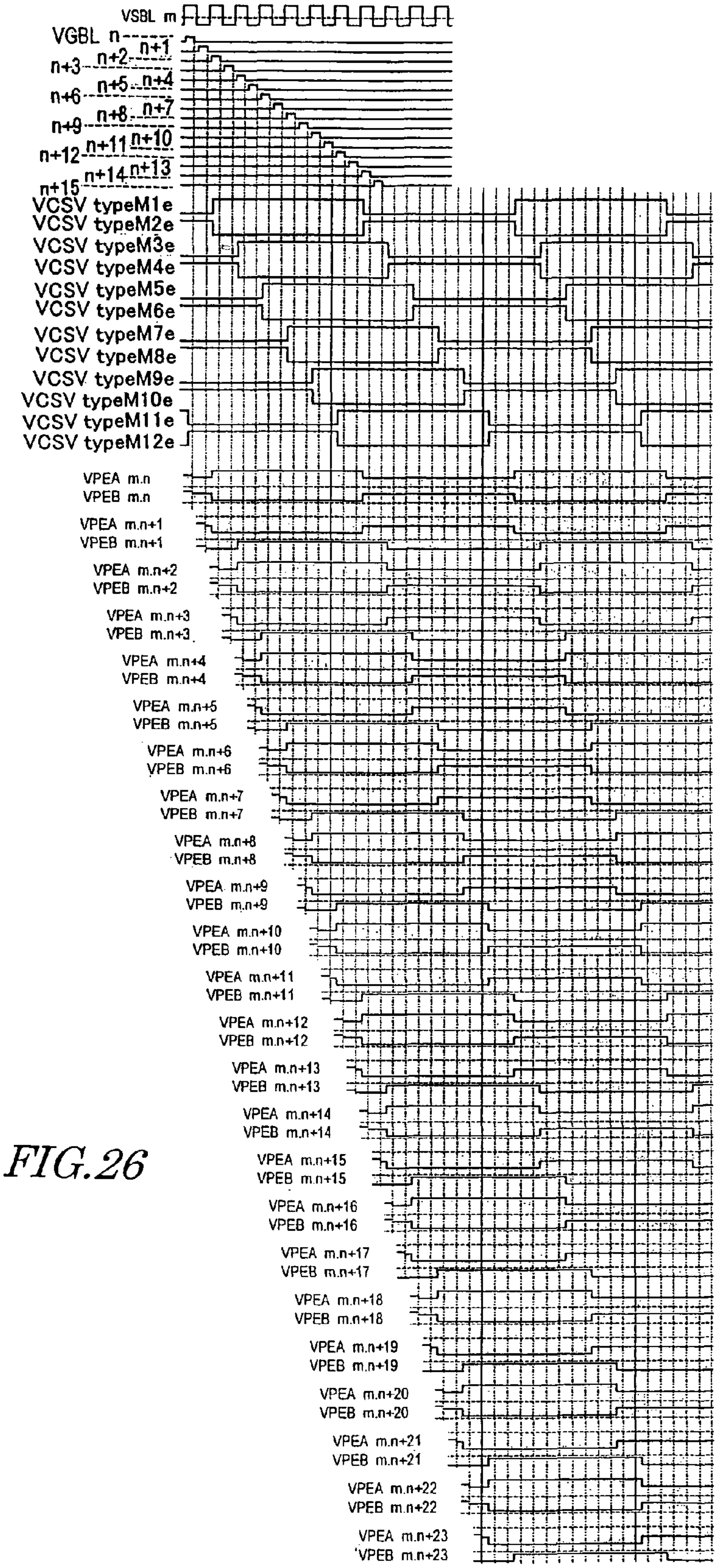

FIG. 26 schematically shows the waveforms of signals used to drive this liquid crystal display device shown in FIG. 25.

Figure 27:
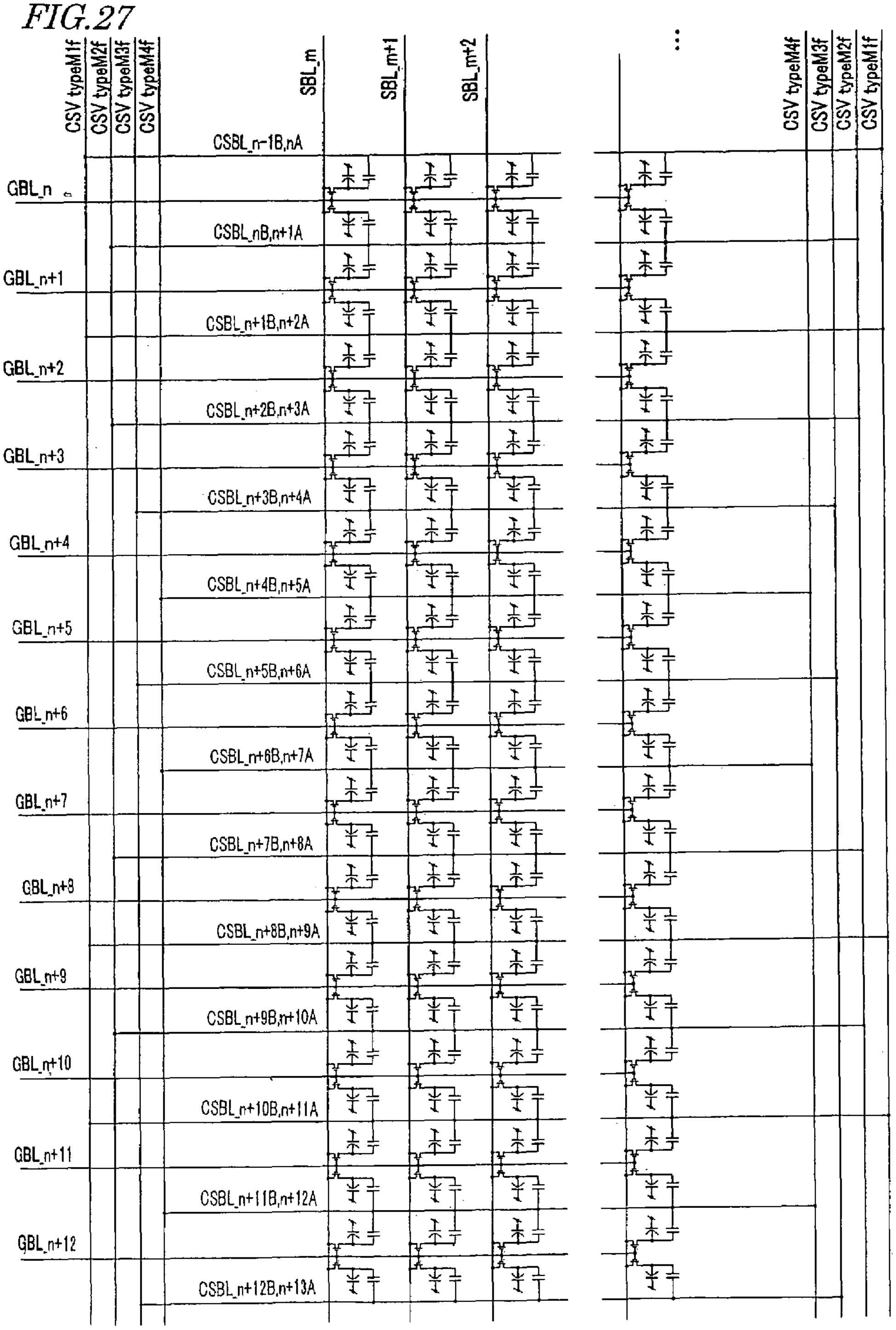

FIG. 27 schematically shows a matrix arrangement (including the connection pattern of CS bus lines) for a liquid crystal display device with Type II arrangement according to yet another preferred embodiment of the present invention.

Figure 28:
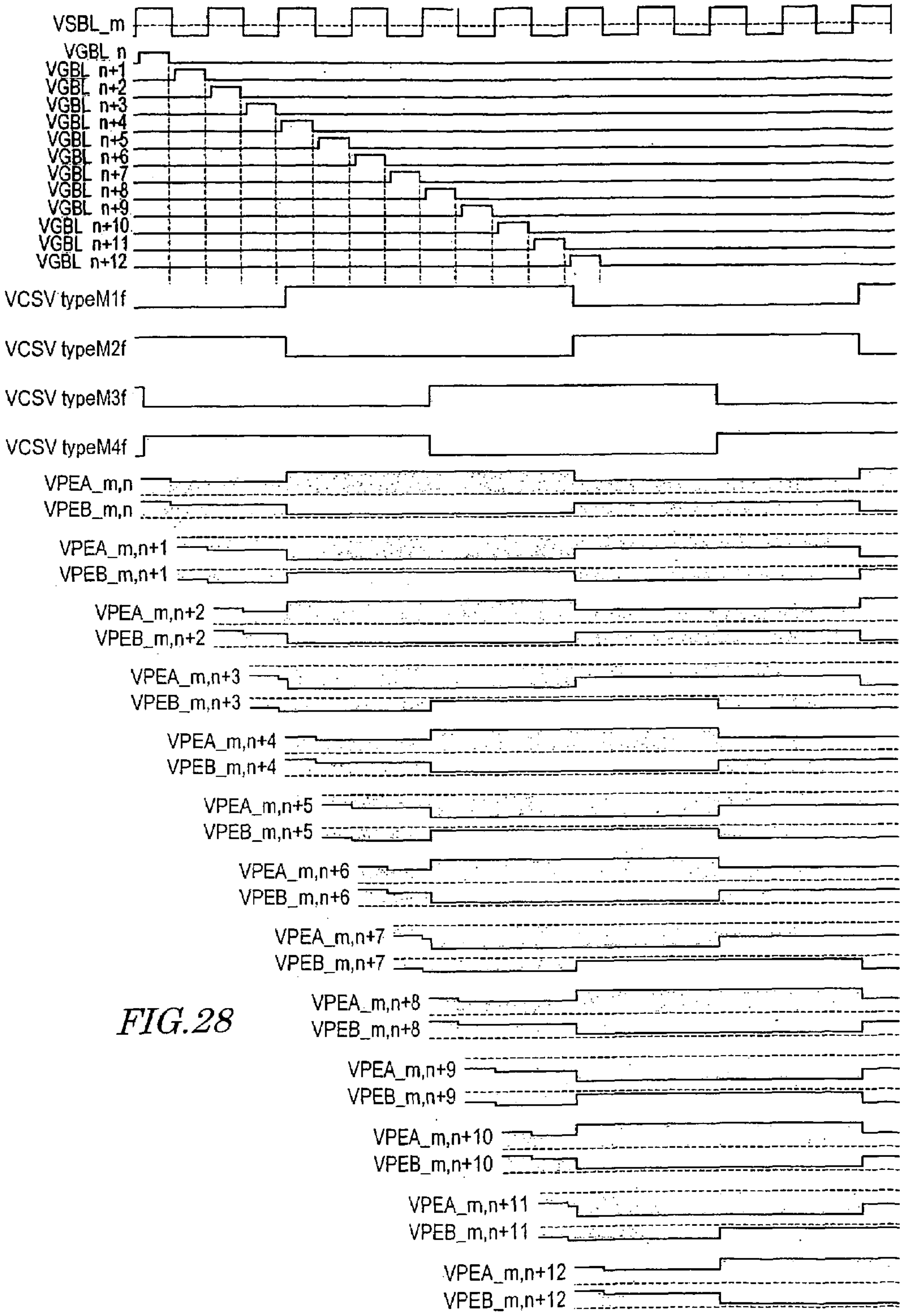

FIG. 28 schematically shows the waveforms of signals used to drive this liquid crystal display device shown in FIG. 27.

Figure 29:
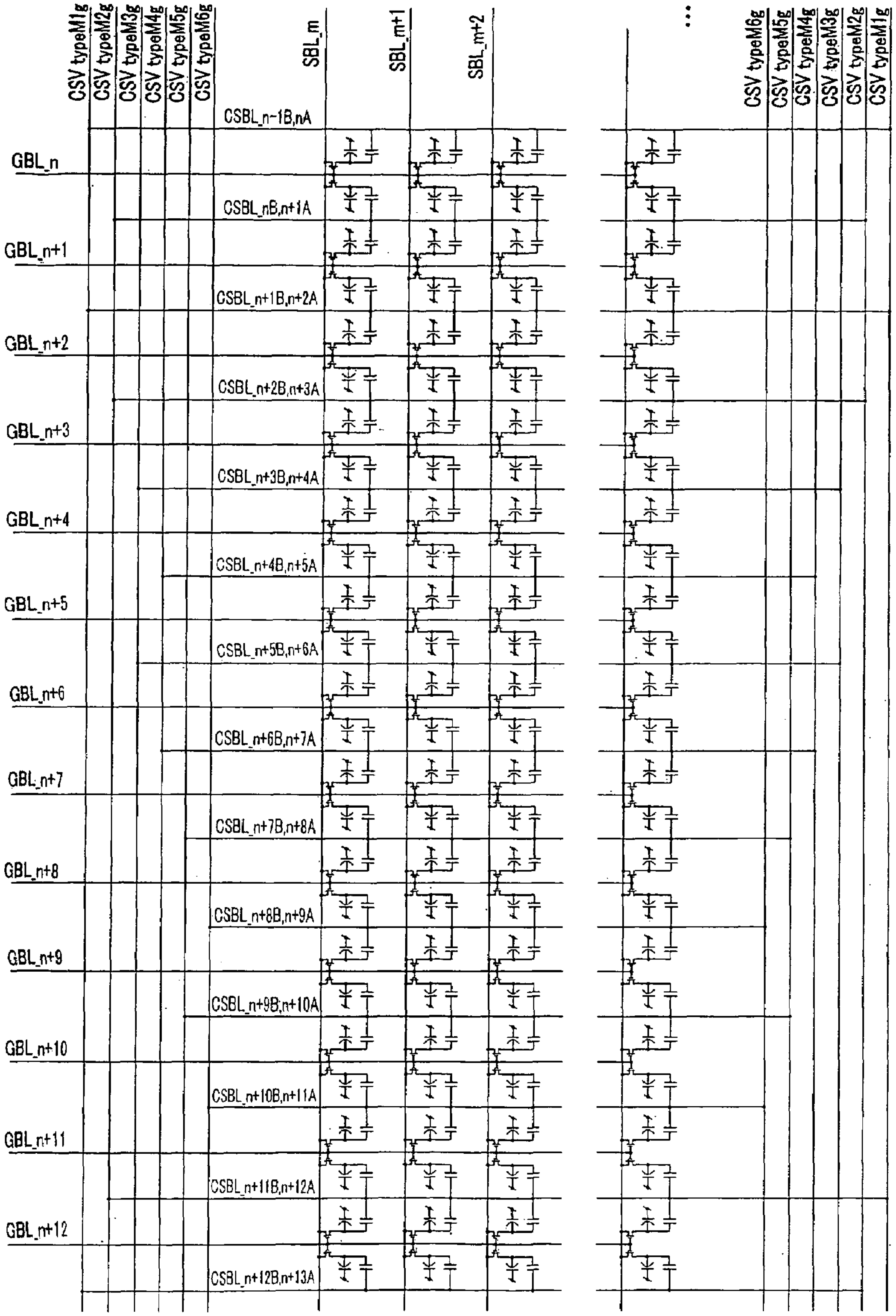

FIG. 29 schematically shows a matrix arrangement (including the connection pattern of CS bus lines) for a liquid crystal display device with Type II arrangement according to yet another preferred embodiment of the present invention.

Figure 30:
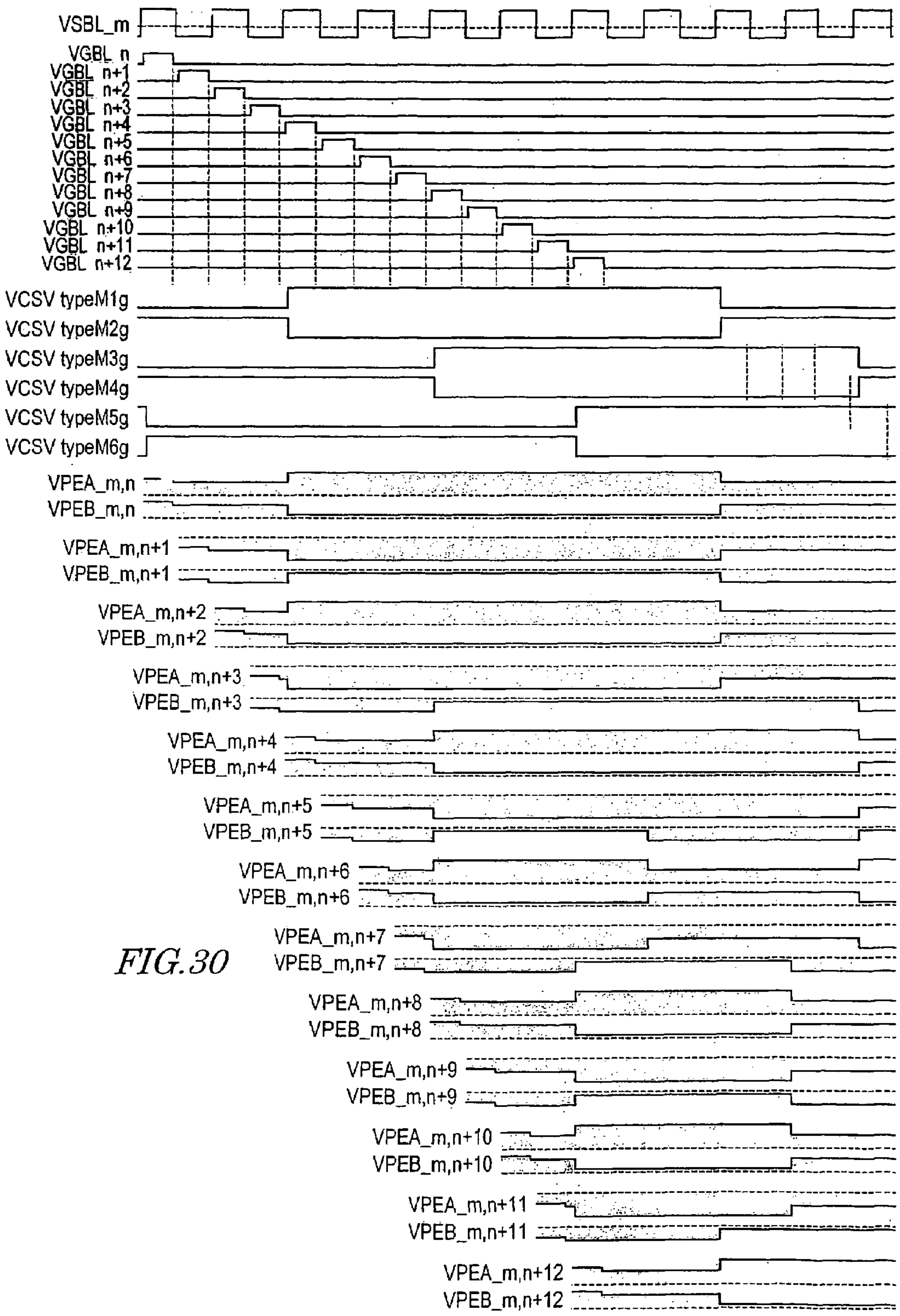

FIG. 30 schematically shows the waveforms of signals used to drive this liquid crystal display device shown in FIG. 29.

Figure 31:
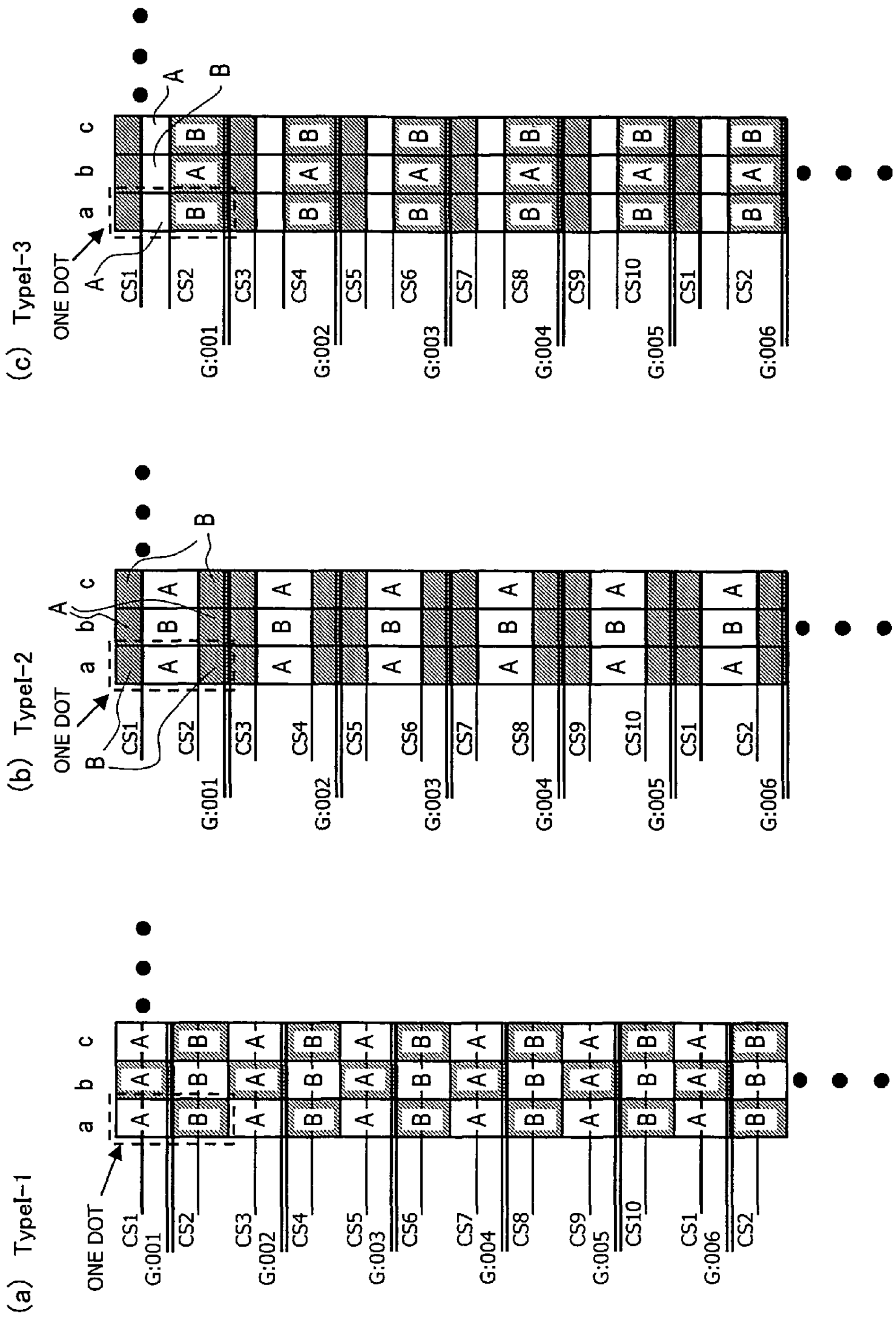

FIGS. 31(*a*), 31(*b*) and 31(*c*) schematically show three representative Type I arrangements for a liquid crystal display device according to a preferred embodiment of the present invention.

Figure 32:
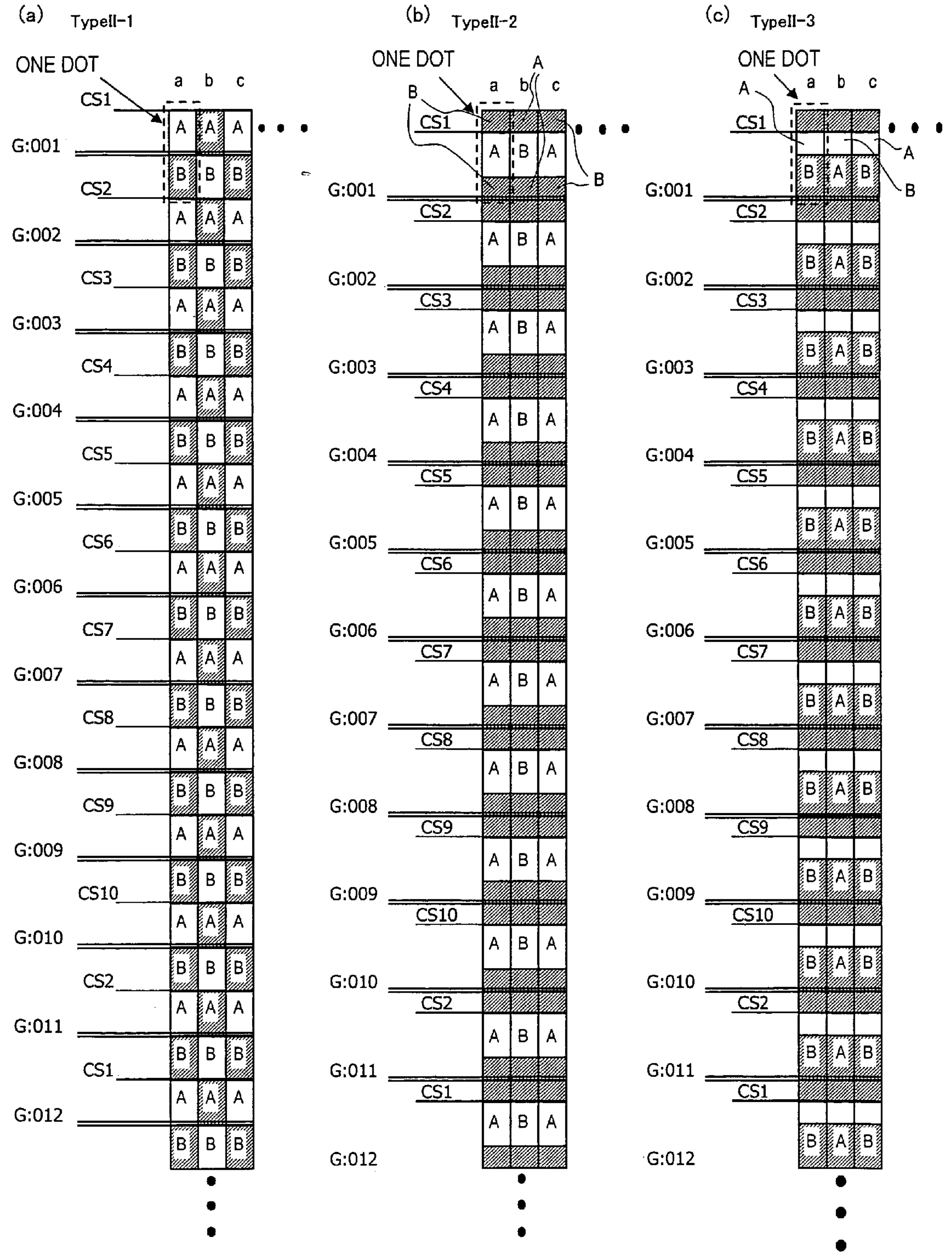

FIGS. 32(*a*), 32(*b*) and 32(*c*) schematically show three representative Type II arrangements for a liquid crystal display device according to a preferred embodiment of the present invention.

Figure 33A:
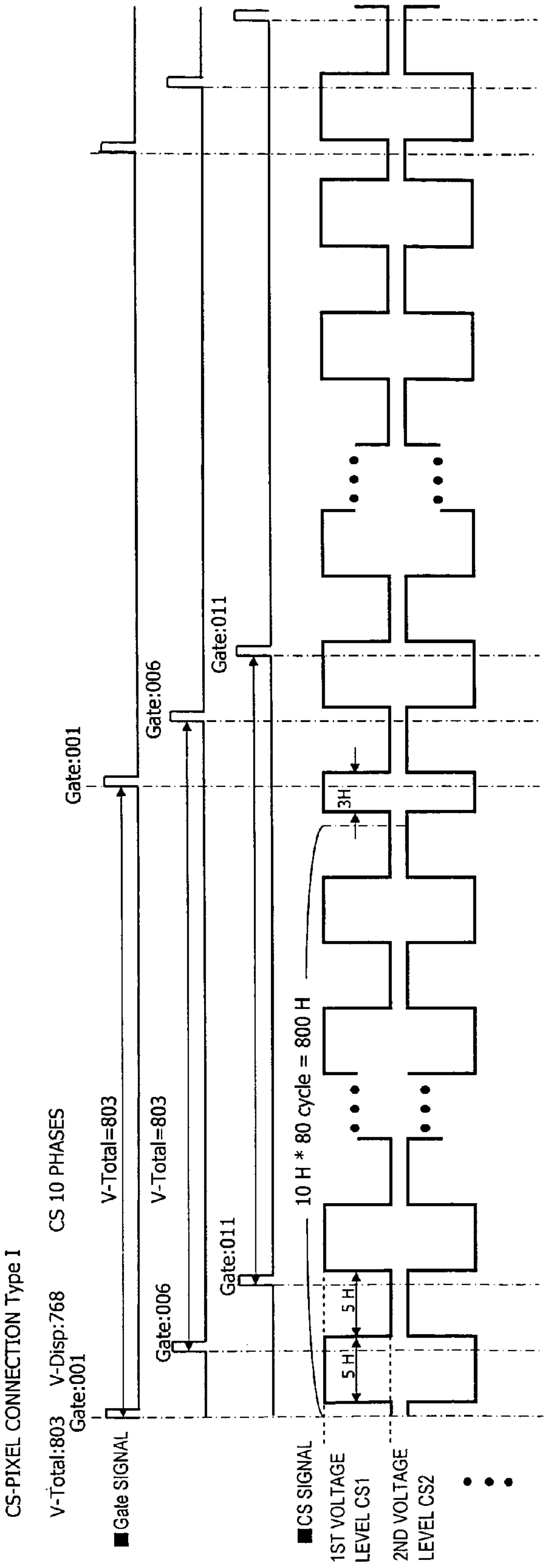

FIG. 33A shows the waveforms of gate voltages and CS voltages to explain the reason why stripes are generated on the Type I liquid crystal display device.

Figure 33B:
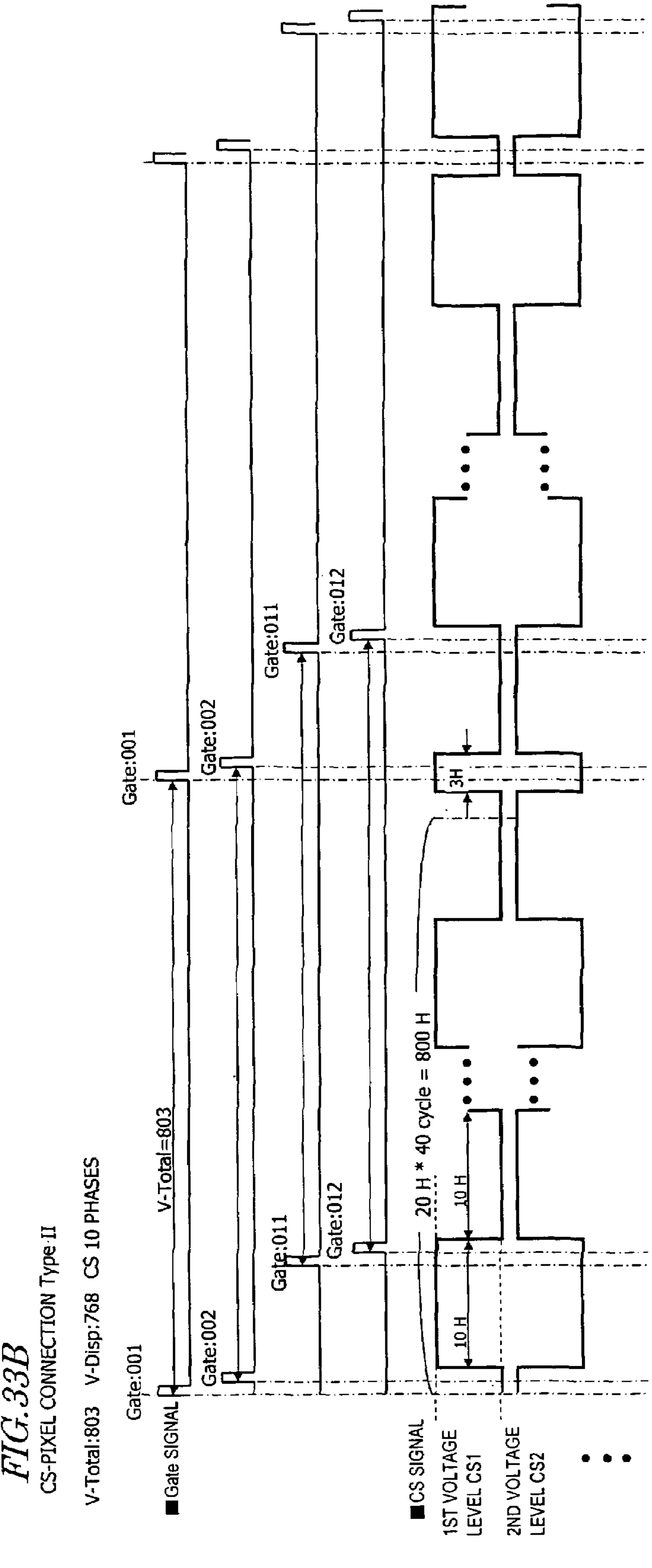

FIG. 33B shows the waveforms of gate voltages and CS voltages to explain the reason why stripes are generated on the Type II liquid crystal display device.

Figure 34:
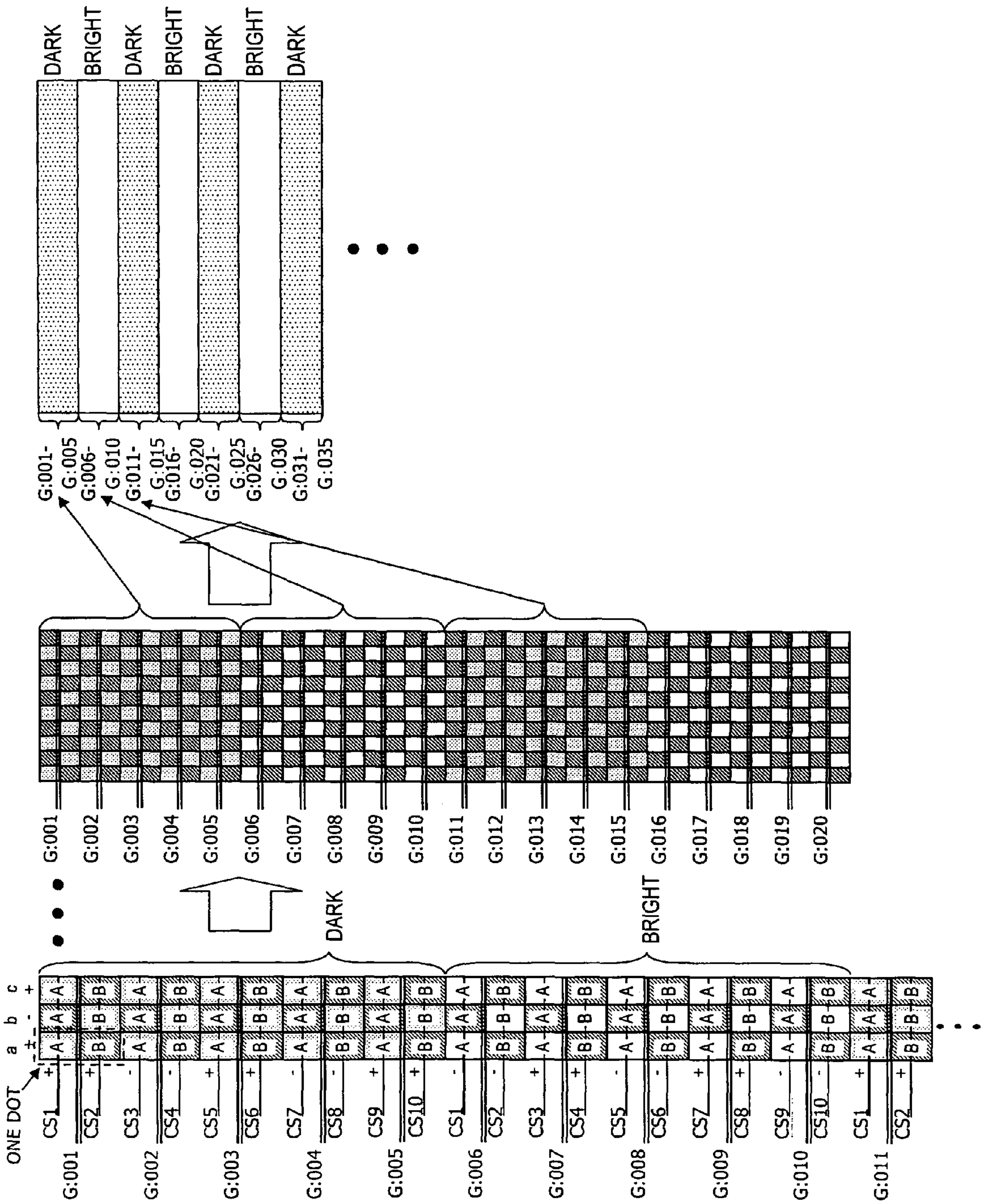

FIG. 34 schematically shows the stripes that have been generated on the Type I liquid crystal display device.

Figure 35A:
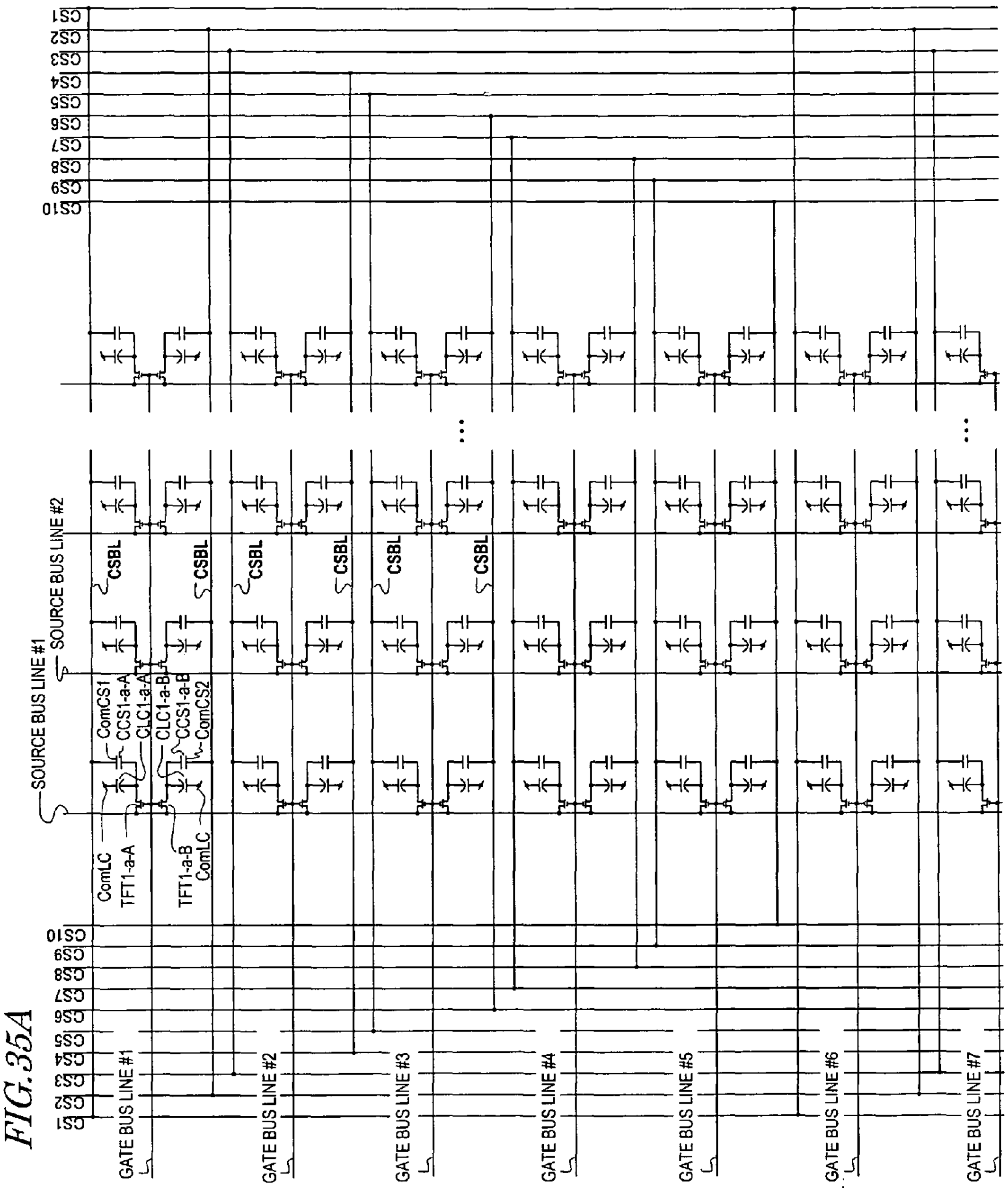
Figure 35B:
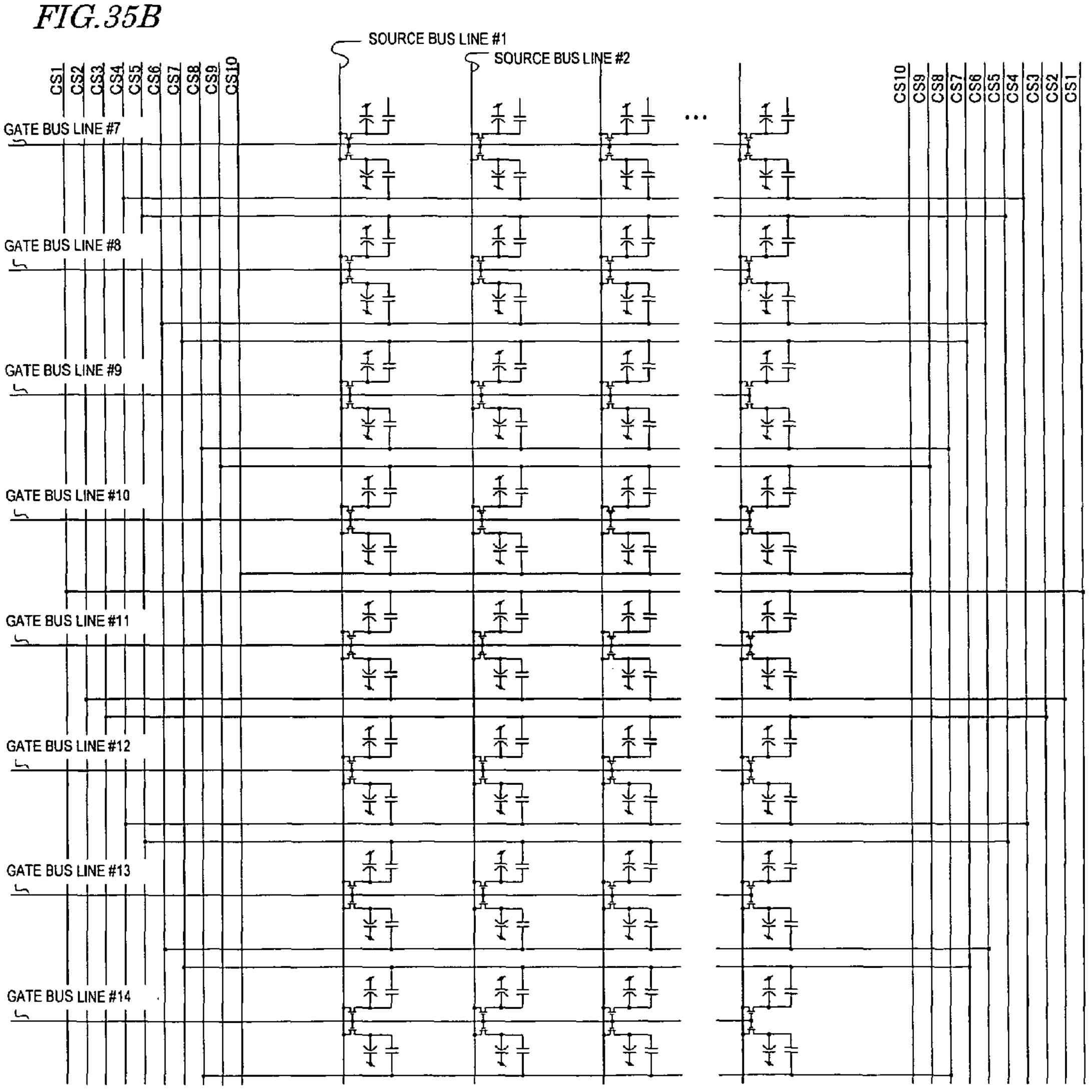

FIGS. 35A and 35B show an equivalent circuit of the Type I liquid crystal display device with a pattern of connection to the CS trunks.

Figure 36:
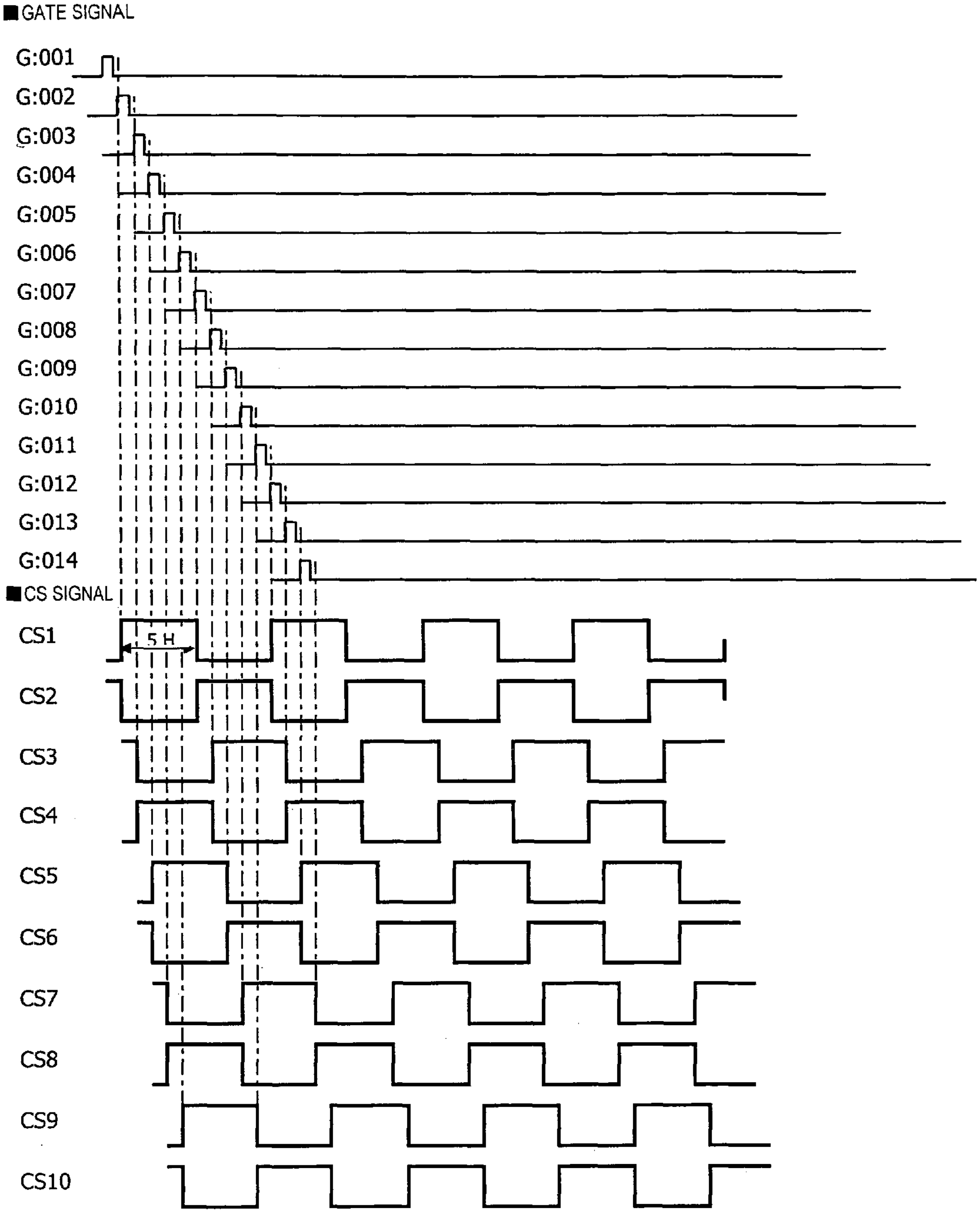

FIG. 36 shows timing relations between the CS voltages and the gate voltages in the liquid crystal display device shown in FIGS. 35A and 35B.

Figure 37:
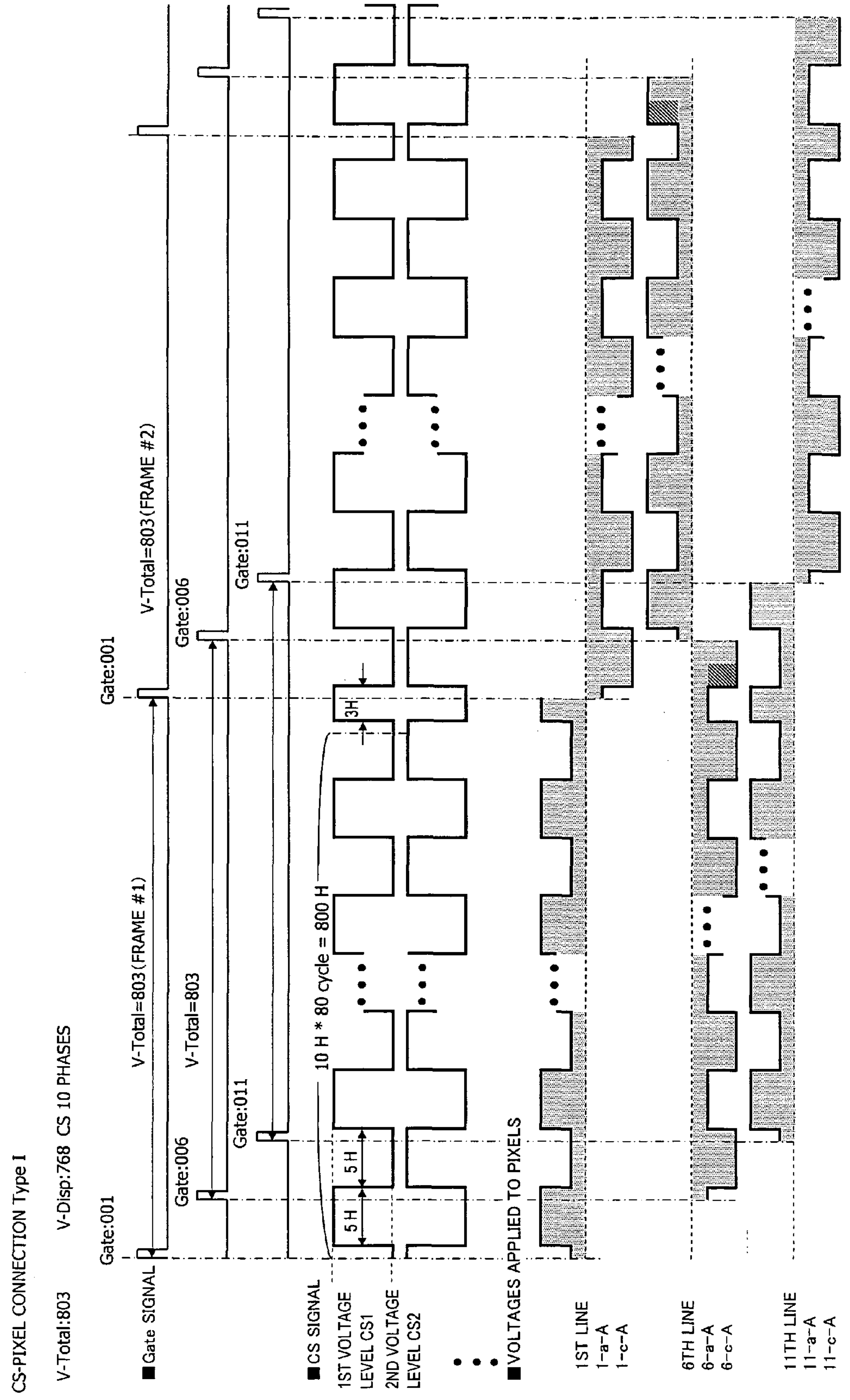

FIG. 37 shows the waveforms of gate voltages and CS voltages to explain the reason why stripes are generated on the liquid crystal display device shown in FIGS. 35A and 35B.

Figure 38:
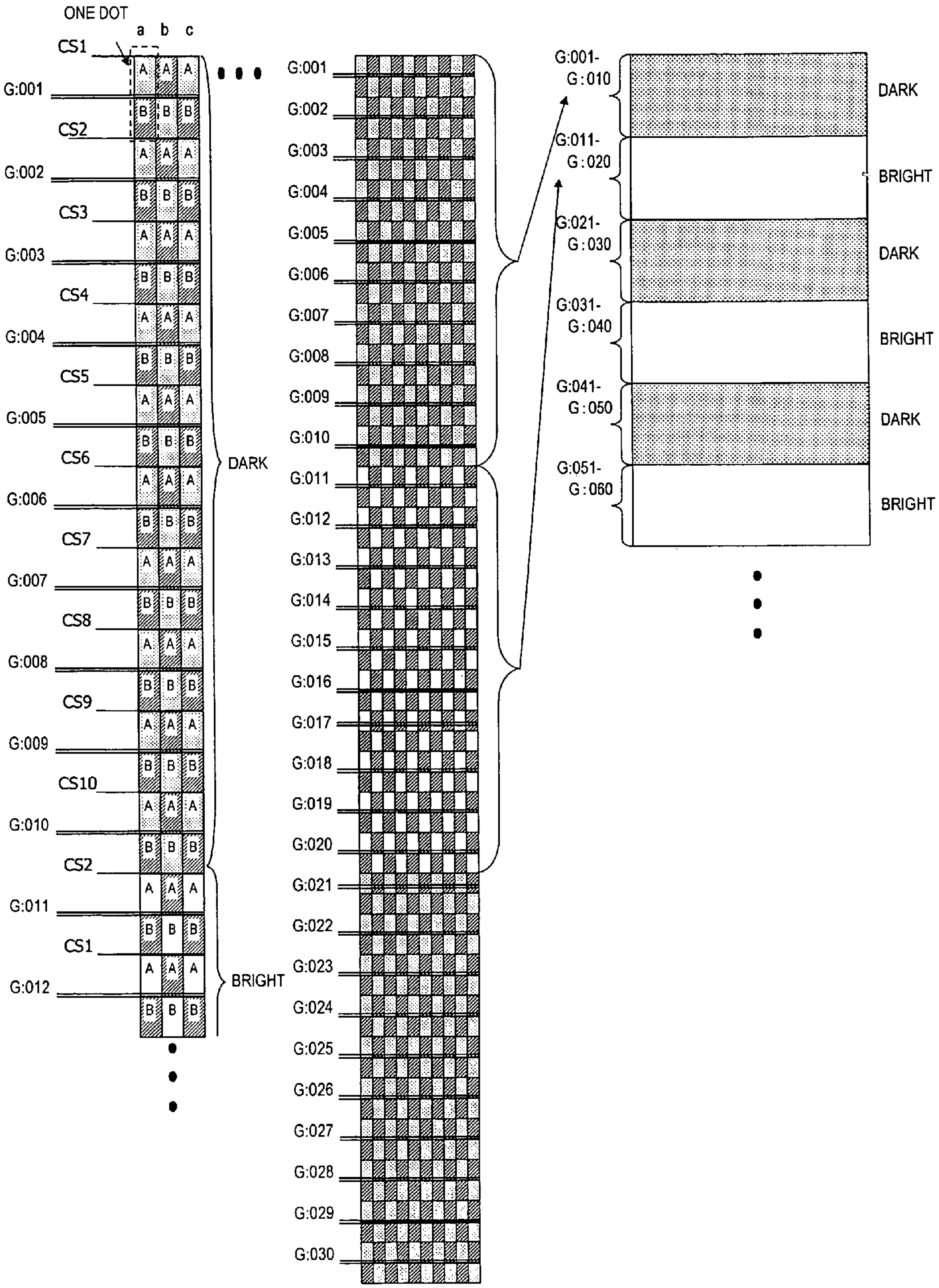

FIG. 38 schematically shows the stripes that have been generated on the Type II liquid crystal display device.

Figure 39A:
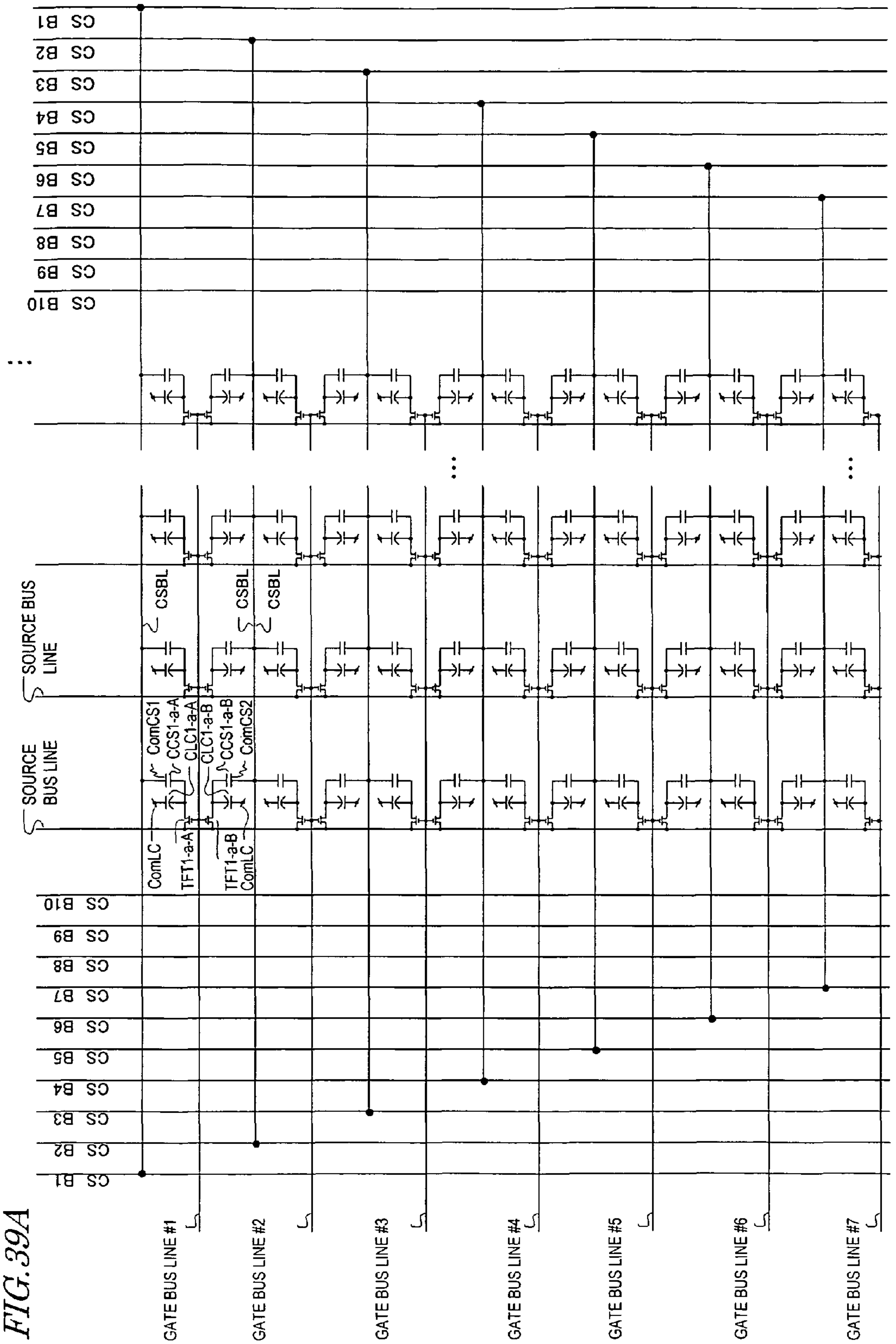
Figure 39B:
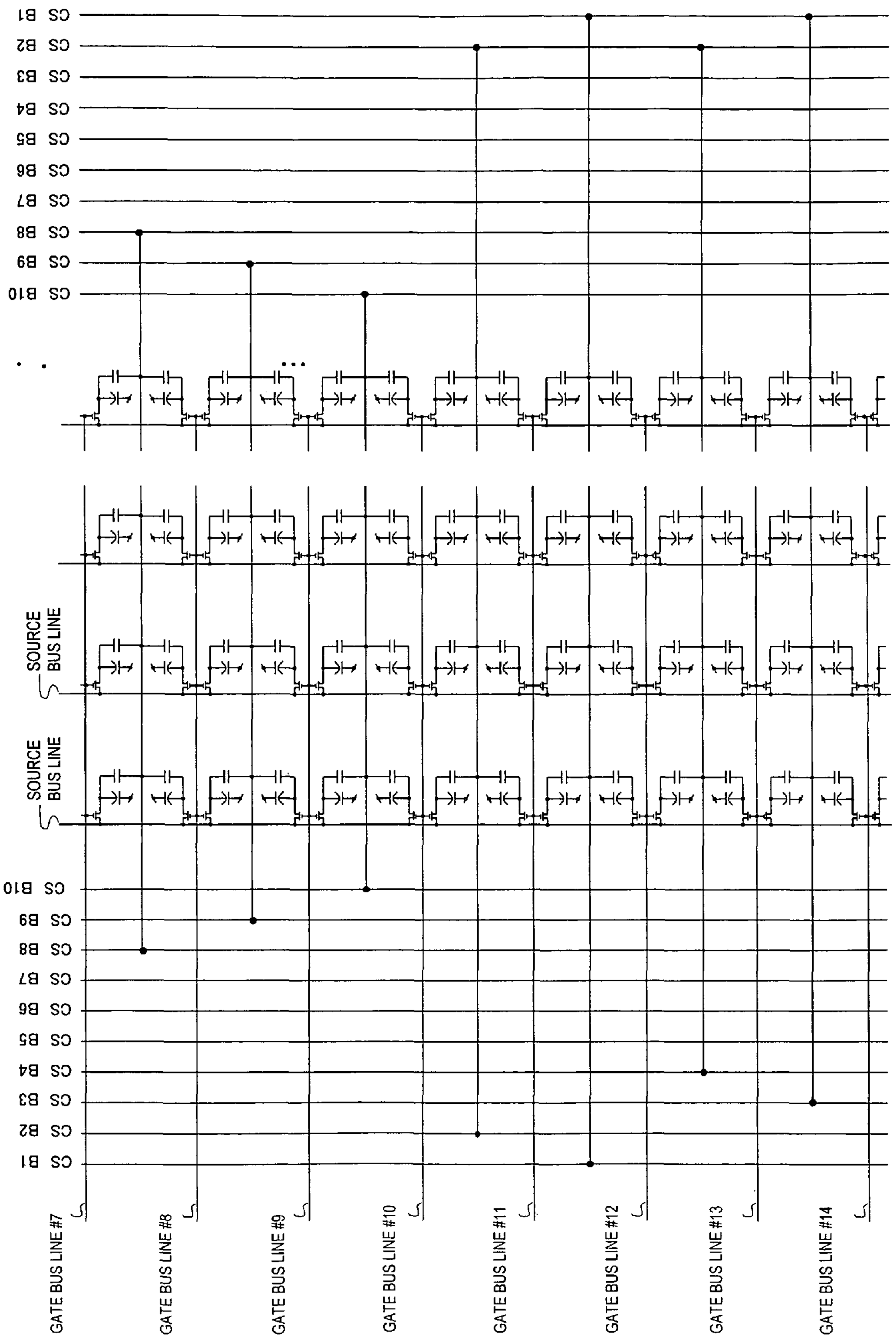
Figure 39C:
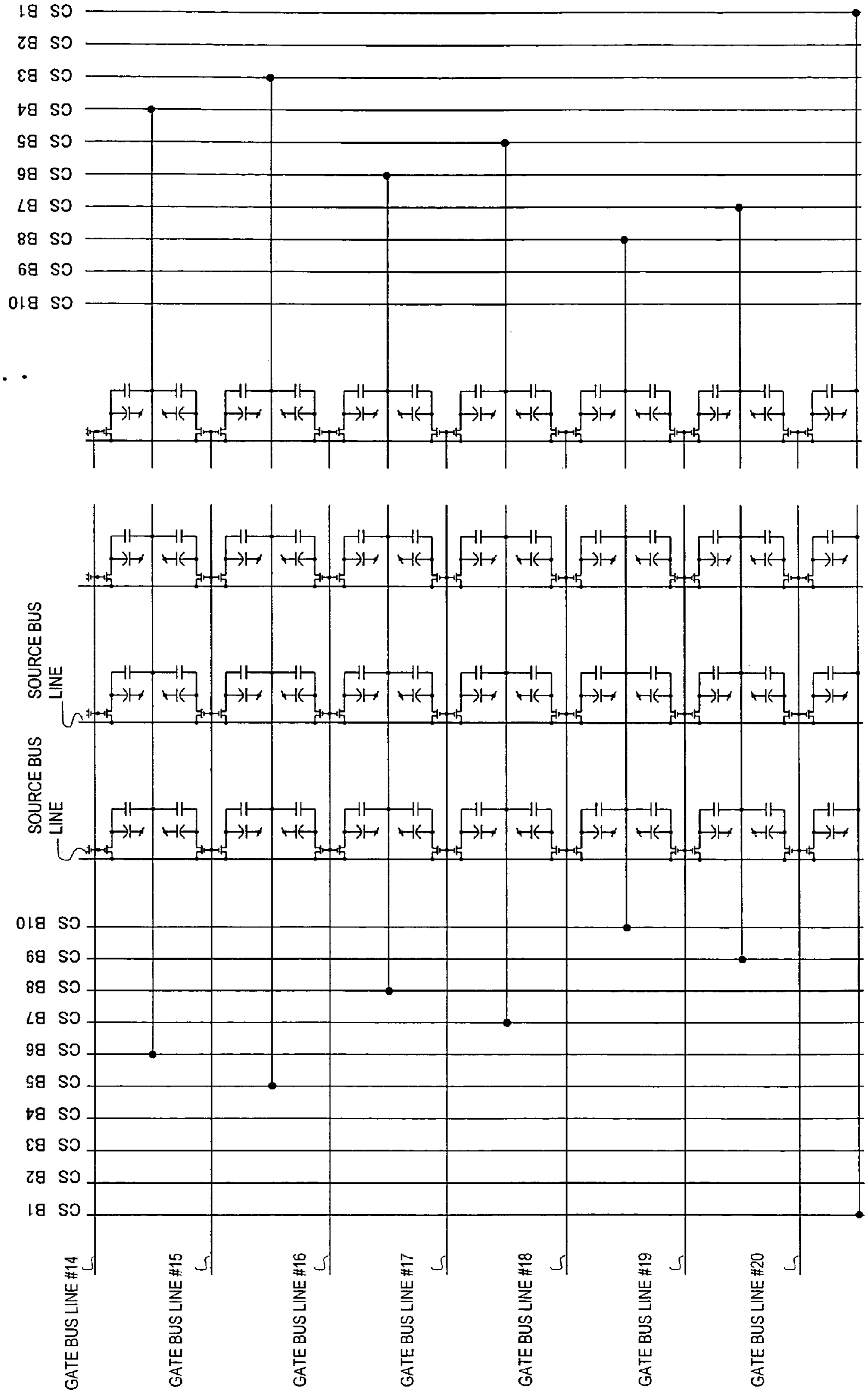

FIGS. 39A, 39B and 39C show an equivalent circuit of the Type I liquid crystal display device with a pattern of connection to the CS trunks.

Figure 40:
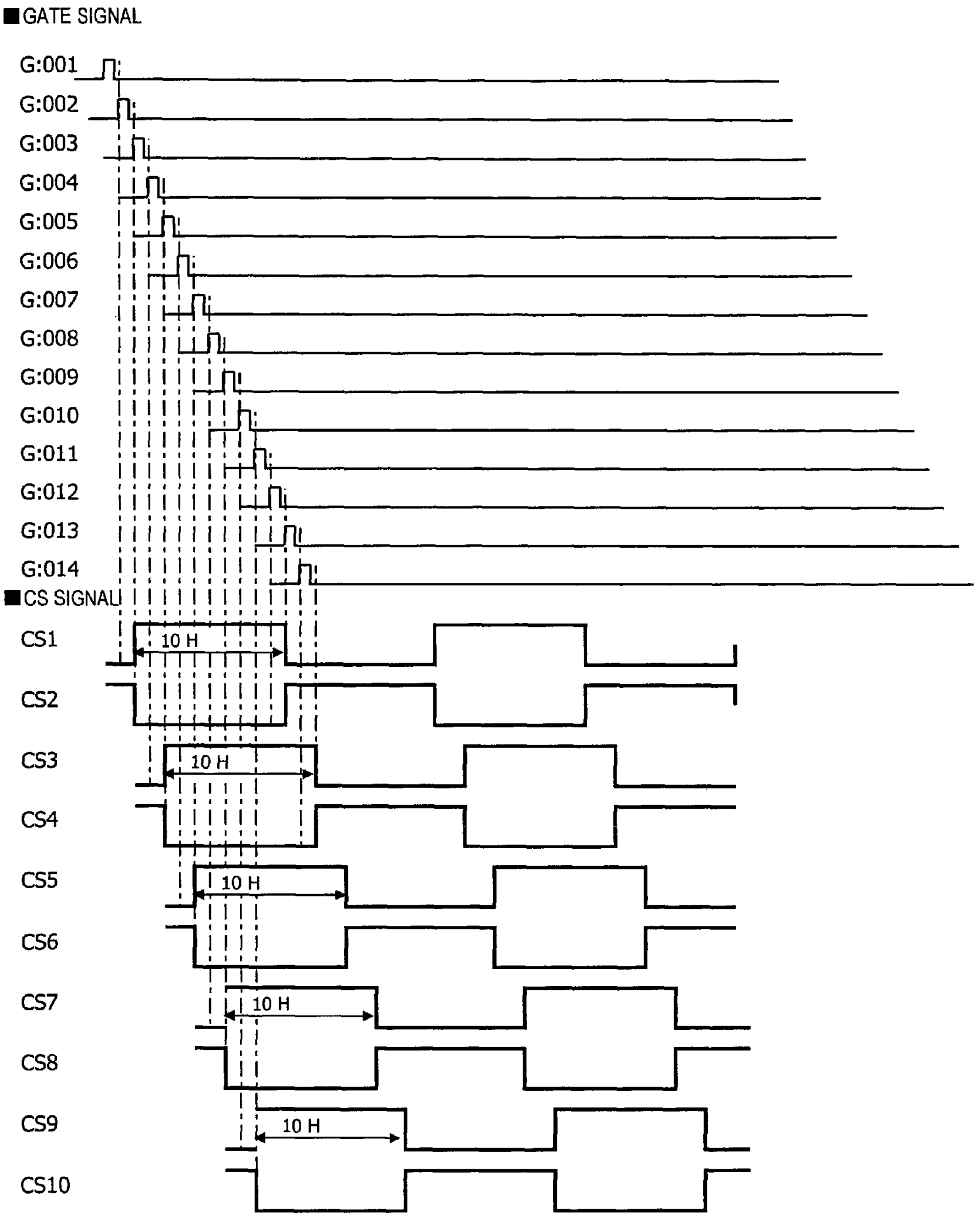

FIG. 40 shows timing relations between the CS voltages and the gate voltages in the liquid crystal display device shown in FIGS. 39A through 39C.

Figure 41A:
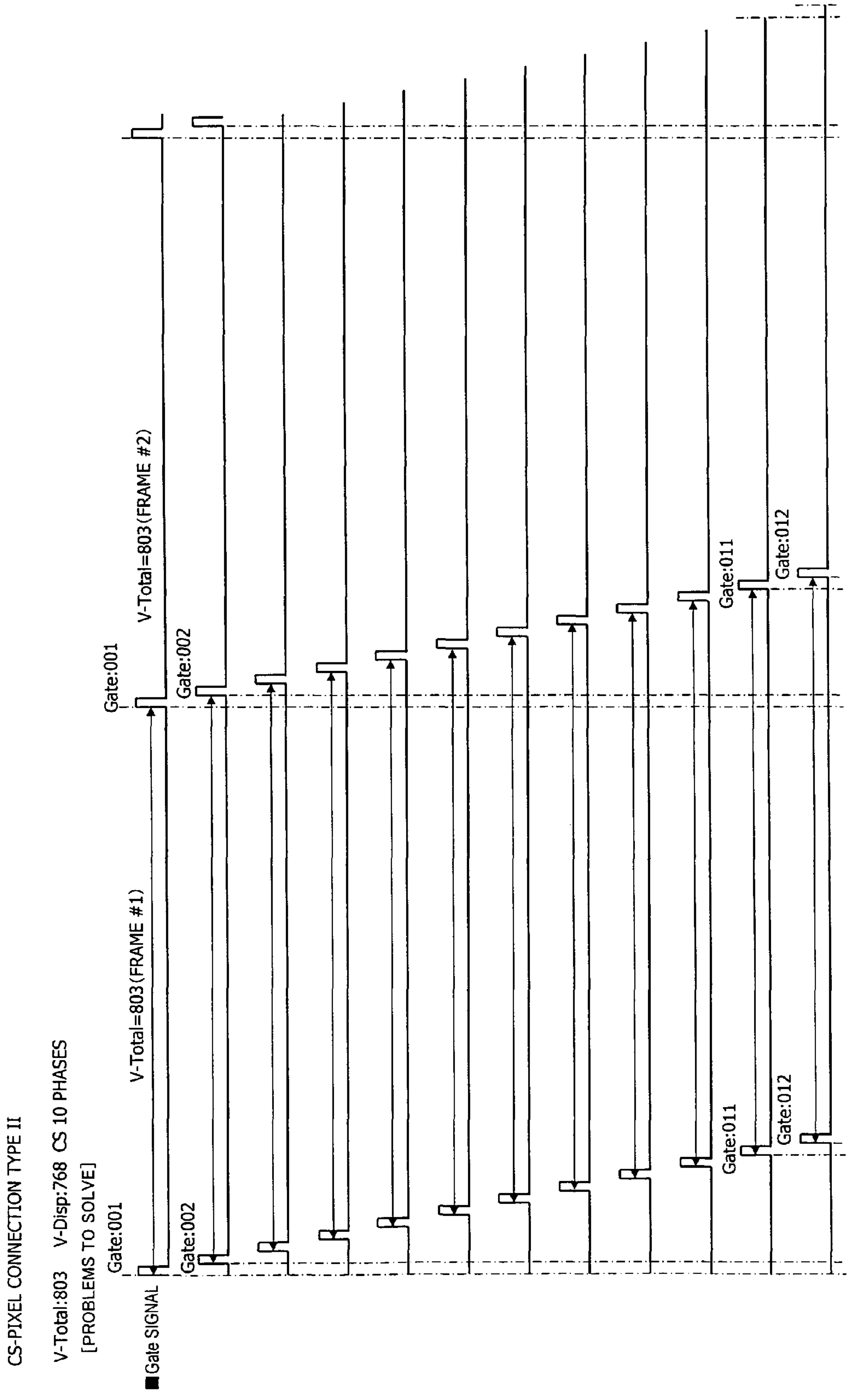

FIG. 41A shows the waveforms of gate voltages to explain the reason why the stripes are generated on the liquid crystal display device shown in FIGS. 39A through 39C.

Figure 41B:
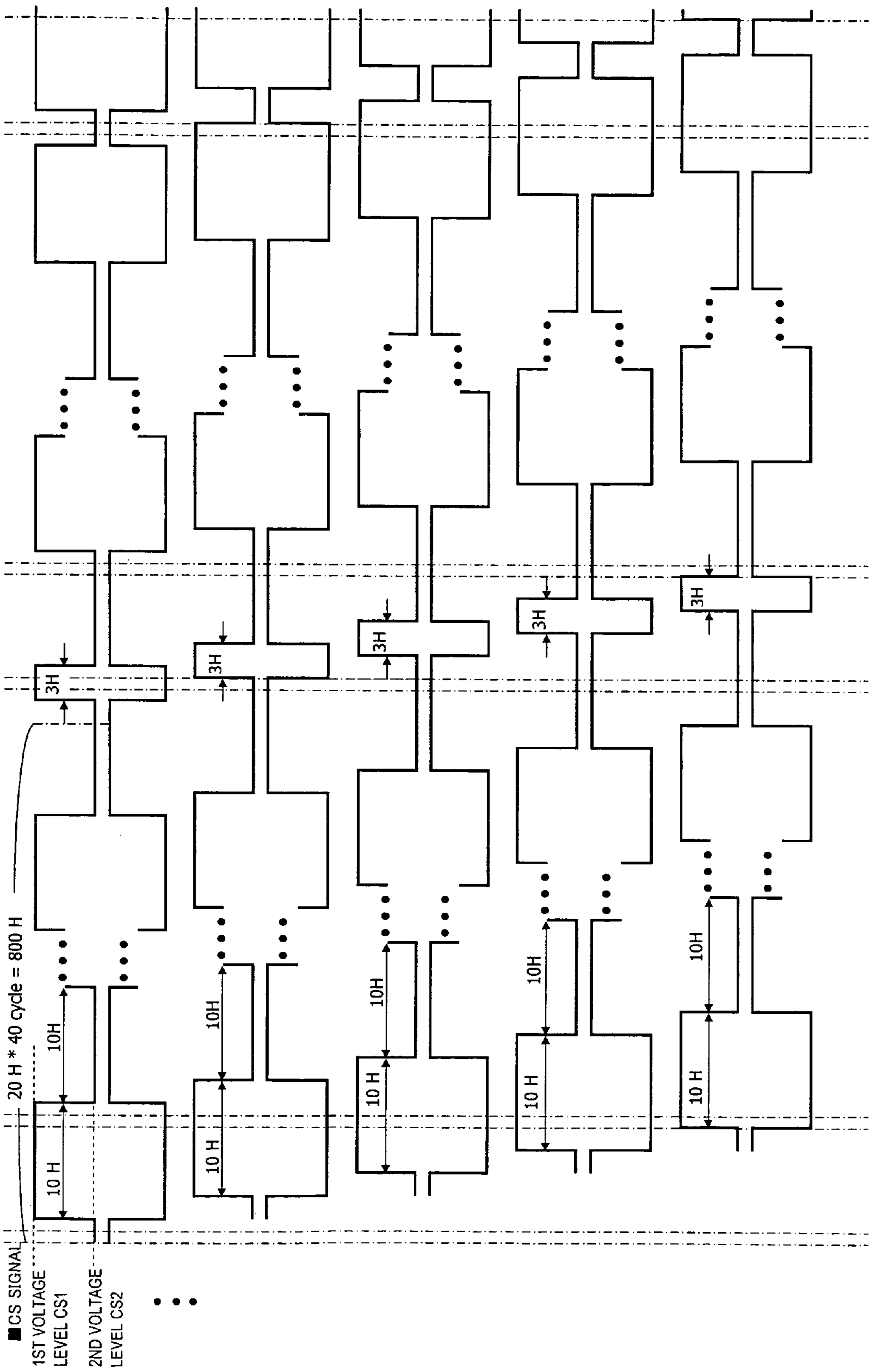

FIG. 41B shows the waveforms of CS voltages to explain the reason why the stripes are generated on the liquid crystal display device shown in FIGS. 39A through 39C.

Figure 41C:
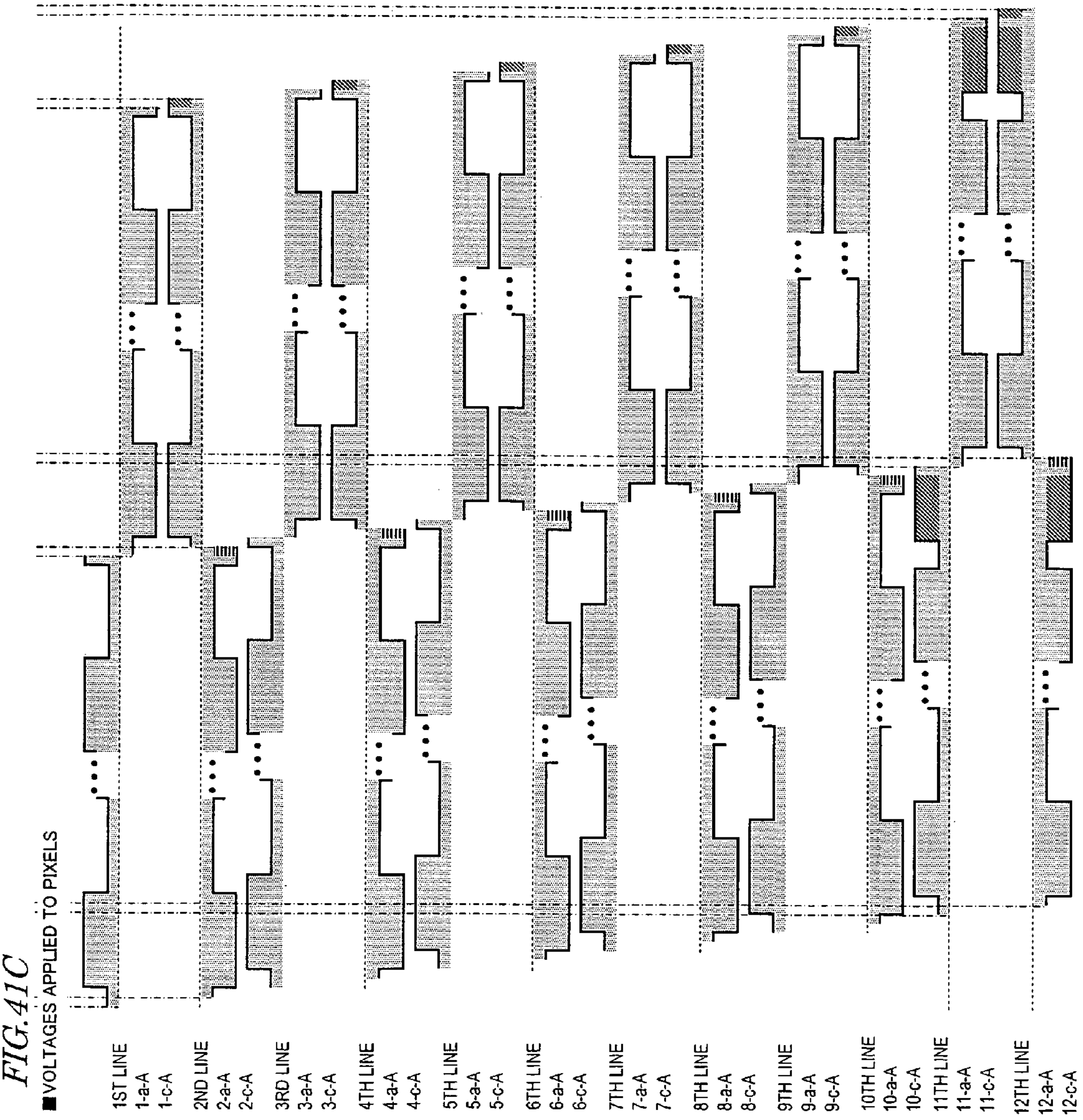

FIG. 41C shows the waveforms of voltages applied to the pixels to explain the reason why the stripes are generated on the liquid crystal display device shown in FIGS. 39A through 39C.

Figure 42A:
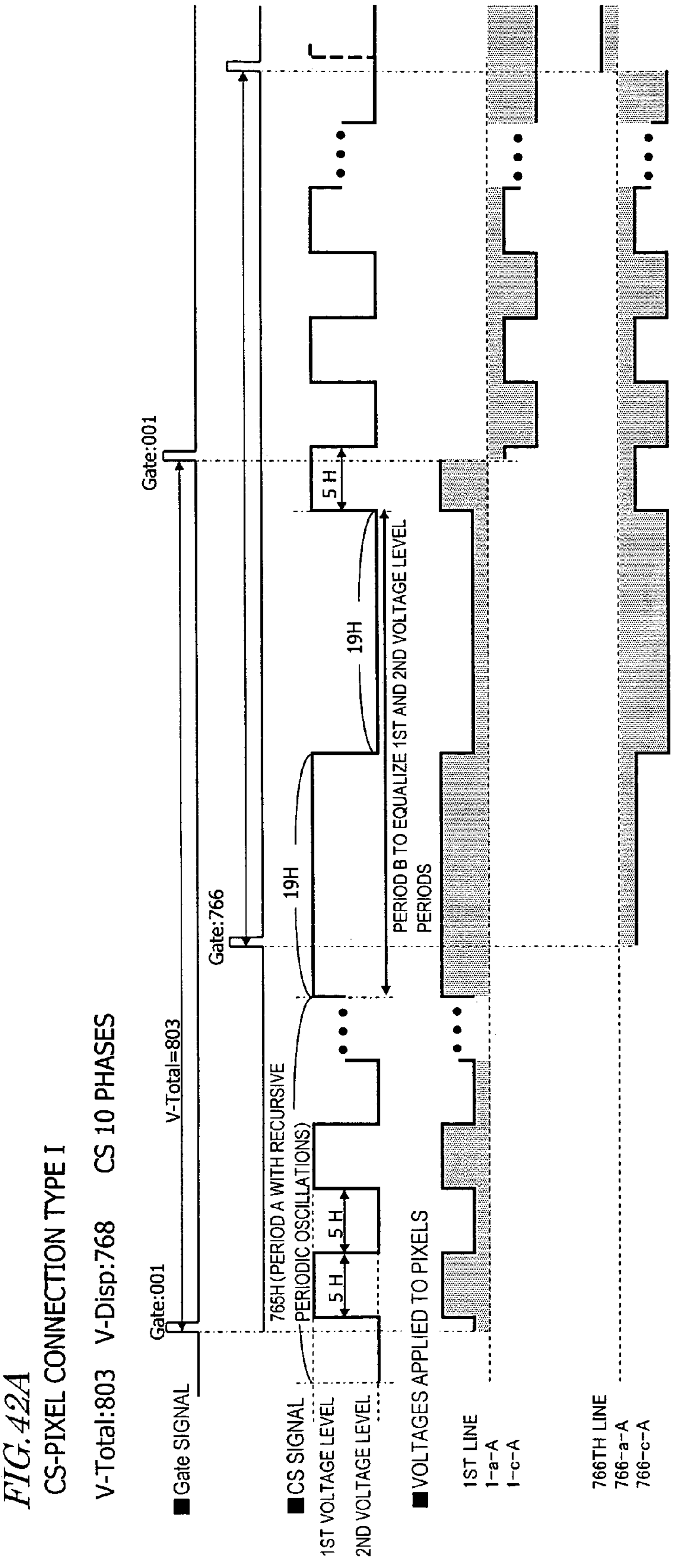

FIG. 42A shows the waveforms of a gate voltage, a CS voltage and the voltage applied to pixels to illustrate how to drive a Type I liquid crystal display device according to a first preferred embodiment of the present invention (representing Example #1).

Figure 42B:
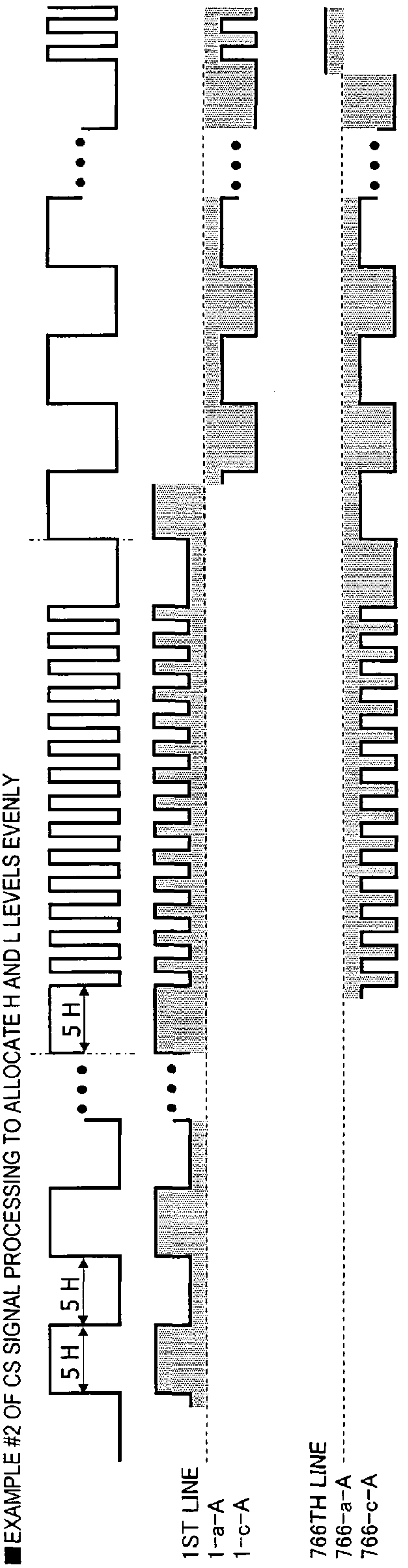

FIG. 42B shows the waveforms of a CS voltage and the voltage applied to pixels to illustrate how to drive the Type I liquid crystal display device of the first preferred embodiment of the present invention (representing Example #2).

Figure 42C:
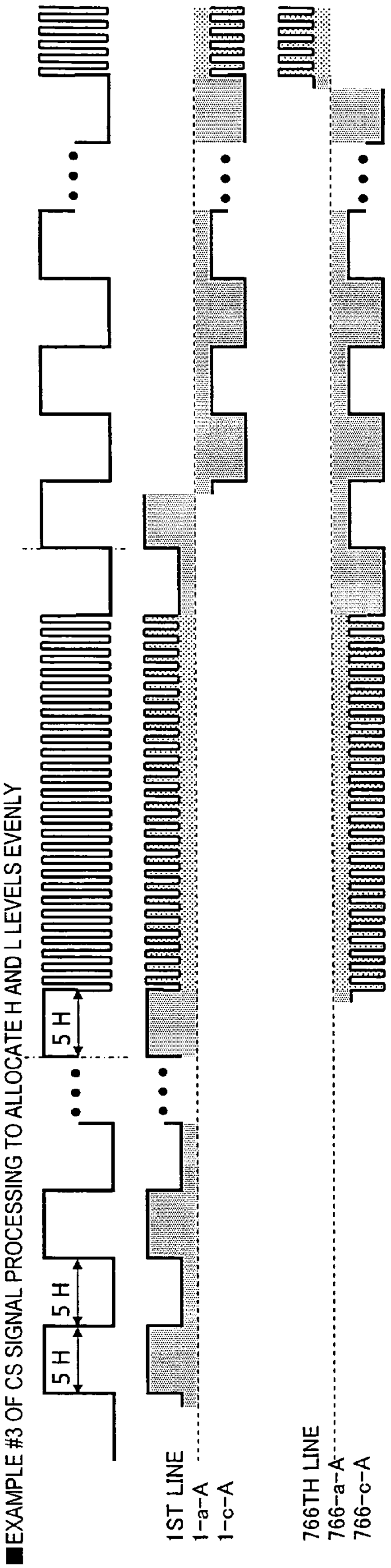

FIG. 42C shows the waveforms of a CS voltage and the voltage applied to pixels to illustrate how to drive the Type I liquid crystal display device of the first preferred embodiment of the present invention (representing Example #3).

Figure 42D:
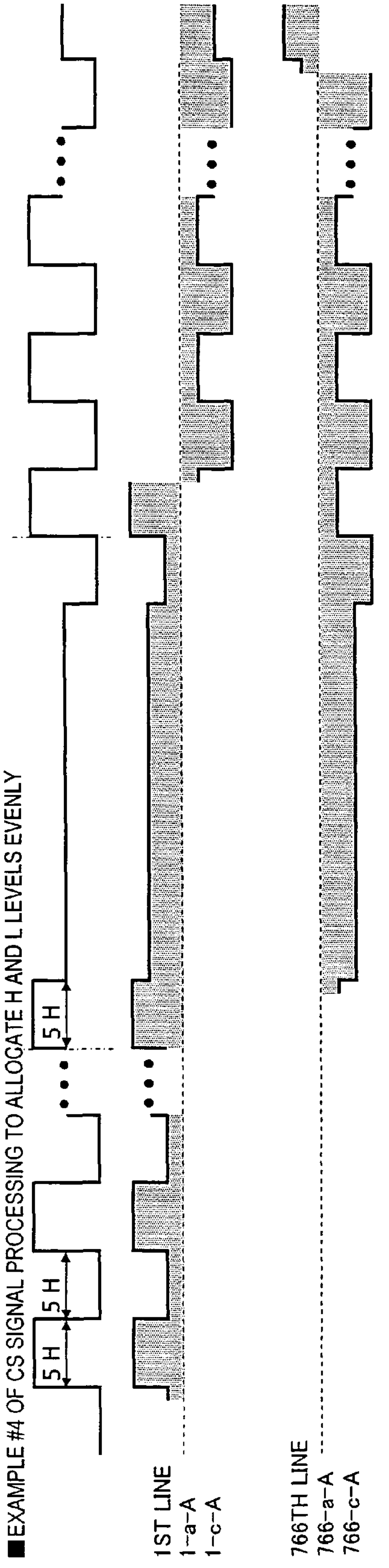

FIG. 42D shows the waveforms of a CS voltage and the voltage applied to pixels to illustrate how to drive the Type I liquid crystal display device of the first preferred embodiment of the present invention (representing Example #4).

Figure 43:
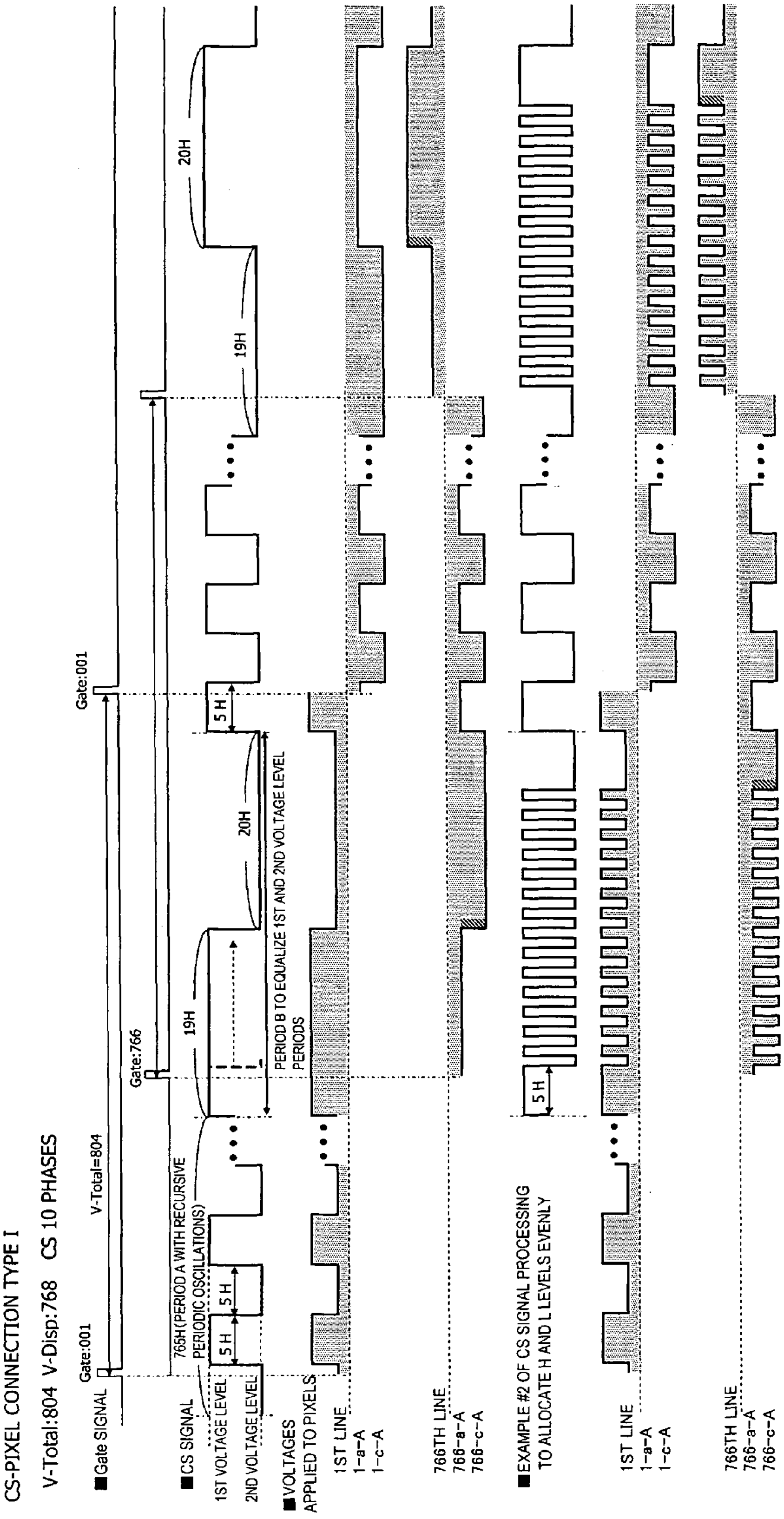

FIG. 43 shows the waveforms of a gate voltage, a CS voltage and the voltage applied to pixels to explain why the stripes are produced on another Type I liquid crystal display device.

Figure 44:
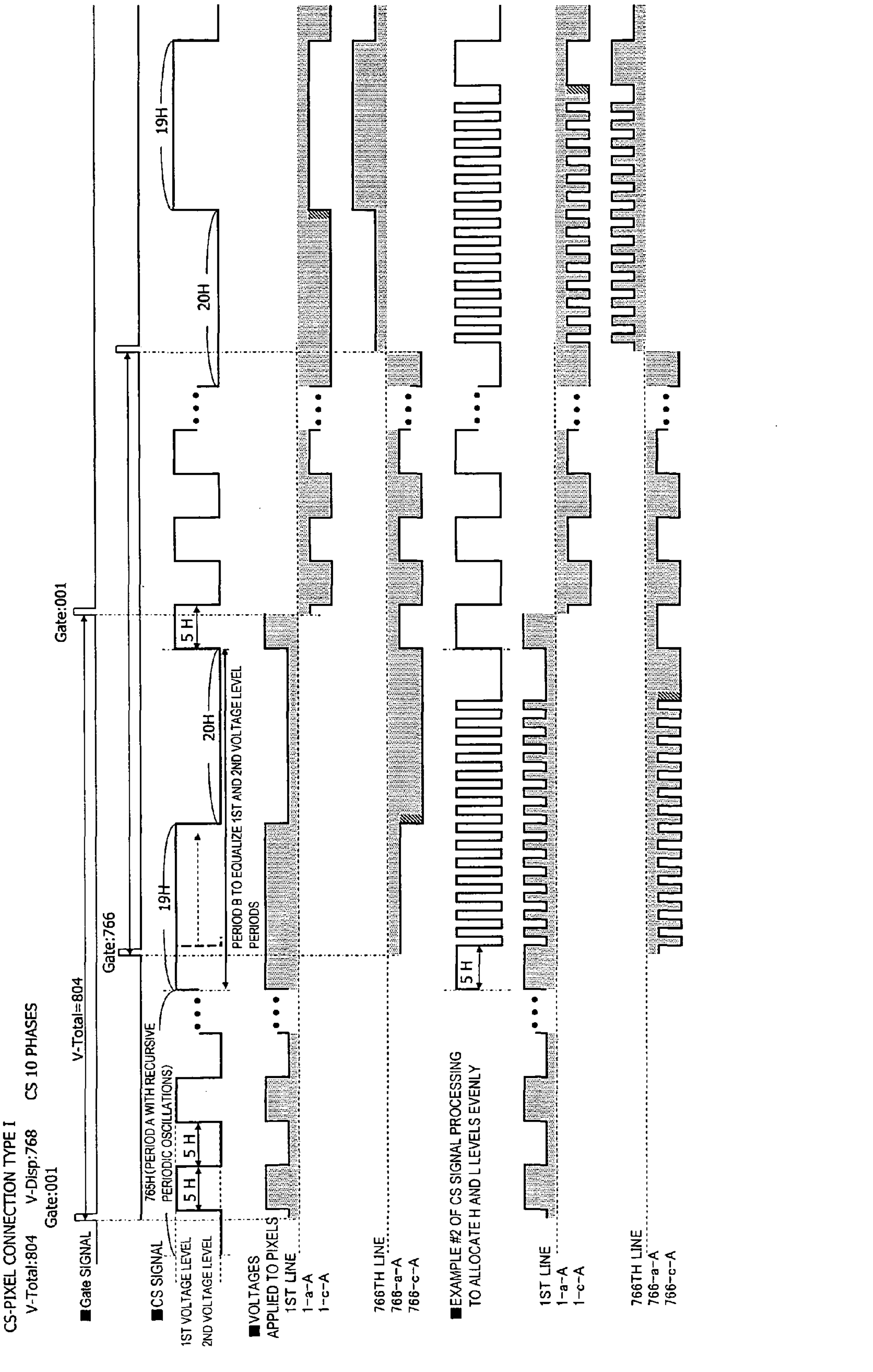

FIG. 44 shows the waveforms of a gate voltage, a CS voltage and the voltage applied to pixels to illustrate how to drive a Type I liquid crystal display device according to a second preferred embodiment of the present invention.

Figure 45A:
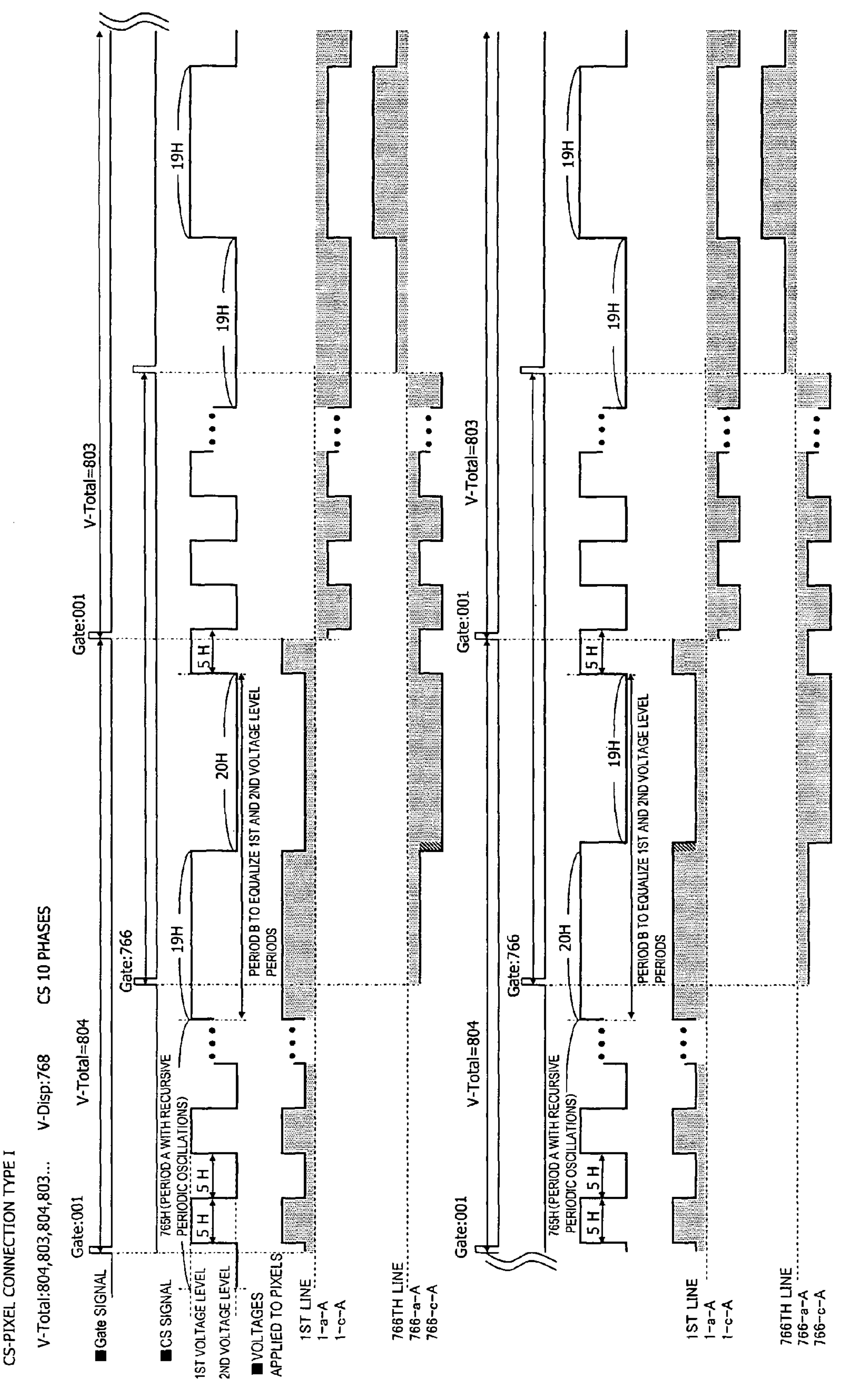

FIG. 45A shows the waveforms of a gate voltage, a CS voltage and the voltage applied to pixels to illustrate how to drive a Type I liquid crystal display device according to a third preferred embodiment of the present invention (representing Example #1).

Figure 45B:
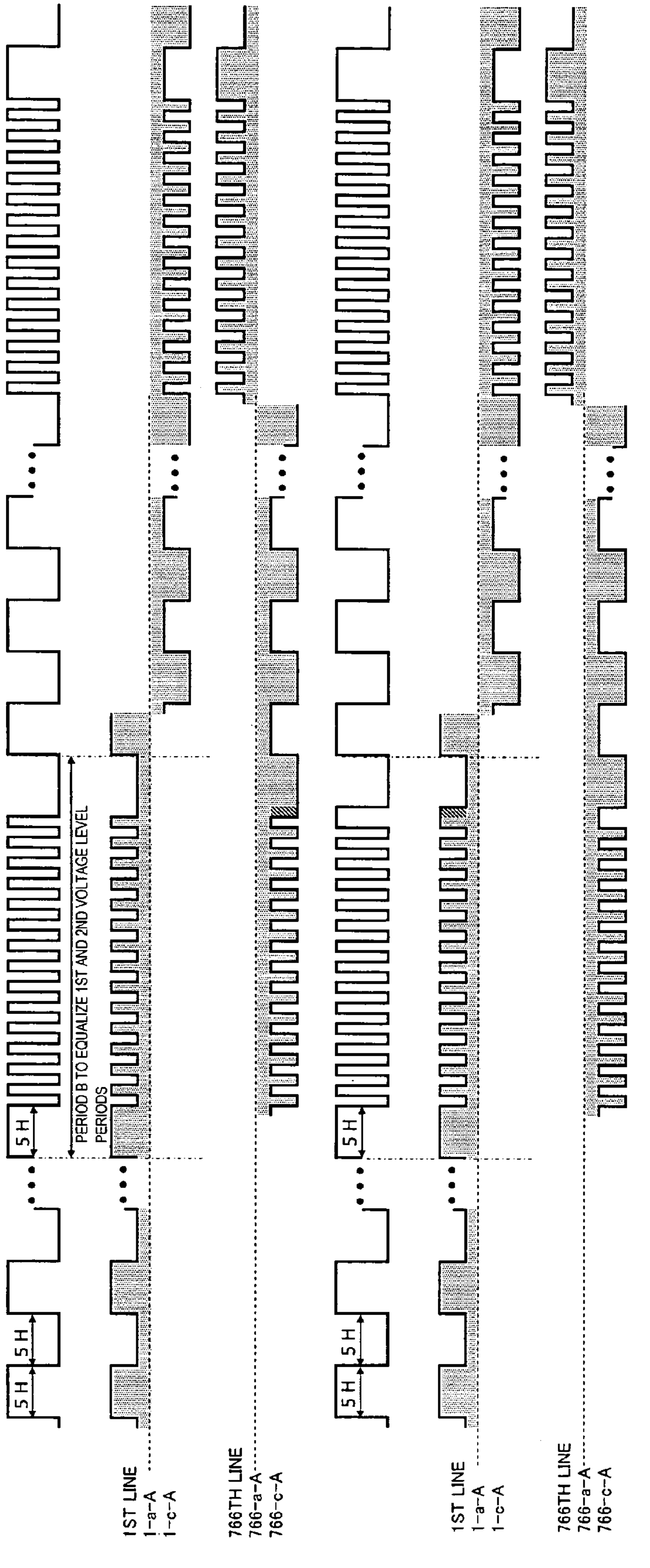

FIG. 45B shows the waveforms of a gate voltage, a CS voltage and the voltage applied to pixels to illustrate how to drive the Type I liquid crystal display device of the third preferred embodiment of the present invention (representing Example #2).

Figure 46A:
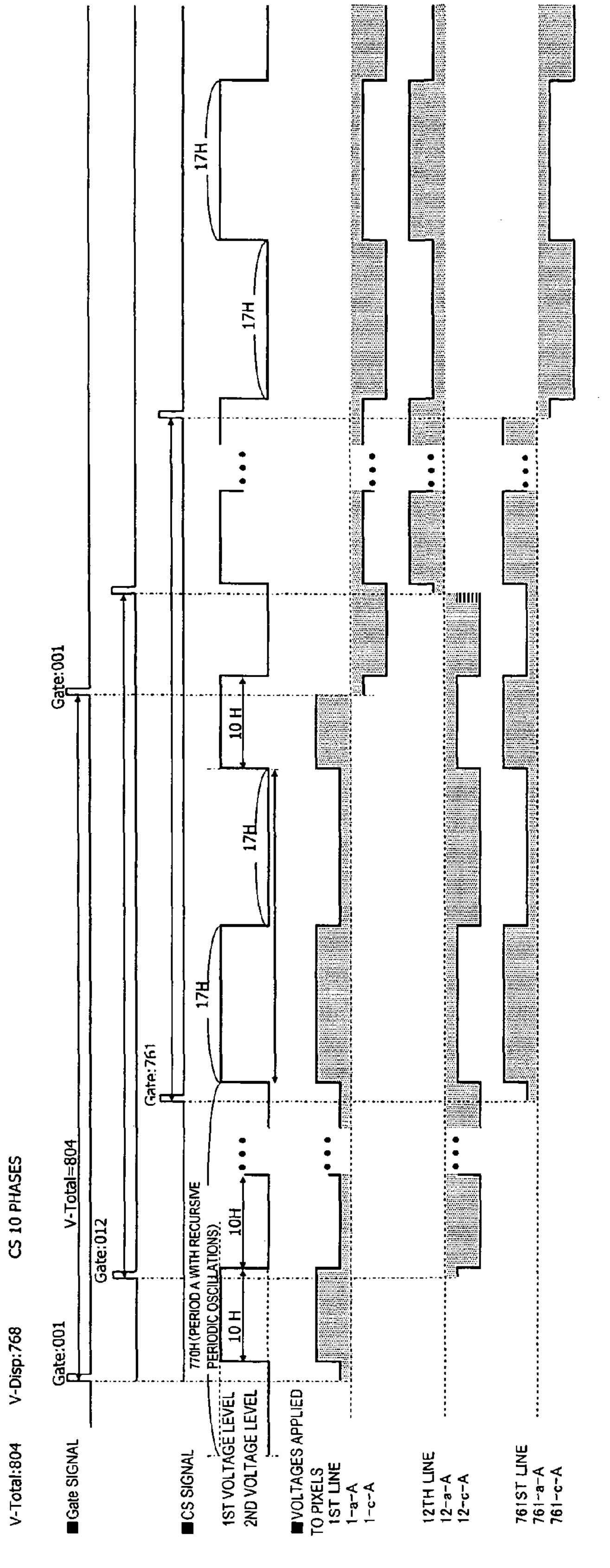

FIG. 46A shows the waveforms of a gate voltage, a CS voltage and the voltage applied to pixels to illustrate how to drive a Type II liquid crystal display device according to a fourth preferred embodiment of the present invention (representing Example #1).

Figure 46B:
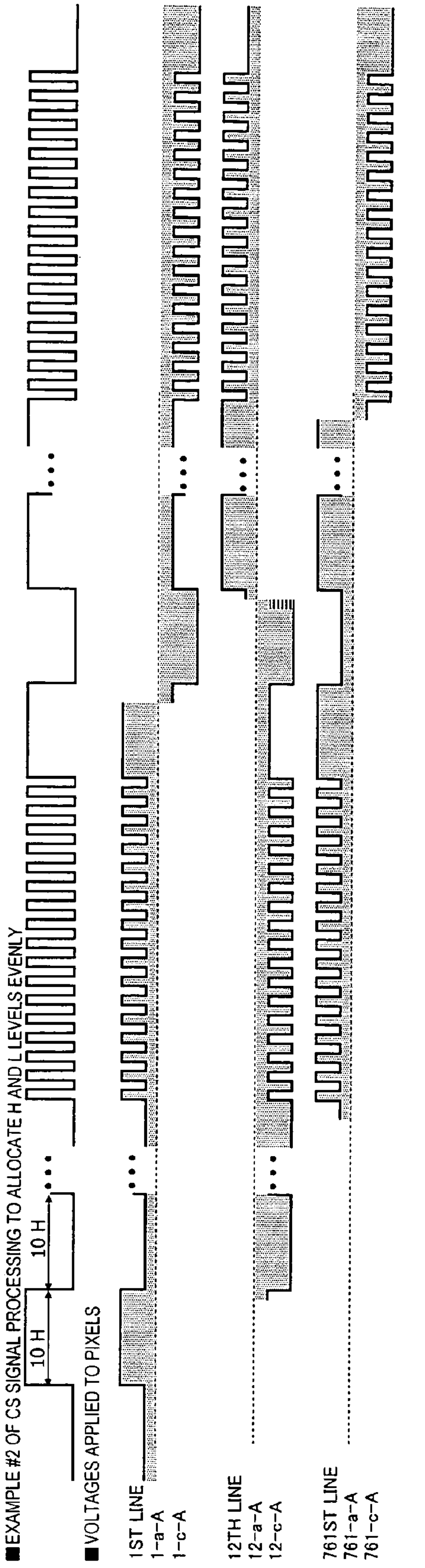

FIG. 46B shows the waveforms of a CS voltage and the voltage applied to pixels to illustrate how to drive the Type II liquid crystal display device of the fourth preferred embodiment of the present invention (representing Example #2).

Figure 46C:
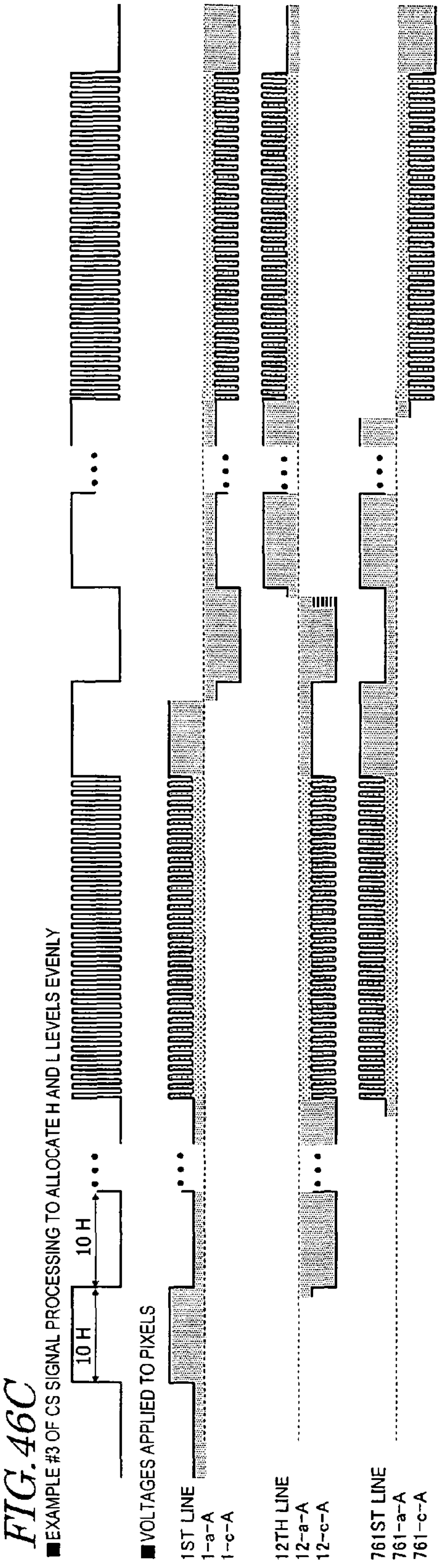

FIG. 46C shows the waveforms of a CS voltage and the voltage applied to pixels to illustrate how to drive the Type II liquid crystal display device of the fourth preferred embodiment of the present invention (representing Example #3).

Figure 46D:
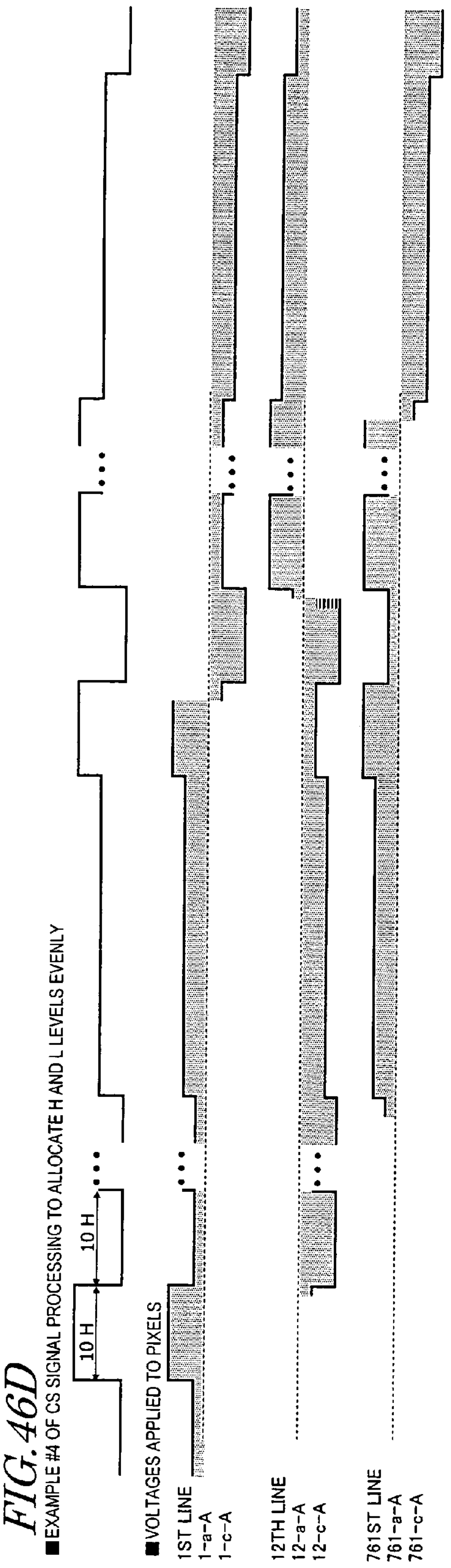

FIG. 46D shows the waveforms of a CS voltage and the voltage applied to pixels to illustrate how to drive the Type II liquid crystal display device of the fourth preferred embodiment of the present invention (representing Example #4).

Figure 47A:
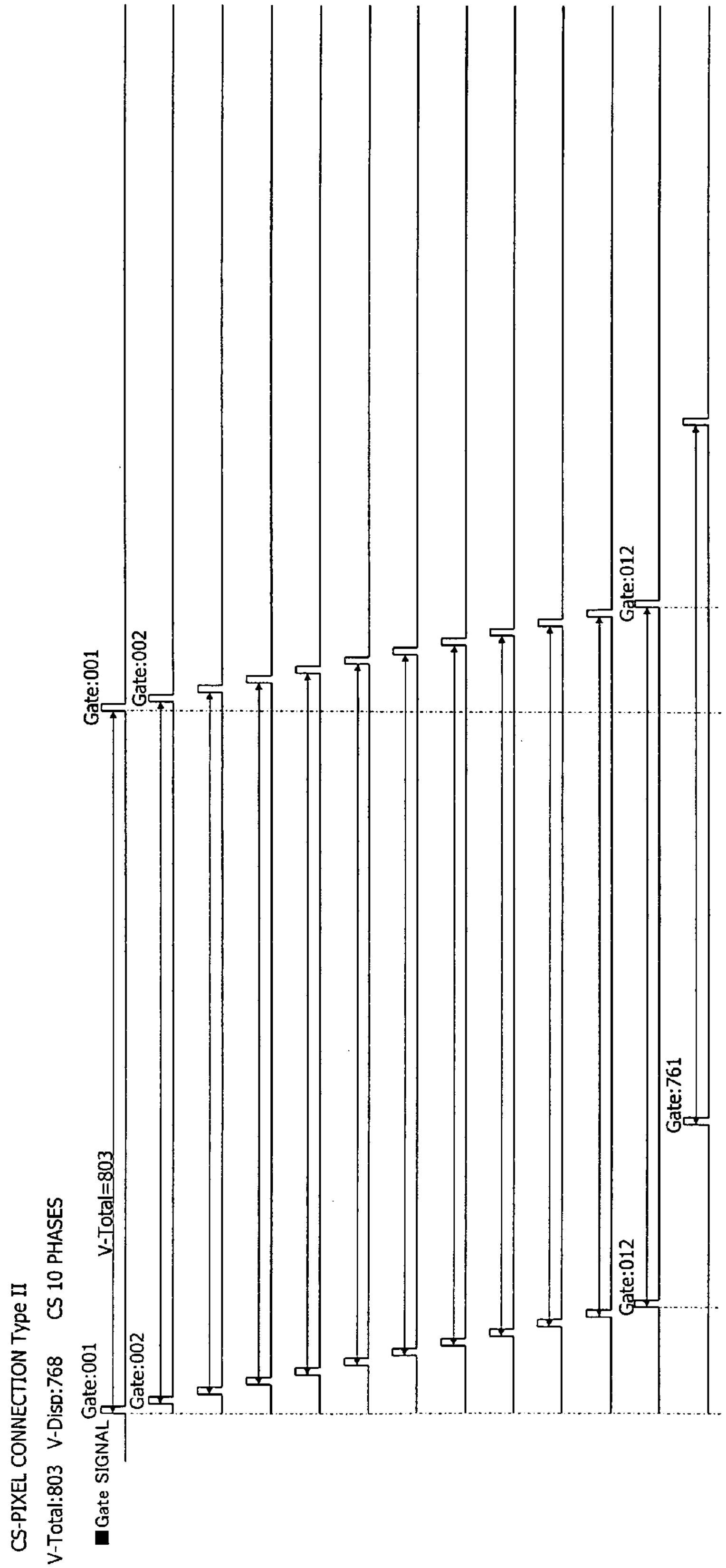

FIG. 47A shows the waveforms of gate voltages to illustrate why the stripes are produced on another Type II liquid crystal display device.

Figure 47B:
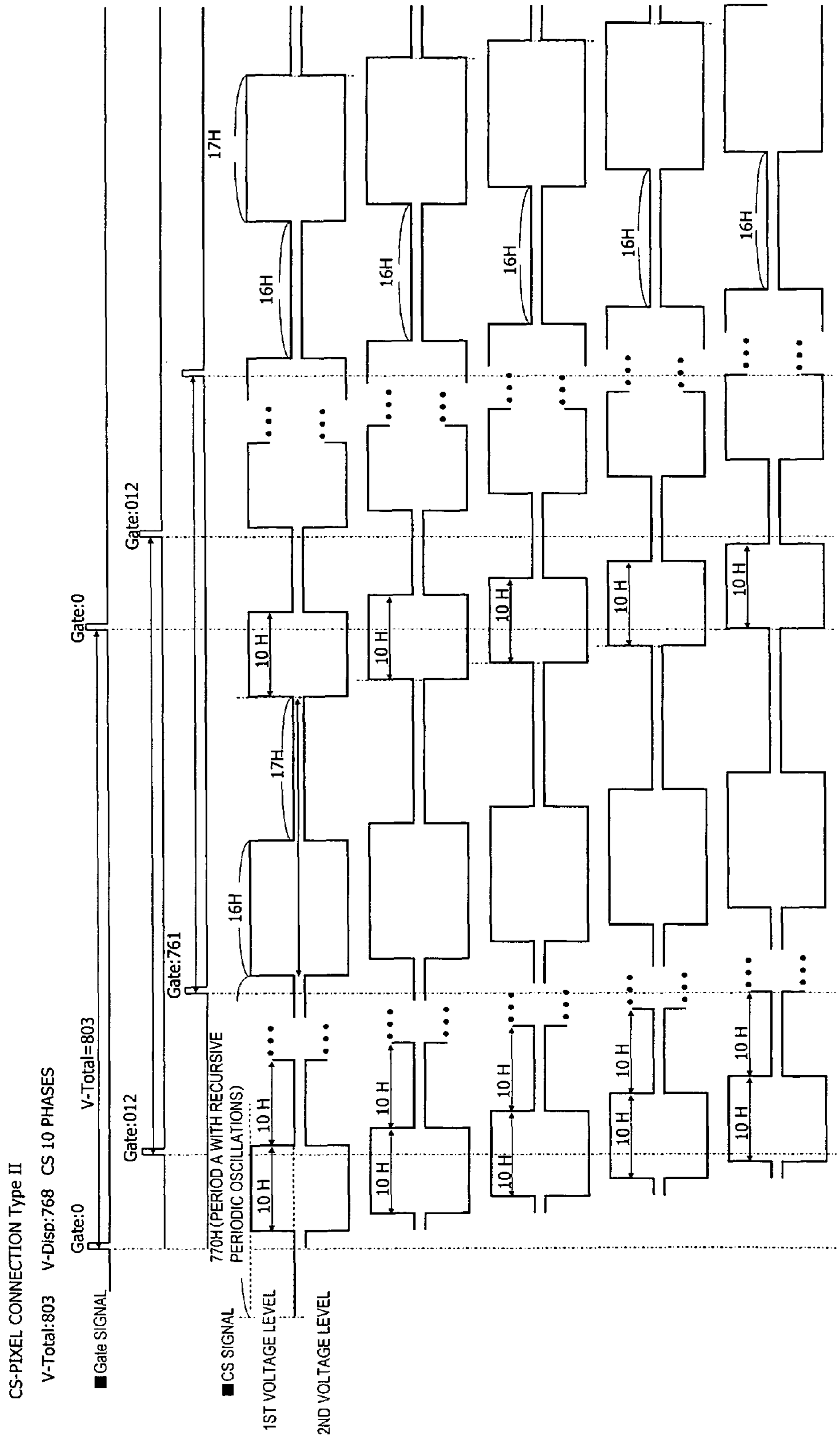

FIG. 47B shows the waveforms of a gate voltage and CS voltages to illustrate why the stripes are produced on that another Type II liquid crystal display device.

Figure 47C:
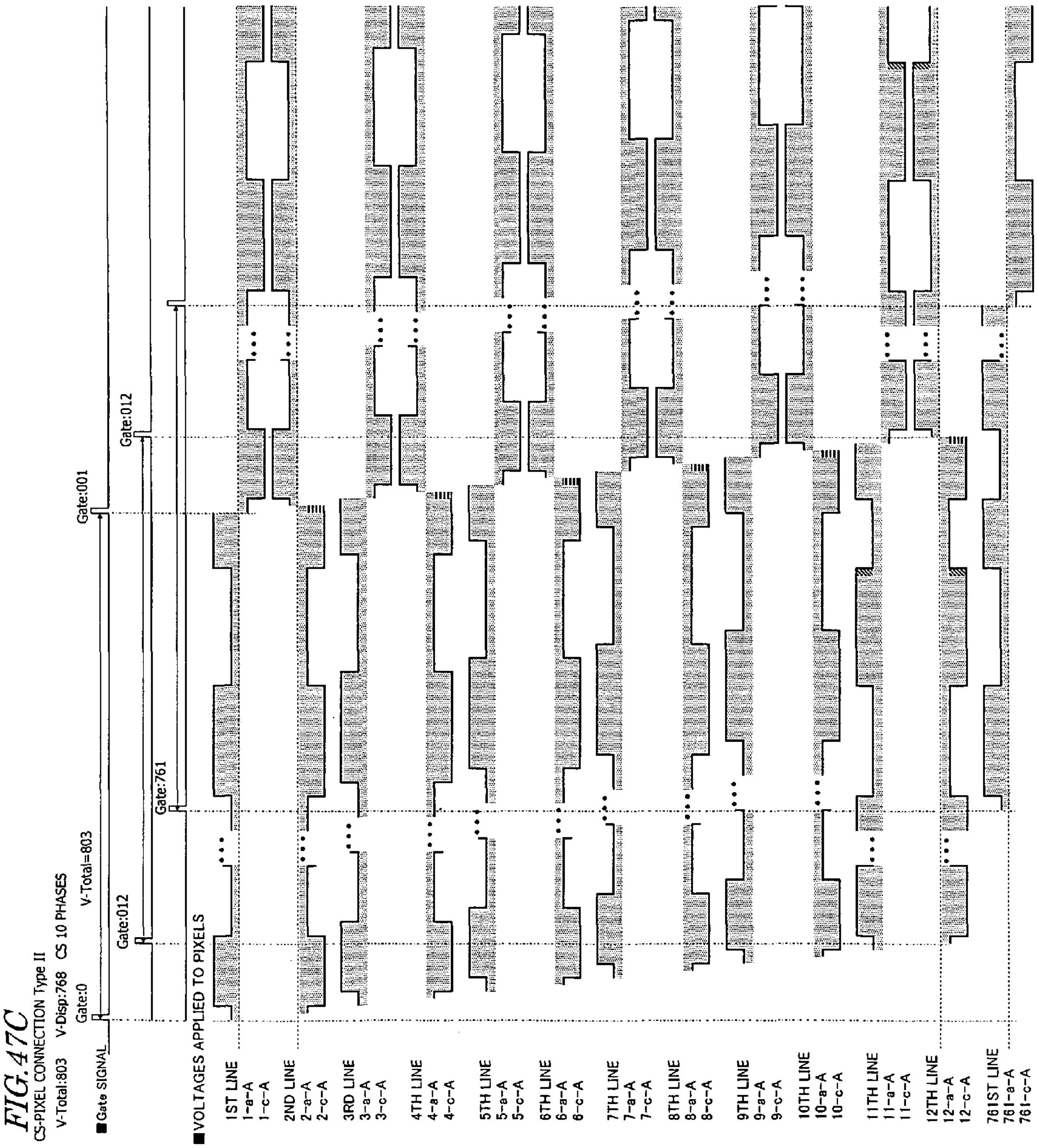

FIG. 47C shows the waveforms of a gate voltage and the voltages applied to pixels to illustrate why the stripes are produced on that another Type II liquid crystal display device.

Figure 47D:
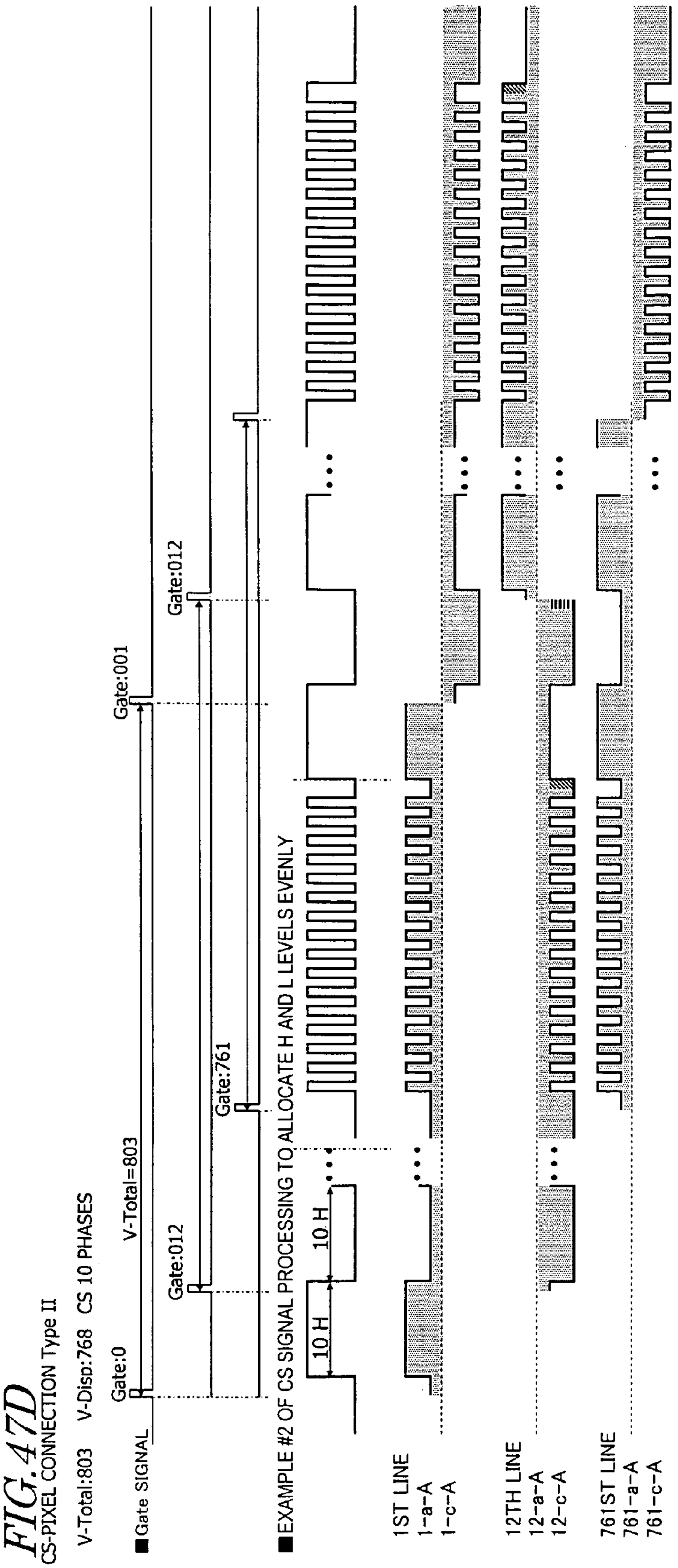

FIG. 47D shows the waveforms of a gate voltage, a CS voltage and the voltages applied to pixels to illustrate why the stripes are produced on that another Type II liquid crystal display device (representing Example #2).

Figure 48:
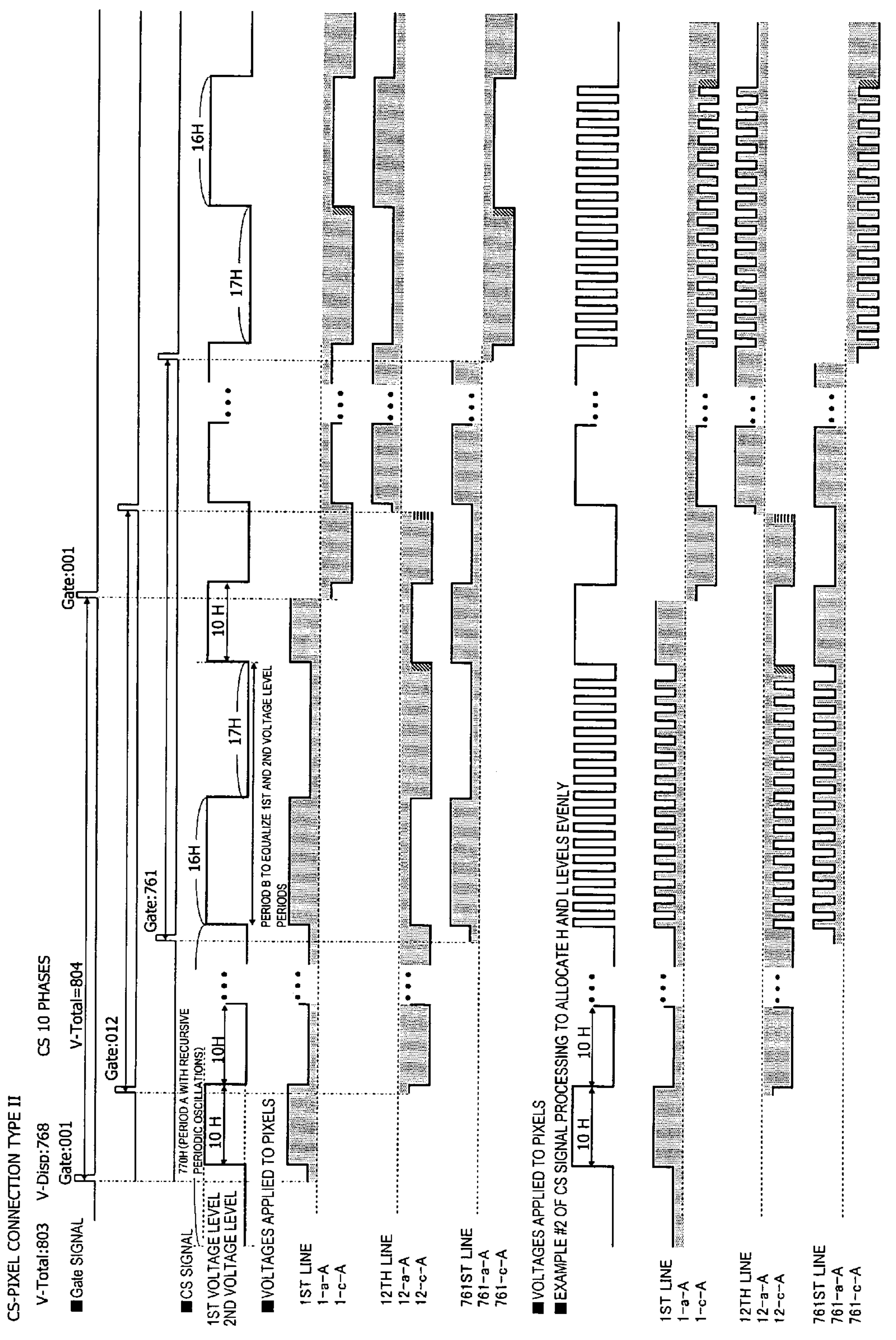

FIG. 48 shows the waveforms of a gate voltage, a CS voltage and the voltage applied to pixels to illustrate how to drive a Type II liquid crystal display device according to a fifth preferred embodiment of the present invention.

Figure 49A:
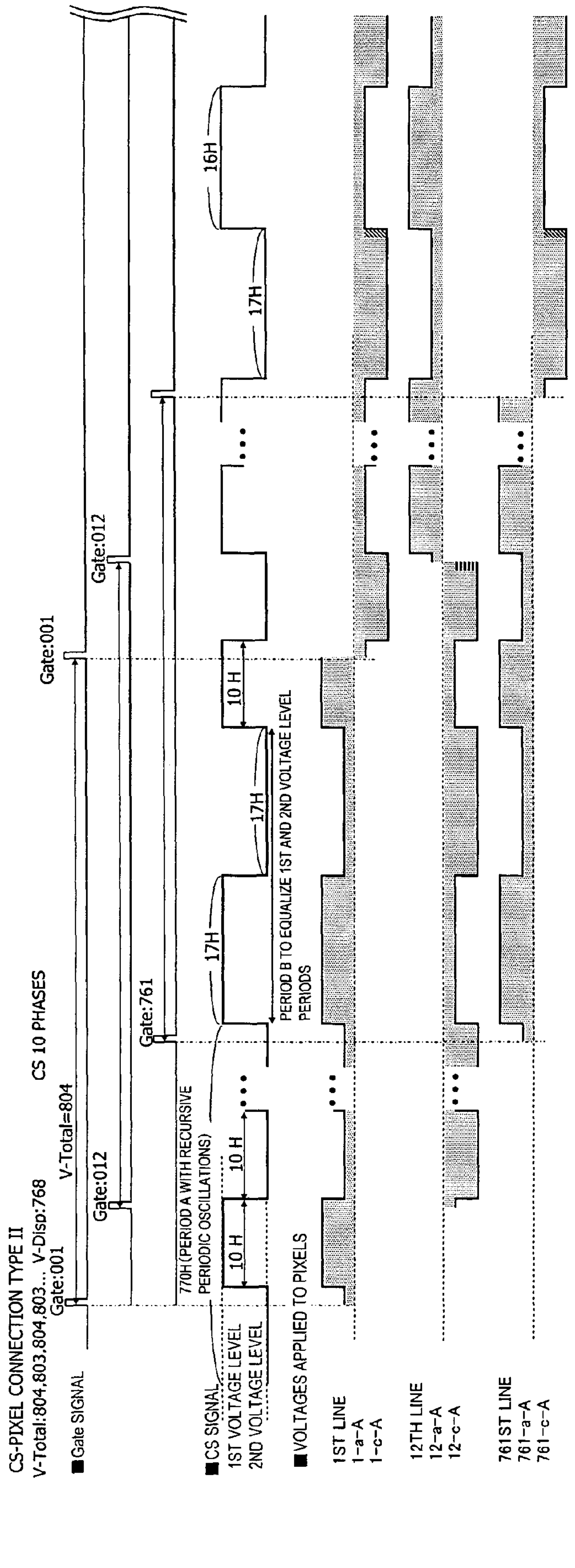

FIG. 49A shows the waveforms of a gate voltage, a CS voltage and the voltage applied to pixels to illustrate how to drive a Type II liquid crystal display device according to a sixth preferred embodiment of the present invention (representing Example #1).

Figure 49B:
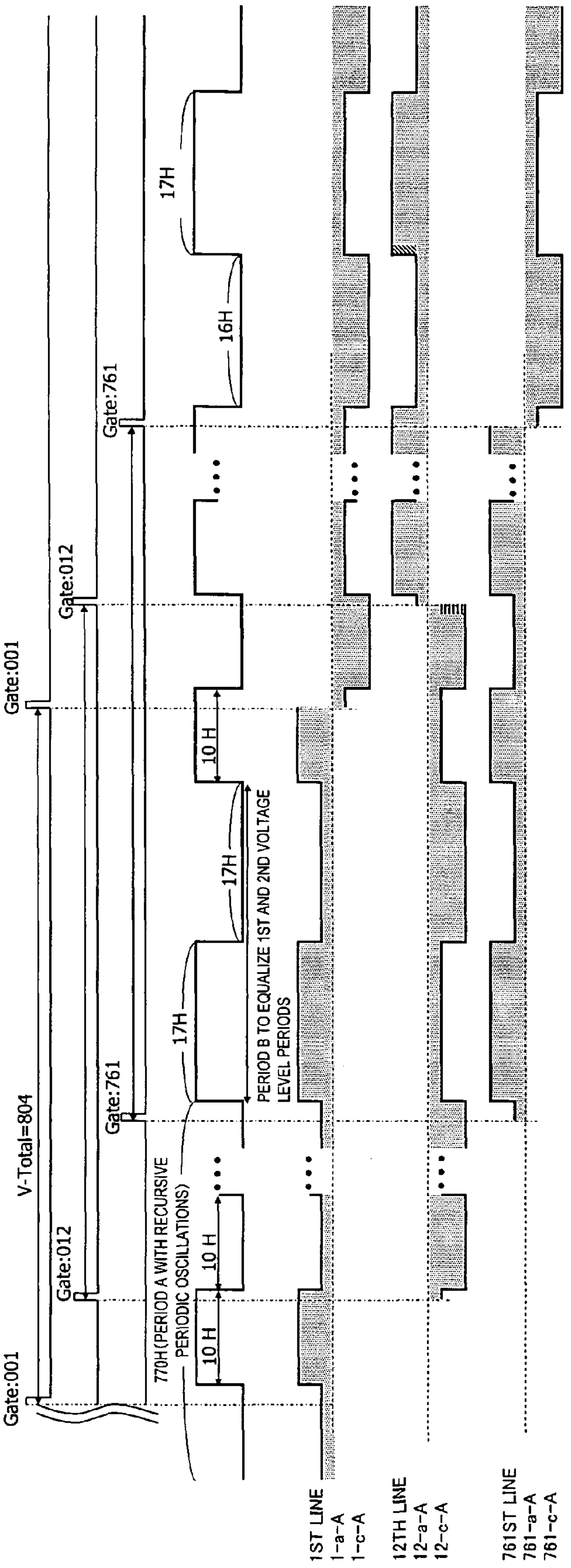

FIG. 49B shows the waveforms of a gate voltage, a CS voltage and the voltage applied to pixels to illustrate how to drive the Type II liquid crystal display device of the sixth preferred embodiment of the present invention (representing Example #1).

Figure 49C:
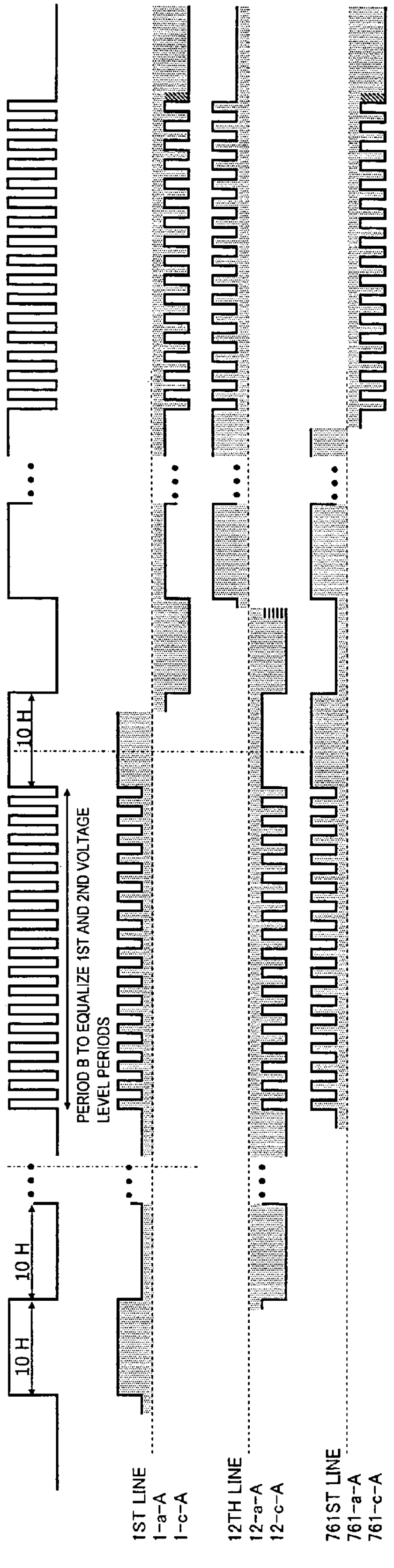

FIG. 49C shows the waveforms of a CS voltage and the voltage applied to pixels to illustrate how to drive the Type II liquid crystal display device of the sixth preferred embodiment of the present invention (representing Example #2).

Figure 49D:
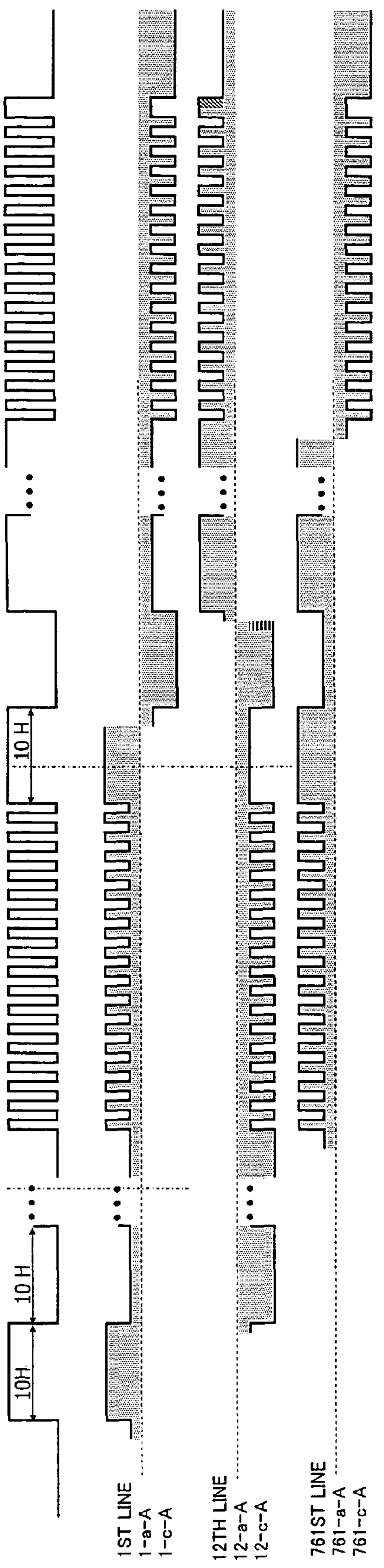

FIG. 49D shows the waveforms of a CS voltage and the voltage applied to pixels to illustrate how to drive the Type II liquid crystal display device of the sixth preferred embodiment of the present invention (representing Example #2).

Figure 50:
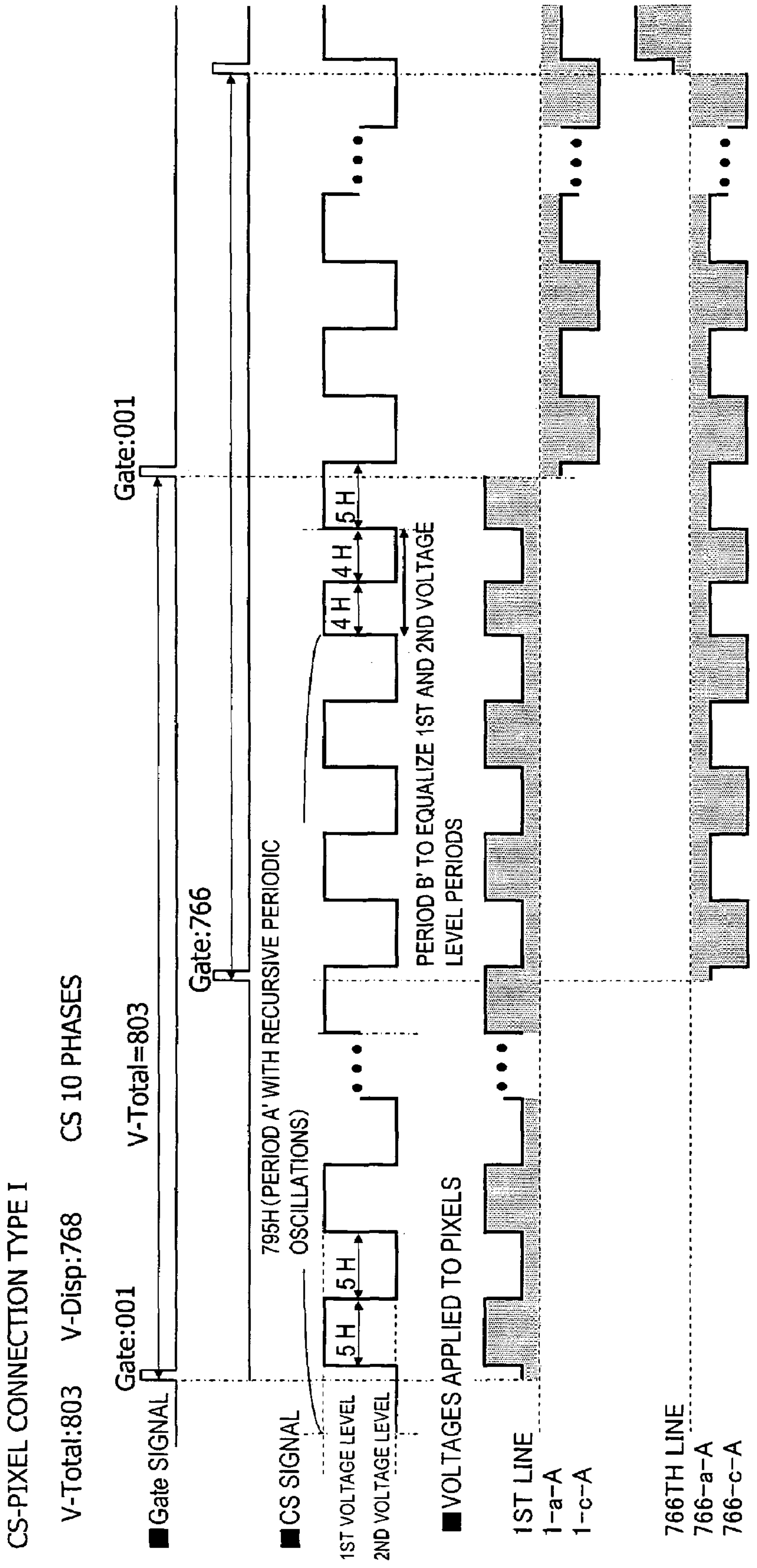

FIG. 50 shows the waveforms of a gate voltage, a CS voltage and the voltage applied to pixels to illustrate how to drive a Type I liquid crystal display device according to a seventh preferred embodiment of the present invention.

Figure 51:
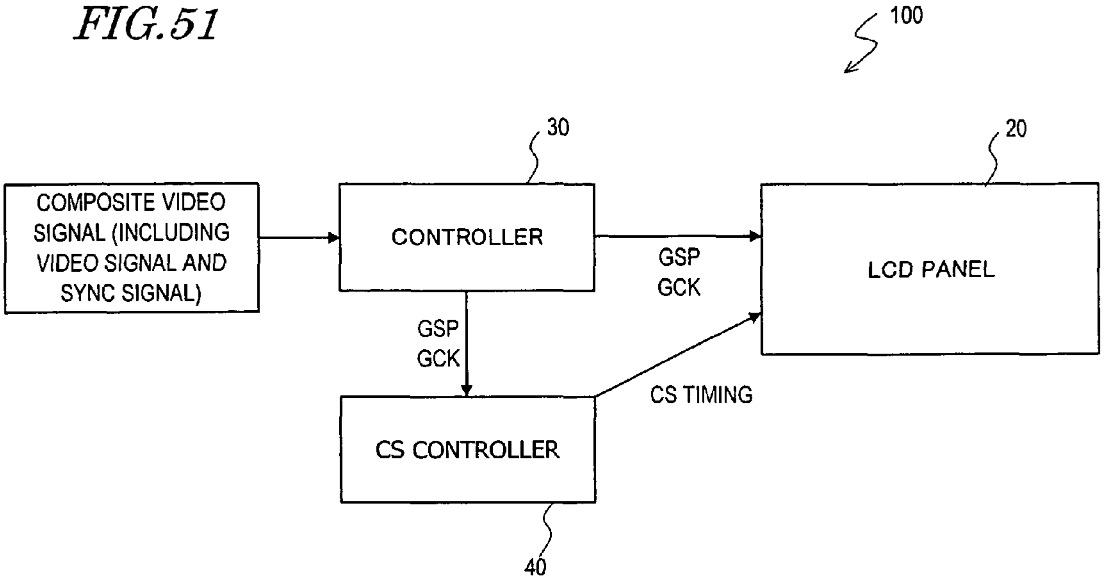

FIG. 51 schematically shows the configuration of a CS voltage generator for the liquid crystal display device 100 of the seventh preferred embodiment of the present invention.

Figure 52:
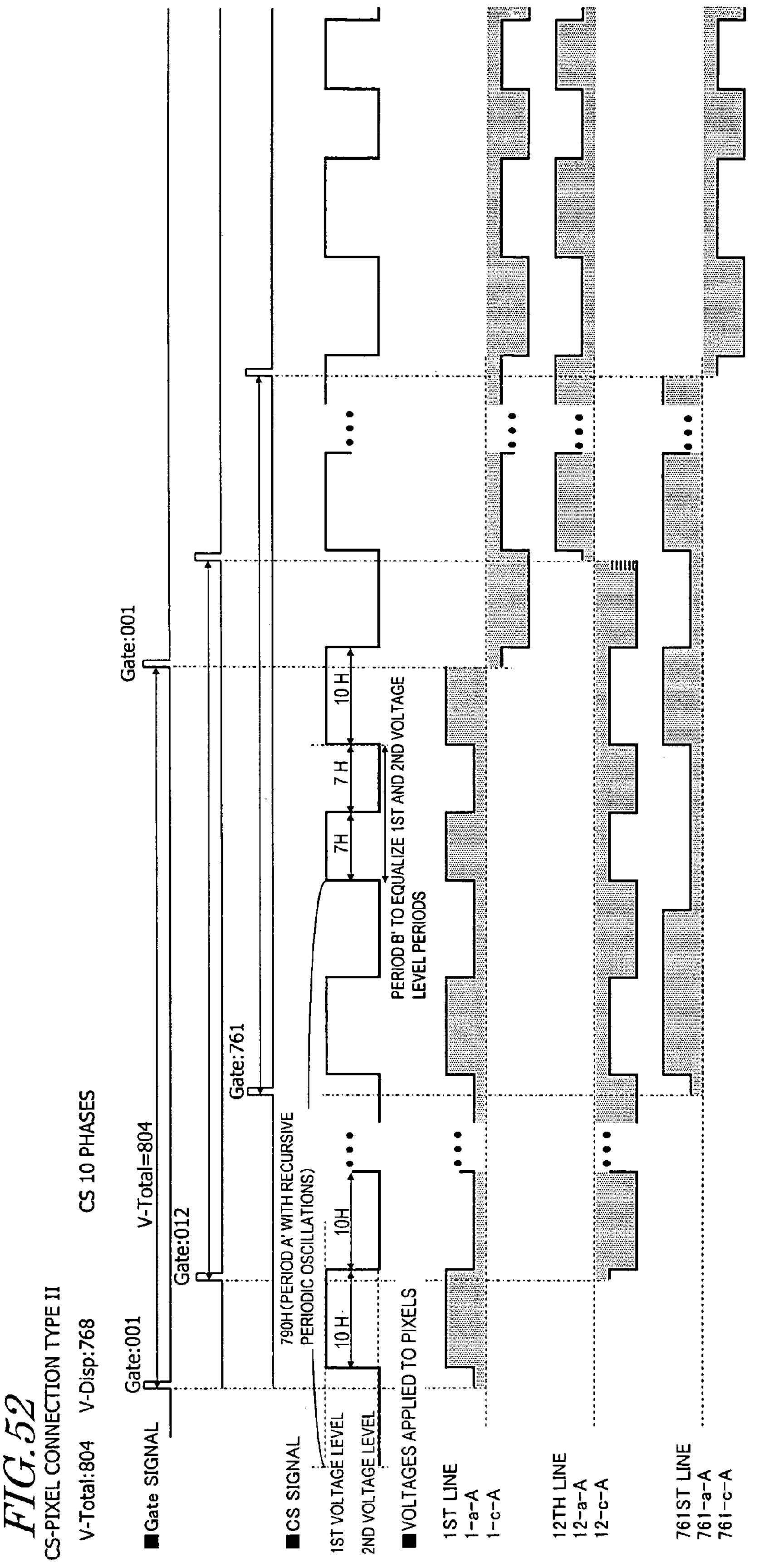

FIG. 52 shows the waveforms of a gate voltage, a CS voltage and the voltage applied to pixels to illustrate how to drive a Type II liquid crystal display device according to an eighth preferred embodiment of the present invention.

Figure 53:
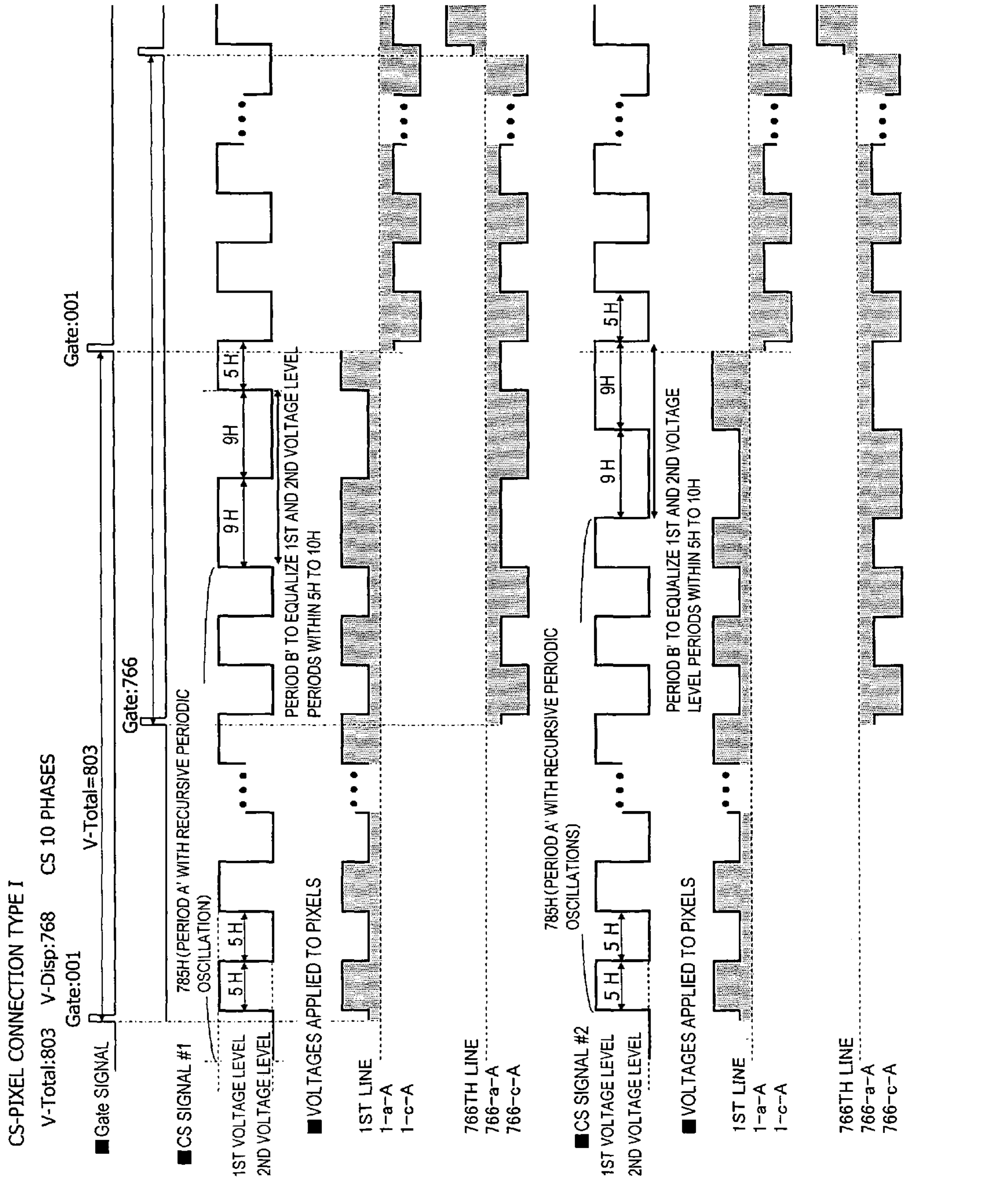

FIG. 53 shows the waveforms of a gate voltage, a CS voltage and the voltage applied to pixels to illustrate how to drive a Type I liquid crystal display device according to a ninth preferred embodiment of the present invention.

FIG. 54 shows the waveforms of a gate voltage, a CS voltage and the voltage applied to pixels to illustrate how to drive a Type II liquid crystal display device according to a tenth preferred embodiment of the present invention.

Figure 55:
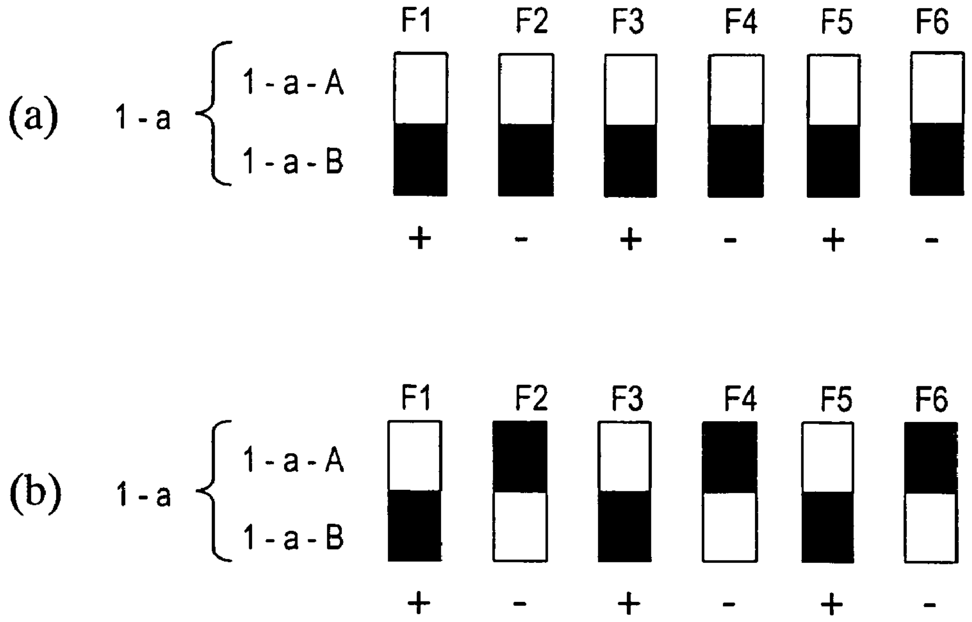

FIG. 55(*a*) illustrates a sequence for a driving method in which the same luminance ranking is maintained between subpixels, and FIG. 55(*b*) illustrates a sequence for a driving method in which the luminance ranking between the subpixels is reversed at regular intervals.

Figure 56:
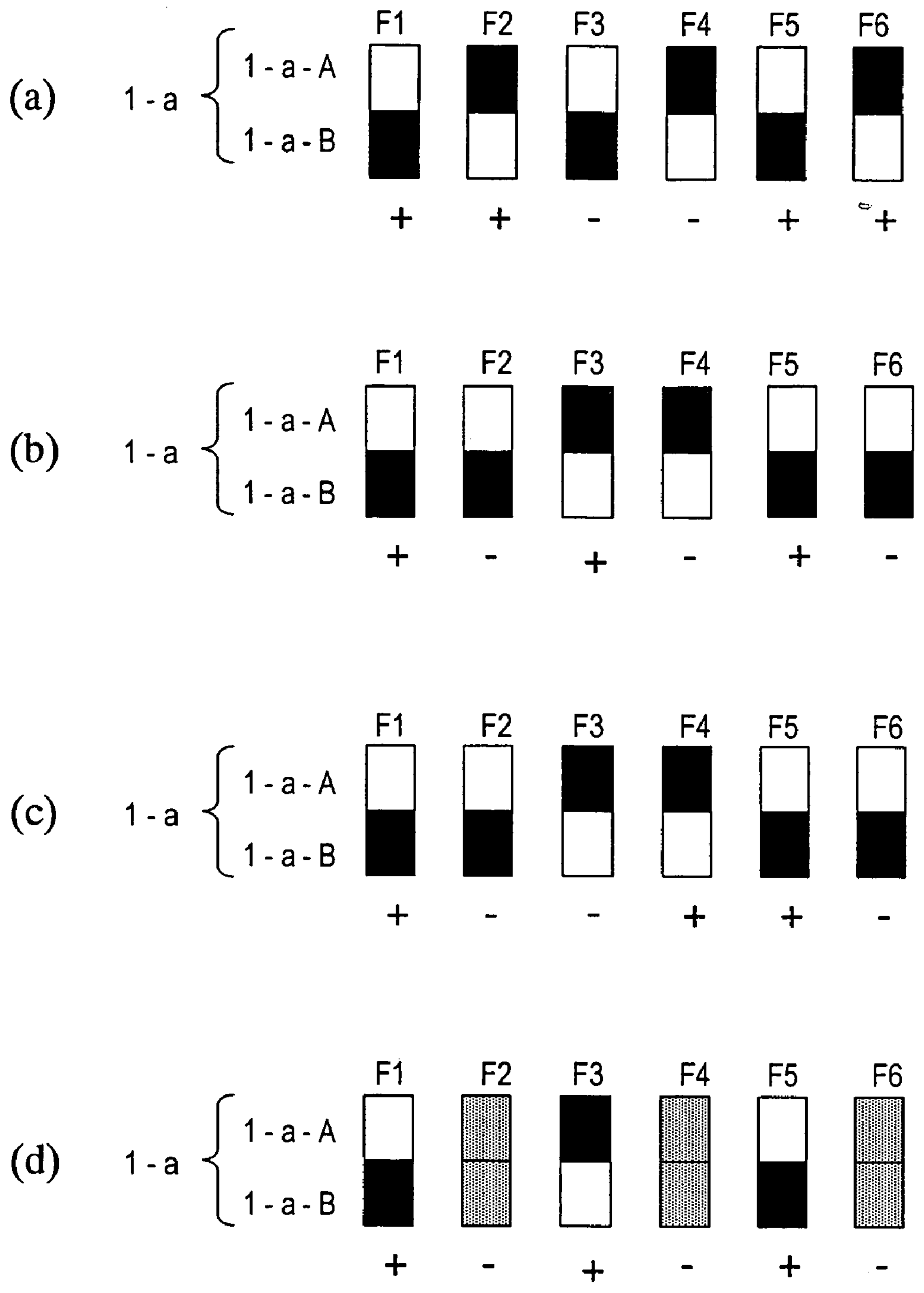

FIGS. 56(*a*) through 56(*d*) illustrate various sequences for a driving method according to the present invention in which the luminance ranking between subpixels is reversed.

Figure 57:
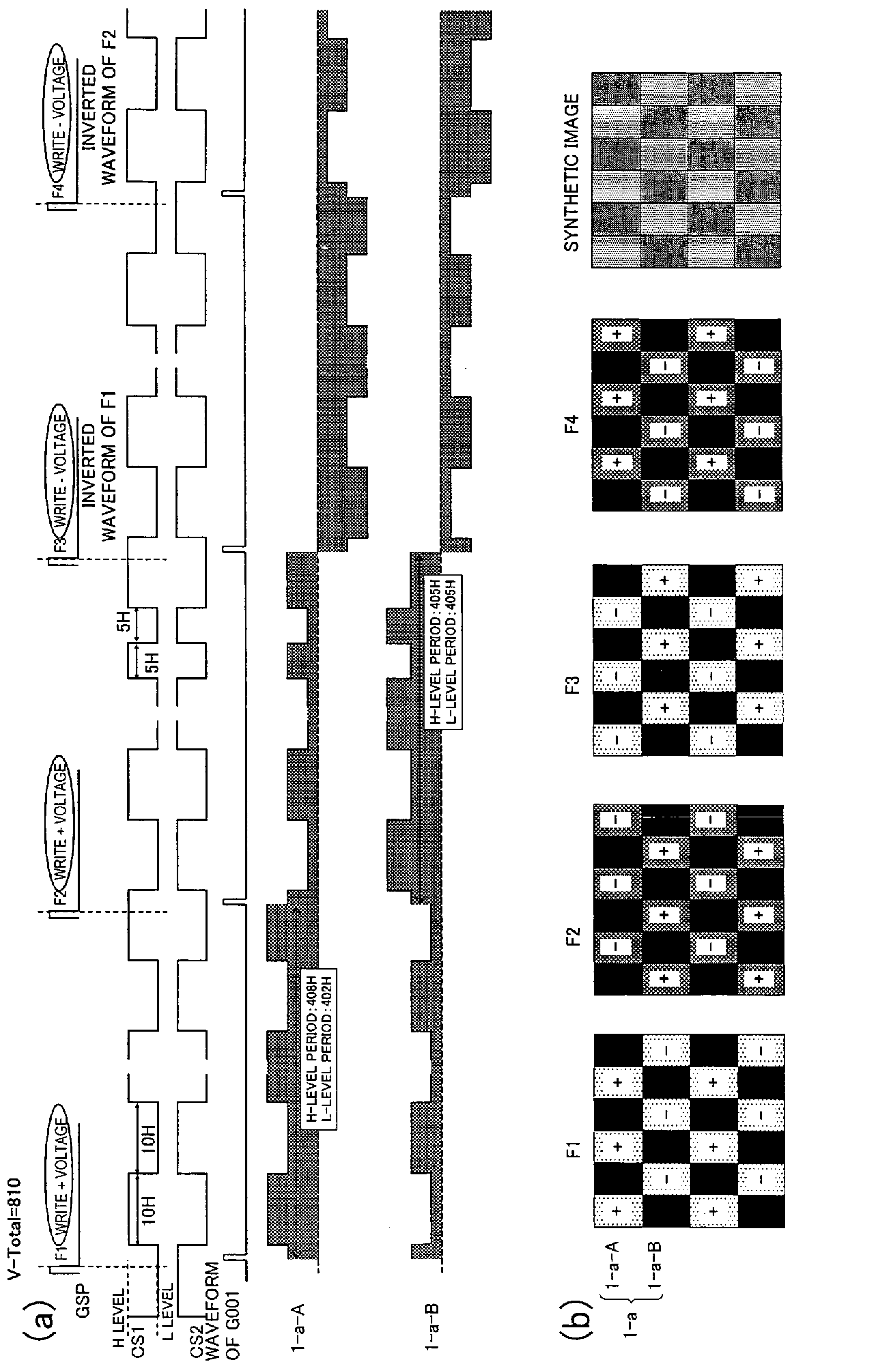

FIGS. 57(*a*) and 57(*b*) show what problems will arise if the sequence shown in FIG. 56(*a*) is applied to the liquid crystal display device with the Type II-1 pixel division structure shown in FIG. 32(*a*), wherein FIG. 57(*a*) shows the waveforms of a gate voltage, CS voltages and voltages applied to the pixel, while FIG. 57(*b*) schematically illustrates display states.

Figure 58:
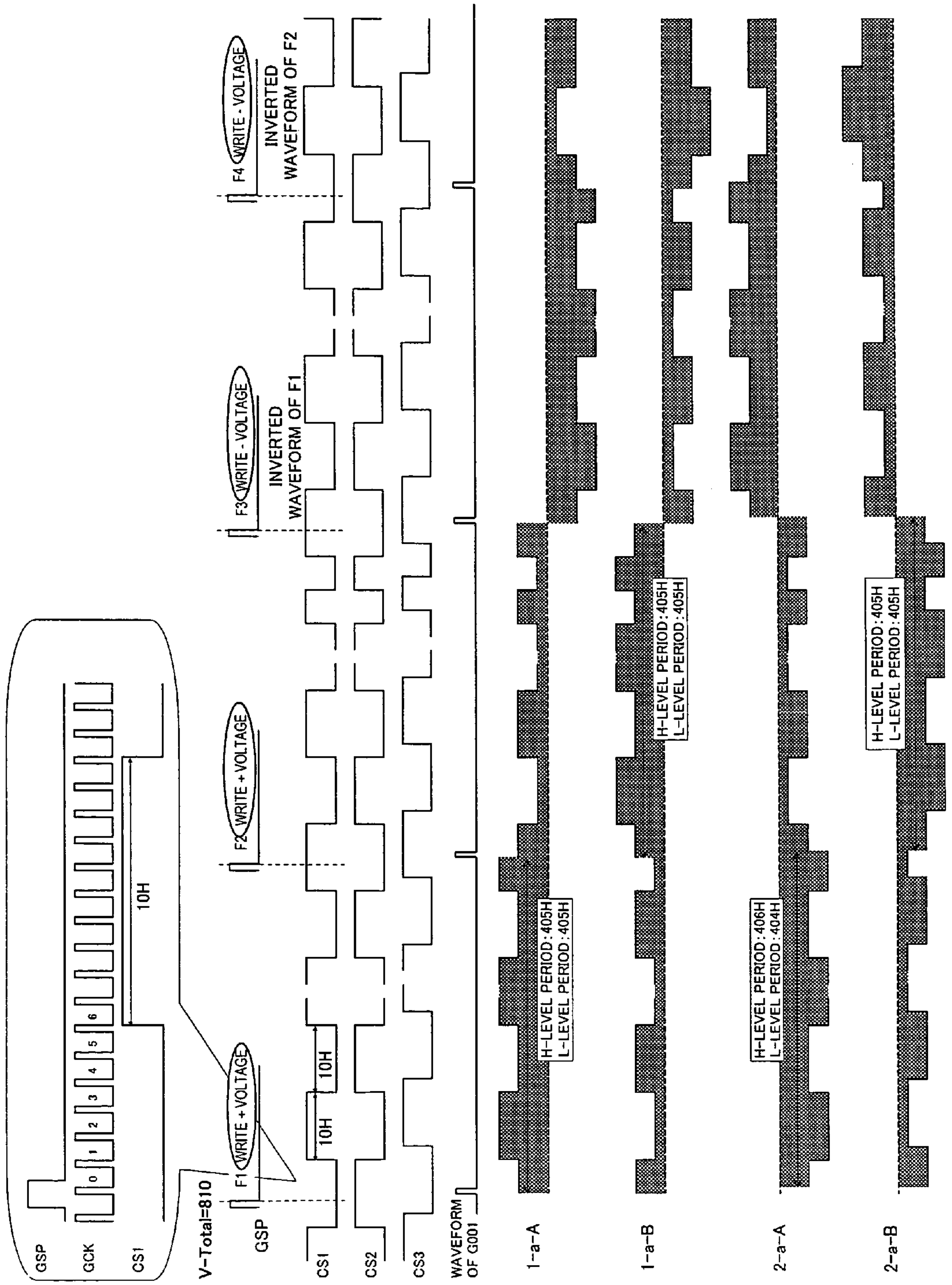

FIG. 58 shows the waveforms of the gate voltage, CS voltages and voltages applied to the pixel in four frames F1 through F4 in a liquid crystal display device according to an eleventh preferred embodiment.

Figure 59:
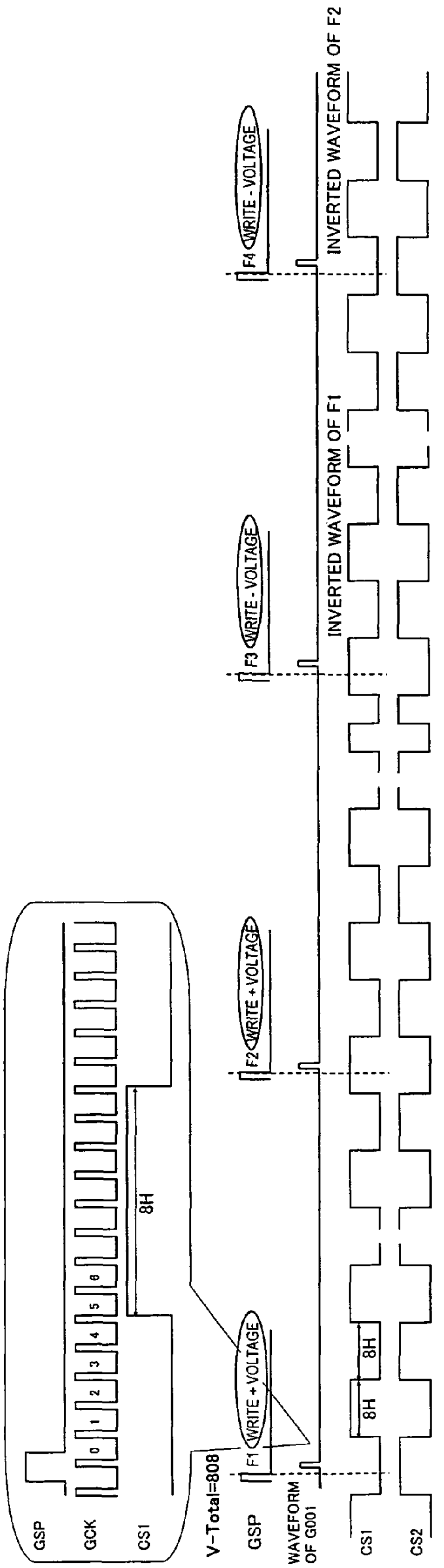

FIG. 59 shows the waveforms of the gate voltage, CS voltages and voltages applied to the pixel in the four frames F1 through F4 in another liquid crystal display device according to the eleventh preferred embodiment.

Figure 60:
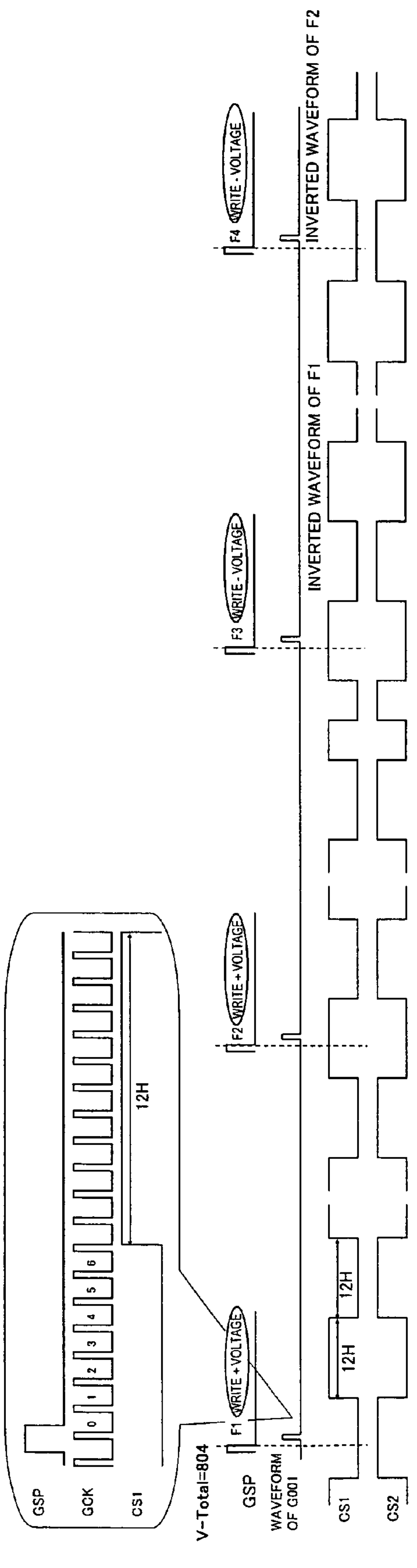

FIG. 60 shows the waveforms of the gate voltage, CS voltages and voltages applied to the pixel in the four frames F1 through F4 in another liquid crystal display device according to the eleventh preferred embodiment.

Figure 61:
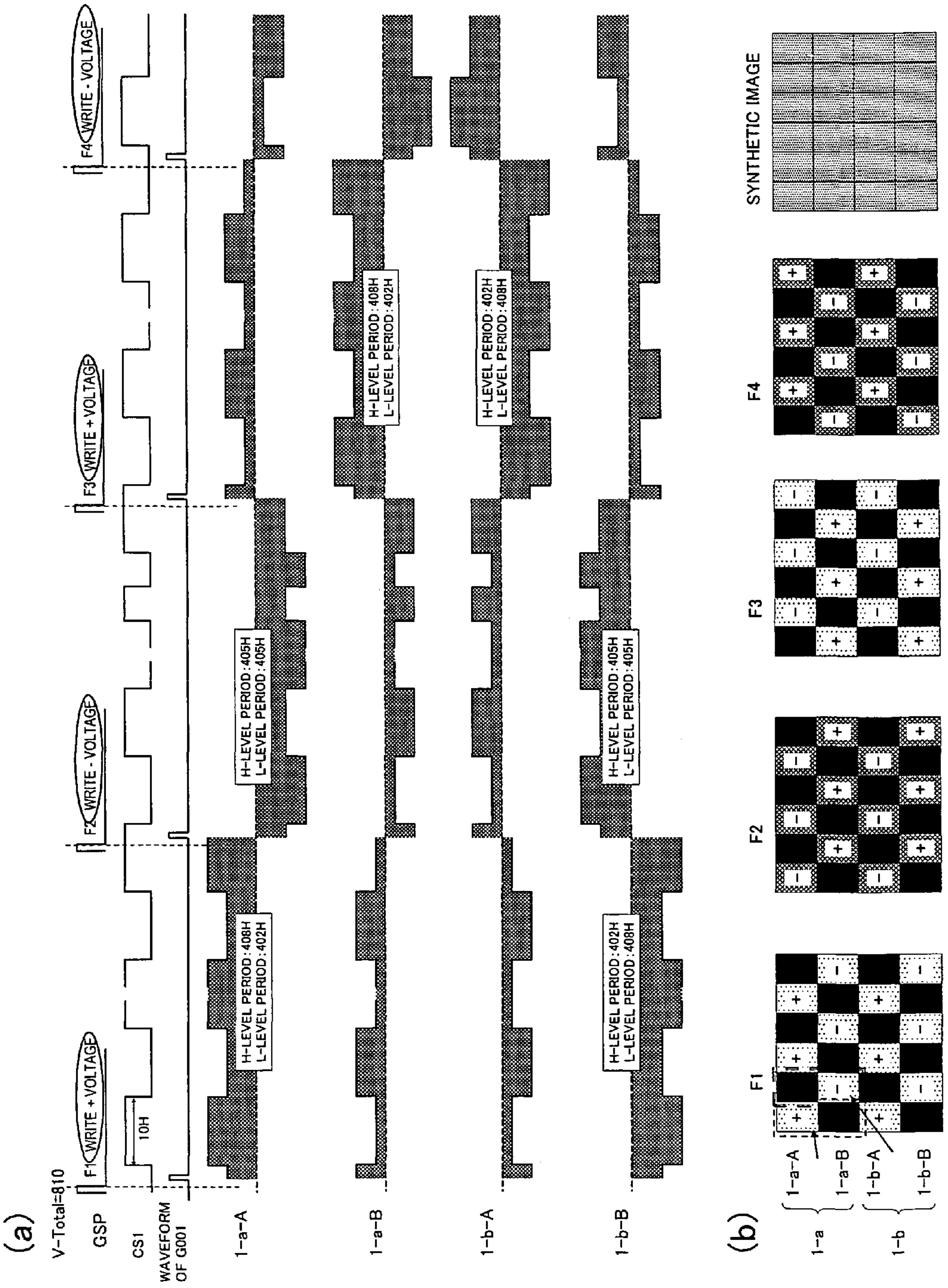

FIGS. 61(*a*) and 61(*b*) show what problems will arise if the sequence shown in FIG. 56(*b*) is applied to the liquid crystal display device with the Type II-1 pixel division structure shown in FIG. 32(*a*), wherein FIG. 61(*a*) shows the waveforms of a gate voltage, CS voltages and voltages applied to the pixel, while FIG. 61(*b*) schematically illustrates display states.

Figure 62:
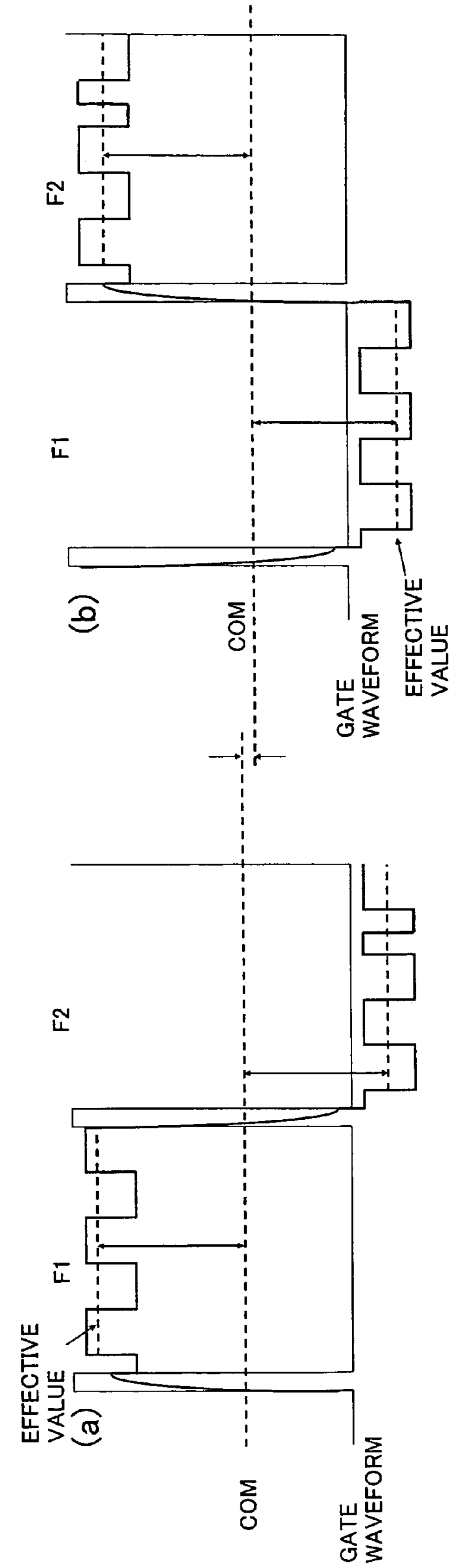

FIGS. 62(*a*) and 62(*b*) show what problems will arise if the voltage waveforms shown in FIG. 61(*a*) are used. Specifically, FIGS. 62(*a*) and 62(*b*) show the effective values of the voltage applied to the liquid crystal layer of the subpixel 1-*a*-A in the first and second frames F1 and F2 and those of the voltage applied to the liquid crystal layer of the subpixel 1-*b*-B in the first and second frames F1 and F2, respectively.

Figure 63:
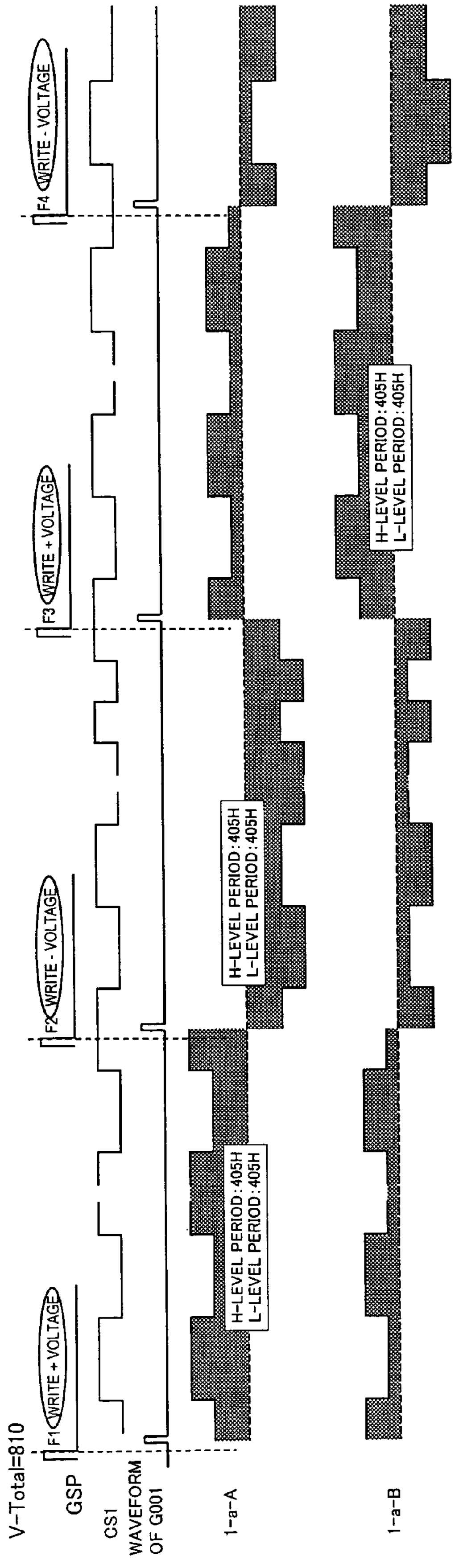

FIG. 63 shows the waveforms of the gate voltage, CS voltage and voltages applied to the pixel in four frames F1 through F4 in a liquid crystal display device according to a twelfth preferred embodiment.

Figure 64:
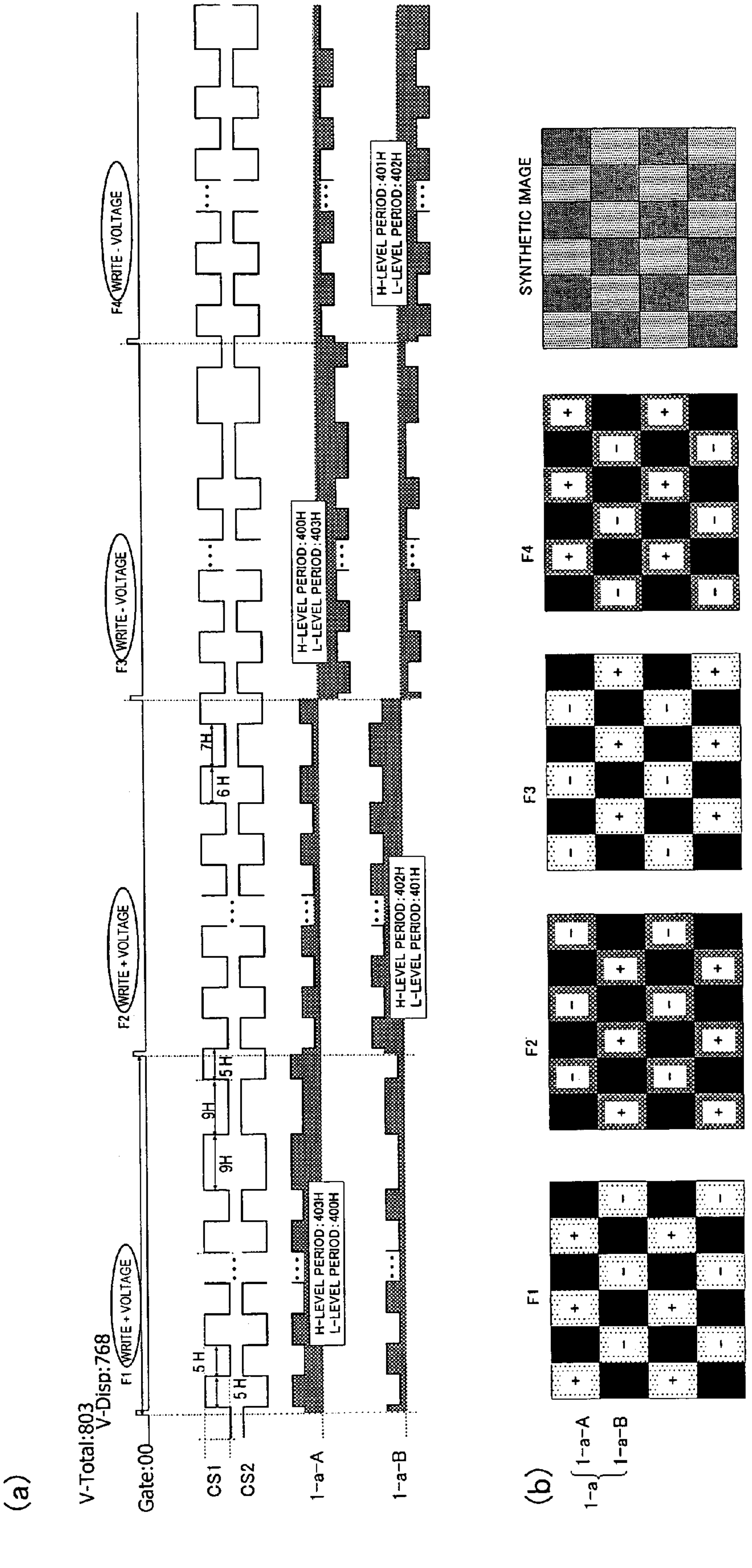

FIGS. 64(*a*) and 64(*b*) show what problems will arise if the sequence shown in FIG. 56(*a*) is applied to the liquid crystal display device with the Type I-1 pixel division structure shown in FIG. 31(*a*), wherein FIG. 64(*a*) shows the waveforms of a gate voltage, CS voltages and voltages applied to the pixel, while FIG. 64(*b*) schematically illustrates display states.

Figure 65:
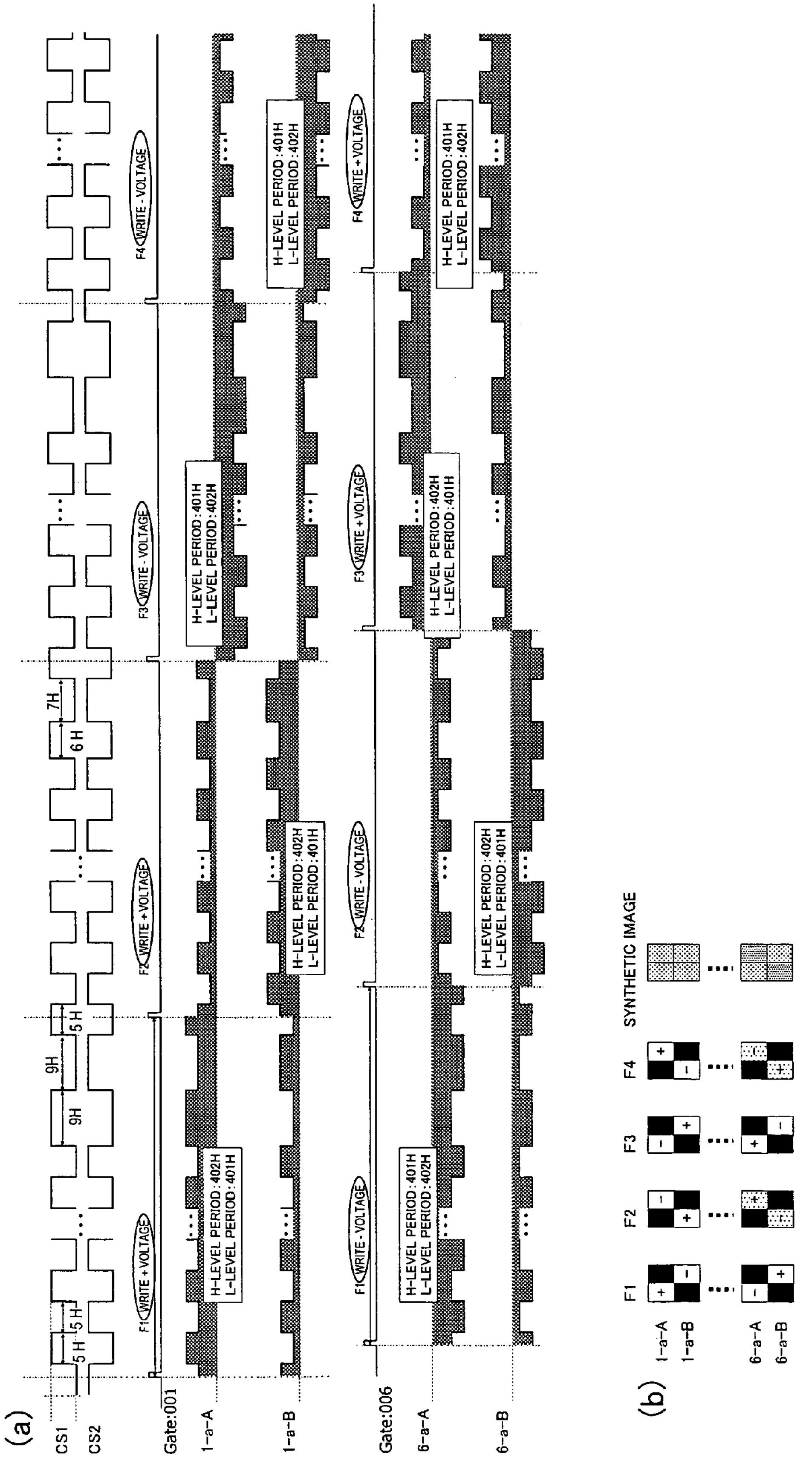

FIG. 65(*a*) shows the waveforms of the gate voltage, CS voltages (with ten phases) and voltages applied to the pixel in the four frames F1 through F4 (with a V-Total of 803H) in the liquid crystal display device of the thirteenth preferred embodiment in a situation where the interval between the fall of the gate voltage on G001 to low level and the first change of the CS voltage levels is defined to be longer than 0H but shorter than 1H. And FIG. 65(*b*) schematically illustrates the display states and the synthetic images in the respective frames.

Figure 66:
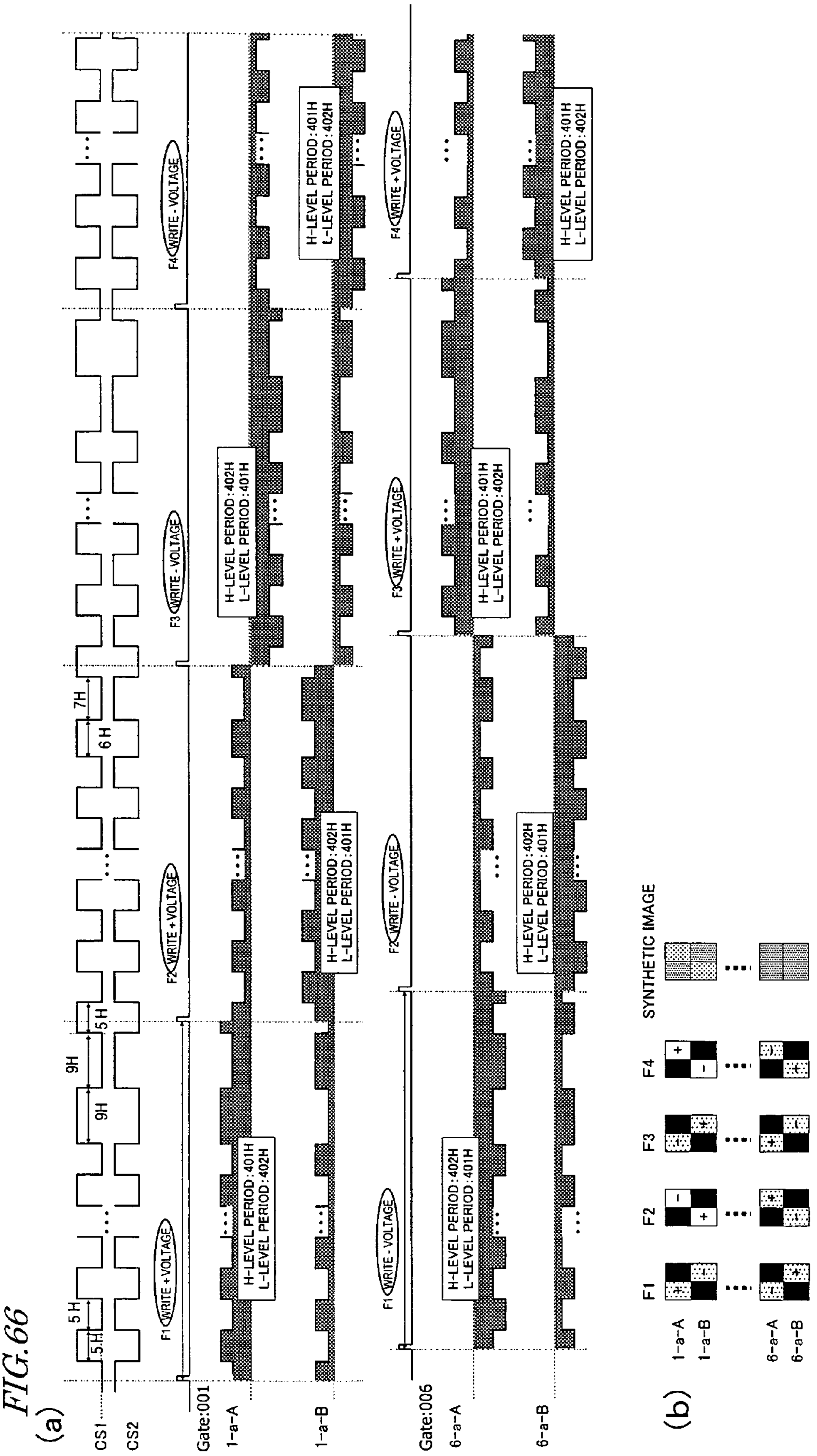

FIG. 66(*a*) shows the waveforms of the gate voltage, CS voltages and voltages applied to the pixel in the four frames in the liquid crystal display device of the thirteenth preferred embodiment just like FIG. 65(*a*) except that the interval between the fall of the gate voltage on G001 to low level and the first change of the CS voltage levels is defined to be longer than 2H but shorter than 3H and the interval between the rise of the gate voltage to high level and the first change of the CS voltage levels is defined to be 3H. And FIG. 66(*b*) schematically illustrates the display states and the synthetic images in the respective frames.

Figure 67:
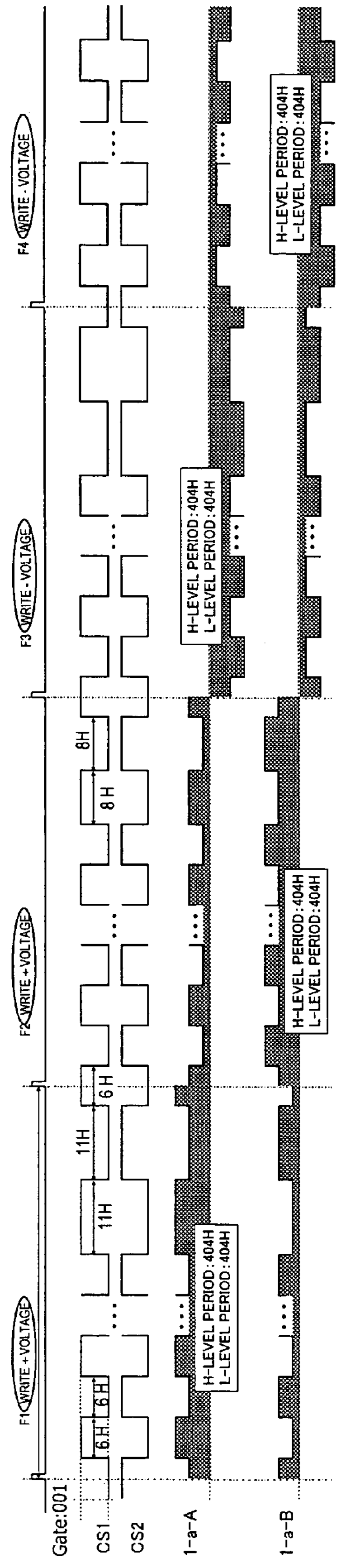

FIG. 67 shows the waveforms of the gate voltage, CS voltages (with twelve phases) and voltages applied to the pixel in the four frames (with a V-Total of 808H) in the liquid crystal display device of the thirteenth preferred embodiment in a situation where the interval between the fall of the gate voltage on G001 to low level and the first change of the CS voltage levels is defined to be longer than 2H but shorter than 3H.

Figure 68:
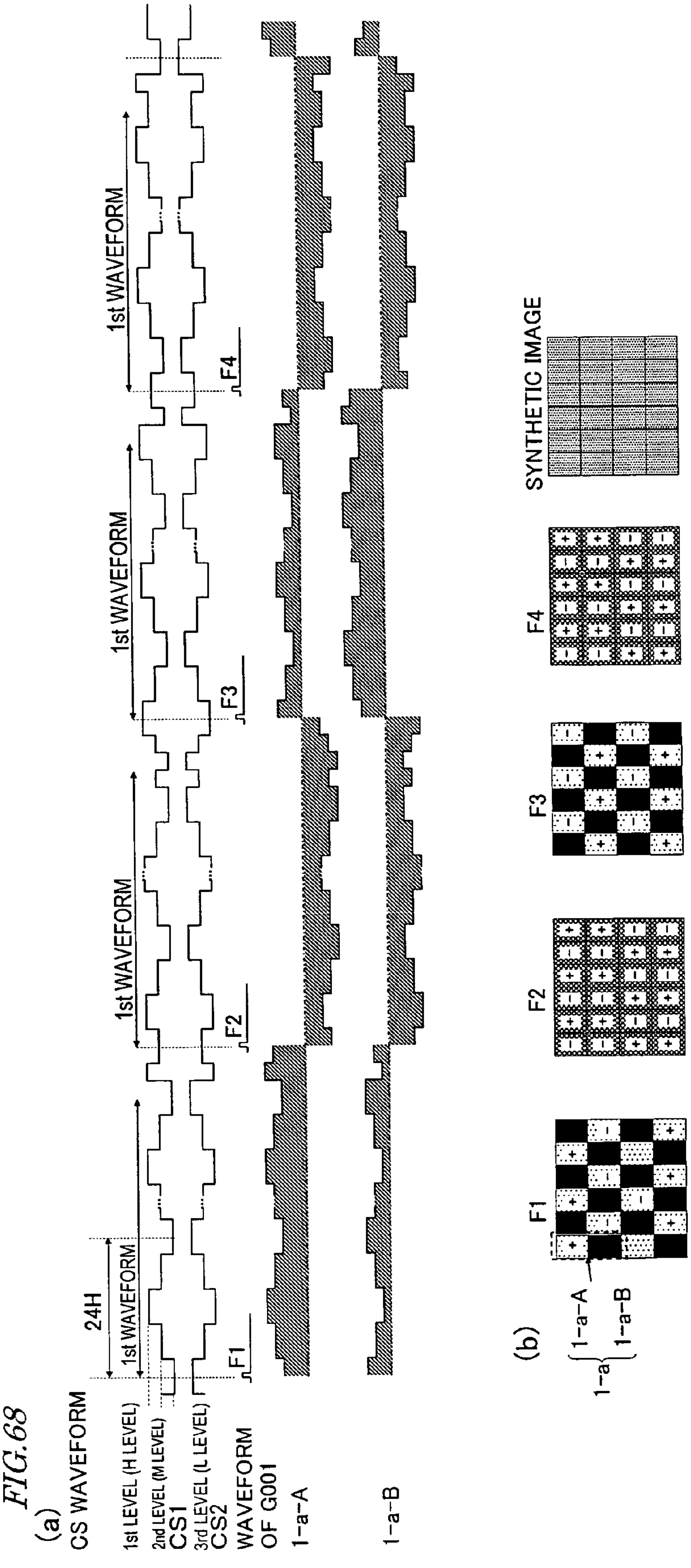

FIG. 68(*a*) shows the waveforms of the gate voltage, CS voltages (with twelve phases) and voltages applied to the pixel in the four frames (with a V-Total of 801H) in a liquid crystal display device according to a fourteenth preferred embodiment. And FIG. 68(*b*) schematically illustrates the display states and the synthetic images in the respective frames.

Figure 69:
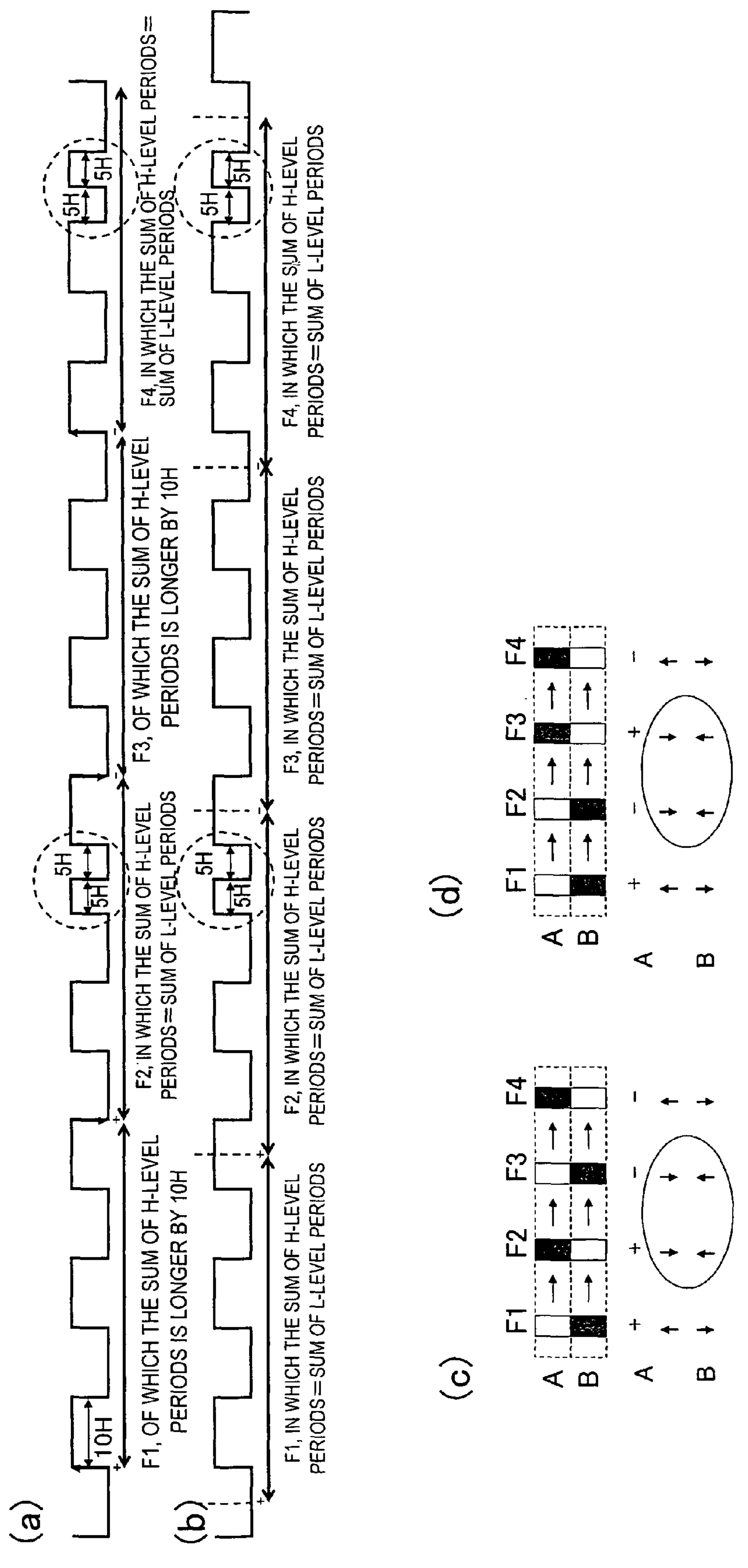

FIGS. 69(*a*) through 69(*d*) simply illustrate the basic technical concept of the eleventh through fourteenth preferred embodiments, wherein FIG. 69(*a*) schematically illustrates a reference example in which the CS voltage changes its level for the first time just after the gate voltage has gone low; FIG. 69(*b*) illustrates a situation where the interval between the fall of the gate voltage to the low level and the first change of the CS voltage levels is longer than one fourth minus one, but shorter than one fourth, of one cycle of oscillation $P_A$ of the first waveform of the CS voltage and the interval between the rise of the gate voltage to the high level and the first change of the CS voltage levels is one fourth as long as one cycle of oscillation $P_A$ of the first waveform of the CS voltage; and FIGS. 69(*c*) and 69(*d*) show the drive polarities to realize the sequences shown in FIGS. 56(*a*) and 56(*b*), respectively, and the first change of the CS voltage levels in each of the subpixels A and B after the gate voltage has gone low in the respective frames F1 through F4.

FIGS. 70(*a*) and 70(*b*) show what requirement should be satisfied by the interval between the fall of the gate voltage and the first change of the CS voltage levels in the eleventh through fourteenth preferred embodiments.

Figure 71:
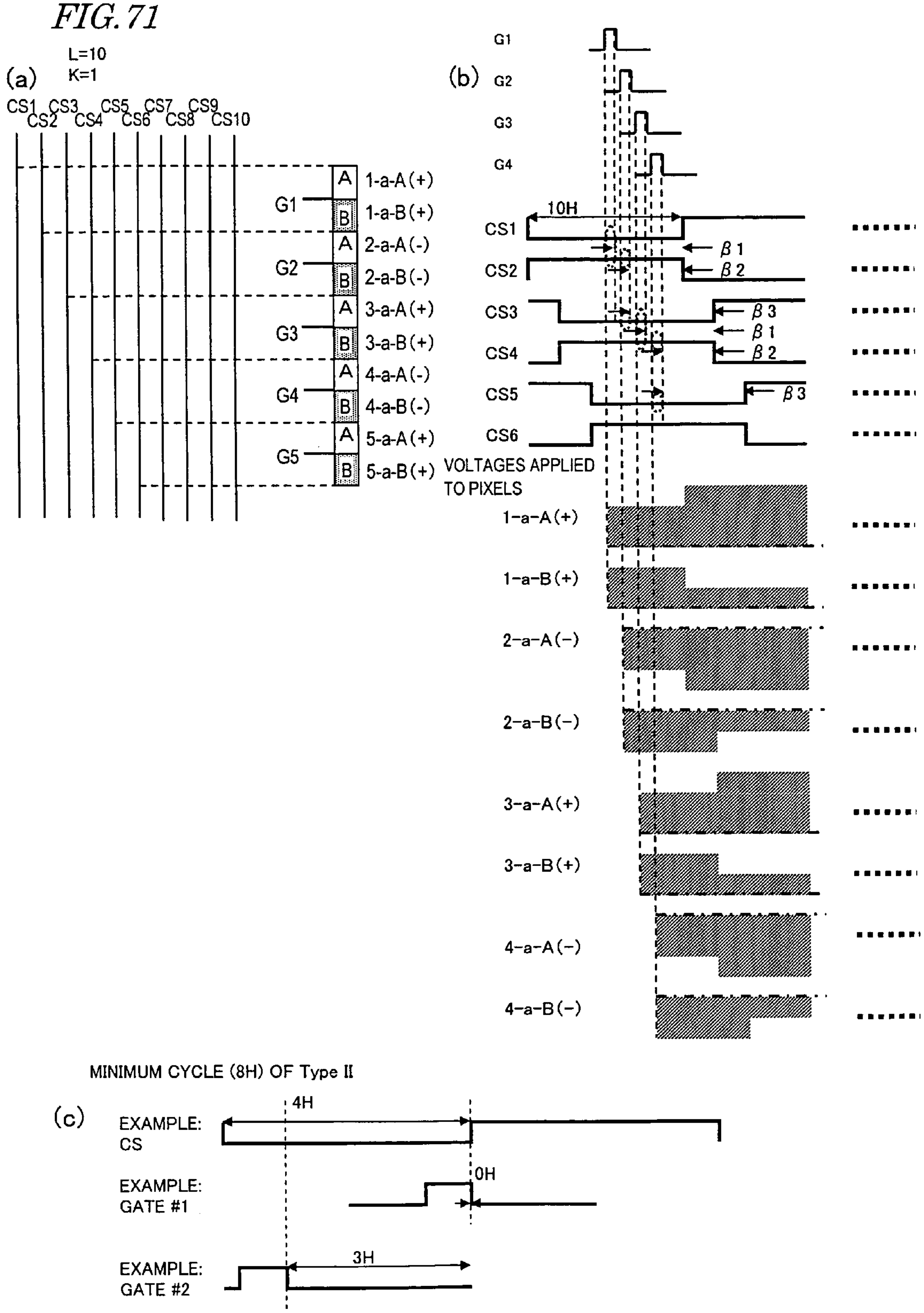

FIG. 71(*a*) schematically illustrates the connection structure between the Type II-1 pixel division structure and CS bus lines. FIG. 71(*b*) shows the waveforms of gate voltages, CS voltages and voltages applied to pixels to indicate how long the interval βH between the fall of each gate voltage and the first change of its associated CS signal levels (i.e., rise from L level to H level in the example shown in FIG. 71(*b*)) is. And FIG. 71(*c*) shows the relation between a CS voltage, of which $P_A$ is 8H, and two gate voltages (Gate 1 and Gate 2).

Figure 72:
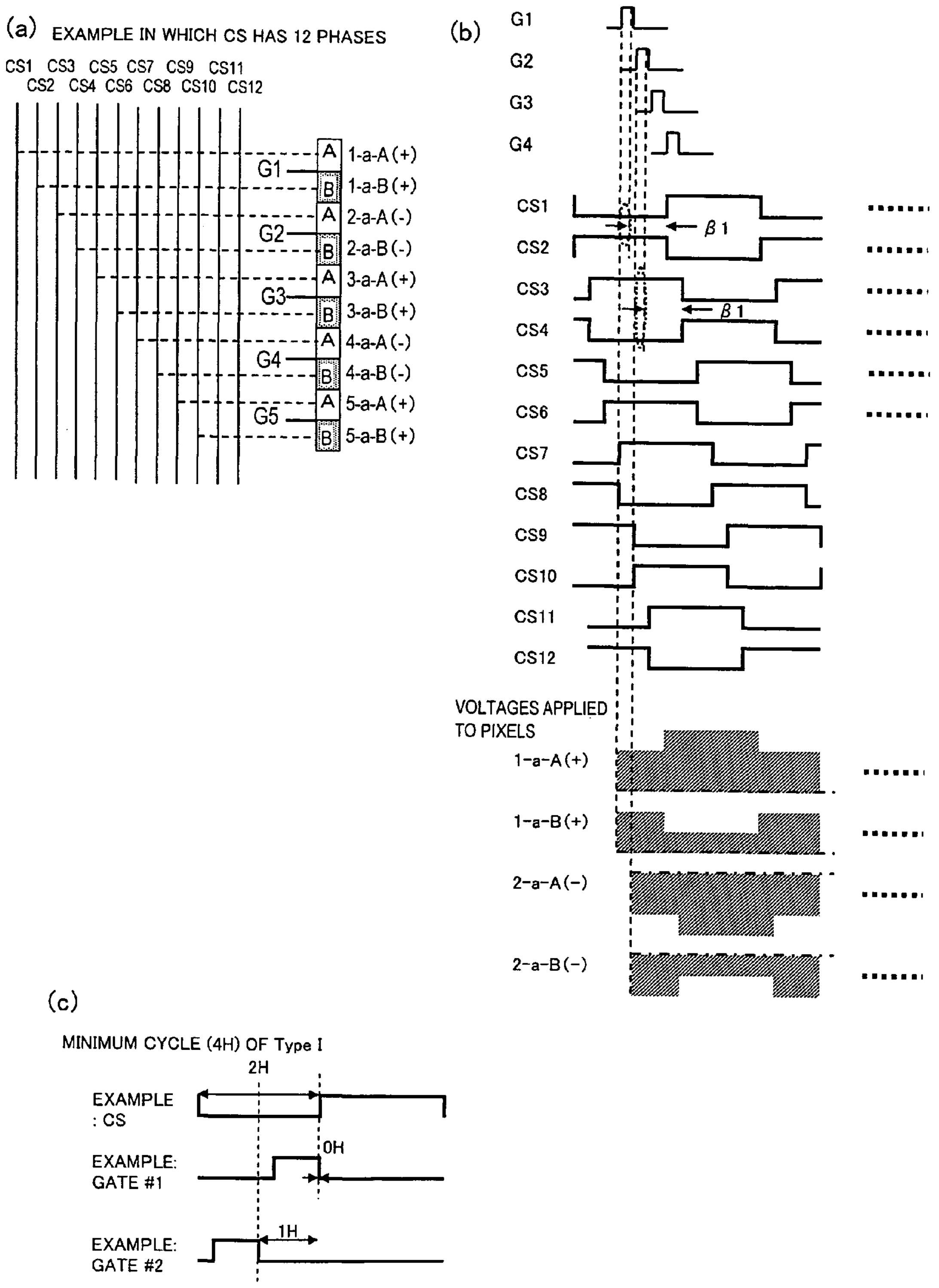

FIG. 72(*a*) schematically illustrates the connection structure between the Type I-1 pixel division structure and CS bus lines. FIG. 72(*b*) shows the waveforms of gate voltages, CS voltages and voltages applied to pixels to indicate how long the interval βH between the fall of each gate voltage and the first change of its associated CS signal levels (i.e., rise from L level to H level in the example shown in FIG. 72(*b*)) is. And FIG. 72(*c*) shows the relation between a CS voltage, of which $P_A$ is 4H, and two gate voltages (Gate 1 and Gate 2).

Figure 73:
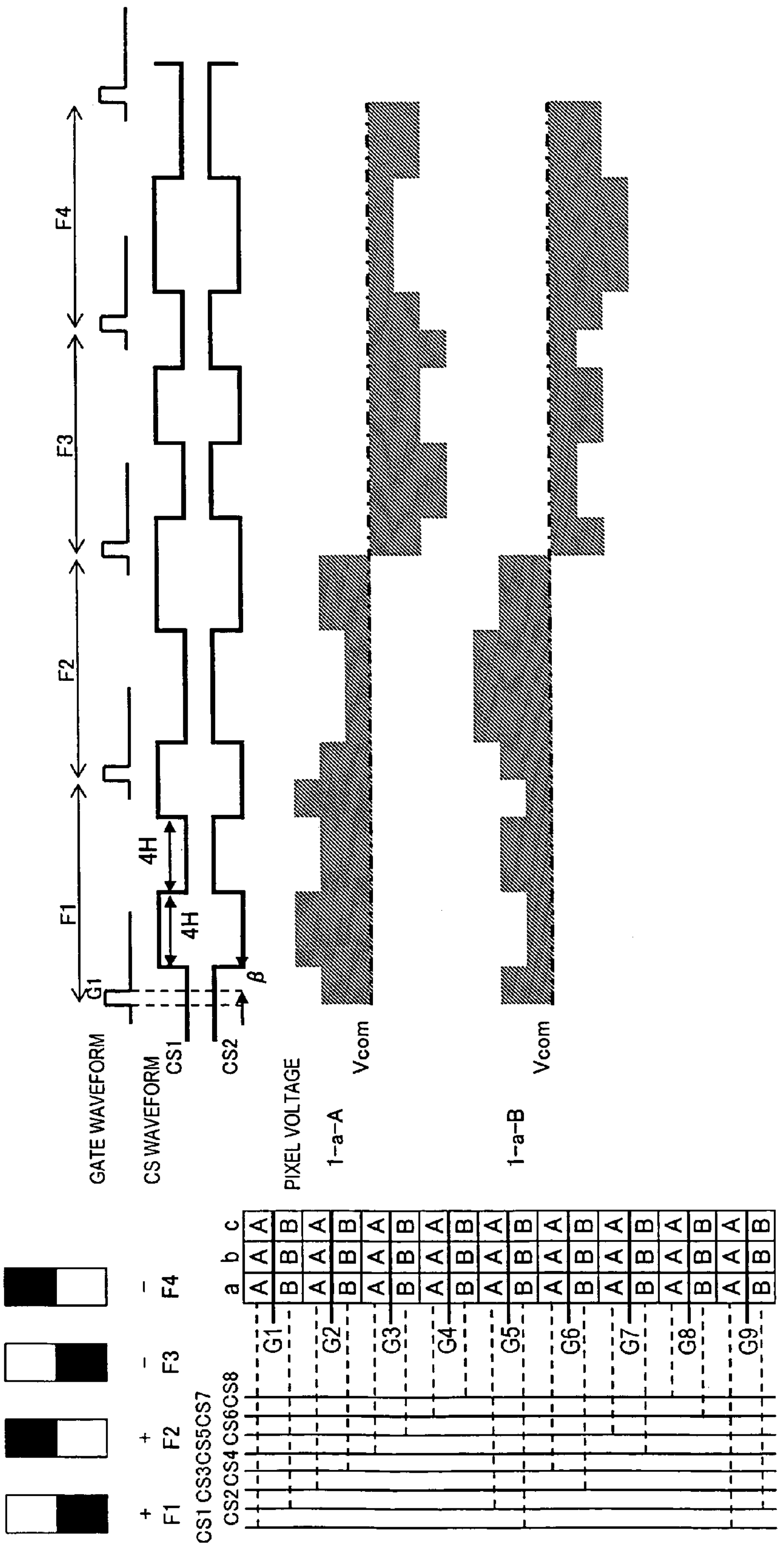

FIG. 73 shows what relation K and β should satisfy in the Type I arrangement in a situation where the number L of CS trunks is eight and K=1.

Figure 74:
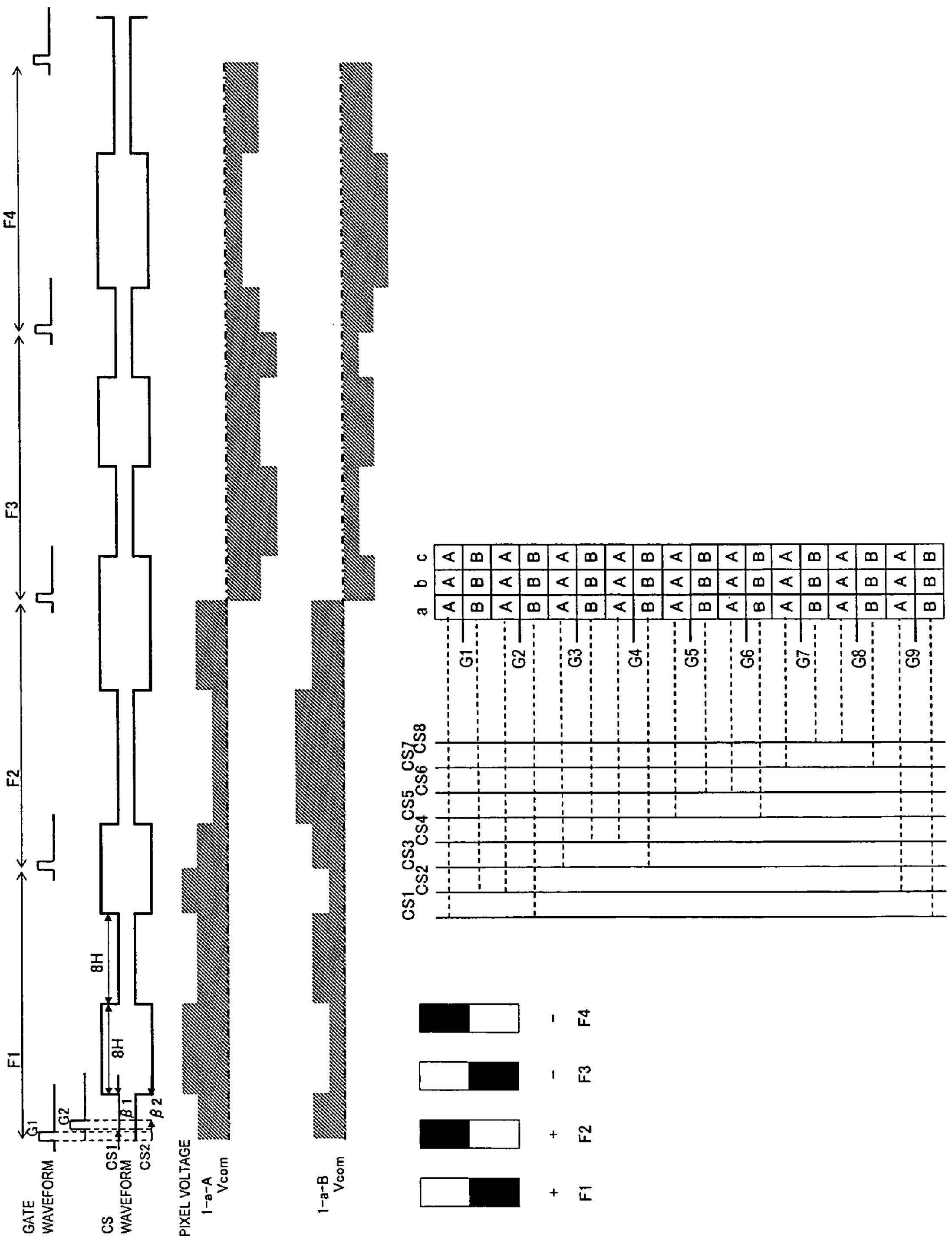

FIG. 74 shows what relation K and β should satisfy in the Type I arrangement in a situation where the number L of CS trunks is eight and K=2.

Figure 75:
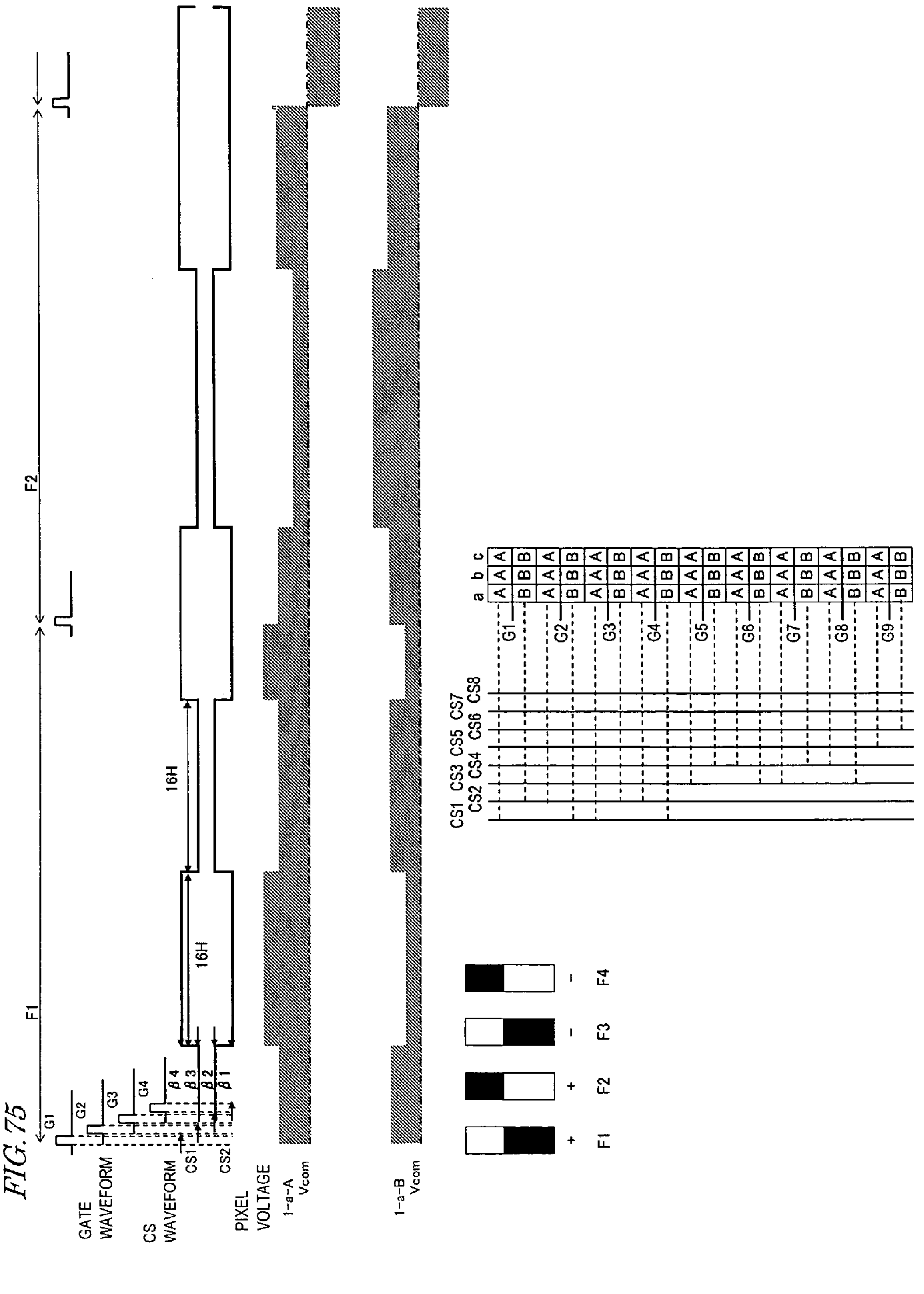

FIG. 75 shows what relation K and β should satisfy in the Type I arrangement in a situation where the number L of CS trunks is eight and K=4.

Figure 76:
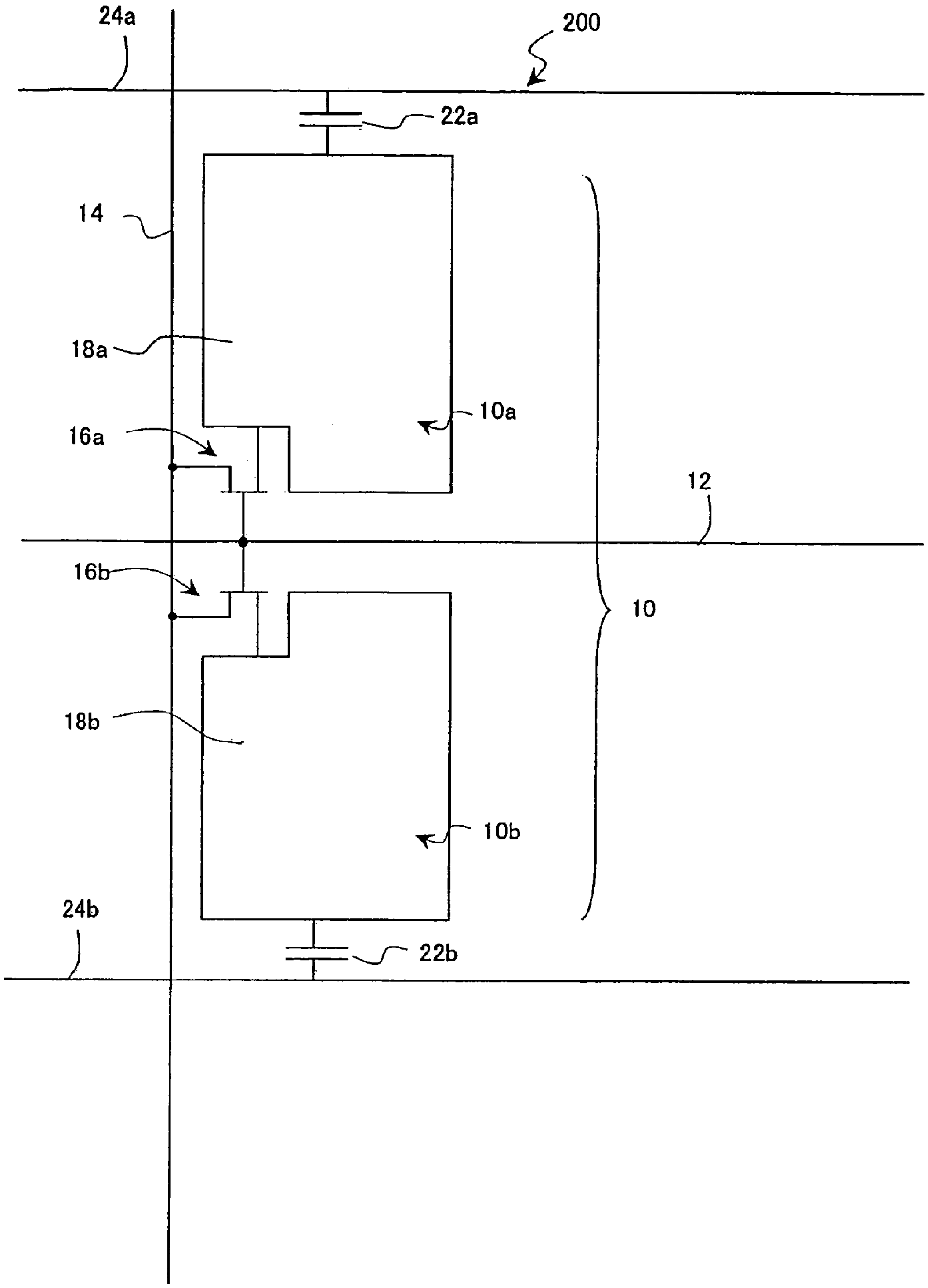

FIG. 76 schematically shows the pixel division structure of the liquid crystal display device 200 disclosed in Patent Document No. 5.

Figure 77:
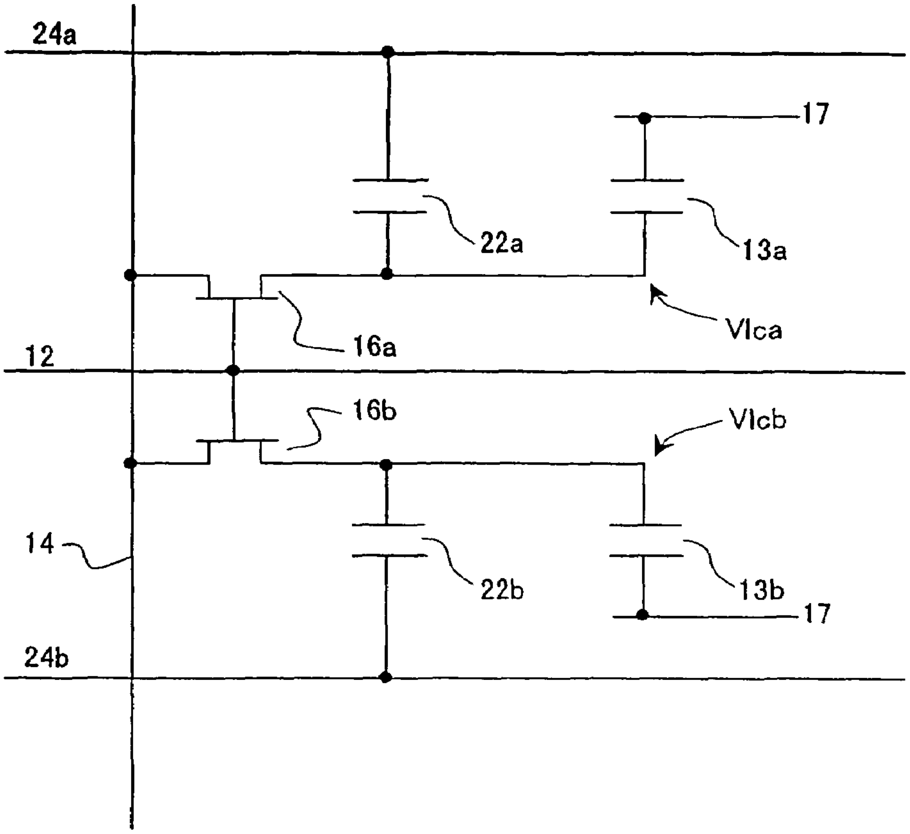

FIG. 77 shows an electrical equivalent circuit corresponding to the pixel structure of the liquid crystal display device 200.

Figure 78:
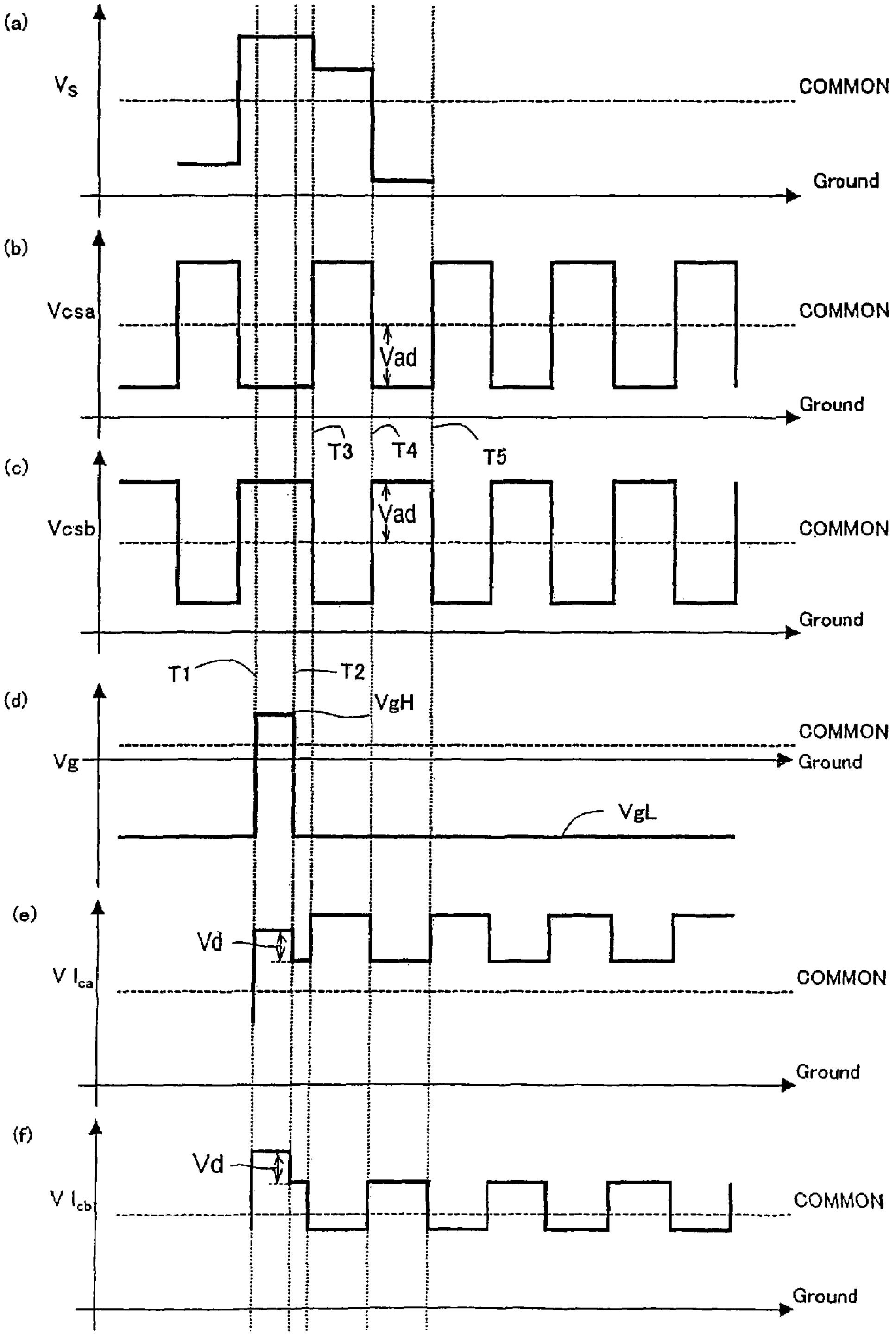

Portions (a) through (f) of FIG. 78 show the waveforms of voltages applied to drive the liquid crystal display device 200.

Figure 79:
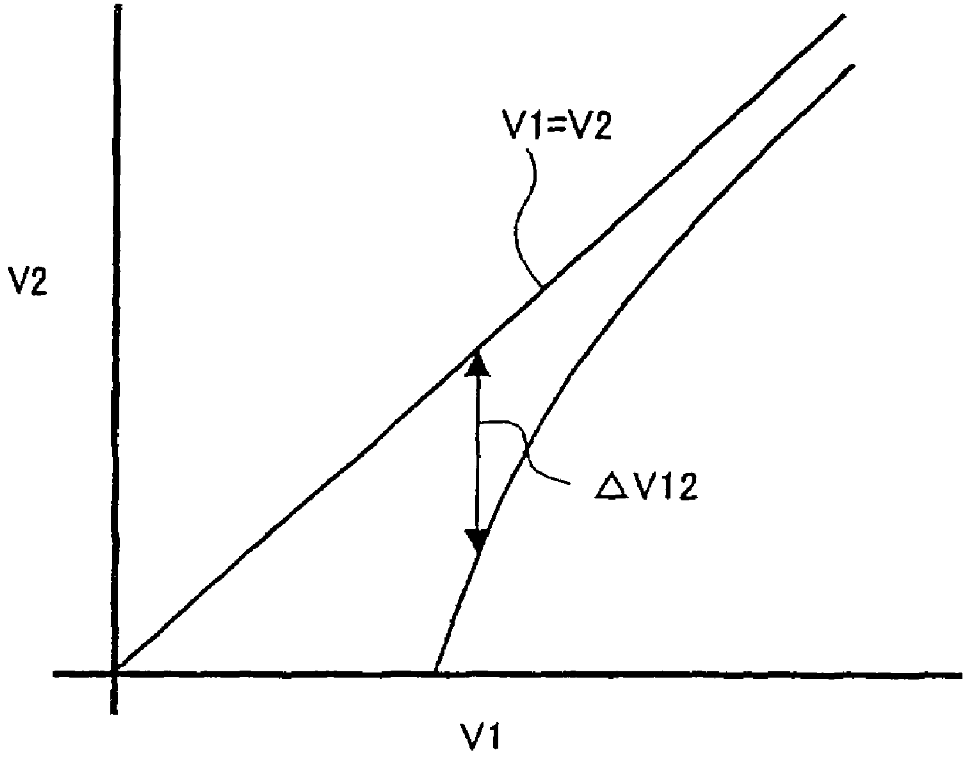

FIG. 79 shows a relation between the voltages applied to the liquid crystal layers of respective subpixels in the liquid crystal display device 200.

| DESCRIPTION OF REFERENCE NUMERALS | |
|---|---|
| 10 | pixel |
| 10a, 10b | subpixel |
| 12 | scanline (gatebus line) |
| 14a, 14b | signal line(source bus line) |
| 16a, 16b | TFT |
| 18a, 18b | subpixel electrode |
| 100, 200 | liquid crystal display device |

BEST MODE FOR CARRYING OUT THE INVENTION

Hereinafter, preferred embodiments of a liquid crystal display device and its driving method according to the present invention will be described with reference to the accompanying drawings. It should be noted that in a liquid crystal display device according to a preferred embodiment of the present invention, the structure of pixels is similar to that disclosed in Patent Document No. 5, but the connection pattern of storage capacitor lines (which are typically CS bus lines) and the waveform of a storage capacitor counter voltage (which will also be referred to herein as a "CS voltage") are different from those disclosed in that document. First of all, it will be described what problem will arise if the oscillating voltage applied to the CS bus lines (i.e., the CS voltage) has a short oscillation period.

Figure 1:
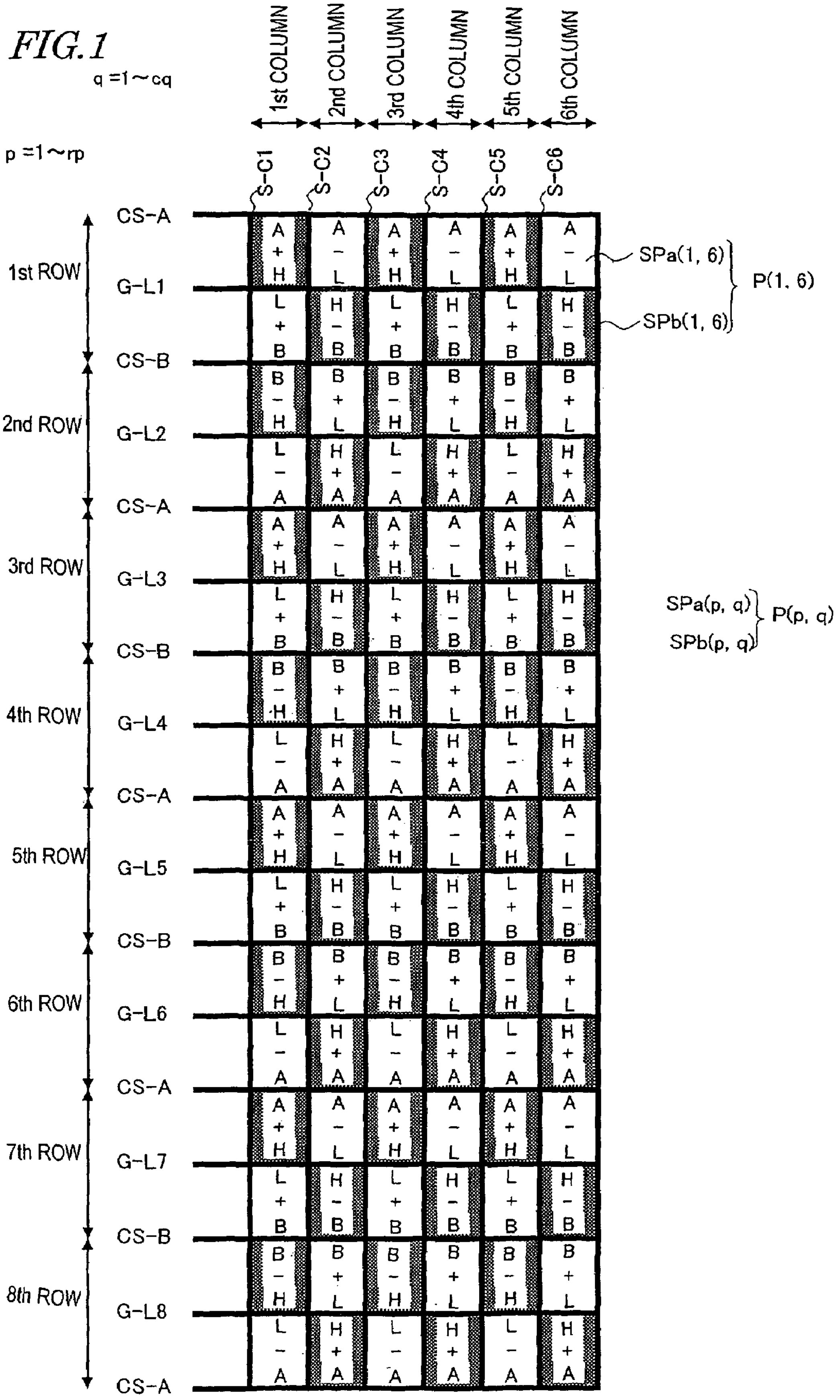
FIG. 1 schematically shows a pixel arrangement for a liquid crystal display device according to a preferred embodiment of the present invention.

In the following description, a liquid crystal display device, having such a pixel arrangement that can be used effectively in a 1H one dot inversion drive as shown in FIG. 1, will be described as an example. In the 1H one dot inversion drive, the potential levels of pixel electrodes and counter electrode are interchanged at regular intervals and the direction of the electric field applied to the liquid crystal layer (i.e., the direction of the electric lines of force) is inverted every vertical scanning period. As a result, flickering on the screen can be reduced. To minimize flickering on the screen, subpixels that have intentionally different luminances are preferably arranged such that their luminance ranking becomes as random as possible. And an arrangement in which no subpixels of the same luminance rank are adjacent to each other in the column direction or in the row direction is most preferable. In other words, it is most preferable to arrange subpixels of the same luminance rank in a checkered pattern to improve the quality of display.

As used herein, one "vertical scanning period" is defined to be an interval between a point in time when one scan line is selected to write a display signal voltage and a point in time when that scan line is selected to write the next display signal voltage. Also, each of one frame period of a non-interlaced drive input video signal and one field period of an interlaced drive input video signal will be referred to herein as "one vertical scanning period of the input video signal". Normally, one vertical scanning period of a liquid crystal display device corresponds to one vertical scanning period of the input video signal. In the example to be described below, one vertical scanning period of the liquid crystal panel is supposed to correspond to that of the input video signal for the sake of simplicity. However, the present invention is in no way limited to that specific preferred embodiment. Alternatively, the present invention is also applicable to a so-called "2× drive" with a vertical scanning frequency of 120 Hz in which two vertical scanning periods of the liquid crystal panel (that lasts 2×1/120 sec, for example) are allocated to one vertical scanning period of the input video signal (that lasts 1/60 sec, for example).

Furthermore, in each vertical scanning period, the interval between a point in time when one scan line is selected and a point in time when the next scan line is selected will be referred to herein as one horizontal scanning period (1H).

Hereinafter, a specific example of a liquid crystal display device according to the present invention will be described with reference to FIG. 1. The liquid crystal display device shown in FIG. 1 includes a plurality of pixels, which are arranged in columns (1 to cq) and rows (1 to rp) so as to form a matrix pattern (rp, cq). Each pixel P(p, q) (where 1≦p≦rp and 1≦q≦cq) has two subpixels SPa(p, q) and SPb(p, q). FIG. 1 schematically illustrates a part of the relative arrangement (8 rows×6 columns) of signal lines S-C1, S-C2, S-C3, S-C4, . . . and S-Ccq; scan lines G-L1, G-L2, G-L3, . . . and G-Lrp; storage capacitor lines CS-A and CS-B; pixels P (p, q); and subpixels SPa(p, q) and SPb (p, q) of the respective pixels.

As shown in FIG. 1, each pixel P(p, q) has subpixels SPa(p, q) and SPb(p, q) over and under its associated scan line G-Lp that extends horizontally approximately through the center of the pixel. That is to say, the subpixels SPa(p, q) and SPb(p, q) of each pixel are arranged in the column direction. In each of the subpixels SPa(p, q) and SPb(p, q), one of the two storage capacitor electrodes (not shown) thereof is connected to an adjacent storage capacitor line CS-A or CS-B. Also, a signal line S-Cq to supply a signal voltage (which will also be referred to herein as a "display signal voltage" or a "data signal voltage"), representing an image to be presented, to the pixels P(p, q) runs vertically (in the column direction) between those pixels to supply the signal voltage to the TFTs (not shown) of the subpixels (or pixels) on the right-hand side of that signal line. In the arrangement shown in FIG. 1, one storage capacitor line and one scan line are shared by two subpixels, thus achieving the effect of increasing the aperture ratio of the pixels.

Figure 2:
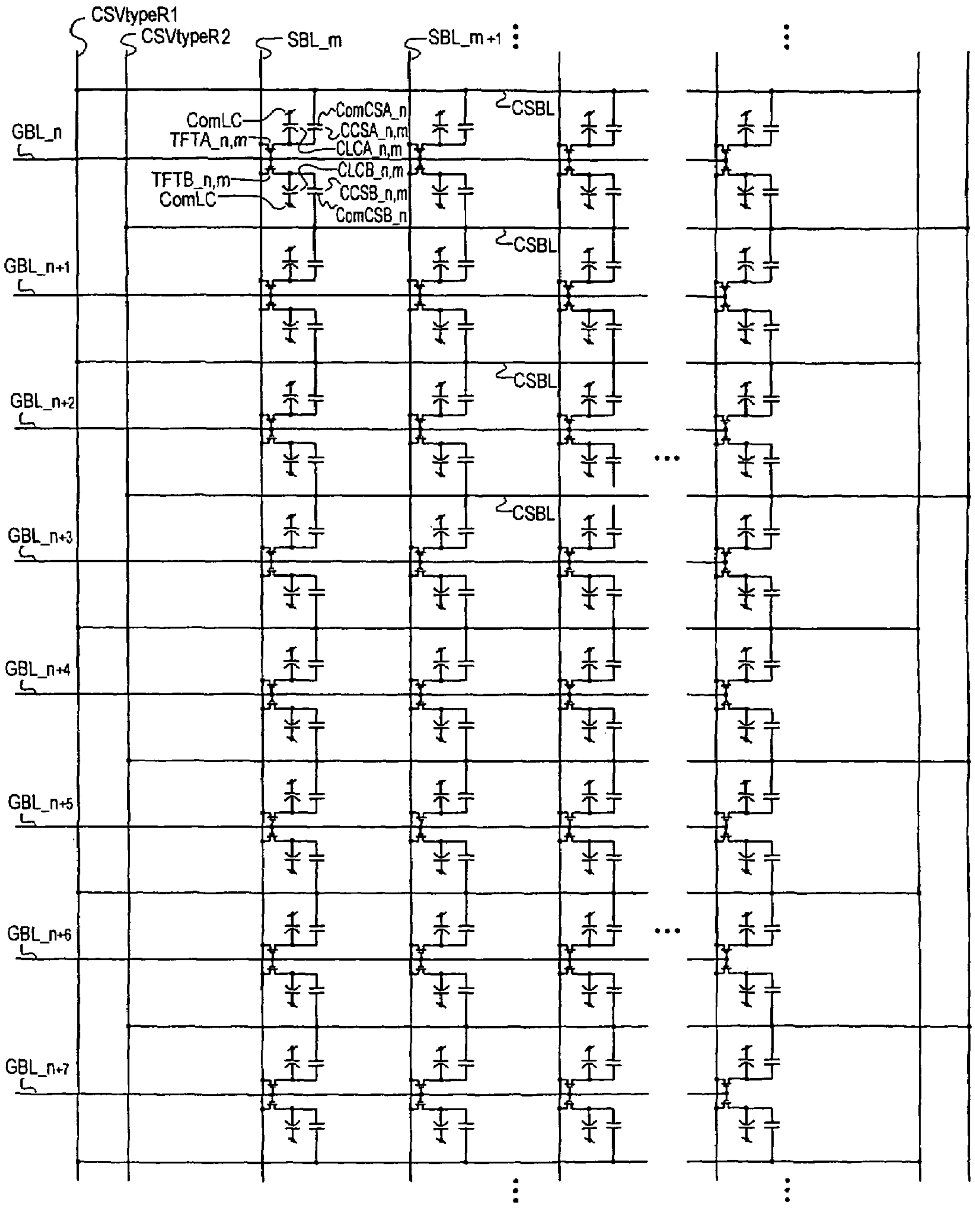
FIG. 2 is an equivalent circuit diagram showing an area of the liquid crystal display device of the preferred embodiment of the present invention.

FIG. 2 is an equivalent circuit diagram of an area of a liquid crystal display device with the pixel arrangement shown in FIG. 1. The liquid crystal display device has pixels that are arranged in columns and rows so as to form a matrix pattern. Each pixel has two subpixels (which are identified herein by the reference signs A and B, respectively). Each subpixel includes a liquid crystal capacitor CLCA_n,m or CLCB_n,m and a storage capacitor CCSA_n,m or CCSB_n,m. Each liquid crystal capacitor is formed by a subpixel electrode, a counter electrode ComLC, and a liquid crystal layer interposed between them. Each storage capacitor is formed by a storage capacitor electrode, an insulating film, and a storage capacitor counter electrode (ComCSA_n or ComCSB_n). The two subpixels are connected to a common signal line (source bus line) SBL_m by way of their associated TFTA_n,m and TFTB_n,m. The ON/OFF states of TFTA_n,m and TFTB_n,m are controlled with a scan signal voltage supplied to a common scan line (gate bus line) GBL_n. When the two TFTs are ON, a display signal voltage is applied to the respective subpixel electrodes and storage capacitor electrodes of the two subpixels through a common signal line. The storage capacitor counter electrode of one of the two subpixels is connected to a storage capacitor trunk (CS trunk) CSVtypeR1 and that of the other subpixel is connected to a storage capacitor trunk (CS trunk) CSVtypeR2 by way of a CS bus line CSBL.

In FIG. 2, attention should be paid to the fact that the subpixels of two pixels, belonging to rows that are adjacent to each other in the column direction, share the same CS bus line electrically. More specifically, the CS bus line CSBL for the subpixels CLCB_n,m of the $n^{th}$ row and the CS bus line CSBL for the subpixels CLCA_n+1,m of a pixel that is adjacent to the former subpixels in the column direction are electrically common.

Figure 3A:
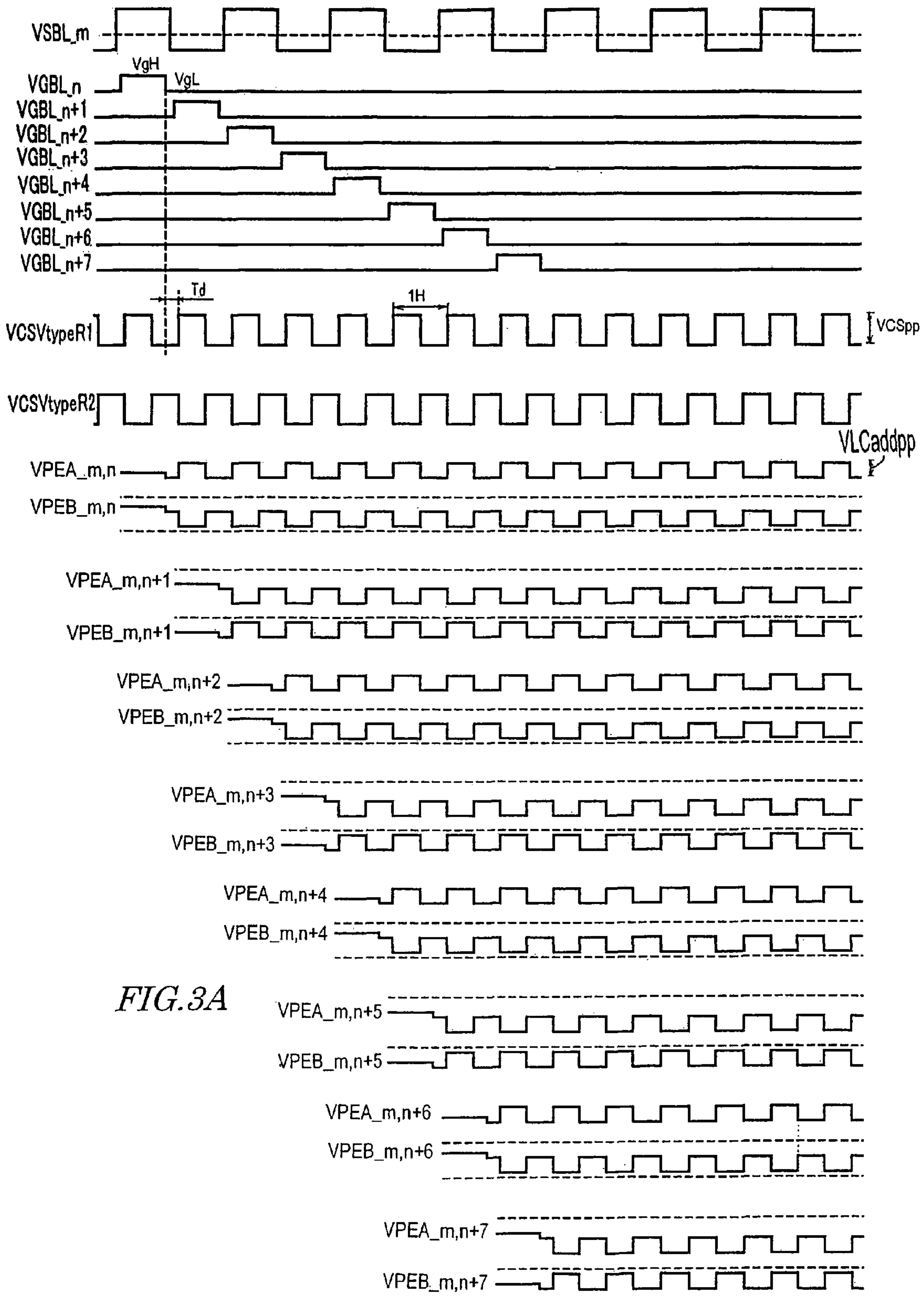
FIG. 3A shows the periods and phases of oscillation of oscillating voltages supplied to CS bus lines with respect to the voltage waveforms on gate bus lines and the voltages applied to subpixel electrodes in the liquid crystal display device shown in FIG. 2.
Figure 3B:
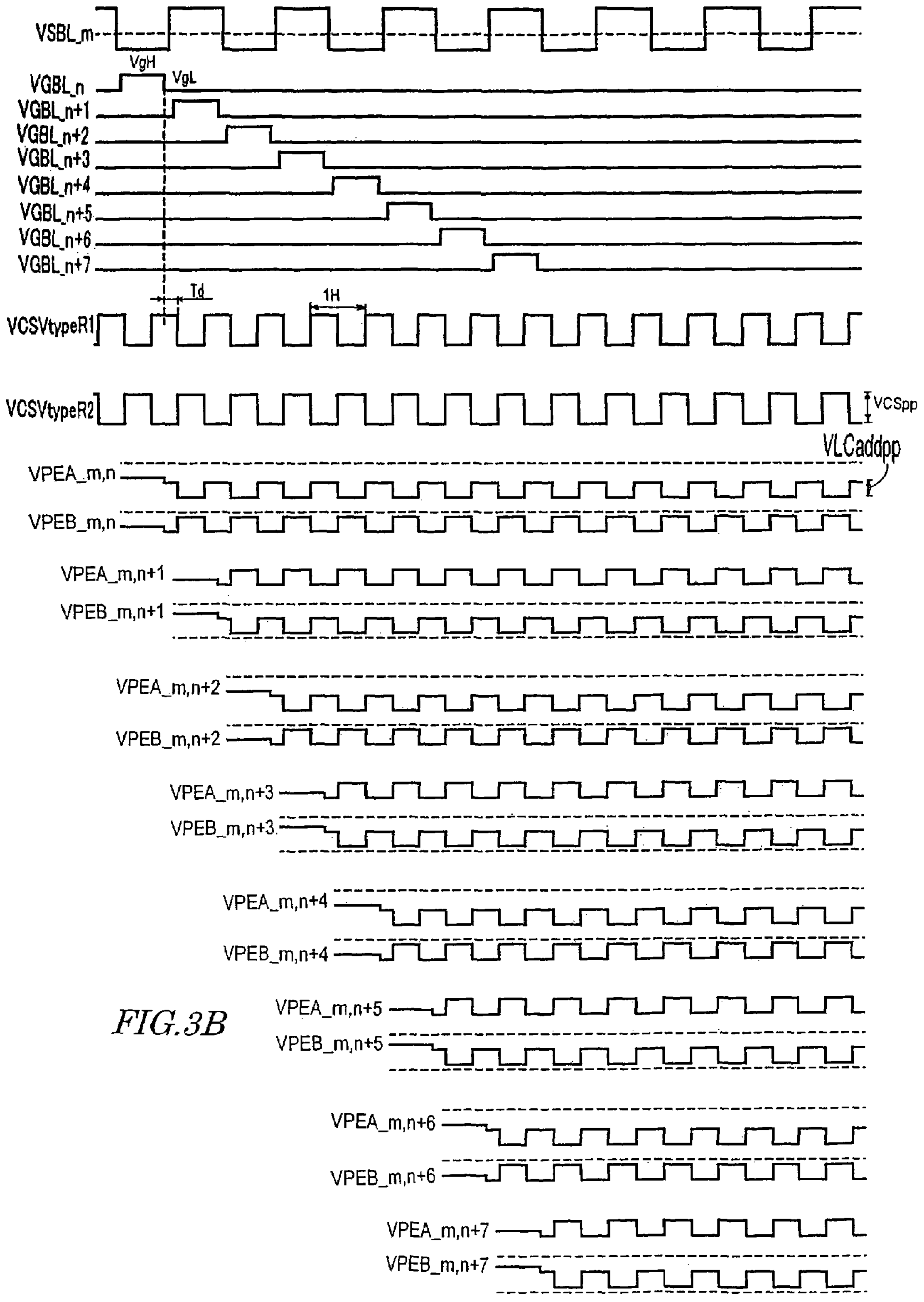
FIG. 3B shows the periods and phases of oscillation of oscillating voltages supplied to CS bus lines with respect to the voltage waveforms on gate bus lines and the voltages applied to subpixel electrodes in the liquid crystal display device shown in FIG. 2 (in which the voltage applied to the liquid crystal layer has its polarity inverted compared to FIG. 3A).

FIGS. 3A and 3B show the oscillation periods and phases of oscillating voltages supplied to the CS bus lines with respect to the voltage waveforms of the gate bus lines as well as the voltages applied to the subpixel electrodes. In general, in a liquid crystal display device, the direction of the electric field applied to the liquid crystal layer of each pixel is inverted at regular intervals (e.g., every vertical scanning period), and therefore, two types of drive voltage waveforms need to be provided for the two directions of the electric field. These two types of drive states are shown in FIGS. 3A and 3B, respectively.

In FIGS. 3A and 3B, VSBL_m denotes the waveform of a display signal voltage (source signal voltage) supplied to the source bus line SBL_m of the $m^{th}$ column, while VGBL_n denotes the waveform of a scan signal voltage (gate signal voltage) supplied to the gate bus line GBL_n of the $n^{th}$ column. VCSVtypeR1 and VCSVtypeR2 denote the waveforms of the oscillating voltages supplied as storage capacitor counter voltages to the CS trunks CSVtypeR1 and CSVtypeR2, respectively. VPEA_m,n and VPEB_m,n denote the voltage waveforms of the liquid crystal capacitors of the respective subpixels.

In FIGS. 3A and 3B, first of all, attention should be paid to the fact that the oscillation periods of the voltages VCSVtypeR1 and VCSVtypeR2 of CSVtypeR1 and CSVtypeR2 are both as long as one horizontal scanning period (1H).

Secondly, in FIGS. 3A and 3B, VCSVtypeR1 and VCSVtypeR2 have the following phases. First, looking at the phase difference between the CS trunks, VCSVtypeR2 has a phase delay of 0.5H with respect to VCSVtypeR1. Next, looking at the voltages on the CS trunks and the gate bus lines, the voltages on the CS trunks and gate bus lines have the following phases. As can be seen from FIGS. 3A and 3B, the time when the gate bus line voltages for respective CS trunks change from VgH to VgL agrees with the centers of respective flat portions of the CS trunk voltages. In other words, the Td value shown in FIGS. 3A and 3B is 0.25H. However, Td may have any other value as long as Td is greater than 0H but smaller than 0.5H.

Although the periods and phases of the voltages on the CS trunks have been described with reference to FIGS. 3A and 3B, the CS trunks do not have to have such voltage waveforms but just need to satisfy one of the following two conditions. The first condition is that the first voltage variation of VCSVtypeR1 after the voltage on its associated arbitrary gate bus line has changed from VgH to VgL should be a voltage increase, while the first voltage variation of VCSVtypeR2 after the voltage on its associated arbitrary gate bus line has changed from VgH to VgL should be a voltage decrease. The second condition is that the first voltage variation of VCSVtypeR1 after the voltage on its associated arbitrary gate bus line has changed from VgH to VgL should be a voltage decrease, while the first voltage variation of VCSVtypeR2 after the voltage on its associated arbitrary gate bus line has changed from VgH to VgL should be a voltage increase.

Figure 4A:
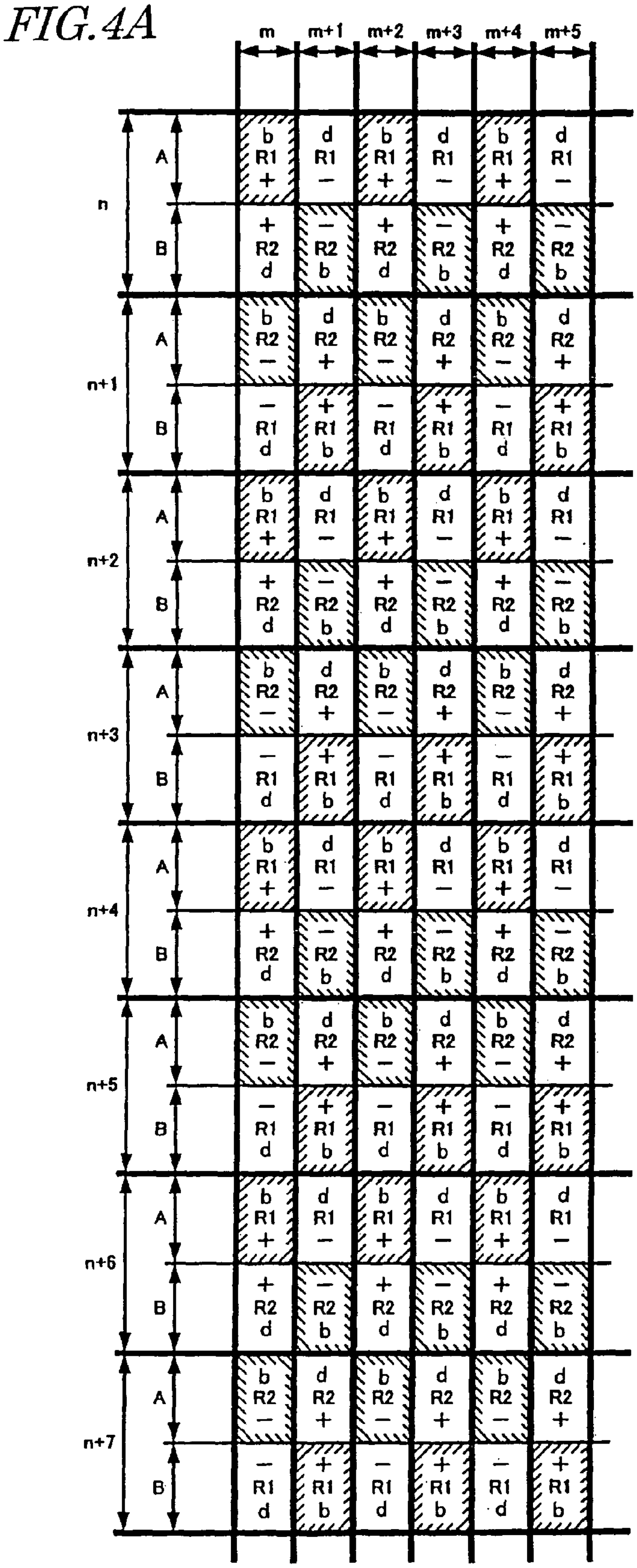
FIG. 4A is a schematic representation showing the drive state of the liquid crystal display device shown in FIG. 2 (in a situation where the voltages shown in FIG. 3A are used).
Figure 4B:
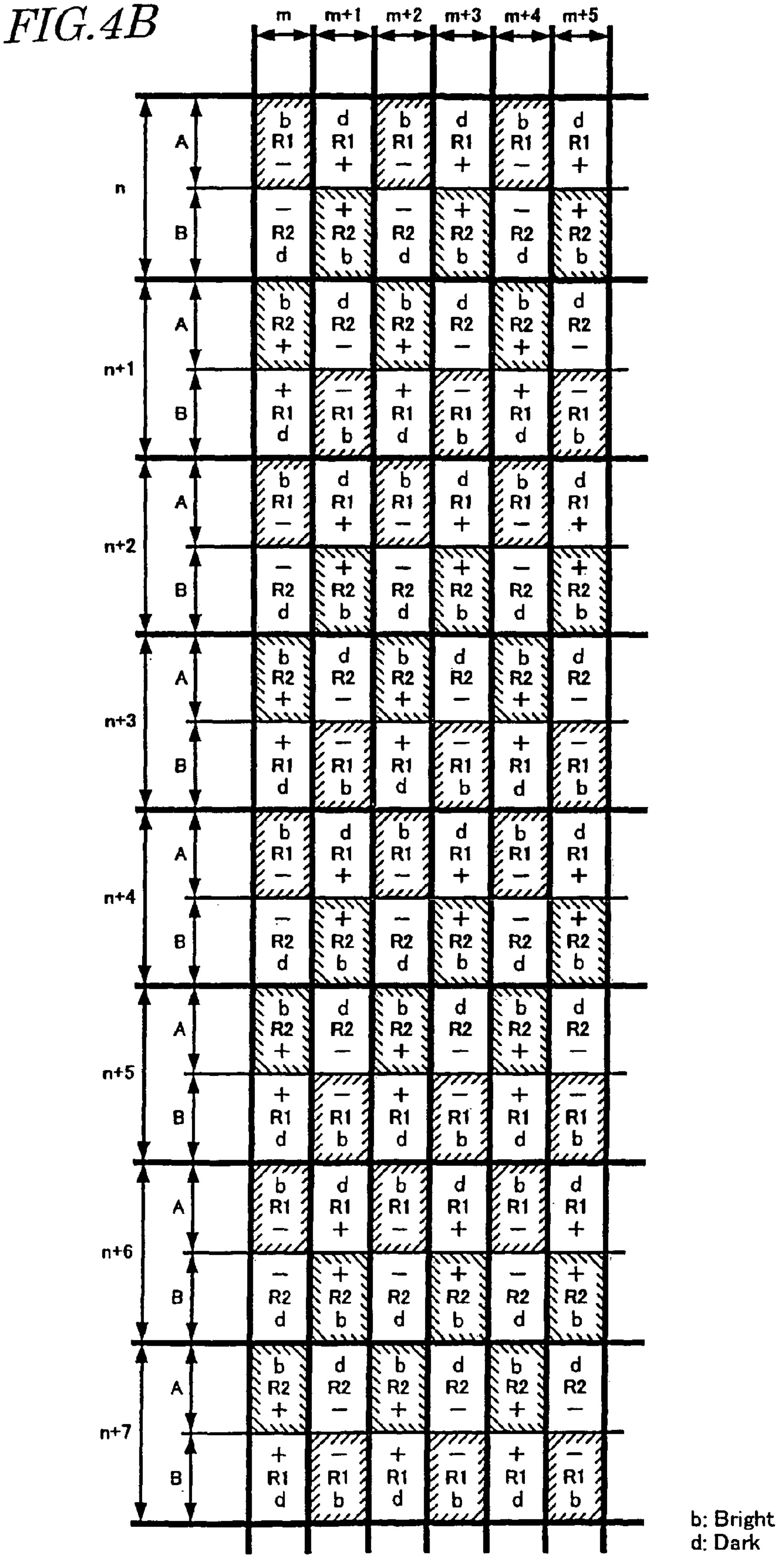
FIG. 4B is a schematic representation showing the drive state of the liquid crystal display device shown in FIG. 2 (in a situation where the voltages shown in FIG. 3B are used).

FIGS. 4A and 4B summarize the drive states of this liquid crystal display device. The drive state of the liquid crystal display device also needs to be one of the two types according to the combination of drive voltage polarities for the respective subpixels as in FIGS. 3A and 3B. Specifically, the drive state shown in FIG. 4A corresponds to the drive voltage waveforms shown in FIG. 3A, while the drive state shown in FIG. 4B corresponds to the drive voltage waveforms shown in FIG. 3B.

FIGS. 4A and 4B schematically show the drive states of pixels, which are arranged in eight rows (from the $n^{th}$ row through $(n+7)^{th}$ row) and in six columns (from the $m^{th}$ column through the $(m+5)^{th}$ column) among those pixels arranged in matrix. Each pixel has two subpixels with mutually different luminances: a "bright (b)" subpixel and a "dark (d)" subpixel. These drawings are basically the same as FIG. 1.

In FIGS. 4A and 4B, it should be determined whether or not this arrangement satisfies the following five requirements for an area ratio gray scale panel:

(1) Each pixel should consist of a plurality of subpixels with mutually different luminances when displaying a gray-scale;

(2) The luminance ranks of those subpixels with mutually different luminances should always remain the same;

(3) The subpixels with different luminances should be arranged densely;

(4) Pixels of opposite polarities should be arranged densely on a pixel-by-pixel basis in an arbitrary vertical scanning period (which will be referred to herein as a "frame");

(5) In an arbitrary frame, subpixels of the same polarity should be arranged densely such that subpixels of the same luminance rank (e.g., subpixels with the highest luminance, among other things) alternate one after another.

Let us see if the first requirement is satisfied. In this example, each pixel consists of two subpixels with mutually different luminances. Specifically, in FIG. 4A, the pixel at the intersection of the $n^{th}$ row and the $m^{th}$ column consists of a high-luminance subpixel labeled as "b (bright)" and a low-luminance subpixel labeled as "d (dark)". Therefore, the first requirement is satisfied.

Next, the second requirement will be discussed. This liquid crystal display device alternately shows two display states having mutually different drive states at regular intervals. Comparing FIGS. 4A and 4B showing the drive states corresponding to the two display states to each other, it can be seen that both high-luminance subpixels and low-luminance subpixels remain in the same locations. That is why the second requirement is also satisfied.

Let's turn to the third requirement next. In FIGS. 4A and 4B, subpixels of two different luminance ranks, i.e., subpixels labeled as "b (bright)" and subpixels labeled as "d (dark)", are arranged in a checkered pattern. When this liquid crystal display device was actually operated, no defects such as a decrease in resolution due to the use of those subpixels with different luminances were visible to the naked eye. Thus, the third requirement is satisfied.

Next is the fourth requirement. In FIGS. 4A and 4B, pixels of opposite polarities are arranged on a pixel-by-pixel basis in a checkered pattern. Specifically, in FIG. 4A, the pixel at the intersection of the $(n+2)^{th}$ row and the $(m+2)^{th}$ column is a "+" pixel. From this pixel, the polarities changes every pixel from "+" into "−", and vice versa, both in the row direction and in the column direction alike. Also, in a liquid crystal display device that does not satisfy the fourth requirement, flickering should be seen on the screen when the pixels switch their drive polarities (i.e., the polarities of signal voltages (or the pixels' effective voltages) with respect to the counter voltage and will also be referred to herein as "write polarities") between "+" and "−". When this liquid crystal display device was operated, however, no flickering was seen to the eye. That is why the fourth requirement is also satisfied.

And let's focus on the fifth requirement. In FIGS. 4A and 4B, the drive polarities of subpixels of the same luminance rank invert every two rows of subpixels, i.e., every row of pixels. Specifically, in the $(n\_B)^{th}$ row in FIG. 4A, the subpixels of the $(m+1)^{th}$, $(m+3)^{th}$, and $(m+5)^{th}$ columns have the luminance ranking sign "b (bright)" and their polarity inversion sign is "−". In the $(n+1\_A)^{th}$ row right under the $(n\_B)^{th}$ row, the subpixels of the $m^{th}$, $(m+2)^{th}$, and $(m+4)^{th}$ columns have the luminance ranking sign "b (bright)" and their polarity inversion sign is "−". In the $(n+1\_B)^{th}$ row under the $(n+1\_A)^{th}$ row, the subpixels of the $(m+1)^{th}$, $(m+3)^{th}$ and $(m+5)^{th}$ columns have the luminance ranking sign "b (bright)" and their polarity inversion sign is "+". And in the $(n+2\_A)^{th}$ row under the $(n+1\_B)^{th}$ row, the subpixels of the $m^{th}$, $(m+2)^{th}$ and $(m+4)^{th}$ columns have the luminance ranking sign "b (Bright)" and their polarity inversion sign is "+". Also, in a liquid crystal display device that does not satisfy the fifth requirement, flickering should be seen on the screen when the pixels switch their drive polarities between "+" and "−". When this liquid crystal display device was operated, however, no flickering was seen to the eye. That is why the fifth requirement is also satisfied.

When the image presented on this liquid crystal display device was monitored with the amplitude VCSpp of the CS voltage varied, viewing angle characteristics improved. Specifically, as the amplitude VCSpp of the CS voltage was increased from 0 V (which is a voltage to be applied to a liquid crystal display device that does not conduct the multi-pixel display operation), the excessively high contrast ratio on the screen when the image was viewed obliquely could be reduced. Although the viewing angle characteristics seemed to improve slightly differently depending on the specific image to present, the best improvement was achieved when VCSpp was set such that the VLCaddpp value would be 0.5 to 2 times as high as the threshold voltage of the liquid crystal display device in a typical drive mode (in which VCSpp was 0V).

Thus, the liquid crystal display device described above improves the viewing angle characteristics by conducting a multi-pixel display operation with an oscillating voltage applied to the storage capacitor counter electrodes. In this case, one oscillation period of the oscillating voltage applied to the storage capacitor counter electrodes is as long as (or may be even shorter than) one horizontal scanning period. However, if the period of oscillation of the oscillating voltage supplied to the CS bus lines is short, it is rather difficult to perform such a multi-pixel display operation on a large-screen LCD including CS bus lines with high load capacitance and resistance, a high-resolution LCD with a short horizontal scanning period, or a high-speed-drive LCD with shortened vertical and horizontal scanning periods.

This problem will be discussed with reference to FIGS. 5 to 8.

FIG. 5(*a*) is a diagram schematically illustrating a configuration for supplying an oscillating voltage to the CS bus lines of the liquid crystal display device described above. The oscillating voltage is supplied through CS trunks to a plurality of CS bus lines provided for the LCD panel. The oscillating voltage is supplied from a CS bus line voltage generator to the CS trunks via connection points ContP1, ContP2, ContP3 and ContP4. As the size of the LCD panel increases, the distance from the pixel at the center of the display panel to the connection points ContP1 to ContP4 increases so much as to make the load impedance between them non-negligible. The load impedance is mainly produced by the liquid crystal layer capacitance (CLC) and storage capacitance (CCS) of pixels, the resistance RCS of the CS bus lines, and the resistance Rmiki of the CS trunks. This load impedance may be represented, as a first-order approximation, by a low pass filter comprised of those capacitances and resistances as schematically shown in FIG. 5(*b*). The value of this load impedance is a function of location on the LCD panel. That is to say, it is a function of the distance from the connection points ContP1, ContP2, ContP3 and ContP4. Specifically, the load impedance is relatively small near the connection points. But the more distant from the connection points, the higher the load impedance.

That is to say, since the CS bus line voltage generated by the oscillating voltage generator is affected by the CS bus line's load impedance approximated as a CR low pass filter, the waveform of the CS bus line voltage blunts (i.e., loses its sharpness), the degree of which varies from one location in the panel to another.

In the multi-pixel display operation described above, the oscillating voltage is applied to the CS bus lines in order to form one pixel by two or more subpixels and to make the subpixels have mutually different luminances. That is to say, this multi-pixel display liquid crystal display device adopts a configuration and drive method in which a voltage waveform for the respective subpixel electrodes changes with the oscillating voltage on the CS bus lines and in which the effective voltage is varied according to the oscillating voltage waveform of the CS bus lines. That is why if the waveform of CS bus line voltage varies from one location to another, so does the effective voltage of the subpixel electrodes. In other words, if the waveform of the CS bus line voltage blunts differently from one location to another, the display luminance varies location by location, too, thus making the luminance on the screen uneven overall.

To minimize such unevenness in luminance on the display screen by extending the oscillation period of CS bus lines is one of the principal features of the liquid crystal display device of the present invention. This feature will be described in further detail below.

FIGS. 6 and 7 schematically show the waveforms of oscillating voltages to be applied to the subpixel electrodes in a situation where the CS load is kept constant. In FIGS. 6 and 7, the voltage applied to the subpixel electrodes is supposed to be 0 V when the CS bus line voltage is not an oscillating voltage and the oscillation of the subpixel electrode voltage caused by that of the CS bus line voltage is supposed to have an amplitude of 1 V. Portions (a) through (e) of FIG. 6 schematically show the waveforms in a situation where there is no waveform blunting in the CS voltage, i.e., when the CR time constant of the CR low pass filter is 0H. On the other hand, portions (a) through (e) of FIG. 7 schematically show waveform blunting that occurs when the CR time constant of the CR low pass filter is 0.2H. FIGS. 6 and 7 schematically show the waveforms of the subpixel electrode voltages when CR time constant of the CR low pass filter are 0H and 0.2H, respectively, and when the oscillating voltages on the CS bus lines have different oscillation periods. Portions (a) through (e) in FIGS. 6 and 7 show situations where the oscillation periods of the waveforms are 1H, 2H, 4H, 8H, respectively.

Comparing FIGS. 6 and 7 to each other, it can be seen that the difference between the waveforms shown in FIG. 6 and 7 narrows as the oscillation period extends. This tendency is shown quantitatively in FIG. 8.

FIG. 8 shows how the average and effective values of the oscillating voltages, calculated based on the waveforms shown in FIG. 7, change with one oscillation period (where one scale corresponds to one horizontal scanning period 1H) of the CS bus line voltage. As can be seen from FIG. 8, the difference in average voltage or effective voltage between the situation where the CR time constant is 0H and the situation where the CR time constant is 0.2H narrows as the oscillation period of the CS bus line voltage is extended. It can be seen that the influence of waveform blunting can be reduced significantly particularly when one oscillation period of the oscillating voltage on the CS bus lines is eight or more times as long as the CR time constant of the CS bus lines (which is an approximate load impedance of the CS bus lines).

As can be seen, by extending the oscillation period of the oscillating voltage on the CS bus lines, the unevenness in luminance due to waveform blunting on the CS bus lines can be reduced on the screen. The influence of waveform blunting can be reduced significantly particularly when one oscillation period of the oscillating voltage on the CS bus lines is eight or more times as long as the CR time constant of the CS bus lines (which is an approximate load impedance of the CS bus lines).

The present invention provides preferred embodiments of a liquid crystal display device and a driving method thereof that can extend one oscillation period of the oscillating voltages supplied to the CS bus lines. The preferred arrangements for extending one CS voltage oscillation period are roughly classified into the two types, which will be referred to herein as Type I and Type II, respectively.

In a liquid crystal display device according to a preferred embodiment having the arrangement of Type I, subpixels of two pixels, which belong to the same column of the matrix-addressed LCD, which are adjacent to each other in the column direction, and which have mutually different luminance ranks (e.g., a first subpixel and a second subpixel), are associated with CS bus lines that are electrically independent of each other. Specifically, the CS bus lines associated with the first subpixel on the $n^{th}$ row and the second subpixel on the $(n+1)^{th}$ row are electrically independent of each other. As used herein, the pixels belonging to the same column of the matrix-addressed LCD are pixels driven by the same signal line (which is typically a source bus line). Also, the pixels that are adjacent to each other in the column direction in the matrix-addressed LCD are pixels driven by scan lines to be selected at two consecutive points in time among the scan lines (which are typically gate bus lines) that are sequentially selected on the time axis. Furthermore, supposing that there are L pairs of electrically independent CS trunks, one oscillation period of the CS bus line voltage can be K·L times (where K is a positive integer) as long as one horizontal scanning period. As described above, the number of electrically independent CS trunks is preferably more than eight times as large as the value obtained by dividing one horizontal scanning period by a CR time constant that is an approximate maximum load impedance of the CS bus line. More preferably, the number is an even number that is more than eight times as large as that value as will be described later. It should be noted that the number L of the electrically independent CS trunk pairs will sometimes be referred to herein as the number L of electrically independent CS trunks. Even if pairs of electrically equivalent CS trunks are arranged on both sides of the panel, the number of electrically equivalent CS trunks remains the same.

Hereinafter, a liquid crystal display device with Type I arrangement and its driving method according to a preferred embodiment of the present invention will be described with reference to the accompanying drawings.

First, an example of a liquid crystal display device that achieves the area ratio gray scale display by setting one oscillation period of the oscillating voltage on the CS bus lines to be four times as long as one horizontal scanning period will be described with reference to FIGS. 9, 10A, 10B and 11B. The description will be focused on the following three points with reference to drawings. Specifically, the first point is the specific configuration of the liquid crystal display device, which is mainly characterized by the connection pattern between the storage capacitor counter electrodes of the storage capacitors connected to respective subpixels and the CS bus lines. The second point concerns the oscillation period and phase of the CS bus line voltage with respect to the voltage waveforms of the gate bus lines. And the third point is the drive and display states of respective subpixels according to this preferred embodiment.

FIG. 9 schematically shows an equivalent circuit diagram of the liquid crystal display device with Type I arrangement according to a preferred embodiment of the present invention and corresponds to FIG. 2 that has already been referred to. In FIG. 9, any component of the liquid crystal display device, having the same function as the counterpart shown in FIG. 2, is identified by the same reference numeral as that used in FIG. 2 and the description thereof will be omitted herein. Unlike the counterpart shown in FIG. 2, the liquid crystal display device shown in FIG. 9 includes four electrically independent CS trunks CSVtypeA1 to CSVtypeA4. And the connection pattern between these CS trunks and the CS bus lines in FIG. 9 is different from that shown in FIG. 2.

In FIG. 9, first or all, attention should be paid to the point that CS bus lines for two adjacent subpixels of two pixels belonging to two rows that are adjacent in the column direction (e.g., subpixels associated with CLCB_n,m and CLCA_n+1,m) are electrically independent of each other. Specifically, for example, the CS bus line CSBL_B_n for the subpixel CLCB_n,m on the $n^{th}$ row and the CS bus line CSBL_A_n+1 for the subpixel CLCA_n+1,m of the pixel on the next row that is adjacent to the $n^{th}$ row in the column direction are electrically independent of each other.

The second point to emphasize in FIG. 9 is that each CS bus line CSBL is connected to the four CS trunks CSVtypeA1, CSVtypeA2, CSVtypeA3, and CSVtypeA4 at one end of the panel. That is to say, in the liquid crystal display device of this embodiment, there are four types of electrically independent CS trunks.

The third point to keep in mind in FIG. 9 is the state of connection between the CS bus lines and the four CS trunks, i.e., the arrangement of the electrically independent CS bus lines in the column direction. According to the rule of connection between the CS bus lines and the CS trunks in FIG. 9, the bus lines connected to the CS trunks CSVtypeA1, CSVtypeA2, CSVtypeA3, and CSVtypeA4 are as shown in the following Table 1:

TABLE 1

| CS trunk | CS busline connected to CS trunk | | General notation of CS busline listed on left |
|---|---|---|---|
| CSVtypeA1 | CSBL_A_n, CSBL_A_n + 4, CSBL_A_n + 8, CSBL_A_n + 12, | CSBL_B_n + 2, CSBL_B_n + 6, CSBL_B_n + 10, CSBL_B_n + 14, . . . | CSBL_A_n + 4 · k, CSBL_B_n + 2 + 4 · k (k = 0, 1, 2, 3, . . . ) |
| CSVtypeA2 | CSBL_B_n, CSBL_B_n + 4, CSBL_B_n + 8, CSBL_B_n + 12, | CSBL_A_n + 2, CSBL_A_n + 6, CSBL_A_n + 10, CSBL_A_n + 14, . . . | CSBL_B_n + 4 · k, CSBL_A_n + 2 + 4 · k (k = 0, 1, 2, 3, . . . ) |
| CSVtypeA3 | CSBL_A_n + 1, CSBL_A_n + 5, CSBL_A_n + 9, CSBL_A_n + 13, | CSBL_B_n + 3, CSBL_B_n + 7, CSBL_B_n + 11, CSBL_B_n + 15, . . . | CSBL_A_n + 1 + 4 · k, CSBL_B_n + 3 + 4 · k (k = 0, 1, 2, 3, . . . ) |
| CSVtypeA4 | CSBL_B_n + 1, CSBL_B_n + 5, CSBL_B_n + 9, CSBL_B_n + 13, | CSBL_A_n + 3, CSBL_A_n + 7, CSBL_A_n + 11, CSBL_A_n + 15, . . . | CSBL_B_n + 1 + 4 · k, CSBL_A_n + 3 + 4 · k (k = 0, 1, 2, 3, . . . ) |

It should be noted that a set of CS bus lines to be connected to the four trunks shown in this Table 1 is a set of the four different types of electrically independent CS bus lines.

FIGS. 10A and 10B show the periods and phases of oscillation of the CS bus line voltages with respect to the voltage waveforms on the gate bus lines as well as the voltages applied to the respective subpixel electrodes. FIGS. 10A and 10B correspond to FIGS. 3A and 3B that have already been referred to. In FIGS. 10A and 10B, the same waveform as the counterpart shown in FIGS. 3A and 3B is identified by the same reference numeral as that used in FIGS. 3A and 3B and the description thereof will be omitted herein. In general, in a liquid crystal display device, the direction of the electric field applied to the liquid crystal layer of each pixel is inverted at regular intervals, and therefore, two types of drive voltage waveforms need to be provided for the two directions of the electric field. These two types of drive states are shown in FIGS. 10A and 10B, respectively.

In FIGS. 10A and 10B, first of all, attention should be paid to the point that periods of oscillation of the voltages VCSVtypeA1, VCSVtypeA2, VCSVtypeA3 and VCSVtypeA4 of CSVtypeA1, CSVtypeA2, CSVtypeA3, and CSVtypeA4 are all four times as long as one horizontal scanning period (4H).

The second point to emphasize in FIGS. 10A and 10B is that VCSVtypeA1, VCSVtypeA2, VCSVtypeA3, and VCSVtypeA4 have the following phases. First, looking at the phase difference between the CS trunks, VCSVtypeA2 has a phase delay of 2H with respect to VCSVtypeA1, VCSVtypeA3 has a phase delay of 3H with respect to VCSVtypeA1, and VCSVtypeA4 has a phase delay of 1H with respect to VCSVtypeA1. Next, looking at the voltages on the CS trunks and the gate bus lines, the voltages on the CS trunks and gate bus lines have the following phases. As can be seen from FIGS. 10A and 10B, the time when the gate bus line voltages for respective CS trunks change from VgH to VgL agrees with the centers of respective flat portions of the CS trunk voltages. In other words, the Td value shown in FIGS. 10A and 10B is 1H. However, Td may have any other value as long as Td is greater than 0H but smaller than 2H.

In this case, the gate bus line associated with the respective CS trunks is the CS trunks and gate bus lines to which CS bus lines, connected to the same subpixel electrode by way of a storage capacitor CS and a TFT, are connected. According to the arrangement shown in FIG. 9, the gate bus lines and CS bus lines associated with each CS trunk in this liquid crystal display device are shown in the following Table 2:

TABLE 2

| CS trunk | Corresponding gate busline | Corresponding CS busline |
|---|---|---|
| CSVtypeA1 | GBL_n, GBL_n + 2, GBL_n + 4, GBL_n + 6, GBL_n + 8, . . . [GBL_n + 2 · k (k = 0, 1, 2, 3, . . . )] | CSBL_A_n, CSBL_B_n + 2, CSBL_A_n + 4, CSBL_B_n + 6, CSBL_A_n + 8, . . . [CSBL_A_n + 4 · k, CSBL_B_n + 2 + 4 · k (k = 0, 1, 2, 3, . . . )] |
| CSVtypeA2 | GBL_n, GBL_n + 2, GBL_n + 4, GBL_n + 6, GBL_n + 8, . . . [GBL_n + 2 · k (k = 0, 1, 2, 3, . . . )] | CSBL_B_n, CSBL_A_n + 2, CSBL_B_n + 4, CSBL_A_n + 6, CSBL_B_n + 8, . . . [CSBL_B_n + 4 · k, CSBL_A_n + 2 + 4 · k (k = 0, 1, 2, 3, . . . )] |
| CSVtypeA3 | GBL_n + 1, GBL_n + 3, GBL_n + 5, GBL_n + 7, GBL_n + 9, . . . [GBL_n + 1 + 2 · k (k = 0, 1, 2, 3, . . . )] | CSBL_A_n + 1, CSBL_B_n + 3, CSBL_A_n + 5, CSBL_B_n + 7, CSBL_A_n + 9, . . . [CSBL_A_n + 1 + 4 · k, CSBL_B_n + 3 + 4 · k (k = 0, 1, 2, 3, . . . )] |
| CSVtypeA4 | GBL_n + 1, GBL_n + 3, GBL_n + 5, GBL_n + 7, GBL_n + 9, . . . [GBL_n + 1 + 2 · k (k = 0, 1, 2, 3, . . . )] | CSBL_B_n + 1, CSBL_A_n + 3, CSBL_B_n + 5, CSBL_A_n + 7, CSBL_B_n + 9, . . . [CSBL_B_n + 1 + 4 · k, CSBL_A_n + 3 + 4 · k (k = 0, 1, 2, 3, . . . )] |

Although the periods and phases of the voltages on the CS trunks have been described with reference to FIGS. 10A and 10B, the CS trunks do not have to have such voltage waveforms but just need to satisfy one of the following two conditions.

The first condition is that the first voltage variation of VCSVtypeA1 after the voltage on its associated gate bus line has changed from VgH to VgL should be a voltage increase, while the first voltage variation of VCSVtypeA2 after the voltage on its associated gate bus line has changed from VgH to VgL should be a voltage decrease. Also, to satisfy the first condition, the first voltage variation of VCSVtypeA3 after the voltage on its associated gate bus line has changed from VgH to VgL should be a voltage decrease, while the first voltage variation of VCSVtypeA4 after the voltage on its associated gate bus line has changed from VgH to VgL should be a voltage increase. This condition is set on the drive voltage waveforms shown in FIG. 10A.

The second condition is that the first voltage variation of VCSVtypeA1 after the voltage on its associated gate bus line has changed from VgH to VgL should be a voltage decrease, while the first voltage variation of VCSVtypeA2 after the voltage on its associated gate bus line has changed from VgH to VgL should be a voltage increase. Also, to satisfy the second condition, the first voltage variation of VCSVtypeA3 after the voltage on its associated gate bus line has changed from VgH to VgL should be a voltage increase, while the first voltage variation of VCSVtypeA4 after the voltage on its associated gate bus line has changed from VgH to VgL should be a voltage decrease. This condition is set on the drive voltage waveforms shown in FIG. 10B.

However, for the following reasons, the waveforms shown in FIGS. 10A and 10B can be used effectively.

In FIGS. 10A and 10B, the period of oscillation is constant, thus making it possible to simplify the signal generator.

Besides, in FIGS. 10A and 10B, the duty ratio of oscillation is also constant, thus making it possible to make the amplitude of oscillation constant and simplify the driver. This is because if the CS bus line voltage is an oscillating voltage, the variation in the voltage applied to the liquid crystal layer will depend on the amplitude and duty ratio of oscillation. That is why by keeping the duty ratio of oscillation constant, the amplitude of oscillation can also be made constant. The duty ratio may be set to one to one, for example.

Furthermore, in FIGS. 10A and 10B, any oscillating voltage is paired with another oscillating voltage, of which the phase is inverse of that of the former voltage (i.e., which has a phase difference of 180 degrees with respect to the former voltage). That is to say, the four types of electrically independent CS trunks consist of two pairs of CS trunks that supply such oscillating voltages, of which the phases are different from each other by 180 degrees. As a result, the amount of current flowing through the counter electrode of the liquid crystal capacitor can be minimized, and therefore, the driver connected to the counter electrodes can be simplified.

FIGS. 11A and 11B summarize the drive states of the liquid crystal display device of this preferred embodiment. The drive state of the liquid crystal display device also needs to be one of the two types according to the combination of drive voltage polarities for the respective subpixels as in FIGS. 10A and 10B. Specifically, the drive state shown in FIG. 11A corresponds to the drive voltage waveforms shown in FIG. 10A, while the drive state shown in FIG. 11B corresponds to the drive voltage waveforms shown in FIG. 10B. FIGS. 11A and 11B correspond to FIGS. 4A and 4B that have already been referred to.

In FIGS. 11A and 11B, it should be determined whether or not this arrangement satisfies the following five requirements for an area ratio gray scale panel:

(1) Each pixel should consist of a plurality of subpixels with mutually different luminances when displaying a grayscale;

(2) The luminance ranking of those subpixels with the mutually different luminances should always remain the same;

(3) The subpixels with different luminances should be arranged densely;

(4) Pixels of opposite polarities should be arranged densely on a pixel-by-pixel basis in an arbitrary frame;

(5) In an arbitrary frame, subpixels of the same polarity should be arranged densely such that subpixels of the same luminance rank (e.g., subpixels with the highest luminance, among other things) alternate one after another.

Let us see if the first requirement is satisfied. In the example shown in FIGS. 11A and 11B, each pixel consists of two subpixels with mutually different luminances. Specifically, in FIG. 11A, the pixel at the intersection of the $n^{th}$ row and the $m^{th}$ column consists of a high-luminance subpixel labeled as "b (bright)" and a low-luminance subpixel labeled as "d (dark)". Therefore, the first requirement is satisfied.

Next, the second requirement will be discussed. The liquid crystal display device of this preferred embodiment alternately shows two display states having mutually different drive states at regular intervals. Comparing FIGS. 11A and 11B showing the drive states corresponding to the two display states to each other, it can be seen that both high-luminance subpixels and low-luminance subpixels remain in the same locations. That is why the second requirement is also satisfied.

Let's turn to the third requirement next. In FIGS. 11A and 11B, subpixels having two different luminance ranks, i.e., subpixels labeled as "b (bright)" and subpixels labeled as "d (dark)", are arranged in a checkered pattern. When the liquid crystal display device of this preferred embodiment was actually operated, no defects such as a decrease in resolution due to the use of those subpixels with different luminances were visible to the naked eye. Thus, the third requirement is satisfied.

Next is the fourth requirement. In FIGS. 11A and 11B, pixels of opposite polarities are arranged on a pixel-by-pixel basis in a checkered pattern. Specifically, in FIG. 11A, the pixel at the intersection of the $(n+2)^{th}$ row and the $(m+2)^{th}$ column is a "+" pixel. From this pixel, the polarities changes every pixel from "+" into "−", and vice versa, both in the row direction and in the column direction alike. Also, in a liquid crystal display device that does not satisfy the fourth requirement, flickering should be seen on the screen when the pixels switch their drive polarities between "+" and "−". When the liquid crystal display device of this preferred embodiment was operated, however, no flickering was seen to the eye. That is why the fourth requirement is also satisfied.

And let's focus on the fifth requirement. In FIGS. 11A and 11B, the drive polarities of subpixels of the same luminance rank invert every two rows of subpixels, i.e., every row of pixels. Specifically, in the $(n\_B)^{th}$ row in FIG. 11A, the subpixels of the $(m+1)^{th}$, $(m+3)^{th}$, and $(m+5)^{th}$ columns have the luminance ranking sign "b (bright)" and their polarity inversion sign is "−". In the $(n+1\_A)^{th}$ row right under the $(n\_B)^{th}$ row, the subpixels of the $m^{th}$, $(m+2)^{th}$, and $(m+4)^{th}$ columns have the luminance ranking sign "b (bright)" and their polarity inversion sign is "−". In the $(n+1\_B)^{th}$ row under the $(n+1\_A)^{th}$ row, the subpixels of the $(m+1)^{th}$, $(m+3)^{th}$, and $(m+5)^{th}$ columns have the luminance ranking sign "b (bright)" and their polarity inversion sign is "+". And in the $(n+2\_A)^{th}$ row under the $(n+1\_B)^{th}$ row, the subpixels of the $m^{th}$, $(m+2)^{th}$, and $(m+4)^{th}$ columns have the luminance ranking sign "b (Bright)" and their polarity inversion sign is "+". Also, in a liquid crystal display device that does not satisfy the fifth requirement, flickering should be seen on the screen when the pixels switch their drive polarities between "+" and "−". When this liquid crystal display device was operated, however, no flickering was seen to the eye. That is why the fifth requirement is also satisfied.

When the image presented on the liquid crystal display device of this preferred embodiment was monitored with the amplitude VCSpp of the CS voltage varied, viewing angle characteristics improved. Specifically, as the amplitude VCSpp of the CS voltage was increased from 0 V (which is a voltage to be applied to a typical liquid crystal display device not according to the present invention), the excessively high contrast ratio on the screen when the image was viewed obliquely could be reduced. Although the viewing angle characteristics seemed to improve slightly differently depending on the specific image to present, the best improvement was achieved when VCSpp was set such that the VLCaddpp value would be 0.5 to 2 times as high as the threshold voltage of the liquid crystal display device in a typical drive mode (in which VCSpp was 0V).

To sum up, the liquid crystal display device of this preferred embodiment improves the viewing angle characteristics by conducting an area ratio gray scale display (multi-pixel display) operation with an oscillating voltage applied to the storage capacitor counter electrodes. In this case, one oscillation period of the oscillating voltage applied to the storage capacitor counter electrodes can be four times as long as one horizontal scanning period. Nevertheless, such an area ratio gray scale display operation can also be performed easily even on a large-screen LCD including CS bus lines with high load capacitance and resistance, a high-resolution LCD with a short horizontal scanning period, or a high-speed-drive LCD with shortened vertical and horizontal scanning periods.

Hereinafter, a liquid crystal display device with Type I arrangement and its operation according to another preferred embodiment of the present invention will be described with reference to FIGS. 12, 13A, 13B, 14A and 14B.

This liquid crystal display device achieves the area ratio gray scale display by setting one oscillation period of the oscillating voltage on the CS bus lines to be twice as long as one horizontal scanning period. The description will be focused on the following three points with reference to drawings. Specifically, the first point is the specific configuration of the liquid crystal display device, which is mainly characterized by the connection pattern between the storage capacitor counter electrodes of the storage capacitors connected to respective subpixels and the CS bus lines. The second point concerns the oscillation period and phase of the CS bus line voltage with respect to the voltage waveforms of the gate bus lines. And the third point is the drive and display states of respective subpixels according to this preferred embodiment.

FIG. 12 schematically shows an equivalent circuit diagram of the liquid crystal display device with Type I arrangement according to another preferred embodiment of the present invention and corresponds to FIG. 9 that has already been referred to for the liquid crystal display device of the previous preferred embodiment. In FIG. 12, any component of the liquid crystal display device, having the same function as the counterpart shown in FIG. 9, is identified by the same reference numeral as that used in FIG. 9 and the description thereof will be omitted herein. Unlike the counterpart shown in FIG. 9, the liquid crystal display device shown in FIG. 12 includes two electrically independent CS trunks CSVtypeB1 and CSVtypeB2. And the connection pattern between these CS trunks and the CS bus lines in FIG. 12 is also different from that shown in FIG. 9.

In FIG. 12, first or all, attention should be paid to the point that CS bus lines for two adjacent subpixels of two pixels belonging to two rows that are adjacent in the column direction are electrically independent of each other. Specifically, for example, the CS bus line CSBL_B_n for the subpixel CLCB_n,m on the $n^{th}$ row and the CS bus line CSBL_A_n+1 for the subpixel CLCA_n+1,m of the pixel on the next row that is adjacent to the $n^{th}$ row in the column direction are electrically independent of each other.

The second point to emphasize in FIG. 12 is that each CS bus line CSBL is connected to the two CS trunks CSVtypeB1 and CSVtypeB2 at one end of the panel. That is to say, in the liquid crystal display device of this embodiment, there are two types of electrically independent CS trunks.

The third point to keep in mind in FIG. 12 is the state of connection between the CS bus lines and the two CS trunks, i.e., the arrangement of the electrically independent CS bus lines in the column direction. According to the rule of connection between the CS bus lines and the CS trunks in FIG. 12, the CS bus lines connected to the CS trunks CSVtypeB1 and CSVtypeB2 are as shown in the following Table 3:

TABLE 3

| CS trunk | CS busline connected to CS trunk | General notation of CS busline listed on left |
|---|---|---|
| CSVtypeB1 | CSBL_A_n, CSBL_A_n + 1, CSBL_A_n + 2, CSBL_A_n + 3, . . . | CSBL_A_n + k, (k = 0, 1, 2, 3, . . . ) |
| CSVtypeB2 | CSBL_B_n, CSBL_B_n + 1, CSBL_B_n + 2, CSBL_B_n + 3, . . . | CSBL_B_n + k, (k = 0, 1, 2, 3, . . . ) |

It should be noted that a set of CS bus lines to be connected to the two trunks shown in this Table 3 is a set of the two different types of electrically independent CS bus lines.

FIGS. 13A and 13B show the periods and phases of oscillation of the CS bus line voltages with respect to the voltage waveforms on the gate bus lines as well as the voltages applied to the respective subpixel electrodes. FIGS. 13A and 13B correspond to FIGS. 10A and 10B that have already been referred to. In FIGS. 13A and 13B, the same waveform as the counterpart shown in FIGS. 10A and 10B is identified by the same reference numeral as that used in FIGS. 10A and 10B and the description thereof will be omitted herein. In general, in a liquid crystal display device, the direction of the electric field applied to the liquid crystal layer of each pixel is inverted at regular intervals, and therefore, two types of drive voltage waveforms need to be provided for the two directions of the electric field. These two types of drive states are shown in FIGS. 13A and 13B, respectively.

In FIGS. 13A and 13B, first of all, attention should be paid to the point that periods of oscillation of the voltages VCSVtypeB1 and VCSVtypeB2 of CSVtypeB1 and CSVtypeB2 are both twice as long as one horizontal scanning period (2H).

The second point to emphasize in FIGS. 13A and 13B is that VCSVtypeB1 and VCSVtypeB2 have the following phases. First, looking at the phase difference between the CS trunks, VCSVtypeB2 has a phase delay of 1H with respect to VCSVtypeB1. Next, looking at the voltages on the CS trunks and the gate bus lines, the voltages on the CS trunks and gate bus lines have the following phases. As can be seen from FIGS. 13A and 13B, the time when the gate bus line voltages for respective CS trunks change from VgH to VgL agrees with the centers of respective flat portions of the CS trunk voltages. In other words, the Td value shown in FIGS. 13A and 13B is 0.5H. However, Td may have any other value as long as Td is greater than 0H but smaller than 1H.

In this case, the gate bus line associated with the respective CS trunks is the CS trunks and gate bus lines to which CS bus lines, connected to the same subpixel electrode by way of a storage capacitor CS and a TFT, are connected. According to the arrangement shown in FIGS. 13A and 13B, the gate bus lines and CS bus lines associated with each CS trunk in this liquid crystal display device are shown in the following Table 4:

TABLE 4

| CS trunk | Corresponding gate busline | Corresponding CS busline |
|---|---|---|
| CSVtypeB1 | GBL_n, GBL_n + 1, GBL_n + 2, GBL_n + 3, GBL_n + 4, . . . [GBL_n + k (k = 0, 1, 2, 3, . . . )] | CSBL_A_n, CSBL_A_n + 1, CSBL_A_n + 2, CSBL_A_n + 3, CSBL_A_n + 4, . . . [CSBL_A_n + k (k = 0, 1, 2, 3, . . . )] |
| CSVtypeB2 | GBL_n, GBL_n + 1, GBL_n + 2, GBL_n + 3, GBL_n + 4, . . . [GBL_n + k (k = 0, 1, 2, 3, . . . )] | CSBL_B_n, CSBL_B_n + 1, CSBL_B_n + 2, CSBL_B_n + 3, CSBL_B_n + 4, . . . [CSBL_B_n + k (k = 0, 1, 2, 3, . . . )] |

Although the periods and phases of the voltages on the CS trunks have been described with reference to FIGS. 13A and 13B, the CS trunks do not have to have such voltage waveforms but just need to satisfy one of the following two conditions.

The first condition is that the first voltage variation of VCSVtypeB1 after the voltage on its associated gate bus line has changed from VgH to VgL should be a voltage increase, while the first voltage variation of VCSVtypeB2 after the voltage on its associated gate bus line has changed from VgH to VgL should be a voltage decrease. This condition is set on FIG. 13A.

The second condition is that the first voltage variation of VCSVtypeB1 after the voltage on its associated gate bus line has changed from VgH to VgL should be a voltage decrease, while the first voltage variation of VCSVtypeB2 after the voltage on its associated gate bus line has changed from VgH to VgL should be a voltage increase. This condition is set on FIG. 13B.

FIGS. 14A and 14B summarize the drive states of the liquid crystal display device of this preferred embodiment. The drive state of the liquid crystal display device also needs to be one of the two types according to the combination of drive voltage polarities for the respective subpixels as in FIGS. 13A and 13B. Specifically, the drive state shown in FIG. 14A corresponds to the drive voltage waveforms shown in FIG. 13A, while the drive state shown in FIG. 14B corresponds to the drive voltage waveforms shown in FIG. 13B. FIGS. 14A and 14B correspond to FIGS. 11A and 11B that have already been referred to for the liquid crystal display device of the preferred embodiment described above.

In FIGS. 14A and 14B, it should be determined whether or not this arrangement satisfies the following five requirements for an area ratio gray scale panel:

(1) Each pixel should consist of a plurality of subpixels with mutually different luminances when displaying a grayscale;

(2) The luminance ranking of those subpixels with mutually different luminances should always remain the same;

(3) The subpixels with different luminances should be arranged densely;

(4) Pixels of opposite polarities should be arranged densely on a pixel-by-pixel basis in an arbitrary frame;

(5) In an arbitrary frame, subpixels of the same polarity should be arranged densely such that subpixels of the same luminance rank (e.g., subpixels with the highest luminance, among other things) alternate one after another.

Let us see if the first requirement is satisfied. In the example shown in FIGS. 14A and 14B, each pixel consists of two subpixels with mutually different luminances. Specifically, in FIG. 14A, the pixel at the intersection of the $n^{th}$ row and the $m^{th}$ column consists of a high-luminance subpixel labeled as "b (bright)" and a low-luminance subpixel labeled as "d (dark)". Therefore, the first requirement is satisfied.

Next, the second requirement will be discussed. The liquid crystal display device of this preferred embodiment alternately shows two display states having mutually different drive states at regular intervals. Comparing FIGS. 14A and 14B showing the drive states corresponding to the two display states to each other, it can be seen that both high-luminance subpixels and low-luminance subpixels remain in the same locations. That is why the second requirement is also satisfied.

Let's turn to the third requirement next. In FIGS. 14A and 14B, subpixels of two different luminance ranks, i.e., subpixels labeled as "b (bright)" and subpixels labeled as "d (dark)", are arranged in a checkered pattern. When the liquid crystal display device of this preferred embodiment was actually operated, no defects such as a decrease in resolution due to the use of those subpixels with different luminances were visible to the naked eye. Thus, the third requirement is satisfied.

Next is the fourth requirement. In FIGS. 14A and 14B, pixels of opposite polarities are arranged on a pixel-by-pixel basis in a checkered pattern. Specifically, in FIG. 14A, the pixel at the intersection of the $(n+2)^{th}$ row and the $(m+2)^{th}$ column is a "+" pixel. From this pixel, the polarities changes every pixel from "+" into "−", and vice versa, both in the row direction and in the column direction alike. Also, in a liquid crystal display device that does not satisfy the fourth requirement, flickering should be seen on the screen when the pixels switch their drive polarities between "+" and "−". When the liquid crystal display device of this preferred embodiment was operated, however, no flickering was seen to the eye. That is why the fourth requirement is also satisfied.

And let's focus on the fifth requirement. In FIGS. 14A and 14B, the drive polarities of subpixels of the same luminance rank invert every two rows of subpixels, i.e., every row of pixels. Specifically, in the $(n\_B)^{th}$ row in FIG. 14A, the subpixels of the $(m+1)^{th}$, $(m+3)^{th}$, and $(m+5)^{th}$ columns have the luminance ranking sign "b (bright)" and their polarity inversion sign is "–". In the (n+1_A)$^{th}$ row right under the (n_B)$^{th}$ row, the subpixels of the m$^{th}$, (m+2)$^{th}$, and (m+4)$^{th}$ columns have the luminance ranking sign "b (bright)" and their polarity inversion sign is "–". In the (n+1_B)$^{th}$ row under the (n+1_A)$^{th}$ row, the subpixels of the (m+1)$^{th}$, (m+3)$^{th}$, and (M+5)$^{th}$ columns have the luminance ranking sign "b (bright)" and their polarity inversion sign is "+". And in the (n+2_A)$^{th}$ row under the (n+1_B)$^{th}$ row, the subpixels of the m$^{th}$, (m+2)$^{th}$, and (m+4)$^{th}$ columns have the luminance ranking sign "b (Bright)" and their polarity inversion sign is "+". Also, in a liquid crystal display device that does not satisfy the fifth requirement, flickering should be seen on the screen when the pixels switch their drive polarities between "+" and "–". When this liquid crystal display device was operated, however, no flickering was seen to the eye. That is why the fifth requirement is also satisfied.

When the present inventors monitored the image on the liquid crystal display device of the preferred embodiment described above with the amplitude VCSpp of the CS voltage varied, we found the viewing angle characteristics improve. Specifically, as the amplitude VCSpp of the CS voltage was increased from 0 V (which is a voltage to be applied to a typical liquid crystal display device that does not perform the area ratio gray scale display operation), the excessively high contrast ratio on the screen when the image was viewed obliquely could be reduced. However, when the VCSpp value was further increased, decrease in contrast ratio on the screen and other problems occurred. That is why the VCSpp value needs to be set within such a range as to improve the viewing angle characteristics sufficiently without causing those problems. Specifically, although the viewing angle characteristics seemed to improve slightly differently depending on the specific image to present, the best improvement was achieved when VCSpp was set such that the VLCaddpp value would be 0.5 to 2 times as high as the threshold voltage of the liquid crystal display device in a typical drive mode (in which VCSpp was 0V).

To sum up, the liquid crystal display device with Type I arrangement improves the viewing angle characteristics by conducting a multi-pixel display operation with an oscillating voltage applied to the storage capacitor counter electrodes. In this case, one oscillation period of the oscillating voltage applied to the storage capacitor counter electrodes can be twice as long as one horizontal scanning period. Nevertheless, such a multi-pixel display operation can also be performed easily even on a large-screen LCD including CS bus lines with high load capacitance and resistance, a high-resolution LCD with a short horizontal scanning period, or a high-speed-drive LCD with shortened vertical and horizontal scanning periods.

In specific examples of the preferred embodiment described above, the number (of types) of electrically independent CS trunks is supposed to be either four or two. However, in a liquid crystal display device with Type I arrangement according to the present invention, the number of (types of) electrically independent CS trunks does not have to be two or four but may be three, five, or six or more. Nonetheless, the number L of electrically independent CS trunks is preferably an even number. This is because if the electrically independent CS trunks consist of CS trunk pairs, each supplying oscillating voltages, of which the phases are different from each other by 180 degrees (i.e., if L is an even number), then the amount of current flowing through the counter electrode of the liquid crystal capacitor can be minimized as described above.

The following Tables 5 and 6 show the relation between the CS trunks and their associated gate bus lines and CS bus lines in a situation where the number L of electrically independent CS trunks is six and in a situation where the number L is eight, respectively. Also, if L is an even number, the relations between the CS trunks and their associated gate bus lines and CS bus lines are roughly classifiable into a situation where L/2 is an odd number (i.e., L=2, 6, 10, 14, and so on) and a situation where L/2 is an even number (i.e., L=4, 8, 12, 16, and so on). A general connection pattern for a situation where L/2 is an odd number will be described just after Table 5, while a general connection pattern for a situation where L/2 is an even number will be described right after Table 6, in which L=8.

TABLE 5

| CS trunk | Corresponding gate busline | Corresponding CS busline |
|---|---|---|
| CSVtypeC1 | GBL_n, GBL_n + 3, GBL_n + 6, GBL_n + 9, GBL_n + 12, . . . [GBL_n + 3 · k (k = 0, 1, 2, 3, . . . )] | CSBL_A_n, CSBL_A_n + 3, CSBL_A_n + 6, CSBL_A_n + 9, CSBL_A_n + 12, . . . [CSBL_A_n + 3 · k, (k = 0, 1, 2, 3, . . . )] |
| CSVtypeC2 | GBL_n, GBL_n + 3, GBL_n + 6, GBL_n + 9, GBL_n + 12, . . . [GBL_n + 3 · k (k = 0, 1, 2, 3, . . . )] | CSBL_B_n, CSBL_B_n + 3, CSBL_B_n + 6, CSBL_B_n + 9, CSBL_B_n + 12, . . . [CSBL_B_n + 3 · k (k = 0, 1, 2, 3, . . . )] |
| CSVtypeC3 | GBL_n + 1, GBL_n + 4, GBL_n + 7, GBL_n + 10, GBL_n + 13, . . . [GBL_n + 1 + 3 · k (k = 0, 1, 2, 3, . . . )] | CSBL_A_n + 1, CSBL_A_n + 4, CSBL_A_n + 7, CSBL_A_n + 10, CSBL_A_n + 13, . . . [CSBL_A_n + 1 + 3 · k (k = 0, 1, 2, 3, . . . )] |
| CSVtypeC4 | GBL_n + 1, GBL_n + 4, GBL_n + 7, GBL_n + 10, GBL_n + 13, . . . [GBL_n + 1 + 3 · k (k = 0, 1, 2, 3, . . . )] | CSBL_B_n + 1, CSBL_B_n + 4, CSBL_B_n + 7, CSBL_B_n + 10, CSBL_B_n + 13, . . . [CSBL_B_n + 1 + 3 · k (k = 0, 1, 2, 3, . . . )] |
| CSVtypeC5 | GBL_n + 2, GBL_n + 5, GBL_n + 8, GBL_n + 11, GBL_n + 14, . . . [GBL_n + 2 + 3 · k (k = 0, 1, 2, 3, . . . )] | CSBL_A_n + 2, CSBL_A_n + 5, CSBL_A_n + 8, CSBL_A_n + 11, CSBL_A_n + 14, . . . [CSBL_A_n + 2 + 3 · k (k = 0, 1, 2, 3, . . . )] |
| CSVtypeC6 | GBL_n + 2, GBL_n + 5, GBL_n + 8, GBL_n + 11, GBL_n + 14, . . . [GBL_n + 2 + 3 · k (k = 0, 1, 2, 3, . . . )] | CSBL_B_n + 2, CSBL_B_n + 5, CSBL_B_n + 8, CSBL_B_n + 11, CSBL_B_n + 14, . . . [CSBL_B_n + 2 + 3 · k (k = 0, 1, 2, 3, . . . )] |

In a situation where a half of the number L of electrically independent storage capacitor trunks is an odd number (i.e., when L=2, 6, 10, and so on), if the storage capacitor line, connected to the storage capacitor counter electrode of the first subpixel of a pixel, located at the intersection between an arbitrary column and an $n^{th}$ row in a matrix of pixels that are arranged in columns and rows, is identified by CSBL_A_n; if the storage capacitor line, connected to the storage capacitor counter electrode of the second subpixel of that pixel, is identified by CSBL_B_n; and if k is a natural number (including zero), then the connection pattern may be defined such that:

CSBL_A_n+(L/2)·k is connected to the first storage capacitor trunk,

CSBL_B_n+(L/2)·k is connected to the second storage capacitor trunk,

CSBL_A_n+1+(L/2)·k is connected to the third storage capacitor trunk,

CSBL_B_n+1+(L/2)·k is connected to the fourth storage capacitor trunk,

CSBL_A_n+2+(L/2)·k is connected to the fifth storage capacitor trunk,

CSBL_B_n+2+(L/2)·k is connected to the sixth storage capacitor trunk, similar connection patterns are repeated after that, and then CSBL_A_n+(L/2)−2+(L/2)·k is connected to the $(L-3)^{th}$ storage capacitor trunk, CSBL_B_n+(L/2)−2+(L/2)·k is connected to the $(L-2)^{th}$ storage capacitor trunk, CSBL_A_n+(L/2)−1+(L/2)·k is connected to the $(L-1)^{th}$ storage capacitor trunk, and CSBL_B_n+(L/2)−1+(L/2)·k is connected to the $L^{th}$ storage capacitor trunk.

TABLE 6

| CS trunk | Corresponding gate busline | Corresponding CS busline |
|---|---|---|
| CSVtypeD1 | GBL_n, GBL_n + 4, GBL_n + 8, GBL_n + 12, GBL_n + 16, . . . [GBL_n + 4 · k (k = 0, 1, 2, 3, . . . )] | CSBL_A_n, CSBL_B_n + 4, CSBL_A_n + 8, CSBL_B_n + 12, CSBL_A_n + 16, . . . [CSBL_A_n + 8 · k, CSBL_B_n + 4 + 8 · k, (k = 0, 1, 2, 3, . . . )] |
| CSVtypeD2 | GBL_n, GBL_n + 4, GBL_n + 8, GBL_n + 12, GBL_n + 16, . . . [GBL_n + 4 · k (k = 0, 1, 2, 3, . . . )] | CSBL_B_n, CSBL_A_n + 4, CSBL_B_n + 8, CSBL_A_n + 12, CSBL_B_n + 16, . . . [CSBL_B_n + 8 · k, CSBL_A_n + 4 + 8 · k (k = 0, 1, 2, 3, . . . )] |
| CSVtypeD3 | GBL_n + 1, GBL_n + 5, GBL_n + 9, GBL_n + 13, GBL_n + 17, . . . [GBL_n + 1 + 4 · k (k = 0, 1, 2, 3, . . . )] | CSBL_A_n + 1, CSBL_B_n + 5, CSBL_A_n + 9, CSBL_B_n + 13, CSBL_A_n + 17, . . . [CSBL_A_n + 1 + 8 · k, CSBL_B_n + 5 + 8 · k, (k = 0, 1, 2, 3, . . . )] |
| CSVtypeD4 | GBL_n + 1, GBL_n + 5, GBL_n + 9, GBL_n + 13, GBL_n + 17, . . . [GBL_n + 1 + 4 · k (k = 0, 1, 2, 3, . . . )] | CSBL_B_n + 1, CSBL_A_n + 5, CSBL_B_n + 9, CSBL_A_n + 13, CSBL_B_n + 17, . . . [CSBL_B_n + 1 + 8 · k, CSBL_A_n + 5 + 8 · k (k = 0, 1, 2, 3, . . . )] |
| CSVtypeD5 | GBL_n + 2, GBL_n + 6, GBL_n + 10, GBL_n + 14, GBL_n + 18, . . . [GBL_n + 2 + 4 · k (k = 0, 1, 2, 3, . . . )] | CSBL_A_n + 2, CSBL_B_n + 6, CSBL_A_n + 10, CSBL_B_n + 14, CSBL_A_n + 18, . . . [CSBL_A_n + 2 + 8 · k, CSBL_B_n + 6 + 8 · k (k = 0, 1, 2, 3, . . . )] |
| CSVtypeD6 | GBL_n + 2, GBL_n + 6, GBL_n + 10, GBL_n + 14, GBL_n + 18, . . . [GBL_n + 2 + 4 · k (k = 0, 1, 2, 3, . . . )] | CSBL_B_n + 2, CSBL_A_n + 6, CSBL_B_n + 10, CSBL_A_n + 14, CSBL_B_n + 18, . . . [CSBL_B_n + 2 + 8 · k, CSBL_A_n + 6 + 8 · k (k = 0, 1, 2, 3, . . . )] |
| CSVtypeD7 | GBL_n + 3, GBL_n + 7, GBL_n + 11, GBL_n + 15, GBL_n + 19, . . . [GBL_n + 3 + 4 · k (k = 0, 1, 2, 3, . . . )] | CSBL_A_n + 3, CSBL_B_n + 7, CSBL_A_n + 11, CSBL_B_n + 15, CSBL_A_n + 19, . . . [CSBL_A_n + 3 + 8 · k, CSBL_B_n + 7 + 8 · k (k = 0, 1, 2, 3, . . . )] |
| CSVtypeC8 | GBL_n + 3, GBL_n + 7, GBL_n + 11, GBL_n + 15, GBL_n + 19, . . . [GBL_n + 3 + 4 · k (k = 0, 1, 2, 3, . . . )] | CSBL_B_n + 3, CSBL_A_n + 7, CSBL_B_n + 11, CSBL_A_n + 15, CSBL_B_n + 19, . . . [CSBL_B_n + 3 + 8 · k, CSBL_A_n + 7 + 8 · k (k = 0, 1, 2, 3, . . . )] |

On the other hand, in a situation where a half of the number L of electrically independent storage capacitor trunks is an even number (i.e., when L=4, 8, 12, and so on), if the storage capacitor line, connected to the storage capacitor counter electrode of the first subpixel of a pixel, located at the intersection between an arbitrary column and an $n^{th}$ row in a matrix of pixels that are arranged in columns and rows, is identified by CSBL_A_n; if the storage capacitor line, connected to the storage capacitor counter electrode of the second subpixel of that pixel, is identified by CSBL_B_n; and if k is a natural number (including zero), then the connection pattern may be defined such that:

CSBL_A_n+L·k and CSBL_B_n+(L/2)+L·k are connected to the first storage capacitor trunk, CSBL_B_n+L·k and CSBL_A_n+(L/2)+L·k are connected to the second storage capacitor trunk, CSBL_A_n+1+L·k and CSBL_B_n+(L/2)+1+L·k are connected to the third storage capacitor trunk, CSBL_B_n+1+L·k and CSBL_A_n+(L/2)+1+L·k are connected to the fourth storage capacitor trunk, CSBL_A_n+2+L·k and CSBL_B_n+(L/2)+2+L·k are connected to the fifth storage capacitor trunk, CSBL_B_n+2+L·k and CSBL_A_n+(L/2)+2+L·k are connected to the sixth storage capacitor trunk, CSBL_A_n+3+L·k and CSBL_B_n+(L/2)+3+L·k are connected to the seventh storage capacitor trunk, CSBL_B_n+3+L·k and CSBL_A_n+(L/2)+3+L·k are connected to the eighth storage capacitor trunk, similar connection patterns are repeated after that, and then CSBL_A_n+(L/2)−2+L·k and CSBL_B_n+L−2+L·k are connected to the $(L-3)^{th}$ storage capacitor trunk, CSBL_B_n+(L/2)−2+L·k and CSBL_A_n+L−2+L·k are connected to the $(L-2)^{th}$ storage capacitor trunk, CSBL_A_n+(L/2)−1+L·k and CSBL_B_n+L−1+L·k are connected to the $(L-1)^{th}$ storage capacitor trunk, and CSBL_B_n+(L/2)−1+L·k and CSBL_A_n+L−1+L·k are connected to the $L^{th}$ storage capacitor trunk.

As described above, according to the present invention, a multi-pixel liquid crystal display device that can significantly reduce the excessive high contrast ratio on the screen at an oblique viewing angle is easily applicable to a large-screen LCD, a high-resolution LCD, or a high-speed-drive LCD with shortened vertical and horizontal scanning periods. The reason is as follows. Specifically, if a multi-pixel LCD that applies an oscillating voltage to the CS bus lines had a big size, then the load capacitance or resistance on CS bus lines would normally increase so much as to blunt the waveform of the CS bus line voltage. Or if the resolution or drive rate of an LCD were increased, then the CS bus line voltage would have a shorter period of oscillation, thus possibly causing a significant effect of waveform blunting. Also, as the effective value of VLCadd would vary noticeably on the monitor screen, the luminance on the screen would become apparently uneven. However, these problems could be overcome by extending one oscillation period of the oscillating voltage applied to the CS bus lines.

In the liquid crystal display device disclosed in Patent Document No. 5, when an electrically common CS bus line is used for two adjacent subpixels of two pixels belonging to two adjacent rows and two types of electrically independent CS trunks are arranged, one oscillation period of the CS bus line voltage is 1H. On the other hand, in the liquid crystal display device with Type I arrangement according to the present invention, when electrically independent CS bus lines are used for two adjacent subpixels of two pixels belonging to two adjacent rows and two types of electrically independent CS trunks are arranged, one oscillation period of the CS bus line voltage can be 2H. Meanwhile, if four types of electrically independent CS trunks are arranged, one oscillation period of the CS bus line voltage can be 4H.

According to the configuration or drive waveforms of the liquid crystal display device with Type I arrangement of the present invention, if electrically independent CS trunks are used for two adjacent subpixels of two pixels belonging to two adjacent rows and if the number of types of the electrically independent CS trunks is L, then one oscillation period of the CS bus line voltage can be L times as long as one horizontal scanning period (i.e., one oscillation period=LH).

Hereinafter, a liquid crystal display device with a Type II arrangement according to another preferred embodiment of the present invention and its driving method will be described.

As described above, the liquid crystal display device with Type I arrangement of the present invention uses L different sets of electrically independent storage capacitor counter electrodes (i.e., the number L of electrically independent CS trunks), thereby extending one oscillation period of the oscillating voltage applied to the storage capacitor counter electrodes to L times as long as one horizontal scanning period (H). As a result, the multi-pixel display operation can also be performed even on a big, high-resolution LCD, of which the storage capacitor counter electrode lines make a heavy electrical load.

However, the storage capacitor counter electrodes associated with the respective subpixels of two pixels that are adjacent to each other in the column direction (i.e., two pixels belonging to two adjacent rows) need to be electrically independent of each other (see FIG. 9, for example). That is to say, since two CS bus lines need to be provided for each pixel, the pixel aperture ratio decreases. More specifically, as shown in FIG. 15(*a*), if CS bus lines for respective subpixels are arranged so as to run through the respective centers of those subpixels, then an opaque layer BM1 needs to be arranged to prevent light from leaking through the gap between the pixels that are adjacent to each other in the column direction. For that reason, the areas covered with the two CS bus lines and the opaque layer BM1 cannot contribute to the display operation, thus causing a decrease in pixel aperture ratio, which is a problem.

On the other hand, in the liquid crystal display device with Type II arrangement of this preferred embodiment, two adjacent subpixels of two different pixels that are adjacent to each other in the column direction have their associated storage capacitor counter electrodes connected to a common CS bus line, which is arranged between those two pixels that are adjacent to each other in the column direction as shown in FIG. 15(*b*), thereby making the CS bus line function as an opaque layer, too. As a result, compared to the arrangement shown in FIG. 15(*a*), not just can the number of CS bus lines be reduced but also can the pixel aperture ratio be increased by removing the opaque layer BM1 that needs to be provided separately in FIG. 15(*b*).

Also, in the liquid crystal display device with Type I arrangement of the preferred embodiment described above, if the number of electrically independent CS trunks is L (where L is an even number), one oscillation period of the oscillating voltage is supposed to be K·L times as long as one horizontal scanning period. On the other hand, in the liquid crystal display device with Type II arrangement according to this preferred embodiment of the present invention, if the number of electrically independent CS trunks is L (where L is an even number), one oscillation period of the oscillating voltage can be 2·K·L (where K is a positive integer) times as long as one horizontal scanning period.

Thus, the liquid crystal display device with Type II arrangement according to this preferred embodiment of the present invention can be used as a big, high-resolution LCD more effectively than the counterpart with Type I arrangement of the preferred embodiment described above.

Hereinafter, a specific preferred embodiment of Type II arrangement of the present invention will be described. In the following description, a liquid crystal display device that realizes the drive states shown in FIGS. 16A and 16B will be described as an example. FIGS. 16A and 16B respectively correspond to FIGS. 4A and 4B that have already been referred to. However, in the drive state shown in FIG. 16A, the directions of the electric fields applied to the respective portions of the liquid crystal layer are opposite to those shown in FIG. 4A. The same statement applies to the electric field directions shown in FIGS. 4B and 16B, too. As an example, a configuration for realizing the drive state shown FIG. 16A will be described. To realize the drive state shown FIG. 16B, the polarity of the voltage applied to the source bus lines and that of the storage capacitor voltages may be inverse of those shown in FIG. 16A as already described with reference to FIGS. 3A and 3B. As a result, the first and second subpixels (represented by "b (bright)" or "d (dark)" in the drawings) can be fixed at their original locations with the display polarities ("+" or "−" in the drawings) of the pixels inverted. However, the present invention is in no way limited to this specific preferred embodiment. Alternatively, only the voltage applied to the source bus lines may be inverted. In that case, since the first and second subpixels (represented by "b (bright)" or "d (dark)" in the drawings) will change their locations as the polarities of the pixels are inverted. Consequently, the color bleeding and other problems that could occur during a grayscale display operation if the pixel locations are fixed as described above can be settled.

Also, in the liquid crystal display device of this preferred embodiment, two pixels adjacent to each other in the column direction (belonging to the $n^{th}$ row and $(n+1)^{th}$ row, respectively) share a common CS bus line CSBL, which is arranged between the subpixel electrode 18*b* of the pixel on the $n^{th}$ row and the subpixel electrode 18*a* of the pixel on the $(n+1)^{th}$ row to supply a storage capacitor counter voltage (oscillating voltage) to the storage capacitors of the subpixels associated with these subpixel electrodes. This CS bus line CSBL also serves as an opaque layer to block passage of light between the pixels on the $n^{th}$ and $(n+1)^{th}$ rows. Optionally, this CS bus line CSBL may be arranged so as to partially overlap with the subpixel electrodes 18*a* and 18*b* with an insulating film interposed between them.

In each of the liquid crystal display devices to be described as exemplary preferred embodiments, if one oscillation period of the oscillating voltage applied to CS bus lines is longer than one horizontal scanning period and if the number of electrically independent CS trunks is L (where L is an even number), one oscillation period of the oscillating voltage is 2·K·L times as long as one horizontal scanning period (where K is a positive integer) That is to say, in the liquid crystal display device with Type I arrangement of the preferred embodiment of the present invention described above, one oscillation period of the oscillating voltage can be no greater than K·L times as long as one horizontal scanning period. On the other hand, in the liquid crystal display device with Type II arrangement of this preferred embodiment of the present invention, one oscillation period can be further extended by the factor of two.

In the area ratio gray scale display (i.e., the multi-pixel drive) operation performed by the liquid crystal display device of the present invention, each pixel is split into two subpixels, and mutually different oscillating voltages (i.e., storage capacitor counter voltages) are applied to the storage capacitors connected to the respective subpixels, thereby producing a bright subpixel and dark subpixel. The bright subpixel may be produced if the first change of the oscillating voltages after its TFT has been turned OFF is a voltage increase, for example. Conversely, the dark subpixel may be produced if the first change of the oscillating voltages after its TFT has been turned OFF is a voltage decrease. That is why if CS bus lines for subpixels, of which the oscillating voltage should be increased after their TFTs have been turned OFF, are connected to one common CS trunk and CS bus lines for subpixels, of which the oscillating voltage should be decreased after their TFTs have been turned OFF, are connected to another common CS trunk, then the number of CS trunks can be reduced. K is a parameter that represents how effectively one period can be extended according to the connection pattern between the CS bus lines and CS trunks.

The greater the K value, the longer one period of the oscillating voltage can be. However, K should not be too large. The reason is as follows.

As the K value is increased, the number of subpixels connected to a common CS trunk also increases. Those subpixels are connected to mutually different TFTs, which are turned OFF at respectively different timings (at intervals that are multiples of 1H). That is why an interval between a point in time when a TFT associated with one of the subpixels connected to a common CS trunk is turned OFF and a point in time when its oscillating voltage increases (or decreases) for the first time is different from an interval between a point in time when a TFT associated with another subpixel is turned OFF and a point in time when its oscillating voltage increases (or decreases) for the first time. This time difference increases as the K value increases (i.e., as the number of CS bus lines connected to the common CS trunk increases). As a result, a line defect with significantly different luminance could be seen on the screen. To eliminate such a line defect, the time difference is preferably not more than 5% of the number of scan lines (i.e., the number of pixel rows) as a rule. In an XGA, for example, the K value is preferably set such that the time difference is 38H or less, which is 5% or less of 768 rows. On the other hand, the lower limit of one period of the oscillating voltage should be set so as not to cause uneven luminances due to waveform blunting as has already been described with reference to FIG. 8. For example, in a 45-inch XGA, no waveform blunting problem should occur if one oscillation period is at least as long as 12H. In view of these considerations, when the present invention is applied to a 45-inch LCD TV monitor, for example, if K is 1 or 2, L is 6, 8, 10 or 12, and if one period of the oscillating voltage is defined within the range of 12H to 48H, the liquid crystal display device with the Type II arrangement realizes high-quality display with no uneven luminances. The number L of electrically independent CS trunks should be determined with the number of oscillating voltage sources (or power supplies to drive the storage capacitor counter electrodes), the wiring pattern on the panel (i.e., on the TFT substrate), and other factors taken into consideration.

Hereinafter, a liquid crystal display device with Type II arrangement according to a preferred embodiment of the present invention and its driving method will be described in detail by way of an illustrative example in which K=1 and L=4, 6, 8, 10, or 12 and another example in which K=2 and L=4 or 6. To avoid redundancy of description with the foregoing preferred embodiments, the following description will be focused on the connection patterns between the CS bus lines and the CS trunks.

Pattern in which K=1, L=4, and Oscillation Period=8H

The matrix arrangement (including the connection pattern of CS bus lines) of the liquid crystal display device with Type II arrangement according to this preferred embodiment is shown in FIG. 17 and the waveforms of signals used to drive this liquid crystal display device are shown in FIG. 18. Also, the connection pattern adopted in FIG. 17 is shown in the following Table 7. By applying an oscillating voltage to the CS bus lines at the timings shown in FIG. 18 in the matrix arrangement shown in FIG. 17, the drive state shown in FIG. 15A is realized.

In FIG. 17, each CS bus line is connected to any of the four CS trunks that are arranged at each of the right and left ends of the paper. Therefore, the number (of types) of electrically independent CS bus lines is four (i.e., L=4). It can also be seen from FIG. 17 that a certain rule is set on the connection pattern between the CS bus lines and CS trunks. The rule is that the same connection pattern should recur regularly every eight CS bus lines in FIG. 17. Therefore, K=1 (=8/(2 L)).

TABLE 7

L = 4, K = 1

| CS trunk | CS busline connected to CS trunk |
|---|---|
| M1a | CSBL_(n − 1) B, (n) A<br>CSBL_(n + 4) B, (n + 5) A |
| M2a | CSBL_(n) B, (n + 1) A<br>CSBL_(n + 3) B, (n + 4) A |
| M3a | CSBL_(n + 1) B, (n + 2) A<br>CSBL_(n + 6) B, (n + 7) A |

TABLE 7-continued

| | L = 4, K = 1 |
|---|---|
| CS trunk | CS busline connected to CS trunk |
| M4a | CSBL_(n + 2) B, (n + 3) A<br>CSBL_(n + 5) B, (n + 6) A |

where n = 1, 9, 17, . . .

As can be seen from this Table 7, the CS bus lines shown in FIG. 17 are classified into the type that satisfies, for any p, the relations:

$$CSBL\_(p)B,(p+1)A \text{ and}$$

$$CSBL\_(p+5)B,(p+6)A$$

(such a type will be referred to herein as "Type α") and the type that satisfies, for any p, the relations:

$$CSBL\_(p+1)B,(p+2)A \text{ and}$$

$$CSBL\_(p+4)B,(p+5)A$$

(such a type will be referred to herein as "Type β"). Specifically, the CS bus lines connected to the CS trunks M1*a* and M3*a* are Type α, while the CS bus lines connected to the CS trunks M2*a* and M4*a* are Type β.

Eight consecutive CS bus lines that form one complete cycle of connection pattern consist of four Type α bus lines (two connected to M1*a* and two connected to M3*a*) and four Type β bus lines (two connected to M2*a* and two connected to M4*a*).

If the parameters L and K mentioned above are used, it can be seen that a set of CS bus lines, which are represented, for any p, by:

$$CSBL\_(p+2\cdot(K-1))B,(p+2\cdot(K-1)+1)A \text{ and}$$

$$CSBL\_(p+2\cdot(K-1)+K\cdot L+1)B,(p+2\cdot(K-1)+K\cdot L+2)A$$

or $$CSBL\_(p+2\cdot(K-1)+1)B,(p+2\cdot(K-1)+2)A$$

$$CSBL\_(p+2\cdot(K-1)+K\cdot L)B,(p+2-(K-1)+K\cdot L+1)A$$

should include electrically equivalent CS bus lines, where p=1, 3, 5, etc. or p=0, 2, 4, etc. This condition is set because there are no CS bus lines belonging to both Type α and Type β.

It can be seen from FIG. 18 that in this case, the oscillating voltage applied to the CS bus lines has an oscillation period of 8H, i.e., 2·K·L times as long as one horizontal scanning period.

Pattern in which K=1, L=6, and Oscillation Period=12H

Next, a connection pattern for a situation where the number (of types) of electrically independent CS trunks is six is shown in FIG. 19 and the drive waveforms in that situation are shown in FIG. 20. Also, the connection pattern shown in FIG. 19 is summarized in the following Table 8:

In FIG. 20, each CS bus line is connected to any of the six CS trunks that are arranged at each of the right and left ends of the paper. Therefore, the number (of types) of electrically independent CS bus lines is six (i.e., L=6).

It can also be seen from FIG. 19 that a certain rule is set on the connection pattern between the CS bus lines and CS trunks. The rule is that the same connection pattern should recur regularly every 12 CS bus lines in FIG. 19. Therefore, K=1 (=12/(2 L)).

TABLE 8

| | L = 6, K = 1 |
|---|---|
| CS trunk | CS busline connected to CS trunk |
| M1b | CSBL_(n − 1) B, (n) A<br>CSBL_(n + 6) B, (n + 7) A |
| M2b | CSBL_(n) B, (n + 1) A<br>CSBL_(n + 5) B, (n + 6) A |
| M3b | CSBL_(n + 1) B, (n + 2) A<br>CSBL_(n + 8) B, (n + 9) A |
| M4b | CSBL_(n + 2) B, (n + 3) A<br>CSBL_(n + 7) B, (n + 8) A |
| M5b | CSBL_(n + 3) B, (n + 4) A<br>CSBL_(n + 10) B, (n + 11) A |
| M6b | CSBL_(n + 4) B, (n + 5) A<br>CSBL_(n + 9) B, (n + 10) A |

where n = 1, 13, 25, . . .

As can be seen from Table 8, the CS bus lines are connected in FIG. 19 such that one of the following two sets of CS bus lines:

$$CSBL\_(p)B,(p+1)A \text{ and}$$

$$CSBL\_(p+7)B,(p+8)A$$

or $$CSBL\_(p+1)B,(p+2)A$$

$$CSBL\_(p+6)B,(p+7)A$$

where p=1, 3, 5, etc. or p=0, 2, 4, etc.
consists of electrically equivalent CS bus lines.

If the parameters L and K mentioned above are used, it can be seen that a set of CS bus lines, which are represented, for any p, by:

$$CSBL\_(p+2\cdot(K-1))B,(p+2\cdot(K-1)+1)A \text{ and}$$

$$CSBL\_(p+2\cdot(K-1)+K\cdot L+1)B,(p+2\cdot(K-1)+K\cdot L+2)A$$

or $$CSBL\_(p+2\cdot(K-1)+1)B,(p+2\cdot(K-1)+2)A \text{ and}$$

$$CSBL\_(p+2\cdot(K-1)+K\cdot L)B,(p+2\cdot(K-1)+K\cdot L+1)A$$

should include electrically equivalent CS bus lines, where p=1, 3, 5, etc. or p=0, 2, 4, etc.

It can be seen from FIG. 20 that in this case, the oscillating voltage applied to the CS bus lines has an oscillation period of 12H, i.e., 2·K·L times as long as one horizontal scanning period.

Pattern in which K=1, L=8, and Oscillation Period=16H

Next, a connection pattern for a situation where the number (of types) of electrically independent CS bus lines is eight is shown in FIG. 21 and the drive waveforms in that situation are shown in FIG. 22. Also, the connection pattern shown in FIG. 21 is summarized in the following Table 9.

In FIG. 21, each CS bus line is connected to any of the eight CS trunks that are arranged at the left end of the paper. Therefore, the number (of types) of electrically independent CS bus lines is eight (i.e., L=8).

It can also be seen from FIG. 21 that a certain rule is set on the connection pattern between the CS bus lines and CS trunks. The rule is that the same connection pattern should recur regularly every 16 CS bus lines in FIG. 21. Therefore, K=1 (=16/(2 L)).

TABLE 9

| CS trunk | CS busline connected to CS trunk L = 8, K = 1 |
|---|---|
| M1c | CSBL_(n − 1) B, (n) A<br>CSBL_(n + 8) B, (n + 9) A |
| M2c | CSBL_(n) B, (n + 1) A<br>CSBL_(n + 7) B, (n + 8) A |
| M3c | CSBL_(n + 1) B, (n + 2) A<br>CSBL_(n + 10) B, (n + 11) A |
| M4c | CSBL_(n + 2) B, (n + 3) A<br>CSBL_(n + 9) B, (n + 10) A |
| M5c | CSBL_(n + 3) B, (n + 4) A<br>CSBL_(n + 12) B, (n + 13) A |
| M6c | CSBL_(n + 4) B, (n + 5) A<br>CSBL_(n + 11) B, (n + 12) A |
| M7c | CSBL_(n + 5) B, (n + 6) A<br>CSBL_(n + 14) B, (n + 15) A |
| M8c | CSBL_(n + 6) B, (n + 7) A<br>CSBL_(n + 13) B, (n + 14) A |

where n = 1, 17, 33, . . .

As can be seen from Table 9, the CS bus lines are connected in FIG. 21 such that one of the following two sets of CS bus lines:

$$CSBL\_(p)B,(p+1)A \text{ and}$$

$$CSBL\_(p+9)B,(p+10)A$$

or $$CSBL\_(p+1)B,(p+2)A \text{ and}$$

$$CSBL\_(p+8)B,(p+9)A$$

where p=1, 3, 5, etc. or p=0, 2, 4, etc.
consists of electrically equivalent CS bus lines.

If the parameters L and K mentioned above are used, it can be seen that a set of CS bus lines, which are represented, for any p, by:

$$CSBL\_(p+2\cdot(K-1))B,(p+2\cdot(K-1)+1)A \text{ and}$$

$$CSBL\_(p+2\cdot(K-1)+K\cdot L+1)B,(p+2\cdot(K-1)+K\cdot L+2)A$$

or $$CSBL\_(p+2\cdot(K-1)+1)B,(p+2\cdot(K-1)+2)A \text{ and}$$

$$CSBL\_(p+2\cdot(K-1)+K\cdot L)B,(p+2\cdot(K-1)+K\cdot L+1)A$$

should include electrically equivalent CS bus lines, where p=1, 3, 5, etc. or p=0, 2, 4, etc.

It can be seen from FIG. 22 that in this case, the oscillating voltage applied to the CS bus lines has an oscillation period of 16H, i.e., 2·K·L times as long as one horizontal scanning period.

Pattern in which K=1, L=10, and Oscillation Period=20H

Next, a connection pattern for a situation where the number (of types) of electrically independent CS bus lines is 10 is shown in FIG. 23 and the drive waveforms in that situation are shown in FIG. 24. Also, the connection pattern shown in FIG. 23 is summarized in the following Table 10.

In FIG. 23, each CS bus line is connected to any of the 10 CS trunks that are arranged at both the right and left ends of the paper. Therefore, the number (of types) of electrically independent CS bus lines is 10 (i.e., L=10). It can also be seen from FIG. 23 that a certain rule is set on the connection pattern between the CS bus lines and CS trunks. The rule is that the same connection pattern should recur regularly every 20 CS bus lines in FIG. 23. Therefore, K=1 (=20/(2 L)).

TABLE 10

| CS trunk | CS busline connected to CS trunk L = 10, K = 1 |
|---|---|
| M1d | CSBL_(n − 1) B, (n) A<br>CSBL_(n + 10) B, (n + 11) A |
| M2d | CSBL_(n) B, (n + 1) A<br>CSBL_(n + 9) B, (n + 10) A |
| M3d | CSBL_(n + 1) B, (n + 2) A<br>CSBL_(n + 12) B, (n + 13) A |
| M4d | CSBL_(n + 2) B, (n + 3) A<br>CSBL_(n + 11) B, (n + 12) A |
| M5d | CSBL_(n + 3) B, (n + 4) A<br>CSBL_(n + 14) B, (n + 15) A |
| M6d | CSBL_(n + 4) B, (n + 5) A<br>CSBL_(n + 13) B, (n + 14) A |
| M7d | CSBL_(n + 5) B, (n + 6) A<br>CSBL_(n + 16) B, (n + 17) A |
| M8d | CSBL_(n + 6) B, (n + 7) A<br>CSBL_(n + 15) B, (n + 16) A |
| M9d | CSBL_(n + 7) B, (n + 6) A<br>CSBL_(n + 18) B, (n + 19) A |
| M10d | CSBL_(n + 8) B, (n + 7) A<br>CSBL_(n + 17) B, (n + 18) A |

where n = 1, 21, 41, . . .

As can be seen from Table 10, the CS bus lines are connected in FIG. 23 such that one of the following two sets of CS bus lines:

$$CSBL\_(p)B,(p+1)A \text{ and}$$

$$CSBL\_(p+11)B,(p+12)A$$

or $$CSBL\_(p+1)B,(p+2)A \text{ and}$$

$$CSBL\_(p+10)B,(p+11)A$$

where either p=1, 3, 5, etc. or p=0, 2, 4, etc.
consists of electrically equivalent CS bus lines.

If the parameters L and K mentioned above are used, it can be seen that a set of CS bus lines, which are represented, for any p, by:

$$CSBL\_(p+2\cdot(K-1))B,(p+2\cdot(K-1)+1)A \text{ and}$$

$$CSBL\_(p+2\cdot(K-1)+K\cdot L+1)B,(p+2\cdot(K-1)+K\cdot L+2)A$$

or $$CSBL\_(p+2\cdot(K-1)+1)B,(p+2\cdot(K-1)+2)A \text{ and}$$

$$CSBL\_(p+2\cdot(K-1)+K\cdot L)B,(p+2\cdot(K-1)+K\cdot L+1)A$$

should include electrically equivalent CS bus lines, where p=1, 3, 5, etc. or p=0, 2, 4, etc.

It can be seen from FIG. 24 that in this case, the oscillating voltage applied to the CS bus lines has an oscillation period of 20H, i.e., 2·K·L times as long as one horizontal scanning period.

Pattern in which K=1, L=12, and Oscillation Period=24H

Next, a connection pattern for a situation where the number (of types) of electrically independent CS bus lines is 12 is shown in FIG. 25 and the drive waveforms in that situation are shown in FIG. 26. Also, the connection pattern shown in FIG. 25 is summarized in the following Table 11.

In FIG. 25, each CS bus line is connected to any of the 12 CS trunks that are arranged at the left end of the paper. Therefore, the number (of types) of electrically independent CS bus lines is 12 (i.e., L=12). It can also be seen from FIG. 25 that a certain rule is set on the connection pattern between the CS bus lines and CS trunks. The rule is that the same connection pattern should recur regularly every 24 CS bus lines in FIG. 25. Therefore, K=1 (=24/(2 L))

TABLE 11

L = 12, K = 1

| CS trunk | CS busline connected to CS trunk |
|---|---|
| M1e | CSBL_(n − 1) B, (n) A |
| | CSBL_(n + 12) B, (n + 13) A |
| M2e | CSBL_(n) B, (n + 1) A |
| | CSBL_(n + 11) B, (n + 12) A |
| M3e | CSBL_(n + 1) B, (n + 2) A |
| | CSBL_(n + 14) B, (n + 15) A |
| M4e | CSBL_(n + 2) B, (n + 3) A |
| | CSBL_(n + 13) B, (n + 14) A |
| M5e | CSBL_(n + 3) B, (n + 4) A |
| | CSBL_(n + 16) B, (n + 17) A |
| M6e | CSBL_(n + 4) B, (n + 5) A |
| | CSBL_(n + 15) B, (n + 16) A |
| M7e | CSBL_(n + 5) B, (n + 6) A |
| | CSBL_(n + 18) B, (n + 19) A |
| M8e | CSBL_(n + 6) B, (n + 7) A |
| | CSBL_(n + 17) B, (n + 18) A |
| M9e | CSBL_(n + 7) B, (n + 6) A |
| | CSBL_(n + 20) B, (n + 21) A |
| M10e | CSBL_(n + 8) B, (n + 7) A |
| | CSBL_(n + 19) B, (n + 20) A |
| M11e | CSBL_(n + 9) B, (n + 10) A |
| | CSBL_(n + 22) B, (n + 23) A |
| M12e | CSBL_(n + 10) B, (n + 11) A |
| | CSBL_(n + 21) B, (n + 22) A |

where n = 1, 25, 49, . . .

As can be seen from Table 11, the CS bus lines are connected in FIG. 25 such that one of the following two sets of CS bus lines:

$$CSBL\_(p)B,(p+1)A \text{ and}$$

$$CSBL\_(p+13)B,(p+14)A$$

or $$CSBL\_(p+1)B,(p+2)A \text{ and}$$

$$CSBL\_(p+12)B,(p+13)A$$

where either p=1, 3, 5, etc. or p=0, 2, 4, etc. consists of electrically equivalent CS bus lines.

If the parameters L and K mentioned above are used, it can be seen that a set of CS bus lines, which are represented, for any p, by:

$$CSBL\_(p+2\cdot(K-1))B,(p+2\cdot(K-1)+1)A \text{ and}$$

$$CSBL\_(p+2\cdot(K-1)+K\cdot L+1)B,(p+2\cdot(K-1)+K\cdot L+2)A$$

or $$CSBL\_(p+2\cdot(K-1)+1)B,(p+2\cdot(K-1)+2)A \text{ and}$$

$$CSBL\_(p+2\cdot(K-1)+K\cdot L)B,(p+2\cdot(K-1)+K\cdot L+1)A$$

should include electrically equivalent CS bus lines, where p=1, 3, 5, etc. or p=0, 2, 4, etc.

It can be seen from FIG. 26 that in this case, the oscillating voltage applied to the CS bus lines has an oscillation period of 24H, i.e., 2·K·L times as long as one horizontal scanning period.

In each of the specific examples described above, the parameter K is supposed to be one. Hereinafter, examples in which the parameter K is two will be described.

Pattern in which K=2, L=4, and Oscillation Period=16H

Next, a connection pattern for a situation where the parameter K is two and the number (of types) of electrically independent CS bus lines is four is shown in FIG. 27 and the drive waveforms in that situation are shown in FIG. 28. Also, the connection pattern shown in FIG. 27 is summarized in the following Table 12.

In FIG. 27, each CS bus line is connected to any of the four CS trunks that are arranged at each of the right and left ends of the paper. Therefore, the number (of types) of electrically independent CS bus lines is four (i.e., L=4). It can also be seen from FIG. 27 that a certain rule is set on the connection pattern between the CS bus lines and CS trunks. The rule is that the same connection pattern should recur regularly every 16 CS bus lines in FIG. 27. Therefore, K=2 (=16/(2 L))

TABLE 12

L = 4, K = 2

| CS trunk | CS busline connected to CS trunk |
|---|---|
| M1f | CSBL_(n − 1) B, (n) A |
| | CSBL_(n + 1) B, (n + 2) A |
| | CSBL_(n + 8) B, (n + 9) A |
| | CSBL_(n + 10) B (n + 11) A |
| M2f | CSBL_(n) B, (n + 1) A |
| | CSBL_(n + 2) B, (n + 3) A |
| | CSBL_(n + 7) B, (n + 8) A |
| | CSBL_(n + 9) B (n + 10) A |
| M3f | CSBL_(n + 3) B, (n + 4) A |
| | CSBL_(n + 5) B, (n + 6) A |
| | CSBL_(n + 12) B, (n + 13) A |
| | CSBL_(n + 14) B (n + 15) A |
| M4f | CSBL_(n + 4) B, (n + 5) A |
| | CSBL_(n + 6) B, (n + 7) A |
| | CSBL_(n + 11) B, (n + 12) A |
| | CSBL_(n + 13) B (n + 14) A |

where n = 1, 17, 33, . . .

As can be seen from Table 12, the CS bus lines are connected in FIG. 27 such that one of the following two sets of CS bus lines:

$$CSBL\_(p)B,(p+1)A,$$

$$CSBL\_(p+2)B,(p+3)A$$

and $$CSBL\_(p+9)B,(p+10)A,$$

$$CSBL\_(p+11)B,(p+12)A$$

or $$CSBL\_(p+1)B,(p+2)A,$$

$$CSBL\_(p+3)B,(p+4)A$$

and $$CSBL\_(p+8)B,(p+9)A,$$

$$CSBL\_(p+10)B,(p+11)A$$

where p=1, 3, 5, etc. or p=0, 2, 4, etc.

consists of electrically equivalent CS bus lines.

If the parameters L and K mentioned above are used, it can be seen that a set of CS bus lines, which are represented, for any p, by:

$$CSBL\_(p+2\cdot(1-1))B,(p+2\cdot(1-1)+1)A$$

$$CSBL\_(p+2\cdot(K-1))B,(p+2\cdot(K-1)+1)A$$

and $$CSBL\_(p+2\cdot(1-1)+K\cdot L+1)B,(p+2\cdot(1-1)+K\cdot L+2)A$$

$$CSBL\_(p+2\cdot(K-1)+K\cdot L+1)B,(p+2\cdot(K-1)+K\cdot L+2)A$$

or $$CSBL\_(p+2\cdot(1-1)+1)B,(p+2\cdot(1-1)+2)A$$

$$CSBL\_(p+2\cdot(K-1)+1)B,(p+2\cdot(K-1)+2)A$$

and $$CSBL\_(p+2\cdot(1-1)+K\cdot L)B,(p+2\cdot(1-1)+K\cdot L+1)A$$

$$CSBL\_(p+2\cdot(K-1)+K\cdot L)B,(p+2\cdot(K-1)+K\cdot L+1)A$$

should include electrically equivalent CS bus lines, where p=1, 3, 5, etc. or p=0, 2, 4, etc.

It can be seen from FIG. 28 that in this case, the oscillating voltage applied to the CS bus lines has an oscillation period of 16H, i.e., 2·K·L times as long as one horizontal scanning period.

Pattern in which K=2, L=4, and Oscillation Period=16H

Next, a connection pattern for a situation where the parameter K is two and the number (of types) of electrically independent CS bus lines is six is shown in FIG. 29 and the drive waveforms in that situation are shown in FIG. 30. Also, the connection pattern shown in FIG. 29 is summarized in the following Table 13.

In FIG. 29, each CS bus line is connected to any of the six CS trunks that are arranged at each of the right and left ends of the paper. Therefore, the number (of types) of electrically independent CS bus lines is six (i.e., L=6). It can also be seen from FIG. 29 that a certain rule is set on the connection pattern between the CS bus lines and CS trunks. The rule is that the same connection pattern should recur regularly every 24 CS bus lines in FIG. 29. Therefore, K=2 (=24/(2 L)).

TABLE 13

| CS trunk | CS busline connected to CS trunk (L = 6, K = 2) |
|---|---|
| M1g | CSBL__(n − 1) B, (n) A<br>CSBL__(n + 1) B, (n + 2) A<br>CSBL__(n + 12) B, (n + 13) A<br>CSBL__(n + 14) B (n + 15) A |
| M2g | CSBL__(n) B, (n + 1) A<br>CSBL__(n + 2) B, (n + 3) A<br>CSBL__(n + 11) B, (n + 12) A<br>CSBL__(n + 13) B (n + 14) A |
| M3g | CSBL__(n + 3) B, (n + 4) A<br>CSBL__(n + 5) B, (n + 6) A<br>CSBL__(n + 16) B, (n + 17) A<br>CSBL__(n + 18) B (n + 19) A |
| M4g | CSBL__(n + 4) B, (n + 5) A<br>CSBL__(n + 6) B, (n + 7) A<br>CSBL__(n + 15) B, (n + 16) A<br>CSBL__(n + 17) B (n + 18) A |
| N5g | CSBL__(n + 7) B, (n + 8) A<br>CSBL__(n + 9) B, (n + 10) A<br>CSBL__(n + 20) B, (n + 21) A<br>CSBL__(n + 22) B (n + 23) A |
| N6g | CSBL__(n + 8) B, (n + 9) A<br>CSBL__(n + 10) B, (n + 11) A<br>CSBL__(n + 19) B, (n + 20) A<br>CSBL__(n + 21) B (n + 22) A |

where n = 1, 25, 49, . . .

As can be seen from Table 13, the CS bus lines are connected in FIG. 29 such that one of the following two sets of CS bus lines:

$$CSBL\_(p)B,(p+1)A,$$

$$CSBL\_(p+2)B,(p+3)A$$

and $$CSBL\_(p+13)B,(p+14)A,$$

$$CSBL\_(p+15)B,(p+16)A$$

or $$CSBL\_(p+1)B,(p+2)A,$$

$$CSBL\_(p+3)B,(p+4)A$$

and $$CSBL\_(p+12)B,(p+13)A,$$

$$CSBL\_(p+14)B,(p+15)A$$

where p=1, 3, 5, etc. or p=0, 2, 4, etc.

consists of electrically equivalent CS bus lines.

If the parameters L and K mentioned above are used, it can be seen that a set of CS bus lines, which are represented, for any p, by:

$$CSBL\_(p+2\cdot(1-1))B,(p+2\cdot(1-1)+1)A$$

$$CSBL\_(p+2\cdot(K-1))B,(p+2\cdot(K-1)+1)A$$

and $$CSBL\_(p+2\cdot(1-1)+K\cdot L+1)B,(p+2\cdot(1-1)+K\cdot L+2)A$$

$$CSBL\_(p+2\cdot(K-1)+K\cdot L+1)B,(p+2\cdot(K-1)+K\cdot L+2)A$$

or $$CSBL\_(p+2\cdot(1-1)+1)B,(p+2\cdot(1-1)+2)A$$

$$CSBL\_(p+2\cdot(K-1)+1)B,(p+2\cdot(K-1)+2)A$$

and $$CSBL\_(p+2\cdot(1-1)+K\cdot L)B,(p+2\cdot(1-1)+K\cdot L+1)A$$

$$CSBL\_(p+2\cdot(K-1)+K\cdot L)B,(p+2\cdot(K-1)+K\cdot L+1)A$$

should include electrically equivalent CS bus lines, where p=1, 3, 5, etc. or p=0, 2, 4, etc.

It can be seen from FIG. 30 that in this case, the oscillating voltage applied to the CS bus lines has an oscillation period of 24H, i.e., 2·K·L times as long as one horizontal scanning period.

In the preferred embodiments described above, situations where the parameter K is one and the parameter L=4, 6, 8, 10 or 12 and situations where the parameter K is two and the parameter L=4 or 6 have been set forth. However, Type II arrangement of the present invention is never limited to those specific preferred embodiments.

Specifically, K may be any positive integer, i.e., K=1, 2, 3, 4, 5, 6, 7, 8, 9, and so on, and L may be an even number, i.e., L=2, 4, 6, 8, 10, 12, 14, 16, 18, and so on. In addition, K and L may be defined independently from the their own ranges.

In those cases, the connection patterns between the CS trunks and the CS bus lines may follow the rule described above.

Specifically, if the parameters K and L are K and L, respectively (i.e., if K=K and L=L), CS bus lines connected to the same trunk, i.e., electrically equivalent CS bus lines, should be:

$$CSBL\_(p+2\cdot(1-1))B,(p+2\cdot(1-1)+1)A,$$

$$CSBL\_(p+2\cdot(2-1))B,(p+2\cdot(2-1)+1)A,$$

$$CSBL\_(p+2\cdot(3-1))B,(p+2\cdot(3-1)+1)A,$$

...

$$CSBL\_(p+2\cdot(K-1))B,(p+2\cdot(K-1)+1)A$$

and $$CSBL\_(p+2\cdot(1-1)+K\cdot L+1)B,(p+2\cdot(1-1)+K\cdot L+2)A,$$

$$CSBL\_(p+2\cdot(2-1)+K\cdot L+1)B,(p+2\cdot(2-1)+K\cdot L+2)A,$$

$$CSBL\_(p+2\cdot(3-1)+K\cdot L+1)B,(p+2\cdot(3-1)+K\cdot L+2)A,$$

...

$$CSBL\_(p+2\cdot(K-1)+K\cdot L+1)B,(p+2\cdot(3-1)+K\cdot L+2)A;$$

or $$CSBL\_(p+2\cdot(1-1)+1)B,(p+2\cdot(1-1)+2)A,$$

$$CSBL\_(p+2\cdot(2-1)+1)B,(p+2\cdot(2-1)+2)A,$$

$$CSBL\_(p+2\cdot(3-1)+1)B,(p+2\cdot(3-1)+2)A,$$

...

$$CSBL\_(p+2\cdot(K-1)+1)B,(p+2\cdot(K-1)+2)A$$

and $$CSBL\_(p+2\cdot(1-1)+K\cdot L)B,(p+2\cdot(1-1)+K\cdot L+1)A,$$

$$CSBL\_(p+2\cdot(2-1)+K\cdot L)B,(p+2\cdot(2-1)+K\cdot L+1)A,$$

$$CSBL\_(p+2\cdot(3-1)+K\cdot L)B,(p+2\cdot(3-1)+K\cdot L+1)A,$$

...

$$CSBL\_(p+2\cdot(K-1)+K\cdot L)B,(p+2\cdot(K-1)+K\cdot L+1)A,$$

where p=1, 3, 5, etc. or p=0, 2, 4, etc.

Furthermore, if the parameters K and L are K and L, respectively (i.e., if K=K and L=L), the oscillating voltage applied to the CS bus lines may have an oscillation period that is 2·K·L times as long as one horizontal scanning period.

In the foregoing description, the first subpixel of one of two adjacent picture elements and the second subpixel of the other picture element share a common CS bus line. However, the common CS bus line may be naturally split into two or more electrically equivalent CS bus lines.

The liquid crystal display device with Type I or Type II arrangement of the preferred embodiment described above can extend one oscillation period of the oscillating voltage applied to the CS bus lines (storage capacitor lines), and therefore, can apply the area ratio gray scale display technology disclosed in Patent Document No. 5 to either a large-screen LCD panel or a high-resolution LCD panel, among other things. In addition, the liquid crystal display device with Type II arrangement can supply an oscillating voltage through a common CS bus line to subpixels of two pixels that are adjacent to each other in the column direction. That is why by arranging the CS bus line between the pixels that are adjacent to each other in the column direction, the CS bus line can also be used as an opaque layer (which is typically implemented as a black matrix (BM)). As a result, the number of CS bus lines required by the Type II liquid crystal display device can be smaller than that of the Type I liquid crystal display device. On top of that, since the opaque layer that should be provided separately for the liquid crystal display device with Type I arrangement can be removed, the pixel aperture ratio can be increased as well.

FIGS. 31(*a*), 31(*b*) and 31(*c*) show three representative Type I arrangements TypeI-1, TypeI-2 and TypeI-3, while FIGS. 32(*a*), 32(*b*) and 32(*c*) show three representative Type II arrangements TypeII-1, TypeII-2 and TypeII-3. In these drawings, gate bus lines are identified by the reference sign G and are numbered 001, 002 and so on. Each row of pixels (which will also be referred to herein as "dots") is associated with a gate bus line G and each gate bus line number such as 001 also shows the number of its associated row of pixels. On the other hand, columns of pixels are numbered a, b and c. Therefore, pixels of the first row are identified by 1-*a*, 1-*b*, 1-*c* and so on, and pixels of the first column are identified by 1-*a*, 2-*a*, 3-*a* and so on.

Furthermore, each CS bus line is identified by its type, i.e., the type of the CS trunk connected thereto. Specifically, a CS bus line identified by CS1 is connected to a first CS trunk CS1 and a CS bus line identified by CS2 is connected to a second CS trunk CS2. In each of the six arrangements shown in FIGS. 31 and 32, there are 10 different types of CS trunks (or CS voltages) and CS bus lines are arranged cyclically and sequentially connected to CS1 through CS10, respectively, from the top toward the bottom of the paper.

Each pixel includes two subpixels. One of these two subpixels, associated with a CS bus line that is connected to the storage capacitor counter electrode of its storage capacitor and that is identified by the smaller number, is identified by A and the other subpixel B. For example, the pixel 1-*a* on the first row shown in FIG. 31 includes a subpixel 1-*a*-A with a storage capacitor connected to the CS trunk CS1 and a subpixel 1-*a*-B with a storage capacitor connected to the CS trunk CS2. Also, the darker one of the two subpixels of each pixel is hatched. As described above, each of the six arrangements shown in FIGS. 31 and 32 can eliminate flickers when subjected to 1H one dot inversion drive.

Problems Resulting from Disagreement Between CS Voltage Period and Vertical Scanning Period and Embodiments to Resolve Such Problems As described above, when an arrangement for extending one oscillation period of the oscillating voltage applied to the storage capacitor counter electrode by providing a plurality of electrically independent CS trunks is adopted as in the Type I or Type II liquid crystal display device, waveform blunting of the oscillating voltage can be reduced. However, the resultant display quality could be debased for another reason. The reason will be described below.

The display quality is debased due to disagreement between one period of the oscillating voltage (CS voltage) applied to the CS bus line and one vertical scanning period.

Thus, the vertical scanning period will be described first. In the following description, one vertical scanning period is supposed to be as long as one frame period for the sake of simplicity.

One vertical scanning period V-Total of a video signal supplied to a display device is made up of an effective scanning period V-Disp in which video is presented and a vertical blanking interval V-Blank in which no video is presented. The effective scanning period for presenting video is determined by the display area (or the number of effective pixels) of an LCD panel. On the other hand, the vertical blanking interval is an interval for signal processing, and therefore, is not always constant but changes from one manufacturer of TV receivers to another. For instance, if the display area has 768 rows of pixels (in an XGA), the effective scanning period is fixed at 768×one horizontal scanning period (H) (which will be identified herein by "768H"). However, in one case, one vertical blanking interval may be 35H and one vertical scanning period V-Total may be 803H. In another case, one vertical blanking interval may be 36H and one vertical scanning period V-Total may be 804H. Furthermore, the length of one vertical blanking interval may even alternate between an odd number and an even number (e.g., 803H and 804H) every vertical scanning period.

The CS voltage oscillates within its amplitude during one frame period (=one vertical blanking interval+one effective scanning period). However, since one vertical blanking interval does not have a fixed length, the next frame period may sometimes begin before one cycle of oscillation is complete. That is why the CS voltage may have a disturbed period of oscillation in the transition period between signal processing of the first frame and that of the second frame. For example, in both the Type I arrangement shown in FIG. 33A and the Type II arrangement shown in FIG. 33B, the CS voltage waveform has a disturbed period in the transition between the first and second frames. When this phenomenon was observed on video, it was discovered that bright rows of pixels and dark rows of pixels alternated with each other periodically to debase the display quality significantly. For example, as shown in FIG. 34, dark and bright states may alternate every five rows of pixels (i.e., every ten CS bus lines or every CS trunks of ten phases). On the other hand, in the Type II liquid crystal display device shown in FIG. 38, dark and bright states may alternate every ten rows of pixels.

This phenomenon will be described in further detail.

Suppose a liquid crystal display device has one vertical scanning period V-Total of 803H, one effective scanning period V-Disp of 768H, one vertical blanking interval V-Blank of 35H, ten types of CS voltages (which will be sometimes referred to herein as "CS voltages of ten phases") that switch between a first voltage level (which is High level in this example) and a second voltage level (which is Low level in this example), and has its frame polarity inverted by 1H dot inversion technique. FIGS. 35A and 35B show an equivalent circuit of this liquid crystal display device with a pattern of connections to CS trunks. Also, FIG. 36 shows the timing relation between the CS voltages and the gate voltages (i.e., voltages on gate bus lines; which will also be referred to herein as "gate signals").

The connection pattern shown in FIGS. 35A and 35B corresponds to the TypeI-1 arrangement shown in FIG. 31(*a*). In this pattern, the subpixels 1-*a*-A, 1-*b*-A, 1-*c*-A, etc. on the first row of pixels and the subpixels 6-*a*-A, 6-*b*-A, 6-*c*-A, etc. on the sixth row of pixels are connected to the CS trunk CS1. The subpixels 1-*a*-B, 1-*b*-B, 1-*c*-B, etc. on the first row of pixels and the subpixels 6-*a*-B, 6-*b*-B, 6-*c*-B, etc. on the sixth row of pixels are connected to the CS trunk CS2. The subpixels 2-*a*-A, 2-*b*-A, 2-*c*-A, etc. on the second row of pixels and the subpixels 7-*a*-A, 7-*b*-A, 7-*c*-A, etc. on the seventh row of pixels are connected to the CS trunk CS3.

As shown in FIG. 36, after data has been written on the first row of pixels to turn OFF the TFTs that are connected to the gate bus line associated with the first row of pixels, the CS voltage changes its voltage levels for the first time (i.e., rises from the second voltage level to the first voltage level in this example). After that, the CS voltage will switch its levels between the first and second voltage levels every 5H period (i.e., one period of oscillation is 10H and the duty ratio is one to one). In the same way, after the TFTs connected to a gate bus line that is associated with the second, third or any other row of pixels have been turned OFF, their associated CS voltage will rise or fall and then the first and second voltage levels will switch every 5H period.

If the first switch of CS voltages, e.g., 1H after the TFTs have been turned OFF (the interval may be 1H but just needs to be longer than 0H and shorter than 5H) in one frame is a rise from the second voltage level to the first voltage level, then the polarity will invert in the next frame (which is called "frame inversion drive"). Thus, in the latter frame, the first switch of CS voltages at the same timing as in the former frame, e.g., 1H after the TFTs have been turned OFF (the interval may be 1H but just needs to be longer than 0H and shorter than 5H), will be a fall from the first voltage level to the second voltage level. The CS voltages switch between the first and second voltage levels every 5H period. That is why supposing the first voltage level 5H+the second voltage level 5H=10H is one period, V-Total=803H is 80 periods plus 3H. And if the first switch of the CS voltages in one frame is a rise from the second voltage level to the first voltage level, then the last period (in 803H periods) will finish with the first voltage level. In the next frame, the first voltage level should change into the second voltage level. Thus, the first voltage level of the previous frame changes into the second voltage level. At this time, however, the CS voltages do not switch every 5H but change in the order of the second voltage level (5H), the first voltage level (3H) and then the second voltage level (5H) as shown in FIG. 37.

In this case, the subpixels 1-*a*-A, 1-*b*-A, 1-*c*-A, etc. on the first row of pixels G:001 and the subpixels 6-*a*-A, 6-*b*-A, 6-*c*-A, etc. on the sixth row of pixels G:006 are connected to the same CS trunk CS1. As for the subpixels 1-*a*-A, 1-*c*-A, etc. on the first row of pixels, the first change of CS voltages after the TFTs on the first row of pixels have been turned OFF is a rise from the second voltage level to the first voltage level. As a result, those subpixels will look bright. Meanwhile, the subpixels on the sixth row of pixels are also connected to the same CS trunk CS1. And the first change of CS voltages after the TFTs on the sixth row of pixels have been turned OFF is a fall from the first voltage level to the second voltage level. As a result, those subpixels 6-*a*-A, 6-*c*-A, etc. on the sixth row will also be bright (see FIG. 37).

In this case, the subpixels 1-*a*-A, 1-*c*-A, etc. on the first row of pixels will become bright subpixels by taking advantage of the rise from the second voltage level of the oscillating voltage of CS1 to the first voltage level thereof, while the subpixels 6-*a*-A, 6-*c*-A, etc. on the sixth row of pixels will also become bright subpixels by taking advantage of the fall from the first voltage level to the second voltage level.

Consequently, comparing the effective values of voltages applied to the subpixels 1-*a*-A, 1-*c*-A, etc. on the first row of pixels to those of voltages applied to the subpixels 6-*a*-A, 6-*c*-A, etc. on the sixth row of pixels in one frame (i.e., the areas of the hatched portions of FIG. 37) in a situation where V-Total=803H, it can be seen that the overall area of the subpixels 6-*a*-A, 6-*c*-A, etc. on the sixth row of pixels is greater than that of the subpixels 1-*a*-A, 1-*c*-A, etc. by the area of the portion with the darker shadow (with a width of 2H (=5H−3H)). That is to say, the subpixels 6-*a*-A, 6-*c*-A, etc. have the higher luminance.

As can be seen, even if the subpixels are connected to the same CS trunk every five rows of pixels (i.e., $1^{st}$, $6^{th}$, $11^{th}$, $16^{th}$, $21^{st}$, $26^{th}$ rows and so on), the bright subpixels on the $6^{th}$, $16^{th}$ and $26^{th}$ rows will look brighter than the counterparts on the $1^{st}$, $11^{th}$ and $21^{st}$ rows. The same statement applies to every CS trunk CS1, CS3, CS5, CS7 or CS9 that is connected to the bright subpixels. That is why when video is viewed on this display device, the first through fifth rows of pixels will look dark, the sixth through tenth rows of pixels will look bright, and the eleventh through fifteenth rows of pixels will look dark as shown in FIG. 34. That is to say, bright and dark stripes will alternate with each other every five rows of pixels. In the foregoing example, the bright subpixels contribute more greatly to the display operation than the dark subpixels do. That is why the bright subpixels have been described mainly and the description of the dark subpixels is omitted herein.

Next, another specific example shown in FIG. 38 will be described.

Suppose a liquid crystal display device has V-Total of 803H, V-Disp of 768H, V-Blank of 35H, CS voltages of ten phases that switch between a first voltage level and a second voltage level, and has its frame polarity inverted by 1H dot inversion technique. FIGS. 39A through 39C show an equivalent circuit of this liquid crystal display device with a pattern of connections to CS trunks.

The connection pattern shown in FIGS. 39A through 39C corresponds to the TypeII-1 arrangement shown in FIG. 32(*a*). In this pattern, the subpixels 1-*a*-A, 1-*b*-A, 1-*c*-A, etc. on the first row of pixels, the subpixels 11-*a*-B, 11-*b*-B, 11-*c*-B, etc. on the eleventh row of pixels, and the subpixels 12-*a*-A, 12-*b*-A, 12-*c*-A, etc. on the twelfth row of pixels are connected to the CS trunk CS1. The subpixels 1-*a*-B, 1-*b*-B, 1-*c*-B, etc. on the first row of pixels, the subpixels 2-*a*-A, 2-*b*-A, 2-*c*-A, etc. on the second row of pixels, the subpixels 10-*a*-B, 10-*b*-B, 10-*c*-B, etc. on the tenth row of pixels and the subpixels 11-*a*-A, 11-*b*-A, 11-*c*-A, etc. on the eleventh row of pixels are connected to the CS trunk CS2. And the subpixels 2-*a*-B, 2-*b*-B, 2-*c*-B, etc. on the second row of pixels, the subpixels 3-*a*-A, 3-*b*-A, 3-*c*-A, etc. on the third row of pixels, the subpixels 13-*a*-B, 13-*b*-B, 13-*c*-B, etc. on the thirteenth row of pixels and the subpixels 14-*a*-A, 14-*b*-A, 14-*c*-A, etc. on the fourteenth row of pixels are connected to the CS trunk CS3.

As shown in FIG. 40, after data has been written on the first row of pixels to turn OFF the TFTs that are connected to the gate bus line associated with the first row of pixels, the CS voltage changes its voltage levels for the first time (i.e., rises from the second voltage level to the first voltage level in this example). After that, the CS voltage will switch its levels between the first and second voltage levels every 10H period (i.e., one period of oscillation is 20H and the duty ratio is one to one). In the same way, after the TFTs connected to a gate bus line that is associated with the second, third or any other row of pixels have been turned OFF, their associated CS voltage will rise or fall and then the first and second voltage levels will switch every 10H period.

If the first switch of CS voltages 2H after the TFTs on the first row of pixels have been turned OFF, for example, (the interval may be 2H but just needs to be longer than 1H and shorter than 9H) in one frame is a rise from the second voltage level to the first voltage level, then the polarity will invert in the next frame (which is called "frame inversion drive"). Thus, in the latter frame, the first switch of CS voltages at the same timing as in the former frame, e.g., 2H after the TFTs have been turned OFF (the interval may be 2H but just needs to be longer than 1H and shorter than 9H), will be a fall from the first voltage level to the second voltage level. The CS voltages switch between the first and second voltage levels every 10H period. That is why supposing the first voltage level 10H+the second voltage level 10H=20H is one period, V-Total=803H is 40 periods plus 3H. And if the first switch of the CS voltages in one frame is a rise from the second voltage level to the first voltage level, then the last period (in 803H periods) will finish with the first voltage level. In the next frame, the first voltage level should change into the second voltage level. Thus, the first voltage level of the previous frame changes into the second voltage level. At this time, however, the CS voltages do not switch every 10H but change in the order of the second voltage level (10H), the first voltage level (3H) and then the second voltage level (10H) as shown in FIG. 41B.

In this case, the subpixels 1-*a*-A, 1-*b*-A, 1-*c*-A, etc. on the first row of pixels G:001, the subpixels 11-*a*-B, 11-*b*-B, 11-*c*-B, etc. on the eleventh row of pixels G:011 and the subpixels 12-*a*-A, 12-*b*-A, 12-*c*-A, etc. on the twelfth row of pixels G:012 are connected to the same CS trunk CS1 (see FIG. 38 and FIGS. 39A through 39C). As for the subpixels 1-*a*-A, 1-*c*-A, etc. on the first row of pixels, the first change of CS voltages after the TFTs on the first row of pixels have been turned OFF is a rise from the second voltage level to the first voltage level. As a result, those subpixels will look bright. Meanwhile, the subpixels on the eleventh row of pixels and the subpixels on the twelfth row of pixels are also connected to the same CS trunk CS1. And the first change of CS voltages after the TFTs on the twelfth row of pixels have been turned OFF is a fall from the first voltage level to the second voltage level. As a result, the subpixels 12-*a*-A, 12-*c*-A, etc. on the twelfth row of pixels will also look bright but the subpixels 11-*a*-B, 11-*c*-B, etc. on the eleventh row of pixels will look dark.

In this case, the subpixels 1-*a*-A, 1-*c*-A, etc. on the first row of pixels will become bright subpixels by taking advantage of the rise from the second voltage level of the oscillating voltage of CS1 to the first voltage level thereof, while the subpixels 12-*a*-A, 12-*c*-A, etc. on the twelfth row of pixels will also become bright subpixels by taking advantage of the fall from the first voltage level to the second voltage level.

Consequently, comparing the effective values of voltages applied to the subpixels 1-*a*-A, 1-*c*-A, etc. on the first row of pixels to those of voltages applied to the subpixels 12-*a*-A, 12-*c*-A, etc. on the twelfth row of pixels in one frame (i.e., the areas of the hatched portions of FIG. 41C) in a situation where V-Total=803 H, it can be seen that the overall area of the subpixels 12-*a*-A, 12-*c*-A, etc. on the twelfth row of pixels is greater than that of the subpixels 1-*a*-A, 1-*c*-A, etc. by the area of the portion with the darker shadow (with a width of 7H (=10H−3H)). That is to say, the subpixels 12-*a*-A, 12-*c*-A, etc. have the higher luminance.

As can be seen, even if the subpixels are connected to the same CS trunk just about every ten rows of pixels (i.e., $1^{st}$, $12^{th}$, $21^{st}$, $32^{nd}$, $41^{st}$ and $52^{nd}$ rows and so on), the bright subpixels on the $12^{th}$, $32^{nd}$ and $52^{nd}$ rows will look brighter than the counterparts on the $1^{st}$, $21^{st}$ and $31^{st}$ rows. The same statement applies to every CS trunk. That is why when video is viewed on this display device, the first through tenth rows of pixels will look dark, the eleventh through twentieth rows of pixels will look bright, and the twenty-first through thirtieth rows of pixels will look dark as shown in FIG. 38. That is to say, bright and dark stripes will alternate with each other every ten rows of pixels. In the foregoing example, the bright subpixels contribute more greatly to the display operation than the dark subpixels do. That is why the bright subpixels have been described mainly and the description of the dark subpixels is omitted herein.

In the example shown in FIG. 41C, the effective value of the voltage applied to respective subpixels on the $1^{st}$, $3^{rd}$, $5^{th}$, $7^{th}$ and other odd-numbered rows of pixels is different from that of the voltage applied to their counterparts on the $2^{nd}$, $4^{th}$, $6^{th}$, $8^{th}$ and other even-numbered rows of pixels by the luminance represented by the portions with horizontal stripes (with a width of 1H) in FIG. 41C. However, as this bright/dark state transition occurs every row of pixels, the difference is very difficult to sense on the overall screen, thus causing almost no problem in practice.

A liquid crystal display device and its driving method according to the preferred embodiment to be described below can overcome these problems.

Specifically, in the liquid crystal display device of this preferred embodiment, a CS voltage supplied through each of multiple CS bus lines (CS trunks) has a first period (A) with a first waveform and a second period (B) with a second waveform within one vertical scanning period (V-Total) of an input video signal. The sum of the first and second periods is equal to one vertical scanning period (V-Total=A+B). The first waveform oscillates between first and second voltage levels in a first cycle time $P_A$, which is an integral number of times as long as, and at least twice as long as, one horizontal scanning period (H). And the second waveform is defined such that the CS voltage has a predetermined effective value every predetermined number of consecutive vertical scanning periods, the number being equal to or smaller than 20. For example, if 10 different types of CS voltages are supplied through CS trunks of 10 phases, the effective value of every CS voltage is defined to be a predetermined constant value.

As can be seen from the above-described reason why those stripes are seen on the screen, if the connection pattern is designed such that the storage capacitor counter voltages on mutually different rows of pixels that are connected to the same CS trunk have a predetermined effective value, no stripes will be produced. In this case, during an effective scanning period (V-Disp), the CS voltage needs to oscillate between first and second voltage levels in a constant cycle time. In a vertical blanking interval (V-Blank) in which no video is presented, however, the CS voltage does not have to oscillate between first and second voltage levels in a constant cycle time. But if the CS voltage has a predetermined effective value every predetermined number of consecutive vertical scanning periods, the number being equal to or smaller than 20, then the image on the entire display screen can be uniform. If the predetermined number exceeded 20, the effects that should be achieved by setting the effective value of the CS voltage to be a predetermined constant value could not be achieved fully (i.e., the CS voltage would not be averaged sufficiently with time) and stripes could be visible on the screen.

The first period is associated with the effective scanning period and the second period is associated with the vertical blanking interval. However, the phases of these two periods do not agree with each other and the lengths thereof are not (and need not be) exactly equal to each other, either. As described above, one vertical scanning period is defined herein as an interval between a point in time when one scan line is selected and a point in time when the next scan line is selected. That is to say, a time period in which a gate voltage applied to a gate bus line is high is one vertical scanning period. On the other hand, when a predetermined amount of time (of 0H to 2H, for example) passes after the TFTs connected to the associated gate bus line have been turned OFF, the CS signal changes from a first voltage level into a second voltage level, or vice versa (i.e., either rises or falls), and then repeatedly alternates between the first and second voltage levels. That is to say, when those TFTs are turned ON, the CS voltage already has a waveform that oscillates in a first cycle time $P_A$. That is why its phase (represented by the start point of one period) shifts from the start point of one vertical scanning period accordingly. These points will be described in detail later by way of specific examples.

The predetermined effective value of the storage capacitor counter voltage, which becomes constant through a predetermined number of (and 20 or less) consecutive vertical scanning periods, may be set equal to, but does not have to be equal to, either the average or effective value between the first and second voltage levels of the first waveform. The predetermined effective value does not have to be equal to either the average or effective value of the second waveform, either. Also, although the first waveform is an oscillating wave, the second waveform may or may not be an oscillating wave. Furthermore, even if the second waveform is an oscillating wave, its voltage levels (which will be referred to herein as "third and fourth voltage levels") do not have to be equal to the first and second voltage levels of the first waveform, either. Nevertheless, if both of the first and second waveforms are rectangular waves that oscillate between the first and second voltage levels and have a duty ratio of one to one, then the driver can be simplified. The oscillating wave does not have to be a rectangular wave but may also be a sine wave, a triangular wave or any other wave. Furthermore, if the second waveform is not an oscillating wave, then a waveform that has not only the first and second voltage levels but also a fifth voltage level, which is different from any of the first through fourth voltage levels mentioned above, is used.

The period through which the effective value of the CS voltage is a predetermined constant value is preferably equal to or shorter than four vertical scanning periods. This is because the reason why the voltages applied through the same CS trunk to the storage capacitor counter electrodes on mutually different rows of pixels have different effective values is that one vertical scanning period is not an integral number of times as long as one period of oscillation of the CS voltage and that the vertical blanking interval in one vertical scanning period is not fixed as described above. The vertical blanking interval is not fixed. However, if there are at least four vertical scanning periods (i.e., four frame periods), the effective value of the CS voltage can be a predetermined constant value according to virtually every driving method currently available. For example, according to a driving method, one vertical blanking interval changes its lengths every vertical scanning period (i.e., is an odd number of times as long as one horizontal scanning period in one vertical scanning period but is an even number of times as long as one horizontal scanning period in the next vertical scanning period). Even so, if there are four vertical scanning periods, which are twice as long as one cycle time in which the vertical blanking intervals are switched (i.e., two vertical scanning periods), the effective value can be a predetermined constant value. And if one vertical blanking interval is fixed to be either an odd number of times, or an even number of times, as long as one horizontal scanning period, the effective value can also be a predetermined constant value as long as there are at least two vertical scanning periods.

One period of oscillation of the first waveform (i.e., the first cycle time $P_A$) is an integral number of times as long as, and at least twice as long as, one horizontal scanning period (H). If the Type I arrangement, including an even number L of electrically independent CS trunks, is adopted, the first cycle time $P_A$ can be K·L times as long as one horizontal scanning period, where K is a positive integer. On the other hand, if the Type II arrangement is adopted, the first cycle time $P_A$ can be 2·K·L times as long as one horizontal scanning period, where K is a positive integer. In this case, a part of the first cycle time at the first voltage level is preferably as long as the other part of the first cycle time at the second voltage level.

Suppose the rest of one vertical scanning period other than the first period in which the CS voltage has the first waveform (i.e., the second period in which the CS voltage has the second waveform) is an even number of times as long as one horizontal scanning period. If a part of the second waveform of the second period at the first voltage level is as long as another part of the second waveform at the second voltage level, then the effective value of the second waveform can be fixed at the average between the first and second voltage levels. This can be done no matter whether the frame inversion drive is adopted or not.

If the frame inversion drive is adopted and if the second period is an odd number of times as long as one horizontal scanning period, a part of the second period of a vertical scanning period at the first voltage level may be shorter than another part of the second period at the second voltage level by one horizontal scanning period. In that case, if a part of the second period of the next vertical scanning period at the first voltage level is shorter than another part of the second period at the second voltage level by one horizontal scanning period, then the second waveforms of two consecutive vertical scanning periods can have a constant effective value.

Furthermore, if the frame inversion drive is adopted, the first period may be a half-integral number of times (i.e., an (integer+a half) number of times) as long as the first cycle time.

For example, if the display area has a number N of pixel rows, an effective display period (V-Disp) is N times as long as one horizontal scanning period (if V-Disp=N·H), and the first cycle time is identified by $P_A$, the first period (A) is defined so as to satisfy $A=[\mathrm{Int}\{(N\cdot H-P_A/2)/P_A\}+\frac{1}{2}]\cdot P_A+M\cdot P_A$, where Int(x) is an integral part of an arbitrary real number x and M is an integer that is equal to or greater than zero.

Alternatively, if one vertical scanning period (V-Total) is Q times as long as one horizontal scanning period (if V-Total=Q·H) where Q is a positive integer and if the first cycle time is identified by $P_A$, the first period (A) may be defined so as to satisfy $A=[\mathrm{Int}\{(Q\cdot H-P_A)/P_A\}+\frac{1}{2}]\cdot P_A$, where Int(x) is an integral part of an arbitrary real number x.

Still alternatively, if one vertical scanning period (V-Total) is Q times as long as one horizontal scanning period (if V-Total=Q·H) where Q is a positive integer and if the first cycle time is identified by $P_A$, then the first period (A) may also be defined so as to satisfy $A=[\mathrm{Int}\{(Q\cdot H-3\cdot P_A/2)/P_A\}+\frac{1}{2}]\cdot P_A$, where Int(x) is an integral part of an arbitrary real number x.

The first period may be appropriately defined so as to satisfy one of these three equations according to the connection pattern (i.e., either Type I or Type II) of the CS bus lines. As described above, the first cycle time $P_A$ is equal to K·L·H in Type I but is equal to 2·K·L·H in Type II. That is why depending on the number N of rows of pixels and the number L of storage capacitor trunks in the liquid crystal display device, the first and second periods (A) and (B) may be determined by one of the equations described above using the effective display period (V-Disp) and/or the vertical scanning period (V-Total). The second period (B) can be calculated by subtracting the first period (A) from one vertical scanning period (V-Total).

Suppose the waveform of the CS voltage during the second period, i.e., the second waveform, oscillates between the third and fourth voltage levels. In that case, the average of the third and fourth voltage levels is preferably set equal to that of the first and second voltage levels. And it is most preferable to set the third and fourth voltage levels equal to the first and second voltage levels, respectively, to simplify the circuit configuration.

In this case, if B/H is an even number, the waveform is preferably defined such that the period at the third voltage level is as long as the period at the fourth voltage level. On the other hand, if B/H is an odd number, a part of a vertical scanning period at the third voltage level is preferably shorter than another part of the period at the fourth voltage level by one horizontal scanning period. Likewise, in the second period of the next vertical scanning period, part of the second period at the third voltage level is also preferably shorter than the other part of the second period at the fourth voltage level by one horizontal scanning period.

The Q value (i.e., how many times one vertical scanning period (V-Total) is longer than one horizontal scanning period) can be obtained by counting the number of times the gate voltage becomes high since the gate voltage for the gate bus line associated with the first row (i.e., the first gate start pulse) has been asserted and until the gate voltage for the gate bus line associated with the first row is asserted next time. In this case, Q is preferably calculated on a video signal that was supplied two frames ago. This is because if Q should be calculated on the video signal representing the current frame that is going to be presented, a frame memory would be needed, thus complicating the circuit configuration and increasing the cost excessively. Also, if Q is calculated on a video signal that was supplied one frame ago, then the situation where even- and odd-numbered frames have different vertical scanning periods cannot be coped with. However, if Q is calculated on a video signal that was supplied two frames ago, then there is no need to provide a frame memory and almost all methods of setting a vertical scanning period can be coped with.

Hereinafter, preferred embodiments of a liquid crystal display device and its driving method according to the present invention will be described in further detail by way of specific examples.

Embodiment 1

First, an exemplary method for driving a Type I liquid crystal display device will be described with reference to FIGS. 42A through 42D. The liquid crystal display device of this example may be the TypeI-1 LCD shown in FIG. 31(*a*), for example.

In this example, a video signal with a V-Total of 803H, a V-Blank of 35H, and a V-Disp of 768H is received, CS voltages of ten phases are supplied, the first waveform (in the first period) of the CS voltage oscillates between first and second voltage levels in an oscillation period of 10H (which is the first cycle time $P_A$), and the frame inversion drive is carried out by the 1H dot inversion technique. FIG. 42A shows the gate voltages supplied to a gate bus line G:001 for the first row and a gate bus line G:766 for the 766$^{th}$ row, the CS voltage and the voltage applied to pixels (only the voltage applied to bright subpixels is shown). In FIGS. 42B to 42D, the gate voltage is omitted and only the CS voltage and the voltage applied to pixels are shown.

After a display signal voltage has been written on pixels on the first row (i.e., after their associated TFTs have been turned OFF), the CS voltage CS1 on the CS bus line CS1 that is connected to the first row of pixels changes from the second voltage level into the first voltage level. In the following description, a CS voltage and its associated CS trunk will be identified by the same reference numeral. This CS voltage CS1 has been at the second voltage level for at least 5H when the second voltage level changes into the first voltage level. And once the CS voltage has changed its voltage levels, the CS voltage will repeatedly change its levels from the first voltage level into the second voltage level, and vice versa, every 5H (which corresponds to the first waveform). That is to say, the start point of the first waveform of the CS voltage (i.e., the start point of the first period) is set earlier than the point in time when the CS voltage changes for the first time after the TFT connected to the gate bus line for the associated row of pixels is turned OFF by at least a half of one cycle time of the first waveform (i.e., the first cycle time $P_A$). The same statement will also apply to the second through eighth preferred embodiments to be described below.

Hereinafter, it will be described why the CS voltage has been at the second voltage level for at least 5H when the CS voltage changes its levels for the first time after the TFT has been turned OFF. In this preferred embodiment, a number of independent CS voltages of multiple phases are used to extend one cycle time in which the CS voltage changes its levels (i.e., one period of oscillation) and thereby supply equivalent CS voltages with no waveform blunting to respective rows of pixels. To supply those equivalent CS voltages to respective rows of pixels that are connected to the same CS trunk, a period of time of at least 5H (which is a half or more as long as the first cycle time $P_A$) is guaranteed before the CS voltage changes its levels for the first time after the TFTs have been turned OFF.

The last one of the rows of effective pixels that are connected to this CS trunk CS1 is a row of pixels to be selected by the 766$^{th}$ gate bus line G:766. And once the CS voltage changes its levels from the first voltage level into the second voltage level after the display signal voltage has been written on the 766$^{th}$ row of pixels, there is no need to change the voltage levels every 5H (i.e., in an oscillation period of 10H) in the 38H period (which is the second period or period B in which the first and second voltage levels are allocated equally) before the display signal voltage of the next frame starts being written on the pixels of the 1$^{st}$ row again. However, to equalize the CS voltage levels of all rows of pixels with each other, the CS voltage needs to have been at the first voltage level for 5H when the CS voltage changes its levels from the first voltage level into the second voltage level after the display signal voltage has been written on the pixels of the first row in the next frame.

That is why as shown in FIGS. 42A through 42D, the CS voltage CS1 has been at the second voltage level for 5H when the CS voltage changes its levels from the second voltage level into the first voltage level after the display signal voltage has been written on the first row of pixels. After that, the CS voltage CS1 will switch its levels between the first and second voltage levels every 5H. And after the display signal voltage has been written on the 766$^{th}$ row of pixels and before the display signal voltage of the next frame starts being written on the first row of pixels, the CS voltage CS1 changes its levels at least once from the second voltage level into the first voltage level.

In the remaining 38H period (=803H−765H, which is the second period) after the voltage levels have been switched every 5H for the 765H period (which is the first period), the second waveform, of which a part at the first voltage level is as long as the other part at the second voltage level, is supposed to be adopted. As for this 38H period (i.e., the second period), the sum of the periods at the first voltage level just needs to be as long as that of the periods at the second voltage level, and the cycle time is not particularly limited. Specifically, each of the periods at the first and second voltage levels may be 19H as shown in FIG. 42A. Alternatively, periods in which the first and second voltage levels switch every 5H may be combined with periods in which the first and second voltage levels switch every H as shown in FIG. 42B. Still alternatively, an oscillating waveform in which these two voltage levels alternate at an interval of less than 1H may even be adopted as shown in FIG. 42C. Furthermore, a waveform with a fifth voltage level, which is different from the first and second voltage levels, may also be adopted.

By supplying these CS voltages, the stripes shown in FIG. 34 can be eliminated and good display performance is realized.

In the example illustrated in FIGS. 42A through 42D, V-Total=803H. However, if V-Total=809H (V-Blank=44H), the second waveform after the 765H oscillation period (i.e., the first period) is over may have a first voltage level period of 22H and a second voltage level period of 22H.

In this preferred embodiment, the second period is an even number of times as long as one horizontal scanning period H (i.e., 38H or 44H). Therefore, the effective value of the second waveform of the CS voltages may be defined to be a predetermined constant value during one vertical scanning period (e.g., the average of the first and second voltage levels in this example). Since the first period is 765H and since the effective value of the first waveform of the CS voltages is not equal to the average of the first and second voltage levels but is a constant value, the effective value of the CS voltages can be a constant value in the overall vertical scanning period. Consequently, the stripes shown in FIG. 34 are not visible on the screen.

Embodiment 2

Next, another exemplary method for driving a Type I liquid crystal display device will be described with reference to FIGS. 43 and 44. The liquid crystal display device of this example may be the TypeI-1 LCD shown in FIG. 31(*a*), for example.

In this example, a video signal with a V-Total of 804H, a V-Blank of 36H, and a V-Disp of 768H is received, CS voltages of ten phases are supplied, the first waveform (in the first period) of the CS voltage oscillates between first and second voltage levels in an oscillation period of 10H (which is the first cycle time $P_A$), and the frame inversion drive is carried out by the 1H dot inversion technique.

The CS voltages have almost the same waveforms as the first preferred embodiment described above. However, as V-Total increases by 1H, the first period remains 765H but the second period increases by 1H to 39H. If the second period of 39H is evenly split into two periods to be allocated to the first and second voltage levels, respectively, then each of those two periods becomes 19.5H. However, as it is difficult, and would raise the price of the circuit excessively, to allocate the 0.5H period according to the current signal processing technology, the 39H period is actually split into a 19H period and a 20H period. In this case, if those two periods always came up in the order of 19H and 20H as shown in FIG. 43, then a number of rows of pixels that are connected to the same CS trunk CS1 would be classified into a group of rows of pixels that are always bright for 19H (including the 1$^{st}$, 11$^{th}$, 21$^{st}$ and other rows of pixels) and another group of rows of pixels that are always bright for 20H (including the $6^{th}$, . . . $756^{th}$, and $766^{th}$ rows of pixels). As for the voltages applied to those pixels, a difference would be made in the applied voltage in the shadowed periods, thus causing a luminance difference and producing bright and dark stripes such as those shown in FIG. 34.

In this manner, if the second period is an odd number of times as long as one horizontal scanning period H, then the first and second voltage level periods are defined to be 19H and 20H, respectively, for one frame and to be 19H and 20H again, respectively, for the next frame as shown in FIG. 44. That is to say, in any pair of two consecutive frames, the first voltage level period is set shorter than the second voltage level period by 1H. In that case, the $6^{th}$, . . . $756^{th}$ and $766^{th}$ rows of pixels will be brighter than the $1^{st}$, $11^{th}$, $21^{st}$ and other rows of pixels in one frame, but the $1^{st}$, $11^{th}$, $21^{st}$ and other rows of pixels will be brighter than the $6^{th}$, . . . $756^{th}$ and $766^{th}$ rows of pixels in the next frame. Consequently, in these two consecutive frames, the luminance ranks can be equalized with each other on the $1^{st}$, $6^{th}$, $11^{th}$, $16^{th}$ . . . $756^{th}$ and $766^{th}$ rows of pixels, thus eliminating the stripes.

In this preferred embodiment, the second period is 39H, which is an odd number of times as long as one horizontal scanning period H, and therefore, it is difficult to set the effective value of the second waveform of the CS voltages equal to a predetermined constant value within one vertical scanning period. That is why the effective value is set to be a predetermined constant value every two consecutive vertical scanning periods. Naturally, it is possible to set the effective value equal to a constant value every more than two consecutive frame periods. However, if the interval were 20 or more frame periods, then the effect of equalizing the effective values could not be achieved fully. For that reason, the effective value is preferably made constant in as short an interval as possible. Specifically, the interval is preferably four frame periods or less. In this example, two frame periods are the shortest and most preferable interval.

In the liquid crystal display device of the first preferred embodiment described above, the second period is an even number of times as long as one horizontal scanning period, and therefore, the effective value of the second waveform can be set equal to a predetermined constant value every vertical scanning period. Alternatively, the effective value may be set equal to a predetermined value every two or more consecutive vertical scanning periods as is done in this preferred embodiment.

Embodiment 3

Next, still another exemplary method for driving a Type I liquid crystal display device will be described with reference to FIGS. 45A and 45B. The liquid crystal display device of this example may be the TypeI-1 LCD shown in FIG. 31(*a*), for example.

In this example, a video signal with a V-Total of 804H, a V-Blank of 36H, and a V-Disp of 768H and a video signal with a V-Total of 803H, a V-Blank of 35H, and a V-Disp of 768H are received alternately every other frame, CS voltages of ten phases are supplied, the first waveform (in the first period) of the CS voltage oscillates between first and second voltage levels in an oscillation period of 10H (which is the first cycle time $P_A$), and the frame inversion drive is carried out by the 1H dot inversion technique.

The CS voltages have almost the same waveforms as the preferred embodiments described above. However, when V-Total is 804H, the first period is 765H but the second period is 39H. If the second period is evenly split into two periods to be allocated to the first and second voltage levels, respectively, then each of those two periods becomes 19.5H. As already described for the second preferred embodiment, it is difficult, and would raise the price of the circuit excessively, to allocate the 0.5H period according to the current signal processing technology. That is why the 39H period is actually split into a 19H period and a 20H period. On the other hand, when V-Total is 803H, the first period remains the same but the second period is 38H. Thus, the second period can be evenly split of two periods of 19H each.

In this case, if one frame has a V-Total of 804H, the CS voltage in the second period (i.e., the second waveform) has a first voltage level period of 19H and a second voltage level period of 20H as shown in FIG. 45A. As V-Total=803H in the next frame, the second waveform has a first voltage level period of 19H and a second voltage level period of 19H. As V-Total=804H again in the third frame, the second waveform has a first voltage level period of 20H and a second voltage level period of 19H. And in the frame that follows, V-Total=803H again, and therefore, the second waveform has a first voltage level period of 19H and a second voltage level period of 19H.

If the second period alternately becomes an even number of times, and an odd number of times, as long as one horizontal scanning period every vertical scanning period as described above, the stripes can be eliminated and good display performance is realized by setting the effective value of the second waveform of the CS voltage equal to a predetermined constant value every four consecutive frame periods. Alternatively, the effective value of the second waveform may also be set equal to a predetermined constant value every more than four frame periods. And the second waveform is not limited to that waveform, either. Optionally, the second waveform may be defined such that the first and second voltage levels switch every horizontal scanning period H as shown in FIG. 45B, for example.

Embodiment 4

Next, an exemplary method for driving a Type II liquid crystal display device will be described with reference to FIGS. 46A through 46D. The liquid crystal display device of this example may be the TypeII-1 LCD shown in FIG. 32(*a*), for example.

In this example, a video signal with a V-Total of 804H, a V-Blank of 36H, and a V-Disp of 768H is received, CS voltages of ten phases are supplied, the first waveform (in the first period) of the CS voltage oscillates between first and second voltage levels in an oscillation period of 20H (which is the first cycle time $P_A$), and the frame inversion drive is carried out by the 1H dot inversion technique.

After a display signal voltage has been written on pixels on the first row (i.e., after their associated TFTs have been turned OFF), the CS voltage CS1 on the CS bus line CS1 that is connected to the first row of pixels changes from the second voltage level into the first voltage level. This CS voltage CS1 has been at the second voltage level for at least 10H when the second voltage level changes into the first voltage level. And once the CS voltage has changed its voltage levels, the CS voltage will repeatedly change its levels from the first voltage level into the second voltage level, and vice versa, every 10H.

In this case, the CS voltage has been at the second voltage level for at least 10H (i.e., for at least a half of one oscillation period) when the CS voltage changes its voltage levels in order to supply equivalent CS voltages to the respective rows of pixels that are connected to the same CS trunk as already described for the first preferred embodiment.

The last one of the rows of effective pixels that are connected to this CS trunk CS1 is a row of pixels to be selected by the 761$^{st}$ gate bus line G:761. And once the CS voltage changes its levels from the second voltage level into the first voltage level after the display signal voltage has been written on the 761$^{st}$ row of pixels, there is no need to change the voltage levels every 10H (i.e., in an oscillation period of 20H) in the remaining 44H period (i.e., the second period) before the display signal voltage of the next frame starts being written on the pixels of the 1$^{st}$ row again. However, to equalize the CS voltage levels of all rows of pixels with each other, the CS voltage needs to have been at the first voltage level for 10H when the CS voltage changes its levels from the first voltage level into the second voltage level after the display signal voltage has been written on the pixels of the first row in the next frame.

That is why as shown in FIG. 46A, the CS voltage CS1 has been at the second voltage level for 10H when the CS voltage changes its levels from the second voltage level into the first voltage level after the display signal voltage has been written on the first row of pixels. After that, the CS voltage CS1 will switch its levels between the first and second voltage levels every 10H. And after the display signal voltage has been written on the 761$^{st}$ row of pixels and before the display signal voltage of the next frame starts being written on the first row of pixels, the CS voltage CS1 changes its levels at least once from the second voltage level into the first voltage level.

In the remaining 34H period (=804H−770H, which is the second period) after the voltage levels have been switched every 10H for the 770H period (which is the first period), the second waveform, of which a part at the first voltage level is as long as the other part at the second voltage level, is supposed to be adopted. As for this 34H period (i.e., the second period), the sum of the periods at the first voltage level just needs to be as long as that of the periods at the second voltage level, and the cycle time is not particularly limited. Specifically, each of the periods at the first and second voltage levels may be 17H as shown in FIG. 46A. Alternatively, the first and second voltage levels may switch every H as shown in FIG. 46B. Still alternatively, an oscillating waveform in which these two voltage levels alternate at an interval of less than 1H as shown in FIG. 46C may even be adopted. Furthermore, a waveform with a fifth voltage level, which is different from the first and second voltage levels, may also be adopted as shown in FIG. 46D.

By supplying these CS voltages, the stripes shown in FIG. 38 can be eliminated and good display performance is realized.

In the examples illustrated in FIGS. 46A through 46D, V-Total=804H. However, if V-Total=810H (V-Blank=40H), the second waveform after the 770H oscillation period (i.e., the first period) is over may have a first voltage level period of 20H and a second voltage level period of 20H.

In this preferred embodiment, the second period is an even number of times as long as one horizontal scanning period H as in the liquid crystal display device of the first preferred embodiment described above. Therefore, the effective value of the second waveform of the CS voltages may be defined to be a predetermined constant value during one vertical scanning period (e.g., the average of the first and second voltage levels in this example). Also, the first period is 770H and the effective value of the first waveform of the CS voltages may be equal to the average of the first and second voltage levels, too.

Embodiment 5

Next, another exemplary method for driving a Type II liquid crystal display device will be described with reference to FIGS. 47A through 47D and FIG. 48. The liquid crystal display device of this example may be the TypeII-1 LCD shown in FIG. 32(*a*), for example.

In this example, a video signal with a V-Total of 803H, a V-Blank of 35H, and a V-Disp of 768H is received, CS voltages of ten phases are supplied, the first waveform (in the first period) of the CS voltage oscillates between first and second voltage levels in an oscillation period of 20H (which is the first cycle time $P_A$), and the frame inversion drive is carried out by the 1H dot inversion technique.

The CS voltages have almost the same waveforms as the fourth preferred embodiment described above. However, as V-Total decreases by 1H, the first period remains 770H but the second period decreases by 1H to 33H. If the second period of 33H is evenly split into two periods to be allocated to the first and second voltage levels, respectively, then each of those two periods becomes 16.5H. However, as it is difficult, and would raise the price of the circuit excessively, to allocate the 0.5H period according to the current signal processing technology, the 33H period is actually split into a 17H period and a 16H period. In this case, if those two periods always came up in the order of 16H and 17H as shown in FIG. 47B, then a number of rows of pixels that are connected to the same CS trunk CS1 would be classified into a group of rows of pixels that are always bright for 16H (including the 1$^{st}$, 21$^{st}$, 41$^{st}$ and other rows of pixels) and another group of rows of pixels that are always bright for 17H (including the 12$^{th}$, 32$^{nd}$, 52$^{nd}$ and other rows of pixels). As for the voltages applied to those pixels, a difference would be made in the applied voltage in the shadowed periods, thus causing a luminance difference and producing bright and dark stripes such as those shown in FIG. 38. In this case, there is also a difference in applied voltage between the 1$^{st}$, 3$^{rd}$, 5$^{th}$, 7$^{th}$ and 9$^{th}$ rows of pixels and the 2$^{nd}$, 4$^{th}$, 6$^{th}$, 8$^{th}$ and 10$^{th}$ rows of pixels as indicated by the horizontal stripes (with a width of 1H) in FIG. 47C. However, as the bright and dark states alternate every row of pixels, the display quality is hardly affected. On the other hand, the even split of the second period into the first and second voltage level periods occurs every 10 rows of pixels, thus producing quite visible unevenness in brightness on the screen.

Therefore, if the second period to be evenly split into the first and second voltage level periods is an odd number of times as long as one horizontal scanning period H, then the first and second voltage level periods are defined to be 16H and 17H, respectively, for one frame and to be 16H and 17H again, respectively, for the next frame as shown in FIG. 48. That is to say, in any pair of two consecutive frames, the first voltage level period is set shorter than the second voltage level period by 1H. In that case, the 12$^{th}$, 32$^{nd}$, 52$^{nd}$ and other rows of pixels will be brighter than the 1$^{st}$, 21$^{st}$, 41$^{st}$ and other rows of pixels in one frame, but the 1$^{st}$, 21$^{st}$, 41$^{st}$ and other rows of pixels will be brighter than the 12$^{th}$, 32$^{nd}$, 52$^{nd}$ and other rows of pixels in the next frame. Consequently, in these two consecutive frames, the luminance ranks can be equalized with each other on the 1$^{st}$, 12$^{th}$, 21$^{st}$, 32$^{nd}$, 41$^{st}$, 52$^{nd}$ and other rows of pixels, thus eliminating the stripes. Optionally, the second waveform may be defined such that the first and second voltage levels switch every horizontal scanning period H as shown in FIG. 47D.

In this preferred embodiment, the second period is 33H, which is an odd number of times as long as one horizontal scanning period H, and therefore, it is difficult to set the effective value of the second waveform of the CS voltages equal to a predetermined constant value within one vertical scanning period. That is why the effective value is set to be a predetermined constant value every two consecutive vertical scanning periods. Naturally, it is possible to set the effective value equal to a constant value every more than two consecutive frame periods. However, if the interval were 20 or more frame periods, then the effect of equalizing the effective values could not be achieved fully. For that reason, the effective value is preferably made constant in as short an interval as possible. Specifically, the interval is preferably four frame periods or less. In this example, two frame periods are the shortest and most preferable interval.

In the liquid crystal display device of the fourth preferred embodiment described above, the second period is an even number of times as long as one horizontal scanning period, and therefore, the effective value of the second waveform can be set equal to a predetermined constant value every vertical scanning period. Alternatively, the effective value may be set equal to a predetermined value every two or more consecutive vertical scanning periods as is done in this preferred embodiment.

Embodiment 6

Next, still another exemplary method for driving a Type II liquid crystal display device will be described with reference to FIGS. 49A through 49D. The liquid crystal display device of this example may be the TypeII-1 LCD shown in FIG. 32(*a*), for example.

In this example, a video signal with a V-Total of 804H, a V-Blank of 36H, and a V-Disp of 768H and a video signal with a V-Total of 803H, a V-Blank of 35H, and a V-Disp of 768H are received alternately every other frame, CS voltages of ten phases are supplied, the first waveform (in the first period) of the CS voltage oscillates between first and second voltage levels in an oscillation period of 20H (which is the first cycle time $P_A$), and the frame inversion drive is carried out by the 1H dot inversion technique.

The CS voltages have almost the same waveforms as the fourth and fifth preferred embodiments described above. However, when V-Total is 804H, the first period is 770H and the second period is 34H. Thus, the second period may be evenly split into first and second voltage level periods of 17H each. On the other hand, when V-Total is 803H, the first period remains 770H but the second period is 33H. If the second period is evenly split into two periods to be allocated to the first and second voltage levels, respectively, then each of those two periods becomes 16.5H. As it is difficult, and would raise the price of the circuit excessively, to allocate the 0.5H period according to the current signal processing technology, the 33H period is actually split into a 17H period and a 16H period.

In this case, if one frame has a V-Total of 804H, the CS voltage in the second period (i.e., the second waveform) has a first voltage level period of 17H and a second voltage level period of 17H as shown in FIG. 49A. As V-Total=803H in the next frame, the second waveform has a first voltage level period of 16H and a second voltage level period of 17H as shown in FIG. 49A. As V-Total=804H again in the third frame, the second waveform has a first voltage level period of 17H and a second voltage level period of 17H. And in the frame that follows, V-Total=803H again, and therefore, the second waveform has a first voltage level period of 17H and a second voltage level period of 16H as shown in FIG. 49B.

In FIGS. 49A and 49B, there is also a difference in applied voltage between the $1^{st}$, $3^{rd}$, $5^{th}$, $7^{th}$ and $9^{th}$ rows of pixels and the $2^{nd}$, $4^{th}$, $6^{th}$, $8^{th}$ and $10^{th}$ rows of pixels as indicated by the horizontal stripes (with a width of 1H). However, as the bright and dark states alternate every row of pixels, the display quality is hardly affected.

If the second period alternately becomes an even number of times, and an odd number of times, as long as one horizontal scanning period every vertical scanning period as described above, the stripes can be eliminated and good display performance is realized by setting the effective value of the second waveform of the CS voltage equal to a predetermined constant value every four consecutive frame periods. Alternatively, the effective value of the second waveform may also be set equal to a predetermined constant value every more than four frame periods. And the second waveform is not limited to that waveform, either. Optionally, the second waveform may be defined such that the first and second voltage levels switch every horizontal scanning period H as shown in FIGS. 49C and 49D, for example.

Embodiment 7

Next, still another exemplary method for driving a Type I liquid crystal display device will be described with reference to FIGS. 50 and 51. The liquid crystal display device of this example may be the TypeI-1 LCD shown in FIG. 31(*a*), for example.

In the first, second and third preferred embodiments of the Type I liquid crystal display device described above, the CS voltages are supposed to have a first period with a periodic oscillation of 765H out of a V-Total of 803H or 804H and a second period of 38H for the first preferred embodiment, 39H for the second preferred embodiment, and 39H and 38H that alternate frame by frame for the third preferred embodiment.

However, the length of the first period is not limited to these specific examples. Alternatively, 795H out of a V-Total of 803H may be the first period in which the wave oscillates in a cycle time of 10H, and the remaining 8H or 9H period may be the second period as shown in FIG. 50.

In this manner, the more regular one period of oscillation of the CS voltage (i.e., the longer the first period), the more significantly the display quality and reliability can be improved.

If the pixels form a number N of pixel rows, an effective display period (V-Disp) is N times as long as one horizontal scanning period (if V-Disp=N·H), and one period of oscillation of the first waveform of the CS voltages has a first cycle time $P_A$, then the first period (A) satisfies $A=[\mathrm{Int}\{(N\cdot H-P_A/2)/P_A\}+½]\cdot P_A+M\cdot P_A$, where Int(x) is an integral part of an arbitrary real number x and M is an integer that is equal to or greater than zero.

Supposing N=768 and $P_A$=10H, $\mathrm{Int}\{(768H-5H)/10H\}=76$. As a result, A=765H+M·10H.

In this case, when M=0, A=765H. And when M=3, A=795H. Since the first period (A) is naturally shorter than V-Total, M can be at most equal to three. That is why in this example, the length of the first period may be appropriately controlled within the range of 765H to 795H but is most preferably equal to 795H.

This CS voltage may be generated in response to a CS timing signal that has been generated by the CS controller shown in FIG. 51.

The liquid crystal display device 100 shown in FIG. 51 includes an LCD panel 20, a controller 30, and the CS controller 40. The controller 30 receives a composite video signal, including a video signal and a sync signal, from an external device and supplies a gate start pulse GPS and a gate clock signal GCK to the LCD panel 20 and the CS controller 40. The CS controller 40 supplies a CS timing signal to the LCD panel 20 by performing the processing steps to be described below. In response to the CS timing signal, the LCD panel 20 generates a CS voltage, oscillating between predetermined voltage levels, based on the externally supplied voltage.

The CS controller 40 performs the following processing steps.

First of all, the CS controller 40 calculates an integer Q, the product (Q·H) of which and one horizontal scanning period H is equal to one vertical scanning period (V-Total) of an input video signal. That is to say, the CS controller 40 calculates how many times one vertical scanning period is longer than one horizontal scanning period. The Q value can be obtained by counting the number of times the gate voltage becomes high since the gate voltage for the gate bus line associated with the first row (i.e., the first gate start pulse) has been asserted and until the gate voltage for the gate bus line associated with the first row is asserted next time. This counting may be performed by a known counter, for example. In this case, Q is preferably calculated on a video signal that was supplied two frames ago. This is because if Q should be calculated on the video signal representing the current frame that is going to be presented, a frame memory would be needed, thus complicating the circuit configuration and increasing the cost excessively.

Next, the CS controller 40 calculates A that satisfies A=[Int{(Q−L)/L}+½]·L·H (where Int(x) is an integral part of an arbitrary real number x). In this case, as Q=803 (or 804) and L=10 ($P_A$=10H), A=795H.

Alternatively, if the number N of pixel rows on the display area is already known (e.g., stored in a memory), then the CS controller 40 may calculate A that satisfies A=[Int{(N−L/2)/L}+½]·L·H+M·L·H (where Int(x) is an integral part of an arbitrary real number x and M is an integer that is equal to or greater than zero) when one horizontal scanning period is identified by H and an effective display period (V-Disp) is N·H. It should be noted that the longest A (=795H) is preferably calculated.

The processing step of calculating A may be performed by a known arithmetic and logic unit, for example. L (and M) may be stored in a memory, for instance. M is preferably defined such that the length A of the first period is maximized but does not exceed V-Total. Naturally, Q, N, L, K and M may be stored in a memory in advance. Optionally, the calculations may also be done by means of software.

Next, B that satisfies Q·H−A=B is calculated. That is to say, the length of the second period is figured out.

The waveform of the CS voltage during the second period (i.e., the second waveform) is defined such that the average (effective value) during the second period is equal to that of the first and second voltage levels. If the second waveform is an oscillating wave, then the second waveform may oscillate between third and fourth voltage levels and the average of the third and fourth voltage levels may be equal to that of the first and second voltage levels. However, if the third and fourth voltage levels are equal to the first and second voltage levels, respectively, then the circuit configuration can be simplified. On the other hand, if the second waveform is not an oscillating wave, then the circuit will be expensive but a fifth voltage level, which is equal to the average of the first and second voltage levels, may be used.

Also, if the second waveform is an oscillating wave with a cycle time of 2H or more and if B/H is an even number, then the period at the first voltage level may be defined to be as long as the period at the second voltage level. On the other hand, if B/H is an odd number, the period at the first voltage level may be shorter than the period at the second voltage level by one horizontal scanning period in one vertical scanning period. And in the second period of the next vertical scanning period, the period at the first voltage level may also be shorter than the period at the third voltage level by one horizontal scanning period. Specific examples have already been described with respect to the first through third preferred embodiments and this seventh preferred embodiment.

Embodiment 8

Next, still another exemplary method for driving a Type II liquid crystal display device will be described with reference to FIG. 52. The liquid crystal display device of this example may be the TypeII-1 LCD shown in FIG. 32(*a*), for example.

In the fourth, fifth and sixth preferred embodiments of the Type II liquid crystal display device described above, the CS voltages are supposed to have a first period with a periodic oscillation of 770H out of a V-Total of 804H or 803H and a second period of 34H for the fourth preferred embodiment, 33H for the fifth preferred embodiment, and 34H and 33H that alternate frame by frame for the sixth preferred embodiment.

However, the length of the first period is not limited to these specific examples. Alternatively, 790H out of a V-Total of 804H may be the first period in which the wave oscillates in a cycle time of 20H, and the remaining 14H or 13H period may be the second period as shown in FIG. 52.

In this manner, the more regular one period of oscillation of the CS voltage (i.e., the longer the first period), the more significantly the display quality and reliability can be improved.

If the pixels form a number N of pixel rows, an effective display period (V-Disp) is N times as long as one horizontal scanning period (if V-Disp=N·H), and one period of oscillation of the first waveform of the CS voltages has a first cycle time $P_A$, then the first period (A) satisfies A=[Int{(N·H−$P_A$/2)/$P_A$}+½]·$P_A$+M·$P_A$, where Int(x) is an integral part of an arbitrary real number x and M is an integer that is equal to or greater than zero.

Supposing N=768 and $P_A$=20H, Int{(768H−10H)/20H}=37. As a result, A=750H+M·20H.

In this case, when M=0, A=750H. And when M=2, A=790H. Since the first period (A) is naturally shorter than V-Total, M can be at most equal to two. That is why in this example, the length of the first period may be appropriately controlled within the range of 750H to 790H but is most preferably equal to 790H.

As in the seventh preferred embodiment, the CS voltage described above may be generated in response to a CS timing signal that has been generated by the CS controller shown in FIG. 51.

First of all, an integer Q, the product (Q·H) of which and one horizontal scanning period H is equal to one vertical scanning period (V-Total) of an input video signal, is calculated.

Next, A that satisfies A=[Int{(Q−2·K·L)/(2·K·L)}+½]·2·K·L·H (where Int(x) is an integral part of an arbitrary real number x and K is a positive integer) is calculated. In this case, as Q=804 (or 803), L=10 and K=1 ($P_A$=20H), A=790H.

Alternatively, if the number N of pixel rows on the display area is already known (e.g., stored in a memory), then A that satisfies A=[Int{(N−K·L)/(2·K·L)}+½]·2·K·L·H+2·M·K·L·H (where Int(x) is an integral part of an arbitrary real number x, K is a positive integer, and M is an integer that is equal to or greater than zero) may be calculated when one horizontal scanning period is identified by H and an effective display period (V-Disp) is N·H. It should be noted that the longest A (=790H) is preferably calculated.

Next, B that satisfies Q·H−A=B is calculated. That is to say, the length of the second period is figured out.

The waveform of the CS voltage during the second period (i.e., the second waveform) may be defined as already described for the seventh preferred embodiment. Specific examples have already been described with respect to the fourth through sixth preferred embodiments and this eighth preferred embodiment.

Embodiment 9

Next, still another exemplary method for driving a Type I liquid crystal display device will be described with reference to FIG. 53. The liquid crystal display device of this example may be the TypeI-1 LCD shown in FIG. 31(*a*), for example.

In the first through eighth preferred embodiments described above, the start point of the first waveform (i.e., the start point of the first period) of the CS voltage is set earlier than the point in time when the TFTs connected to the gate bus line of the associated row of pixels are turned OFF by at least a half period of the first waveform (i.e., a half of the first cycle time $P_A$). This timing is adopted to supply equivalent CS voltages to all of the rows of pixels that are connected to the same CS trunk. However, the start point of the first waveform of the CS voltage may also be set later than the point in time when the TFTs connected to the gate bus line of the associated row of pixels are turned OFF. A preferred CS voltage waveform in that situation will be described below.

For example, in the seventh preferred embodiment described above, 795H out of V-Total of 803H is defined as the first period and the remaining 8H period as the second period. In that case, that second period of the CS voltage is evenly split into two 4H periods to be allocated to the first and second voltage levels, respectively. That is why if the start point of the first period is ahead of the point in time when the TFTs on the associated row of pixels are turned OFF by at least a half of the first cycle time $P_A$ as shown in FIG. 50, equivalent CS voltages can be supplied to respective rows of pixels that are connected to the same CS trunk.

However, if the first period is started later (e.g., 1H later) than the point in time when the TFTs on the associated row of pixels are turned OFF, then the voltage level of the CS voltage that changes after the TFTs connected to Gate:001 for the first row of pixels have been turned OFF will be maintained for 4H, which is different from the other rows of pixels. This is because the second period is evenly split into two 4H periods that are allocated to the first and second voltage levels.

To overcome this problem, the liquid crystal display device of this preferred embodiment sets those portions of the second period allocated to the first and second voltage levels to be equal to greater than a half of the first cycle time $P_A$ but equal to or smaller than the first cycle time $P_A$.

Specifically, if V-Total=803H, the first period may be 785H, the second period may be the remaining 18H, and that second period may be evenly split into two 9H periods to be allocated to the first and second voltage levels, respectively, as shown in FIG. 53. If the CS voltage waveform is defined in this manner, equivalent CS voltages can be supplied to the respective rows of pixels that are connected to the same CS trunk, no matter whether the first period of the CS voltage is started before the associated TFTs are turned OFF as in the CS signal #1 shown in the upper portion of FIG. 53 (and as already described for the seventh preferred embodiment) or after the associated TFTs have been turned OFF as in the CS signal #2 shown in the lower portion of FIG. 53.

To set the second period as described above, if one vertical scanning period (V-Total) is Q times as long as one horizontal scanning period (i.e., if V-Total=Q·H) and if the first cycle time is identified by $P_A$, the first period A should satisfy: $A=[\mathrm{Int}\{(Q\cdot H-3\cdot P_A/2)/P_A\}+\frac{1}{2}]\cdot P_A$, where Int(x) is an integral part of an arbitrary real number x.

Supposing Q=803 and $P_A$=10H, Int{(803H−15H)/10H}=78. As a result, A=785H.

As in the seventh preferred embodiment, the CS voltage described above may be generated in response to a CS timing signal that has been generated by the CS controller shown in FIG. 51.

First of all, an integer Q, the product (Q·H) of which and one horizontal scanning period H is equal to one vertical scanning period (V-Total) of an input video signal, is calculated.

Next, A that satisfies $A=[\mathrm{Int}\{(Q-3\cdot L/2)/L\}+\frac{1}{2}]\cdot L$ (where Int(x) is an integral part of an arbitrary real number x) is calculated. In this case, as Q=803, L=10 ($P_A$=10H), A=785H.

Next, B that satisfies Q·H−A=B is calculated. That is to say, the length of the second period is figured out.

The waveform of the CS voltage during the second period (i.e., the second waveform) may be defined as already described for the seventh preferred embodiment. Specific examples have already been described with respect to the first through third preferred embodiments, the seventh preferred embodiment and this ninth preferred embodiment.

By setting the first period of the CS voltage as long as possible and by maintaining the respective voltage levels for $P_A/2$ to $P_A$ during the second period as described above, equivalent CS voltages can be supplied to the respective rows of pixels that are connected to the same CS trunk, no matter whether the first period of the CS voltage is started before or after the associated TFTs are turned OFF. As a result, a display device with high reliability can be provided without debasing the display quality.

Embodiment 10

Next, still another exemplary method for driving a Type II liquid crystal display device will be described with reference to FIG. 54. The liquid crystal display device of this example may be the TypeII-1 LCD shown in FIG. 32(*a*), for example.

In the liquid crystal display device of the eighth preferred embodiment described above, 790H out of V-Total of 804H is defined as the first period and the remaining 14H period as the second period. In that case, that second period of the CS voltage is evenly split into two 7H periods to be allocated to the first and second voltage levels, respectively. That is why if the start point of the first period is ahead of the point in time when the TFTs on the associated row of pixels are turned OFF by at least a half of the first cycle time $P_A$ as shown in FIG. 52, equivalent CS voltages can be supplied to respective rows of pixels that are connected to the same CS trunk.

However, if the first period is started later (e.g., 1H later) than the point in time when the TFTs on the associated row of pixels are turned OFF, then the voltage level of the CS voltage that changes after the TFTs connected to Gate:001 for the first row of pixels have been turned OFF will be maintained for 7H, which is different from the other rows of pixels. This is because the second period is evenly split into two 7H periods that are allocated to the first and second voltage levels.

To overcome this problem, the liquid crystal display device of this preferred embodiment sets those portions of the second period allocated to the first and second voltage levels to be equal to greater than a half of the first cycle time $P_A$ but equal to or smaller than the first cycle time $P_A$.

Specifically, if V-Total=824H, the first period may be 790H, the second period may be the remaining 34H, and that second period may be evenly split into two 17H periods to be allocated to the first and second voltage levels, respectively, as shown in FIG. 54. If the CS voltage waveform is defined in this manner, equivalent CS voltages can be supplied to the respective rows of pixels that are connected to the same CS trunk, no matter whether the first period of the CS voltage is started before the associated TFTs are turned OFF as in the CS signal #1 shown in the upper portion of FIG. 54 (and as already described for the eighth preferred embodiment) or after the associated TFTs have been turned OFF as in the CS signal #2 shown in the lower portion of FIG. 54.

To set the second period as described above, if one vertical scanning period (V-Total) is Q times as long as one horizontal scanning period (i.e., if V-Total=Q·H) and if the first cycle time is identified by $P_A$, the first period A should satisfy: $A=[\mathrm{Int}\{(Q\cdot H-3\cdot P_A/2)/P_A\}+1/2]\cdot P_A$, where Int(x) is an integral part of an arbitrary real number x.

Supposing Q=824 and $P_A$=20H, Int{(824H−30H)/20H}=39. As a result, A=790H.

As in the seventh preferred embodiment, the CS voltage described above may be generated in response to a CS timing signal that has been generated by the CS controller shown in FIG. 51.

First of all, an integer Q, the product (Q·H) of which and one horizontal scanning period H is equal to one vertical scanning period (V-Total) of an input video signal, is calculated.

Next, A that satisfies $A=[\mathrm{Int}\{(Q-3\cdot K\cdot L)/(2\cdot K\cdot L)\}+1/2]\cdot 2\cdot K\cdot L\cdot H$ (where Int(x) is an integral part of an arbitrary real number x and K is a positive integer) is calculated. In this case, as Q=824, L=10 and K=1 ($P_A$=20H), A=790H.

Next, B that satisfies Q·H−A=B is calculated. That is to say, the length of the second period is figured out.

The waveform of the CS voltage during the second period (i.e., the second waveform) may be defined as already described for the eighth preferred embodiment. Specific examples have already been described with respect to the fourth through sixth preferred embodiments, the eighth preferred embodiment and this tenth preferred embodiment.

By setting the first period of the CS voltage as long as possible and by maintaining the respective voltage levels for $P_A/2$ to $P_A$ during the second period as described above, equivalent CS voltages can be supplied to the respective rows of pixels that are connected to the same CS trunk, no matter whether the first period of the CS voltage is started before or after the associated TFTs are turned OFF. As a result, a display device with high reliability can be provided without debasing the display quality.

Embodiments in which Luminance Ranking Between Subpixels is Reversed

Each of the liquid crystal display devices described above satisfies the second requirement that the luminance ranking of subpixels with mutually different luminances should always remain the same (see FIGS. 4A, 4B, 11A, 11B, 16A and 16B, for example). FIG. 55(*a*) schematically illustrates a sequence (i.e., changes with time) of the luminance rankings and drive polarities (i.e., the signs "+" and "−" shown under the subpixels) of the subpixels 1-*a*-A and 1-*a*-B of a certain pixel (which may be the pixel 1-*a* on the first row in this example) in the liquid crystal display device of the preferred embodiment described above. Those changes with time are shown frame by frame as two sequences over six consecutive frames consisting of the first through sixth frames F1 through F6. In the following description, one vertical scanning period of an input video signal is also supposed to be as long as one vertical scanning period of the liquid crystal display device, and supposed to be one frame, for the sake of simplicity. Also, the liquid crystal display device of the following example is also supposed to have a pixel arrangement that is suitable for 1H 1 dot inversion drive.

According to the sequence shown in FIG. 55(*a*), if attention is paid to a particular pixel (i.e., the pixel 1-*a* in this example), the drive polarity inverts one frame after another (i.e., this is a frame inversion drive). On the other hand, the luminance ranking of the subpixels 1-*a*-A and 1-*a*-B in the pixel 1-*a* remains the same all through those frames. That is to say, the upper subpixel 1-*a*-A of the pixel 1-*a* always stays a bright subpixel (i.e., in the first place in luminance ranking) every frame, while the lower subpixel 1-*a*-B of the pixel 1-*a* always stays a dark subpixel (i.e., in the second place in luminance ranking) every frame.

The present inventors discovered that if the luminance ranking of subpixels always remained the same in this manner, the difference in luminance between the subpixels could be sensed as unevenness of an image by the viewer in presenting a still picture (which refers to an image in which the information of an input video signal remains the same for two frames or more in this example).

Thus, to overcome such a problem, the present inventors invented a driving method in which the luminance ranking of subpixels in each pixel is reversed at regular intervals (e.g., on a frame-by-frame basis, or in a cycle time of two frames, in this example) as in the sequence shown in FIG. 55(*b*). Specifically, if in a certain frame (e.g., F1), the subpixels 1-*a*-A and 1-*a*-B are a bright subpixel and a dark subpixel (i.e., in the first and second places in luminance ranking), respectively, then the subpixels 1-*a*-A and 1-*a*-B will be a dark subpixel and a bright subpixel, respectively, in the next frame (e.g., F2). The present inventors discovered that if such a driving method was adopted, the unevenness of the image resulting from the difference in luminance between the subpixels could be eliminated but the balance in DC voltage level was lost and flicker and unevenness were produced instead, thus deteriorating the display quality. On top of that, since the DC voltage was continuously applied to the liquid crystal layer, the reliability decreased (e.g., a residual image was produced), which is also a problem.

This is because in the example shown in FIG. 55(*b*), the polarity of the write voltage is positive (which will be referred to herein as "positive write") in every frame in which the subpixel 1-*a*-A is a bright subpixel (i.e., in F1, F3 and F5) and because the polarity of the write voltage is negative (which will be referred to herein as "negative write") in every frame in which the subpixel 1-*a*-B is a bright subpixel (i.e., in F2, F4 and F6). That is to say, if the polarity of the voltage applied to the liquid crystal layer is inverted every frame, the positive and negative voltages will cancel each other when integrated with time. In that case, even though the frame inversion drive is adopted so as to avoid applying a DC voltage to the liquid crystal layer, the voltage to be written as a positive one onto the subpixel 1-*a*-A has high level to make it a bright subpixel, while the voltage to be written as a negative one onto the subpixel 1-*a*-A has low level to make it a dark subpixel in the example shown in FIG. 55(*b*). That is why if the voltages applied to the liquid crystal layer of the subpixel 1-*a*-A are integrated with time, a DC voltage that has shifted to the positive range will be produced. As for the subpixel 1-*a*-B on the other hand, the voltage to be written as a positive one onto the subpixel 1-*a*-B has low level to make it a dark subpixel, while the voltage to be written as a negative one onto the subpixel 1-*a*-B has high level to make it a bright subpixel. That is why if the voltages applied to the liquid crystal layer of the subpixel 1-*a*-B are integrated with time, a DC voltage that has shifted to the negative range will be produced. As a result, mutually different DC voltages are applied to the respective liquid crystal layers of the subpixels 1-*a*-A and 1-*a*-B.

If the same DC voltage were applied to the respective liquid crystal layers of the subpixels 1-*a*-A and 1-*a*-B, then the DC voltage eventually applied to the liquid crystal layer could be eliminated by regulating the potential level (i.e., DC level) at the counter electrode shared by those pixels. However, if different DC voltages are applied to the respective liquid crystal layers of the subpixels 1-*a*-A and 1-*a*-B, then a DC voltage will be applied to the liquid crystal layer of at least one subpixel. As a result, flicker and unevenness of the image will be produced and the reliability will decrease.

However, it occurred to the present inventors that such a problem should be avoided by adopting a driving method that realizes the sequences shown in FIGS. 56(*a*) through 56(*d*).

Specifically, according to the sequence shown in FIG. 56(*a*), the luminance ranking of the subpixels 1-*a*-A and 1-*a*-B is reversed every frame and the drive polarity is inverted every other frame. For example, look at the first four frames, and it can be seen that in the frame F1 in which the subpixel 1-*a*-A is a bright subpixel, a positive voltage is written onto the subpixel at the intersection between the first line and the first row, while in the frame F3 in which the subpixel 1-*a*-A becomes a bright subpixel again, a negative voltage is written onto the subpixel at the intersection between the first line and the first row. It can also be seen that in the frame F2 in which the subpixel 1-*a*-A is a dark subpixel, a positive voltage is written onto the subpixel at the intersection between the first line and the first row, while in the frame F4 in which the subpixel 1-*a*-B becomes a dark subpixel again, a negative voltage is written onto the subpixel at the intersection between the first line and the first row. In this manner, each pair of frames in which the subpixel 1-*a*-A becomes a bright subpixel has positive and negative voltages to write, each pair of frames in which the subpixel 1-*a*-A becomes a dark subpixel also has positive and negative voltages to write, and one cycle of such alternation is completed in four frames.

As for the subpixel 1-*a*-B on the other hand, in the frame F2 in which the subpixel 1-*a*-B is a bright subpixel, a positive voltage is written, while in the frame F4 in which the subpixel 1-*a*-B becomes a bright subpixel again, a negative voltage is written. In the frame F1 in which the subpixel 1-*a*-B is a dark subpixel, a positive voltage is written, while in the frame F3 in which the subpixel 1-*a*-B becomes a dark subpixel again, a negative voltage is written. Thus, just like the subpixel 1-*a*-A, each pair of frames in which the subpixel 1-*a*-B becomes a bright subpixel has positive and negative voltages to write, each pair of frames in which the subpixel 1-*a*-B becomes a dark subpixel also has positive and negative voltages to write, and one cycle of such alternation is completed in four frames.

As described above, each pair of frames in which a given subpixel becomes a bright subpixel has positive and negative voltages to write, and each pair of frames in which that subpixel becomes a dark subpixel also has positive and negative voltages to write. That is why the variations in the voltage applied to the liquid crystal layer due to the switch of the CS voltage levels cancel each other, thus producing no DC voltages. Also, the sequence shown in FIG. 56(*a*) is equivalent for the two subpixels. Therefore, even if the DC voltage cannot be completely canceled, no DC voltage will be eventually applied to the liquid crystal layer by regulating the potential level at the counter electrode.

Next, according to the sequence shown in FIG. 56(*b*), the luminance ranking of the subpixels 1-*a*-A and 1-*a*-B is reversed every other frame and the drive polarity is inverted every frame. For example, look at the first four frames, and it can be seen that in the frame F1 in which the subpixel 1-*a*-A is a bright subpixel, a positive voltage is written, while in the frame F2 in which the subpixel 1-*a*-A becomes a bright subpixel again, a negative voltage is written. It can also be seen that in the frame F3 in which the subpixel 1-*a*-A is a dark subpixel, a positive voltage is written, while in the frame F4 in which the subpixel 1-*a*-A becomes a dark subpixel again, a negative voltage is written. In this manner, each pair of frames in which the subpixel 1-*a*-A becomes a bright subpixel has positive and negative voltages to write, each pair of frames in which the subpixel 1-*a*-A becomes a dark subpixel also has positive and negative voltages to write, and one cycle of such alternation is completed in four frames.

As for the subpixel 1-*a*-B on the other hand, in the frame F3 in which the subpixel 1-*a*-B is a bright subpixel, a positive voltage is written, while in the frame F4 in which the subpixel 1-*a*-B becomes a bright subpixel again, a negative voltage is written. In the frame F1 in which the subpixel 1-*a*-B is a dark subpixel, a positive voltage is written, while in the frame F2 in which the subpixel 1-*a*-B becomes a dark subpixel again, a negative voltage is written. Thus, just like the subpixel 1-*a*-A, each pair of frames in which the subpixel 1-*a*-B becomes a bright subpixel has positive and negative voltages to write, each pair of frames in which the subpixel 1-*a*-B becomes a dark subpixel also has positive and negative voltages to write, and one cycle of such alternation is completed in four frames.

Consequently, even by adopting the sequence shown in FIG. 56(*b*), no DC voltage will be eventually applied to the liquid crystal layer as in the situation where the sequence shown in FIG. 56(*a*) is adopted.

According to the two sequences described above, either one cycle of luminance ranking reversal or one cycle of drive polarity inversion is supposed to be completed in two frames, the other cycle is supposed to be completed in four frames, and those types of cycles are combined together differently, thereby realizing a sequence in which one cycle (four frames) consists of four different combinations of luminance rankings (bright and dark) and polarities (positive and negative).

Alternatively, both one cycle of luminance ranking reversal and one cycle of drive polarity inversion may be completed in four frames but their phases may be shifted from each other by one frame as shown in FIG. 56(*c*), thereby realizing a sequence in which one cycle (four frames) consists of four different combinations of luminance rankings (bright and dark) and polarities (positive and negative).

According to the sequence shown in FIG. 56(*c*), looking at the first four frames, it can be seen that a positive voltage is written in the frame F1 in which the subpixel 1-*a*-A is a bright subpixel, while a negative voltage is written in the next frame F2. It can also be seen that a negative voltage is written in the frame F3 in which the subpixel 1-*a*-A is a dark subpixel, while a positive voltage is written in the frame F4. In this manner, each pair of frames in which the subpixel 1-*a*-A becomes a bright subpixel has positive and negative voltages to write, each pair of frames in which the subpixel 1-*a*-A becomes a dark subpixel also has positive and negative voltages to write, and one cycle of such alternation is completed in four frames. Just like the subpixel 1-*a*-A, each pair of frames in which the subpixel 1-*a*-B becomes a bright subpixel has positive and negative voltages to write, each pair of frames in which the subpixel 1-*a*-B becomes a dark subpixel also has positive and negative voltages to write, and one cycle of such alternation is also completed in four frames.

Still alternatively, the sequence shown in FIG. 56(*d*) may also be adopted. Unlike the three sequences described above, this sequence has three different luminance rankings. Specifically, as shown in FIG. 56(*d*), this sequence has not only the state in which the subpixel 1-*a*-A is a bright subpixel and the subpixel 1-*a*-B is a dark subpixel and the state in which the subpixel 1-*a*-A is a dark subpixel and the subpixel 1-*a*-B is a bright subpixel but also a third state in which both of these two subpixels become intermediate subpixels with an intermediate luminance, to which an intermediate voltage between the two voltages to make them bright and dark subpixels, respectively, is applied (i.e., the state in the frames F2 and F4 shown in FIG. 56(*d*)).

Look at the first four frames shown in FIG. 56(*d*), and it can be seen that the subpixel 1-*a*-A becomes a bright subpixel in F1, an intermediate subpixel in F2, a dark subpixel in F3 and then an intermediate subpixel again in F4. On the other hand, the subpixel 1-*a*-B becomes a dark subpixel in F1, an intermediate subpixel in F2, a bright subpixel in F3 and then an intermediate subpixel again in F4. In this manner, each of these two subpixels becomes a bright subpixel in one frame, a dark subpixel in another frame, and an intermediate subpixel in the other two frames, and therefore, one cycle of luminance ranking reversal is completed in four frames.

Meanwhile, one cycle of drive polarity inversion is completed in two frames. That is to say, a positive voltage is supposed to be written in an odd-numbered frame F1, F3, F5 and so on, while a negative voltage is supposed to be written in an even-numbered frame F2, F4, F6 and so on.

Look at the subpixel 1-*a*-A, and it can be seen that whenever the subpixel 1-*a*-A becomes a bright subpixel or a dark subpixel, a positive voltage is supposed to be written and that whenever the subpixel 1-*a*-A becomes an intermediate subpixel, a negative voltage is supposed to be written. That is to say, a positive voltage is written in the frames in which the subpixel 1-*a*-A becomes a bright subpixel and a dark subpixel, respectively, while a negative voltage is written in the frames in which the subpixel 1-*a*-A becomes an intermediate subpixel. Since the voltage applied to make a given subpixel an intermediate one is defined to be just an intermediate one between the voltage to make it a bright subpixel and the voltage to make it a dark subpixel, the DC voltages applied to the liquid crystal layer in one cycle of four frames cancel each other.

By adopting such a sequence, even if the device is driven with the luminance ranking between subpixels reversed, the DC voltage applied between the subpixels due to the CS voltage can be canceled. Alternatively, a sequence in which the drive polarities shown in FIG. 56(*a*) are changed into (− + + − − +), sequences in which the drive polarities shown in FIGS. 56(*b*) through 56(*d*) are inverted, and sequences in which the positive and negative signs of the drive polarities are inverted are equivalent to their associated ones and could be adopted as well. It should be noted that only the sequences of the pixel 1-*a* are shown in FIGS. 56(*a*) through 56(*d*) but that the device should be driven so as to realize one of those sequences in every pixel.

Now let us pay attention to how many frames it takes to complete a cycle of luminance ranking reversal in the sequences shown in FIGS. 56(*a*) through 56(*d*). First of all, in the sequence shown in FIG. 56(*a*), the bright and dark states alternate every frame and a cycle of luminance ranking reversal is completed in two frames. On the other hand, in the sequences shown in FIGS. 56(*b*) and 56(*c*), the bright and dark states alternate every other frame and a cycle of luminance ranking reversal is completed in four frames. Therefore, one cycle of luminance ranking reversal of the sequences shown in FIGS. 56(*b*) and 56(*c*) is twice as long as that of the sequence shown in FIG. 56(*a*).

By reversing the luminance ranking, the degree of unevenness of the image can be reduced. And the shorter one cycle of reversal, the more significantly the degree of unevenness can be reduced. However, if one vertical scanning period became too short, the orientations of liquid crystal molecules could not change so much during one vertical scanning period that the luminance of each subpixel could not reach the predetermined one. In this manner, if one vertical scanning period were too short for the response speed of liquid crystal molecules, the difference in luminance between subpixels could be too small to reduce the grayscale dependence of the $\gamma$ characteristic sufficiently. According to the sequence shown in FIG. 56(*a*), if one vertical scanning period has a length of 16.7 ms to 11.1 ms (corresponding to a vertical scanning frequency of 60 Hz to 90 Hz), good image quality is achieved with the viewing angle dependence of the $\gamma$ characteristic and the degree of unevenness both reduced. On the other hand, according to the sequences shown in FIGS. 56(*b*) and 56(*c*), good image quality free from unevenness is achieved at a vertical scanning frequency of 120 Hz or more. The present inventors confirmed via experiments that the viewing angle dependence of the $\gamma$ characteristic could be reduced significantly at a drive rate of 120 Hz. If the drive rate is higher than 120 Hz, however, it is preferred that the response speed be increased by changing the liquid crystal materials and/or the driving methods.

According to the sequence shown in FIG. 56(*d*), the luminance ranks are switched cyclically every frame in the order of bright, intermediate, dark and intermediate states, and one cycle of luminance ranking reversal is completed in four frames. One cycle of luminance level changes is sensed by the viewer as an intermediate one between the sequence shown in FIG. 56(*a*) and the ones shown in FIGS. 56(*b*) and 56(*c*). And the degree of unevenness can be reduced significantly at a vertical scanning frequency of 90 Hz or more.

However, the present inventors discovered that when a driving method realizing any of the sequences shown in FIGS. 56(*a*) through 56(*d*) was applied to the liquid crystal display device of the preferred embodiment described above, sometimes the effects described above could not be achieved but those problems caused by the DC voltage persisted.

The present inventors carried out an extensive research to find the reason why that happened. As a result, the present inventors discovered that the DC voltage problem occurred due to a relatively short interval between the point in time when a TFT was turned OFF (i.e., the gate voltage became low) and the point in time when the CS voltage level changed for the first time (i.e., the interval Td shown in FIG. 13A) compared to one cycle of oscillation of the CS voltage (corresponding to one cycle $P_A$ of the first waveform described above).

For instance, in the example shown in FIG. 36, the CS voltage has one cycle of oscillation of 10H, whereas the interval between the turn-OFF of the TFT and the first change of the CS voltage levels is just 1H. In the example shown in FIG. 40, the CS voltage has one cycle of oscillation of 20H, whereas the interval between the turn-OFF of the TFT and the first change of the CS voltage levels is just 2H. Such a short interval is adopted in view of the waveform blunting of the CS voltage and in order to apply a voltage that matches closely the waveform of the CS voltage as already described with reference to FIG. 8. However, the present inventors discovered that the relation between the CS voltage waveform and the timings to turn the TFT OFF should not be defined as described above.

Embodiment 11

Hereinafter, it will be described with reference to FIGS. 57(*a*) and 57(*b*) what problems will arise if the sequence shown in FIG. 56(*a*) is applied to the liquid crystal display device with the Type II-1 pixel division structure shown in FIG. 32(*a*). FIG. 57(*a*) shows the waveforms of a gate voltage, CS voltages and voltages applied to the pixel, while FIG. 57(*b*) schematically illustrates display states.

Specifically, FIG. 57(*a*) shows the waveforms of the respective voltages in four frames F1 through F4. In this example, the drive polarities are inverted in the order of (+ + − −) with the luminance rankings of the subpixels 1-*a*-A and 1-*a*-B reversed in the orders of (B D B D) and (D B D B), respectively. In each frame, a write operation is started when the gate voltage on the gate bus line G001 goes high after a predetermined amount of time has passed since the application of a gate start pulse GSP. The input video signal is supposed to have one vertical scanning period V-Total of 810H and each CS voltage is supposed to have ten phases. In this example, the waveform of each CS voltage is supposed to consist of a waveform in which H and L levels (i.e., first and second voltage levels) alternate every 10H period (i.e., a waveform with a cycle time of 20H and a duty ratio of one to one) and a waveform in which H and L levels alternate every 5H period (i.e., a waveform with a cycle time of 10H and a duty ratio of one to one).

In this case, the waveform in which the H and L levels alternate every 10H period corresponds to the "first waveform" described above, while the waveform in which the H and L levels alternate every 5H period corresponds to the "second waveform" described above. In the liquid crystal display device of the preferred embodiment described above, the CS voltage is supposed to have the first waveform (i.e., the first period (A) with the first waveform) and the second waveform (i.e., the second period (B) with the second waveform) in every frame. If any of the sequences shown in FIGS. 56(*a*) through 56(*d*) is applied, however, the CS voltage does not always have to have the second waveform in every frame. For example, the CS voltage waveforms shown in FIG. 57(*a*) include the second waveform only in the second and fourth frames F2 and F4. This is because only in the connecting portion between the second and third frames F2 and F3 and in the connecting portion between the fourth and first frames F4 and F1, the waveform will be disturbed, and therefore, only those portions need to be evenly split into H and L levels. Those even split periods can be defined as already described for the first through tenth preferred embodiments by regarding the first and second frames F1 and F2 as forming a single frame and regarding the third and fourth frames F3 and F4 as forming another frame. Also, as already described for the second preferred embodiment, if the even split period is an odd number of times as long as one horizontal scanning period (i.e., if B/H is an odd number) and if the number of L-level periods is 1H greater (or smaller) than that of H-level periods in one frame (i.e., the $FN^{th}$ frame, where FN is a positive integer), then the number of L-level periods is preferably 1H greater (or smaller) than that of H-level periods in the frame after the next frame (i.e., in the $(FN+2)^{th}$ frame), too.

First of all, it will be described what voltages are applied to the subpixels 1-*a*-A and 1-*a*-B in the first frame F1.

Look at the subpixel 1-*a*-A, and it can be seen that since the first change of the CS voltages CS1 after the gate voltage on the gate bus line G001 has gone low is voltage increase (i.e., rise from L level to H level) and a positive voltage is written in the first frame F1, the effective voltage applied to the liquid crystal layer of the subpixel 1-*a*-A comes to have a high level, thus making the subpixel 1-*a*-A a bright subpixel. As for the subpixel 1-*a*-B on the other hand, since the first change of the CS voltages CS2 after the gate voltage on the gate bus line G001 has gone low is voltage decrease (i.e., fall from H level to L level) and a positive voltage is written in the first frame F1, the effective voltage applied to the liquid crystal layer of the subpixel 1-*a*-B comes to have a low level, thus making the subpixel 1-*a*-B a dark subpixel.

As shown in FIG. 57(*a*), in this example, the interval between the fall of the gate voltage to low level and the first change of the CS voltage levels is defined to be longer than 1H but shorter than 2H. And the interval between the rise of the gate voltage to high level and the first change of the CS voltage levels is defined to be 2H. Also, in the first frame F1, the CS voltage CS1 changes its levels from H into. L, and vice versa, every 10H period. Consequently, in the waveform of the voltage applied to the liquid crystal layer of the subpixel 1-*a*-A, the sum of the H-level periods of CS1 is 408H and the sum of the L-level periods thereof is 402H. As a result, the subpixel 1-*a*-A has its luminance increased by a percentage corresponding- to 408H/810H. On the other hand, in the waveform of the voltage applied to the liquid crystal layer of the subpixel 1-*a*-B, the sum of the L-level periods of CS2 is 408H and the sum of the H-level periods thereof is 402H. As a result, the subpixel 1-*a*-B has its luminance decreased by a percentage corresponding to 408H/810H.

Next, it will be described what voltages are applied to the subpixels 1-*a*-A and 1-*a*-B in the second frame F2.

Look at the subpixel 1-*a*-A, and it can be seen that since the first change of the CS voltages CS1 after the gate voltage on the gate bus line G001 has gone low is voltage decrease (i.e., fall from H level to L level) and a positive voltage is written in the second frame F2, the effective voltage applied to the liquid crystal layer of the subpixel 1-*a*-A comes to have a low level, thus making the subpixel 1-*a*-A a dark subpixel. As for the subpixel 1-*a*-B on the other hand, since the first change of the CS voltages CS2 after the gate voltage on the gate bus line G001 has gone low is voltage increase (i.e., rise from L level to H level) and a positive voltage is written in the second frame F2, the effective voltage applied to the liquid crystal layer of the subpixel 1-*a*-B comes to have a high level, thus making the subpixel 1-*a*-B a bright subpixel.

As shown in FIG. 57(*a*), in the second frame F2, the CS voltage CS1 has a waveform in which the CS voltage CS1 changes its levels from H into L, and vice versa, every 10H period (i.e., the first waveform with a cycle time $P_A$) and a waveform in which the CS voltage CS1 changes its levels from H into L, and vice versa, every 5H period (i.e., the second waveform). That is why in the waveform of the voltage applied to the liquid crystal layer of the subpixel 1-*a*-A, the sum of the L-level periods of CS1 is 405H and the sum of the H-level periods thereof is 405H. As a result, the subpixel 1-*a*-A has its luminance decreased by a percentage corresponding to 405H/810H. On the other hand, in the waveform of the voltage applied to the liquid crystal layer of the subpixel 1-*a*-B, the sum of the H-level periods of CS2 is 405H and the sum of the L-level periods thereof is also 405H. As a result, the subpixel 1-*a*-B has its luminance increased by a percentage corresponding to 405H/810H.

The CS voltage waveform in the third frame F3 is obtained by shifting the phase of the CS voltage waveform in the first frame F1 by 180 degrees (i.e., by inverting the CS voltage waveform in the first frame F1). Likewise, the CS voltage waveform in the fourth frame F4 is obtained by shifting the phase of the CS voltage waveform in the second frame F2 by 180 degrees (i.e., by inverting the CS voltage waveform in the second frame F2). The voltages applied to the respective liquid crystal layers of the subpixels in the third frame F3 have different polarities from, but are equivalent to, the ones applied to those of the subpixels in the first frame F1. Also, the voltages applied to the respective liquid crystal layers of the subpixels in the fourth frame F4 have different polarities from, but are equivalent to, the ones applied to those of the subpixels in the second frame F2.

Next, the display states in the first and second frames F1 and F2 will be described with reference to FIG. 57(*b*), which illustrates the display states in the first through fourth frames F1 through F4 and their synthetic image that simulates the image to be actually viewed by the viewer.

Looking at the first frame F1, it can be seen that the subpixel 1-*a*-A is a bright subpixel and the subpixel 1-*a*-B is a dark subpixel. The luminance of the subpixel 1-*a*-A has been increased by 408H/810H as described above.

Next, look at the second frame F2, and it can be seen that the subpixel 1-*a*-B is a bright subpixel and the subpixel 1-*a*-A is a dark subpixel, i.e., their luminance ranking has reversed compared to the first frame F1. In the second frame F2, the luminance of the subpixel 1-*a*-B has been increased by 405H/810H as described above. That is to say, the increase in the luminance of the subpixel 1-*a*-B in the second frame F2 is smaller by 3H/810H than the increase in the luminance of the subpixel 1-*a*-A in the first frame F1. Consequently, the luminance of the subpixel 1-*a*-B is lower than that of the subpixel 1-*a*-A by that amount. That is why the subpixel 1-*a*-B in the second frame F2 shown in FIG. 57(*b*) is illustrated as being darker than the subpixel 1-*a*-A in the first frame F1. The same phenomenon also occurs in the dark subpixel. However, since bright subpixels contribute to the display operation more significantly than dark subpixels, the description thereof will be omitted herein.

In this manner, when the luminance ranking of the subpixels reverses between the first and second frames F1 and F2, the luminance also changes. The same phenomenon also happens between the third and fourth frames F3 and F4. Such a change of luminances sometimes may be seen as flicker to the viewer's eyes. Also, as schematically shown as a synthetic image in FIG. 57(*b*), even when a grayscale should be displayed uniformly, the subpixel 1-*a*-A still looks bright and the subpixel 1-*a*-B still looks dark, which sometimes makes the viewer feel unevenness of the image.

Next, it will be described why a period in which the difference in luminance between the subpixel 1-*a*-A in the first frame F1 and the subpixel 1-*a*-B in the second frame F2, i.e., the CS voltage, achieves the effect of increasing the luminance (i.e., the effective voltage) has varying lengths. Such a period is an H-level period in the first frame F1 but is an L-level period in the second frame F2.

As shown in FIG. 57(*a*), the interval between the fall of the gate voltage to low level and the first change of the CS voltage levels is defined to be longer than 1H but shorter than 2H, and the interval between the rise of the gate voltage to high level and the first change of the CS voltage levels is defined to be 2H. In both of the first and second frames F1 and F2, a voltage of the same polarity (i.e., a positive voltage) is written. Meanwhile, the first change of the CS voltages is increase in the first frame F1 but decrease in the second frame F2. That is to say, since a voltage of the same polarity is written both in the first and second frames F1 and F2, the first change of the CS voltages in one of these two frames should be opposite to the one in the other frame to make the first and second frames F1 and F2 achieve mutually opposite effects with respect to the effective voltage. That is to say, if the first frames F1 begins with L level, the end of the first frame F1 (i.e., the beginning of the second frame F2) should be H level. That is why the number of times of rises from L level to H level in the first frame F1 becomes greater by one than the number of times of falls from H level to L level in the same frame. As a result, the sum of the H-level periods in the first frame F1, accounts for 408H (=10H×41−2H) out of the overall 810H period, while the sum of the L-level periods in the first frame F1 accounts for 402H (=10H×40+2H) out of the overall 810H period. This difference of 2H is taken into account because the interval between the fall of the gate voltage to low level and the first change of the CS voltage levels is defined to be longer than 1H but shorter than 2H and because the interval between the rise of the gate voltage to high level and the first change of the CS voltage levels is defined to be 2H. For that reason, the sum of the L-level periods is increased by 2H, while that of the H-level periods is decreased by 2H.

As for the second frame F2, however, the CS voltage levels may be the same both at the beginning of the second frame F2 and at the end of the second frame F2 (i.e., the beginning of the third frame F3). This is because if attention is paid to the same pixel, voltages of opposite polarities need to be written in the second and third frames F2 and F3 and the first change of CS voltages in the second frame F2 is decrease in the second frame F2 but increase in the third frame F3. That is to say, in such a situation where voltages of the opposite polarities need to be written, if the first changes of CS voltages are the same, then opposite effects will be achieved on the effective voltage. For that reason, if the second frame F2 begins with the H level, then the end of the second frame F2 (i.e., the beginning of the third frame F3) also needs to be H level. And in the second frame F2, the falls from H level to L level are as often as the rises from L level to H level. However, since 810H÷20H (i.e., one cycle of oscillation)=40 plus 10H, those 40 periods should have the first waveform and the remaining 10H period should be evenly split into H and L levels (i.e., the second waveform). The remaining 10H period may be evenly split not just by such a method but also by various other methods. By any of those methods, however, the H period can always be as long as the L period in the second frame.

As can be seen from the foregoing description, such an image with flicker or unevenness will be presented as shown in FIG. 57(*b*) because the sum of the H-level periods of the subpixel 1-*a*-A is as long as 408H in the first frame F1. Thus, it will be described by way of illustrative examples how the relation between the CS voltage waveform and the gate voltage timing should be defined to overcome such a problem.

The liquid crystal display device of the eleventh preferred embodiment has the pixel division structure of Type II-1 shown in FIG. 32(*a*) and realizes the sequence shown in FIG. 56(*a*).

Just like FIG. 57(*a*), FIG. 58 also shows the waveforms of the gate voltage, CS voltages and voltages applied to the pixel in the four frames F1 through F4 in the liquid crystal display device of the eleventh preferred embodiment. The input video signal is supposed to have one vertical scanning period V-Total of 810H and each CS voltage is supposed to have ten phases. The waveform of each CS voltage is supposed to consist of the first waveform in which H and L levels (i.e., first and second voltage levels) alternate every 10H period (i.e., a waveform with a cycle time of 20H and a duty ratio of one to one) and the second waveform in which H and L levels alternate every 5H period (i.e., a waveform with a cycle time of 10H and a duty ratio of one to one). To show the phase relation between the gate voltage and the CS voltage, FIG. 58 also shows the relation between the gate start pulse GSP, the gate clock signal GCK and the CS voltage CS1. When the gate clock signal GCK is counted one in response to the gate start pulse GSP, the gate voltage on G001 goes high.

In the voltage waveform diagram shown in FIG. 57(*a*), the interval between the fall of the gate voltage to low level and the first change of the CS voltage levels is defined to be longer than 1H but shorter than 2H, and the interval between the rise of the gate voltage to high level and the first change of the CS voltage levels is defined to be 2H. On the other hand, in the voltage waveform diagram shown in FIG. 58, the former interval is defined to be longer than 4H but shorter than 5H, and the latter interval is defined to be 5H. The first waveform of the CS voltage CS1 has one cycle of oscillation of 20H and each flat portion with constant amplitude (which may be either H level or L level) lasts 10H. That is why 5H is a half as long as each flat amplitude portion of the CS voltage, i.e., a quarter as long as one cycle of oscillation of the first waveform of the CS voltage.

First, look at the pixel 1-*a*. The waveform of the voltage applied to the liquid crystal layer of the subpixel 1-*a*-A in the first frame F1 shows that the sum of the H-level periods of the voltage CS1 is 405H and the sum of the L-level periods thereof is also 405H. On the other hand, the waveform of the voltage applied to the liquid crystal layer of the subpixel 1-*a*-B in the second frame F2 shows that both sums of the H- and L-level periods of the voltage CS2 are 405H as in FIG. 57(*a*). That is why the luminances of the subpixel 1-*a*-A in the first frame F1 and the subpixel 1-*a*-B in the second frame F2, which are bright subpixels in those frames, agree with each other. So do the luminances of the subpixel 1-*a*-B in the first frame F1 and the subpixel 1-*a*-A in the second frame F2, which are dark subpixels in those frames. Consequently, as far as the pixel 1-*a* is concerned, even if the luminance ranking is reversed between the subpixels, the problem shown in FIG. 57(*b*) never arises.

Look at the pixel 2-*a* next. In the Type II-1 liquid crystal display device shown in FIG. 32(*a*), a CS voltage CS2 is applied to the storage capacitor counter electrode of the subpixel 2-*a*-A and a CS voltage CS3 is applied to the storage capacitor counter electrode of the subpixel 2-*a*-B. Also, as shown in FIG. 58, the phase of the CS voltage CS3 is 2H behind that of the CS voltage CS2 (see FIG. 40). On the other hand, the gate voltages on G002 are switched from high into low 1H later than the change of gate voltages on G001.

That is why in the waveform of the voltage applied to the liquid crystal layer of the subpixel 2-*a*-A, which is a bright subpixel in the first frame F1, the sum of the H-level periods of the voltage CS2 is 406H and the sum of the L-level periods thereof is 404H. On the other hand, in the waveform of the voltage applied to the liquid crystal layer of the subpixel 2-*a*-B, which is a bright subpixel in the second frame F2, the sum of the H-level periods of the voltage CS3 is 405H and the sum of the L-level periods thereof is 405H, too.

The present inventors actually fabricated a 45-inch LCD as a sample device and drove it with the voltage waveforms shown in FIG. 58. As a result, good display quality was achieved without causing the problem shown in FIG. 57(*b*). As described above, even when the luminance ranking between the subpixels was reversed in a pixel (such as the pixel 1-*a*) on the first row, no luminance difference was produced. As for a pixel (such as the pixel 2-*a*) on the second row on the other hand, when the luminance ranking was reversed, a luminance difference corresponding to 1H/810H was produced. However, as the luminance difference appeared just every other row of pixels, that difference was never sensible for the viewer.

Also, although there was a concern that the display quality might be affected by waveform blunting of the CS voltage by defining the interval between the fall of the gate voltage to the low level and the first change of the CS voltage levels to be longer than 4H but shorter than 5H and by providing a relatively long interval of 5H between the rise of the gate voltage to the high level and the first change of the CS voltage levels. Actually, however, the display quality never deteriorated. Nevertheless, if there is waveform blunting of the CS voltage, the display quality usually deteriorates. For that reason, some measure is preferably taken in that case. For example, the load impedance of the liquid crystal display device may be reduced to a sufficiently low level and/or one cycle time of the first waveform of the CS voltage may be extended sufficiently. The present inventors discovered via experiments that by defining one cycle time of the first waveform to be 10H or more (i.e., to change between H and L levels every 5H), even if the interval between the fall of the gate voltage to the low level and the first change of the CS voltage levels was 2H, the display quality was never debased by the waveform blunting of the CS voltage waveform. As will be described later, one cycle $P_A$ of the first waveform has only to be at least as long as 4H in the Type I liquid crystal display device and at least as long as 8H in the Type II liquid crystal display device, theoretically speaking. Thus, one cycle time may be appropriately determined with the load impedance of the liquid crystal display device and other factors taken into consideration.

Hereinafter, a voltage waveform for another liquid crystal display device according to the eleventh preferred embodiment will be described with reference to FIGS. 59 and 60.

In the voltage waveform shown in FIG. 59, the input video signal is supposed to have one vertical scanning period V-Total of 808H and each CS voltage is supposed to have eight phases. The waveform of each CS voltage is supposed to consist of the first waveform in which H and L levels (i.e., first and second voltage levels) alternate every 8H period (i.e., a waveform with a cycle time of 16H and a duty ratio of one to one) and the second waveform in which H and L levels alternate every 4H period (i.e., a waveform with a cycle time of 8H and a duty ratio of one to one).

The interval between the fall of the gate voltage on G001 to the low level and the first change of the CS voltage levels is defined to be longer than 3H but shorter than 4H, and the interval between the rise of the gate voltage to the high level and the first change of the CS voltage levels is defined to be 4H, which is a quarter as long as one cycle of oscillation of the first waveform. As a result, in the first frame F1, the sum of the H-level periods of CS1 is 404H and the sum of the L-level periods thereof is also 404H as shown in FIG. 59. Likewise, in the second frame F2, the sum of the H-level periods of CS1 and the sum of the L-level periods thereof are both 404H. Thus, as already described with reference to FIG. 58, the problem shown in FIG. 57(*b*) never arises and good display quality is achieved.

In the voltage waveform shown in FIG. 60, the input video signal is supposed to have one vertical scanning period V-Total of 804H and each CS voltage is supposed to have twelve phases. The waveform of each CS voltage is supposed to consist of the first waveform in which H and L levels (i.e., first and second voltage levels) alternate every 12H period (i.e., a waveform with a cycle time of 24H and a duty ratio of one to one) and the second waveform in which H and L levels alternate every 6H period (i.e., a waveform with a cycle time of 12H and a duty ratio of one to one).

The interval between the fall of the gate voltage on G001 to the low level and the first change of the CS voltage levels is defined to be longer than 5H but shorter than 6H, and the interval between the rise of the gate voltage to the high level and the first change of the CS voltage levels is defined to be 6H, which is a quarter as long as one cycle of oscillation of the first waveform. As a result, in the first frame F1, the sum of the H-level periods of CS1 is 402H and the sum of the L-level periods thereof is also 402H as shown in FIG. 60. Likewise, in the second frame F2, the sum of the H-level periods of CS1 and the sum of the L-level periods thereof are both 402H. Thus, as already described with reference to FIG. 58, the problem shown in FIG. 57(*b*) never arises and good display quality is achieved.

Embodiment 12

Hereinafter, it will be described with reference to FIGS. 61(*a*) and 61(*b*) what problems will arise if the sequence shown in FIG. 56(*b*) is applied to the liquid crystal display device with the Type II-1 pixel division structure shown in FIG. 32(*a*). FIG. 61(*a*) shows the waveforms of a gate voltage, a CS voltage and voltages applied to the pixel, while FIG. 61(*b*) schematically illustrates display states. Specifically, FIG. 61(*a*) shows the waveforms of the respective voltages in four frames F1 through F4. In this example, the drive polarities are inverted in the order of (+ − + −) in the pixel 1-*a* with the luminance rankings of the subpixels 1-*a*-A and 1-*a*-B reversed in the orders of (B B D D) and (D D B B), respectively. In the pixel 1-*b* on the other hand, the drive polarities are inverted in the order of (− + − +) with the luminance rankings of the subpixels 1-*b*-A and 1-*b*-B reversed in the orders of (D D B B) and (B B D D), respectively. In each frame, a write operation is started when the gate voltage on the gate bus line G001 goes high after a predetermined amount of time has passed since the application of a gate start pulse GSP. The input video signal is supposed to have one vertical scanning period V-Total of 810H and each CS voltage is supposed to have ten phases. In this example, the waveform of each CS voltage is supposed to consist of a first waveform in which H and L levels (i.e., first and second voltage levels) alternate every 10H period (i.e., a waveform with a cycle time of 20H and a duty ratio of one to one) and a second waveform in which H and L levels alternate every 5H period (i.e., a waveform with a cycle time of 10H and a duty ratio of one to one). In FIG. 61, only the waveform of the CS voltage CS1 is illustrated and that of the CS voltage CS2, of which the phase is shifted 180 degrees from that of CS1, is not illustrated.

First of all, it will be described what voltages are applied to the subpixels 1-*a*-A and 1-*a*-B in the first frame F1.

Look at the subpixel 1-*a*-A, and it can be seen that since the first change of the CS voltages CS1 after the gate voltage on the gate bus line G001 has gone low is voltage increase (i.e., rise from L level to H level) and a positive voltage is written in the first frame F1, the effective voltage applied to the liquid crystal layer of the subpixel 1-*a*-A comes to have a high level, thus making the subpixel 1-*a*-A a bright subpixel. As for the subpixel 1-*a*-B on the other hand, since the first change of the CS voltages CS2 (not shown but having the opposite phase to CS1) after the gate voltage on the gate bus line G001 has gone low is voltage decrease (i.e., fall from H level to L level) and a positive voltage is written in the first frame F1, the effective voltage applied to the liquid: crystal layer of the subpixel 1-*a*-B comes to have a low level, thus making the subpixel 1-*a*-B a dark subpixel.

As shown in FIG. 61(*a*), in this example, the interval between the fall of the gate voltage on G0001 to low level and the first change of the CS voltage levels is defined to be longer than 1H but shorter than 2H. And the interval between the rise of the gate voltage to high level and the first change of the CS voltage levels is defined to be 2H. Also, in the first frame F1, the CS voltage CS1 alternately changes its levels from H into L, and vice versa, every 10H period. Consequently, in the waveform of the voltage applied to the liquid crystal layer of the subpixel 1-*a*-A, the sum of the H-level periods of CS1 is 408H and the sum of the L-level periods thereof is 402H. As a result, the subpixel 1-*a*-A has its luminance increased by a percentage corresponding to 408H/810H. On the other hand, in the waveform of the voltage applied to the liquid crystal layer of the subpixel 1-*a*-B, the sum of the L-level periods of CS2 is 408H and the sum of the H-level periods thereof is 402H. As a result, the subpixel 1-*a*-B has its luminance decreased by a percentage corresponding to 408H/810H.

Next, it will be described what voltages are applied to the subpixels 1-*a*-A and 1-*a*-B in the second frame F2.

Look at the subpixel 1-*a*-A, and it can be seen that since the first change of the CS voltages CS1 after the gate voltage on the gate bus line G001 has gone low is voltage decrease (i.e., fall from H level to L level) and a negative voltage is written in the second frame F2, the effective voltage applied to the liquid crystal layer of the subpixel 1-*a*-A comes to have a high level, thus making the subpixel 1-*a*-A a bright subpixel. As for the subpixel 1-*a*-B on the other hand, since the first change of the CS voltages CS2 after the gate voltage on the gate bus line G001 has gone low is voltage increase (i.e., rise from L level to H level) and a negative voltage is written in the second frame F2, the effective voltage applied to the liquid crystal layer of the subpixel 1-*a*-B comes to have a low level, thus making the subpixel 1-*a*-B a dark subpixel.

As shown in FIG. 61(*a*), in the second frame F2, the CS voltage CS1 has a first waveform in which the CS voltage CS1 changes its levels from H into L, and vice versa, every 10H period and a second waveform in which the CS voltage CS1 changes its levels from H into L, and vice versa, every 5H period. That is why in the waveform of the voltage applied to the liquid crystal layer of the subpixel 1-*a*-A, the sum of the L-level periods of CS1 is 405H and the sum of the H-level periods thereof is also 405H. As a result, the subpixel 1-*a*-A has its luminance increased by a percentage corresponding to 405H/810H. On the other hand, in the waveform of the voltage applied to the liquid crystal layer of the subpixel 1-*a*-B, the sum of the L-level periods of CS2 is 405H and the sum of the H-level periods thereof is also 405H. As a result, the subpixel 1-*a*-B has its luminance decreased by a percentage corresponding to 405H/810H.

The CS voltage waveform in the third frame F3 is obtained by shifting the phase of the CS voltage waveform in the first frame F1 by 180 degrees (i.e., by inverting the CS voltage waveform in the first frame F1). Likewise, the CS voltage waveform in the fourth frame F4 is obtained by shifting the phase of the CS voltage waveform in the second frame F2 by 180 degrees (i.e., by inverting the CS voltage waveform in the second frame F2). The polarities of the voltages written in the third and fourth frames F3 and F4 are the same as those of the voltages written in the first and second frames F1 and F2, respectively. Consequently, the voltage applied to the liquid crystal layer of the subpixel 1-*a*-A in the third frame F3 is equivalent to the one applied to that of the subpixel 1-*a*-B in the first frame F1. Also, the voltage applied to the liquid crystal layer of the subpixel 1-*a*-B in the third frame F3 is equivalent to the one applied to that of the subpixel 1-*a*-A in the first frame F1. As a result, in the third frame F3, the subpixel 1-*a*-A becomes a dark subpixel and the subpixel 1-*a*-B becomes a bright subpixel. That is to say, the luminance ranking reverses between the subpixels.

In the same way, the voltage applied to the liquid crystal layer of the subpixel 1-*a*-A in the fourth frame F4 is equivalent to the one applied to that of the subpixel 1-*a*-B in the second frame F2. Also, the voltage applied to the liquid crystal layer of the subpixel 1-*a*-B in the fourth frame F4 is equivalent to the one applied to that of the subpixel 1-*a*-A in the second frame F2. As a result, in the fourth frame F4, the subpixel 1-*a*-A becomes a dark subpixel and the subpixel

1-*a*-B becomes a bright subpixel. That is to say, the luminance ranking between the subpixels in the third frame F3 remains the same in this frame F4.

Next, it will be described what voltages are applied to the subpixels 1-*b*-A and 1-*b*-B in the first frame F1.

Look at the subpixel 1-*b*-A, and it can be seen that since the first change of the CS voltages CS1 after the gate voltage on the gate bus line G001 has gone low is voltage increase (i.e., rise from L level to H level) and a positive voltage is written in the first frame F1 to perform a 1H 1 dot inversion drive, the polarity of the pixel 1-*b* becomes negative and the effective voltage applied to the liquid crystal layer of the subpixel 1-*b*-A comes to have a low level, thus making the subpixel 1-*b*-A a dark subpixel. As for the subpixel 1-*b*-B on the other hand, since the first change of the CS voltages CS2 (not shown but having the opposite phase to CS1) after the gate voltage on the gate bus line G001 has gone low is voltage decrease (i.e., fall from H level to L level) and the polarity of the pixel 1-*b* is negative, the effective voltage applied to the liquid crystal layer of the subpixel 1-*b*-B comes to have a high level, thus making the subpixel 1-*b*-B a bright subpixel.

As shown in FIG. 61(*a*), in this example, the interval between the fall of the gate voltage to low level and the first change of the CS voltage levels is defined to be longer than 1H but shorter than 2H. And the interval between the rise of the gate voltage to high level and the first change of the CS voltage levels is defined to be 2H. Also, in the first frame F1, the CS voltage CS1 alternately changes its levels from H into L, and vice versa, every 10H period. Consequently, in the waveform of the voltage applied to the liquid crystal layer of the subpixel 1-*b*-A, the sum of the H-level periods of CS1 is 408H and the sum of the L-level periods thereof is 402H. As a result, the subpixel 1-*b*-A has its luminance decreased by a percentage corresponding to 408H/810H. On the other hand, in the waveform of the voltage applied to the liquid crystal layer of the subpixel 1-*b*-B, the sum of the L-level periods of CS2 is 408H and the sum of the H-level periods thereof is 402H. As a result, the subpixel 1-*b*-B has its luminance increased by a percentage corresponding to 408H/810H.

Next, it will be described what voltages are applied to the subpixels 1-*b*-A and 1-*b*-B in the second frame F2.

Look at the subpixel 1-*b*-A, and it can be seen that since the first change of the CS voltages CS1 after the gate voltage on the gate bus line G001 has gone low is voltage decrease (i.e., fall from H level to L level) and a negative voltage is written in the second frame F2 to perform a 1H 1 dot inversion drive, the polarity of the pixel 1-*b* becomes positive and the effective voltage applied to the liquid crystal layer of the subpixel 1-*b*-A comes to have a low level, thus making the subpixel 1-*b*-A a dark subpixel. As for the subpixel 1-*b*-B on the other hand, since the first change of the CS voltages CS2 after the gate voltage on the gate bus line G001 has gone low is voltage increase (i.e., rise from L level to H level) and the polarity of the pixel 1-*b* is positive, the effective voltage applied to the liquid crystal layer of the subpixel 1-*b*-B comes to have a high level, thus making the subpixel 1-*b*-B a bright subpixel.

As shown in FIG. 61(*a*), in the second frame F2, the CS voltage CS1 has a first waveform in which the CS voltage CS1 changes its levels from H into L, and vice versa, every 10H period and a second waveform in which the CS voltage CS1 changes its levels from H into L, and vice versa, every 5H period. That is why in the waveform of the voltage applied to the liquid crystal layer of the subpixel 1-*b*-A, the sum of the L-level periods of CS1 is 405H and the sum of the H-level periods thereof is also 405H. As a result, the subpixel 1-*b*-A has its luminance decreased by a percentage corresponding to 405H/810H. On the other hand, in the waveform of the voltage applied to the liquid crystal layer of the subpixel 1-*b*-B, the sum of the L-level periods of CS2 is 405H and the sum of the H-level periods thereof is also 405H. As a result, the subpixel 1-*b*-B has its luminance increased by a percentage corresponding to 405H/810H.

The CS voltage waveform in the third frame F3 is obtained by shifting the phase of the CS voltage waveform in the first frame F1 by 180 degrees (i.e., by inverting the CS voltage waveform in the first frame F1). Likewise, the CS voltage waveform in the fourth frame F4 is obtained by shifting the phase of the CS voltage waveform in the second frame F2 by 180 degrees (i.e., by inverting the CS voltage waveform in the second frame F2). The polarities of the voltages written in the third and fourth frames F3 and F4 are the same as those of the voltages written in the first and second frames F1 and F2, respectively. Consequently, the voltage applied to the liquid crystal layer of the subpixel 1-*b*-A in the third frame F3 is equivalent to the one applied to that of the subpixel 1-*b*-B in the first frame F1. Also, the voltage applied to the liquid crystal layer of the subpixel 1-*b*-B in the third frame F3 is equivalent to the one applied to that of the subpixel 1-*b*-A in the first frame F1. As a result, in the third frame F3, the subpixel 1-*b*-A becomes a bright subpixel and the subpixel 1-*b*-B becomes a dark subpixel. That is to say, the luminance ranking reverses between the subpixels.

In the same way, the voltage applied to the liquid crystal layer of the subpixel 1-*b*-A in the fourth frame F4 is equivalent to the one applied to that of the subpixel 1-*b*-B in the second frame F2. Also, the voltage applied to the liquid crystal layer of the subpixel 1-*b*-B in the fourth frame F4 is equivalent to the one applied to that of the subpixel 1-*b*-A in the second frame F2. As a result, in the fourth frame F4, the subpixel 1-*b*-A becomes a bright subpixel and the subpixel 1-*b*-B becomes a dark subpixel. That is to say, the luminance ranking between the subpixels in the third frame F3 remains the same in this frame F4.

Next, the display states in the first to fourth frames F1 to F4 will be described with reference to FIG. 61(*b*), which illustrates the display states in the first through fourth frames F1 through F4 and their synthetic image that simulates the image to be actually viewed by the viewer.

Looking at the first frame F1, it can be seen that the subpixel 1-*a*-A is a bright subpixel and the subpixel 1-*a*-B is a dark subpixel. The luminance of the subpixel 1-*a*-A has been increased by 408H/810H as described above. Meanwhile, the subpixel 1-*b*-A is a dark subpixel and the subpixel 1-*b*-B is a bright subpixel. The luminance of the subpixel 1-*b*-B has been increased by 408H/810H as described above.

In the second frame F2, the drive polarities are switched to change the polarities of the voltage written on the pixel 1-*a* from positive into negative and also change the polarities of the voltage written on the pixel 1-*b* from negative into positive. However, in the second frame, the subpixels 1-*a*-A and 1-*a*-B stay bright and dark subpixels, respectively, and the subpixels 1-*b*-A and 1-*b*-B stay dark and bright subpixels, respectively. Nevertheless, the luminance of the subpixel 1-*a*-A has been increased by 405H/810H as described above. That is to say, the increase in the luminance of the subpixel 1-*a*-A in the second frame F2 is smaller by 3H/810H than the increase in the first frame F1. Consequently, the luminance of the subpixel 1-*a*-A in the second frame F2 is lower than the one in the first frame F1 by that amount. That is why the subpixel 1-*a*-A in the second frame F2 shown in FIG. 61(*b*) is illustrated as being darker than the subpixel 1-*a*-A in the first frame F1. Likewise, the luminance of the subpixel 1-*b*-B has been increased by 405H/810H as described above. That is to say, the increase in the luminance of the subpixel 1-*b*-B in the second frame F2 is smaller by 3H/810H than the increase in the first frame F1. Consequently, the luminance of the subpixel 1-*b*-B in the second frame F2 is lower than the one in the first frame F1 by that amount. That is why the subpixel 1-*b*-B in the second frame F2 shown in FIG. 61(*b*) is illustrated as being darker than the subpixel 1-*b*-B in the first frame F1. The same phenomenon also occurs in each of the dark subpixels. However, since bright subpixels contribute to the display operation more significantly than dark subpixels, the description thereof will be omitted herein.

In this manner, when the drive polarities are changed between the first and second frames F1 and F2, the luminance also changes. The same phenomenon also happens between the third and fourth frames F3 and F4. Hereinafter, the effective values of the voltages applied to the respective subpixels 1-*a*-A and 1-*a*-B will be described with reference to FIGS. 62(*a*) and 62(*b*), which show the effective values of the voltage applied to the liquid crystal layer of the subpixel 1-*a*-A in the first and second frames F1 and F2 and those of the voltage applied to the liquid crystal layer of the subpixel 1-*b*-B in the first and second frames F1 and F2, respectively.

As shown in FIG. 62(*a*), the subpixel 1-*a*-A has the effective value of its applied voltage increased by 408H/810H in the first frame F1 in which a positive voltage is written and has the effective value of its applied voltage increased again by 405H/810H in the second frame F2 in which a negative voltage is written. On the other hand, the subpixel 1-*b*-B has the effective value of its applied voltage increased by 408H/810H in the first frame F1 in which a negative voltage is written and has the effective value of its applied voltage increased again by 405H/810H in the second frame F2 in which a positive voltage is written as shown in FIG. 62(*b*). That is why the average of the effective voltage values of the subpixel 1-*a*-A over the first and second frames F1 and F2 (corresponding to signal voltage+3H/810H) does not agree with that of the effective voltage values of the subpixel 1-*b*-B over the same first and second frames F1 and F2 (corresponding to signal voltage−3H/810H). Consequently, even if the potential COM at the counter electrode is regulated, a DC voltage will still be applied to the liquid crystal layer of at least one of the subpixels 1-*a*-A and 1-*b*-B. And if the DC voltage is continuously applied to the liquid crystal layer, the reliability will decrease, which is a serious problem. In the example shown in FIG. 61(*b*), the unevenness shown in FIG. 57(*b*) can be avoided but a DC voltage is generated all over the screen to possibly cause a decrease in reliability.

The reason why the luminance of the subpixel 1-*a*-A changes between the first and second frames F1 and F2, i.e., the reason why the CS voltage achieves the effect of increasing the luminance (or effective voltage) for varying lengths, is just as already described.

Hereinafter, it will be described by way of illustrative examples how the relation between the waveform of the CS voltage and the timing of the gate voltage should be defined in order to overcome such a problem.

Just like FIG. 61(*a*), FIG. 63 also shows the waveforms of the gate voltage, CS voltage and voltages applied to the pixel in the four frames F1 through F4 in the liquid crystal display device of the twelfth preferred embodiment. The input video signal is supposed to have one vertical scanning period V-Total of 810H and each CS voltage is supposed to have ten phases. The waveform of each CS voltage is supposed to consist of the first waveform in which H and L levels (i.e., first and second voltage levels) alternate every 10H period (i.e., a waveform with a cycle time of 20H and a duty ratio of one to one) and the second waveform in which H and L levels alternate every 5H period (i.e., a waveform with a cycle time of 10H and a duty ratio of one to one). To show the phase relation between the gate voltage and the CS voltage, FIG. 63 also shows the gate start pulse GSP. The relation between the gate start pulse GSP and the gate voltage on G001 is just like the one shown in FIG. 58 and other drawings.

In the voltage waveform diagram shown in FIG. 61(*a*), the interval between the fall of the gate voltage on G001 to low level and the first change of the CS voltage levels is defined to be longer than 1H but shorter than 2H, and the interval between the rise of the gate voltage to high level and the first change of the CS voltage levels is defined to be 2H. On the other hand, in the voltage waveform diagram shown in FIG. 63, the former interval is defined to be longer than 4H but shorter than 5H, and the latter interval is defined to be 5H. The first waveform of the CS voltage CS1 has one cycle of oscillation of 20H and each flat portion with constant amplitude (which may be either H level or L level) lasts 10H. That is why 5H is a half as long as each flat amplitude portion of the CS voltage, i.e., a quarter as long as one cycle of oscillation of the first waveform of the CS voltage.

By defining the interval between the fall of the gate voltage to the low level and the first change of the CS voltage levels to be 5H in this manner, the luminances of the subpixel 1-*a*-A in the first and second frames F1 and F2 can be equal to each other, so can those of the subpixel 1-*b*-B in the first and second frames F1 and F2. That is why the luminances of the subpixel 1-*a*-B in the first and second frames can be equalized with each other, so can those of the subpixel 1-*b*-A in the first and second frames F1 and F2. As a result, no DC voltages are eventually applied to the respective liquid crystal layers of the subpixels 1-*a*-A and 1-*b*-B.

Embodiment 13

Hereinafter, it will be described with reference to FIGS. 64(*a*) and 64(*b*) what problems will arise if the sequence shown in FIG. 56(*a*) is applied to the liquid crystal display device with the Type I-1 pixel division structure shown in FIG. 31(*a*). FIG. 64(*a*) shows the waveforms of a gate voltage, CS voltages and voltages applied to the pixel, while FIG. 64(*b*) schematically illustrates display states.

Specifically, FIG. 64(*a*) shows the waveforms of the respective voltages in four frames F1 through F4. In this example, the drive polarities are inverted in the order of (+ + − −) with the luminance rankings of the subpixels 1-*a*-A and 1-*a*-B reversed in the orders of (B D B D) and (D B D B), respectively. In each frame, a write operation is started when the gate voltage on the gate bus line G001 goes high after a predetermined amount of time has passed since the application of a gate start pulse GSP. The input video signal is supposed to have one vertical scanning period V-Total of 803H and each CS voltage is supposed to have ten phases. In this example, the first waveform of each CS voltage is a waveform in which H and L levels (i.e., first and second voltage levels) alternate every 5H period (i.e., a waveform with a cycle time of 10H and a duty ratio of one to one). On the other hand, the second waveform of each CS voltage is a waveform in which H and L levels alternate every 9H period in odd-numbered frames but is a rectangular wave in which each H-level period lasts 6H and each L-level period lasts 7H in even-numbered frames. The phases of the CS voltages CS1 and CS2 are shifted from each other by 180 degrees.

As shown in FIG. 64(*a*), in this example, the interval between the fall of the gate voltage to low level and the first change of the CS voltage levels is defined to be longer than 0H but shorter than 1H. Also, in the first frame F1, the CS voltage CS1 has a first waveform in which the H and L levels alternate every 5H period and a second waveform in which the H and L levels alternate every 9H period. Consequently, in the waveform of the voltage applied to the liquid crystal layer of the subpixel 1-*a*-A, the sum of the H-level periods of CS1 is 403H (=78×5H+9H+5H−1H) and the sum of the L-level periods thereof is 400H (=78×5H+9H+1H). As a result, the subpixel 1-*a*-A has its luminance increased by a percentage corresponding to 403H/803H. On the other hand, in the waveform of the voltage applied to the liquid crystal layer of the subpixel 1-*a*-B, the sum of the L-level periods of CS2 is 403H and that of the H-level periods thereof is 400H. As a result, the subpixel 1-*a*-B has its luminance decreased by the percentage corresponding to 403H/803H.

Next, it will be described what voltages are applied to the subpixels 1-*a*-A and 1-*a*-B in the second frame F2.

Look at the subpixel 1-*a*-A, and it can be seen that since the first change of the CS voltages CS1 after the gate voltage on the gate bus line G001 has gone low is voltage decrease (i.e., fall from H level to L level) and a positive voltage is written in the second frame F2, the effective voltage applied to the liquid crystal layer of the subpixel 1-*a*-A comes to have a low level, thus making the subpixel 1-*a*-A a dark subpixel. As for the subpixel 1-*a*-B on the other hand, since the first change of the CS voltages CS2 after the gate voltage on the gate bus line G001 has gone low is voltage increase (i.e., rise from L level to H level) and a positive voltage is written in the second frame F2, the effective voltage applied to the liquid crystal layer of the subpixel 1-*a*-B comes to have a high level, thus making the subpixel 1-*a*-B a bright subpixel.

As shown in FIG. 64(*a*), in the second frame F2, the CS voltage CS1 has a first waveform in which the CS voltage CS1 changes its levels from H into L, and vice versa, every 5H period and a second waveform consisting of H-level periods of 6H and L-level periods of 7H. That is why in the waveform of the voltage applied to the liquid crystal layer of the subpixel 1-*a*-A, the sum of the H-level periods of CS1 is 401H (=79×5H+6H) and the sum of the L-level periods thereof is 402H (=79×5H+7H). As a result, the subpixel 1-*a*-A has its luminance decreased by a percentage corresponding to 402H/803H. On the other hand, in the waveform of the voltage applied to the liquid crystal layer of the subpixel 1-*a*-B, the sum of the H-level periods of CS2 is 402H and the sum of the L-level periods thereof is 401H. As a result, the subpixel 1-*a*-B has its luminance increased by the percentage corresponding to 402H/803H.

The CS voltage waveform in the third frame F3 is obtained by shifting the phase of the CS voltage waveform in the first frame F1 by 180 degrees (i.e., by inverting the CS voltage waveform in the first frame F1). Likewise, the CS voltage waveform in the fourth frame F4 is obtained by shifting the phase of the CS voltage waveform in the second frame F2 by 180 degrees (i.e., by inverting the CS voltage waveform in the second frame F2). Although their polarities are different from each other, the voltage applied to the liquid crystal layer of each subpixel in the third frame F3 is equivalent to the one applied to that of its associated subpixels in the first frame F1. Likewise, even though their polarities are different, the voltage applied to the liquid crystal layer of each subpixel in the fourth frame F4 is equivalent to the one applied to that of its associated subpixels in the second frame F2.

In this example, the CS voltage waveform in the fourth frame F4 is supposed to be obtained by shifting the phase of the CS voltage waveform in the second frame F2 by 180 degrees for the sake of simplicity. However, in a situation where the period to be evenly split is an odd number of times as long as one horizontal scanning period (i.e., if B/H is an odd number), if the number of L-level periods in a certain frame (which is supposed to be an $FN^{th}$ frame where FN is a positive integer) is defined to be greater (or smaller) by one than that of H-level periods thereof, then the number of L-level periods in the frame after the next one (i.e., in the $(FN+2)^{th}$ frame) is also preferably greater (or smaller) by one than that of H-level periods thereof as already described for the second preferred embodiment.

Next, the display states in the first and second frames F1 and F2 will be described with reference to FIG. 64(*b*), which illustrates the display states in the first through fourth frames F1 through F4 and their synthetic image that simulates the image to be actually viewed by the viewer.

Looking at the first frame F1, it can be seen that the subpixel 1-*a*-A is a bright subpixel and the subpixel 1-*a*-B is a dark subpixel. The luminance of the subpixel 1-*a*-A has been increased by the percentage corresponding to 403H/803H as described above.

Next, look at the second frame F2, and it can be seen that the subpixel 1-*a*-B is a bright subpixel and the subpixel 1-*a*-A is a dark subpixel, i.e., their luminance ranking has reversed compared to the first frame F1. In the second frame F2, the luminance of the subpixel 1-*a*-B as a bright subpixel has been increased by 402H/803H as described above. That is to say, the increase in the luminance of the subpixel 1-*a*-B in the second frame F2 is smaller by 1H/803H than the increase in the luminance of the subpixel 1-*a*-A in the first frame F1. Consequently, the luminance of the subpixel 1-*a*-B is lower than that of the subpixel 1-*a*-A by that amount. That is why the subpixel 1-*a*-B in the second frame F2 shown in FIG. 64(*b*) is illustrated as being darker than the subpixel 1-*a*-A in the first frame F1. The same phenomenon also occurs in the dark subpixel. However, since bright subpixels contribute to the display operation more significantly than dark subpixels, the description thereof will be omitted herein.

In this manner, when the luminance ranking of the subpixels reverses between the first and second frames F1 and F2, the luminance also changes. The same phenomenon also happens between the third and fourth frames F3 and F4. Such a change of luminances sometimes may be seen as flicker to the viewer's eyes. Also, as schematically shown as a synthetic image in FIG. 64(*b*), even when a grayscale should be displayed uniformly, the subpixel 1-*a*-A still looks bright and the subpixel 1-*a*-B still looks dark, which sometimes makes the viewer feel unevenness of the image.

The reason why the luminance of the subpixel 1-*a*-A in the first frame F1 and that of the subpixel 1-*a*-B in the second frame F2 are different from each other, i.e., the reason why the CS voltage achieves the effect of increasing the luminance (or effective voltage) for varying lengths (i.e., in the H-level periods in the first frame F1 but in the L-level periods in the second frame F2), is just as already described for the eleventh preferred embodiment.

The liquid crystal display device of the thirteenth preferred embodiment has the Type I-1 pixel division structure shown in FIG. 31(*a*) and realizes the sequence shown in FIG. 56(*a*).

Just like FIG. 64(*a*), FIGS. 65(*a*), 66(*a*) and 67 also show the waveforms of the gate voltage, CS voltages and voltages applied to the pixel in the four frames F1 through F4 in the liquid crystal display device of the thirteenth preferred embodiment. FIGS. 65(*b*) and 66(*b*) schematically illustrate the display states and the synthetic images in the respective frames just like FIG. 64(*b*).

In the voltage waveform shown in FIG. 65(*a*), the input video signal has one vertical scanning period V-Total of 803H and each CS voltage has ten phases as in FIG. 64(*a*). The waveform of each CS voltage is supposed to consist of the first waveform in which H and L levels alternate every 5H period and the second waveform in which H and L levels alternate every 9H period (in one cycle). In the voltage waveform diagram shown in FIG. 64(*a*), the interval between the fall of the gate voltage on G001 to low level and the first change of the CS voltage levels is defined to be longer than 0H but shorter than 1H, and the interval between the rise of the gate voltage to high level and the first change of the CS voltage levels is defined to be 1H. On the other hand, in the voltage waveform diagram shown in FIG. 65(*a*), both intervals are defined to be 2H. The first waveform of the CS voltage CS1 has one cycle of oscillation of 10H and each flat portion with constant amplitude (which may be either H level or L level) lasts 5H. That is why 2H is one of the two integers that are closest to 2.5H, which is a half as long as the portion with the flat amplitude (i.e., a quarter as long as one cycle of oscillation of the first waveform).

By defining the interval between the fall of the gate voltage to the low level and the first change of the CS voltage levels to be 2H, the sum of the H-level periods of CS1 is 402H (=78×5H+9H+5H−2H) and the sum of the L-level periods thereof is 401H (=78×5H+9H+2H) in the waveform of the voltage applied to the liquid crystal layer of the subpixel 1-*a*-A in the first frame F1. As a result, the waveform of the voltage applied to the liquid crystal layer of the subpixel 1-*a*-A in the first frame F1 agrees with that of the voltage applied to the liquid crystal layer of the subpixel 1-*a*-B in the second frame F2. The same relation is also satisfied between the subpixel 1-*a*-B in the first frame F1 and the subpixel 1-*a*-A in the second frame F2. That is why the same can be said as for the third and fourth frames F3 and F4, too. As a result, no DC voltages are eventually applied to the liquid crystal layer. Also, as already described for the second preferred embodiment, if the even split period is an odd number of times as long as one horizontal scanning period and if the number of L-level periods is 1H greater (or smaller) than that of H-level periods in one frame (i.e., the FN$^{th}$ frame), then the number of L-level periods is preferably 1H greater (or smaller) than that of H-level periods in the frame after the next one (i.e., in the (FN+2)$^{th}$ frame), too.

However, in the waveform of the voltage applied to the liquid crystal layer of the subpixel 6-*a*-A in the first frame F1, the sum of the H-level periods of CS1 is 401H (=78×5H+9H+2H) and the sum of the L-level periods thereof is 402H (=78×5H+9H+5H−2H). And in the waveform of the voltage applied to the liquid crystal layer of the subpixel 6-*a*-B in the second frame F2, the sum of the H-level periods is 402H and that of the L-level periods thereof is 401H. Thus, the waveform of the voltage applied to the liquid crystal layer of the subpixel 6-*a*-A to be a bright subpixel in the first frame F1 disagrees with that of the voltage applied to that of the subpixel 6-*a*-B to be a bright subpixel in the second frame F2. The same relation is also satisfied between the subpixel 6-*a*-B in the first frame F1 and the subpixel 6-*a*-A in the second frame F2. That is why the same can be said as for the third and fourth frames F3 and F4, too.

FIG. 65(*b*) illustrates the display states in the first through fourth frames F1 through F4 and their synthetic images that simulate the images to be actually viewed by the viewer.

Look at the first frame F1, and it can be seen that the subpixels 1-*a*-A, 1-*a*-B, 6-*a*-A and 6-*a*-B are bright, dark, bright and dark subpixels, respectively. The luminances of the subpixels 1-*a*-A and 6-*a*-A have been increased by the percentage corresponding to 402H/803H.

Next, look at the second frame F2, and it can be seen that the subpixels 1-*a*-B, 1-*a*-A, 6-*a*-B and 6-*a*-A are bright, dark, bright and dark subpixels, respectively, i.e., their luminance rankings have reversed compared to the first frame F1. In the second frame F2, the luminance of the subpixels 1-*a*-B as a bright subpixel has been increased by 402H/803H, and that of the subpixels 6-*a*-B has been increased by 401H/803H. That is to say, the increase in the luminance of the subpixel 1-*a*-B in the second frame F2 is smaller by 1H/803H than the increase in the luminance of the subpixel 1-*a*-A in the first frame F1. Consequently, the luminance of the subpixel 1-*a*-B is lower than that of the subpixel 1-*a*-A by that amount.

In this manner, when the luminance ranking of the subpixels reverses between the first and second frames F1 and F2, the luminance also changes in the pixel 6-*a*. The same phenomenon also happens between the third and fourth frames F3 and F4. Such a change of luminances sometimes may be seen as flicker to the viewer's eyes. Also, as schematically shown as synthetic images in FIG. 65(*b*), when a grayscale should be displayed uniformly, the pixel 1-*a* looks uniform but the subpixel 6-*a*-A still looks bright and the subpixel 6-*a*-B still looks dark in the pixel 6-*a*. The same state as that of the pixel 1-*a* is observed in every pixel on the first through fifth lines, while the same state as that of the pixel 6-*a* is observed in the sixth through tenth lines, which sometimes makes the viewer feel unevenness of the image.

In a situation where the period to be evenly split is an odd number of times as long as one horizontal scanning period, if the number of L-level periods in one frame (i.e., the FN$^{th}$ frame) is greater (or smaller) by 1H than that of H-level periods in the same frame, the same phenomenon will still be observed even by performing equalization processing to make the number of L-level periods greater (or smaller) by 1H than that of H-level periods in the frame after the next one (i.e., in the (FN+2)$^{th}$ frame).

In the voltage waveform shown in FIG. 66(*a*), the input video signal has one vertical scanning period V-Total of 803H and each CS voltage has ten phases as in FIG. 64(*a*). The interval between the fall of the gate voltage on G001 to low level and the first change of the CS voltage levels is defined to be longer than 2H but shorter than 3H, and the interval between the rise of the gate voltage to high level and the first change of the CS voltage levels is defined to be 3H. Other than that, the waveform shown in FIG. 66(*a*) is identical with the one shown in FIG. 65(*a*). That is why 3H is one of the two integers that are closest to 2.5H, which is a half as long as the portion of the CS voltage waveform with the flat amplitude (i.e., a quarter as long as one cycle of oscillation of the first waveform).

By defining the interval between the fall of the gate voltage to the low level and the first change of the CS voltage levels to be longer than 2H but shorter than 3H and the interval between the rise of the gate voltage to the high level and the first change of the CS voltage levels to be 3H as described above, the sum of the H-level periods of CS1 is 401H (=78×5H+9H+5H−3H) and the sum of the L-level periods thereof is 402H (=78×5H+9H+3H) in the waveform of the voltage applied to the liquid crystal layer of the subpixel 1-*a*-A in the first frame F1. On the other hand, in the waveform of the voltage applied to the liquid crystal layer of the subpixel 1-*a*-B in the second frame F2, the sum of the H-level periods of CS2 is 402H and the sum of the L-level periods thereof is 401H. Thus, there is a difference in luminance corresponding to 1H/803H. The same relation is satisfied between the subpixel 1-*a*-B in the first frame F1 and the subpixel 1-*a*-A in the second frame F2. Thus, the same can be said about the third and fourth frames F3 and F4, too.

FIG. 66(*b*) illustrates the display states in the first through fourth frames F1 through F4 and their synthetic images that simulate the images to be actually viewed by the viewer.

Unlike the example shown in FIG. 65(*b*), when a grayscale should be displayed uniformly, the pixel 6-*a* looks uniform but the subpixel 1-*a*-B still looks bright and the subpixel 1-*a*-A still looks dark in the pixel 1-*a*. The same state as that of the pixel 1-*a* is observed in every pixel on the first through fifth lines, while the same state as that of the pixel 6-*a* is observed in every pixel on the sixth through tenth lines, which sometimes makes the viewer feel unevenness of the image.

In the voltage waveform shown in FIG. 67, the input video signal has one vertical scanning period V-Total of 808H and each CS voltage has twelve phases. In this example, the first waveform of each CS voltage is a waveform in which H and L levels (i.e., first and second voltage levels) alternate every 6H period (i.e., a waveform with a cycle time of 12H and a duty ratio of one to one). On the other hand, the second waveform of each CS voltage is a waveform in which H and L levels alternate every 11H period in odd-numbered frames but is a waveform in which H and L levels alternate every 8H period in even-numbered frames. The phases of the CS voltages CS1 and CS2 are shifted from each other by 180 degrees.

In the voltage waveform diagram shown in FIG. 67, the interval between the fall of the gate voltage on G001 to low level and the first change of the CS voltage levels is defined to be longer than 2H but shorter than 3H, and the interval between the rise of the gate voltage to high level and the first change of the CS voltage levels is defined to be 3H. The first waveform of the CS voltage CS1 has one cycle of oscillation of 12H and each flat portion with constant amplitude (which may be either H level or L level) lasts 6H. That is why 3H is a half as long as each flat amplitude portion of the CS voltage, i.e., a quarter as long as one cycle of oscillation of the first waveform of the CS voltage.

By adopting such settings, the sum of the H-level periods of CS1 is 404H (65×6H+11H+3H) and the sum of the L-level periods thereof is also 404H in the waveform of the voltage applied to the liquid crystal layer of the subpixel 1-*a*-A in the first frame F1. On the other hand, in the waveform of the voltage applied to the liquid crystal layer of the subpixel 1-*a*-B in the second frame F2, the sum of the H-level periods of CS2 is 404H (=65×6H+11H+3H) and the sum of the L-level periods thereof is also 404H. Thus, the luminance of the subpixel 1-*a*-A in the first frame F1 agrees with that of the subpixel 1-*a*-B in the second frame F2. The same relation is satisfied between the subpixel 1-*a*-B in the first frame F1 and the subpixel 1-*a*-A in the second frame F2. And the same can be said about the third and fourth frames F3 and F4, too. As a result, no DC voltages are eventually applied to the liquid crystal layer.

Comparing FIGS. 65(*a*) and 66(*a*) to FIG. 67, it can be seen easily that in a situation where the first waveform of the CS voltage has 4n phases (where n is an arbitrary positive integer), i.e., if the CS voltage has a waveform that has one cycle of oscillation of 4n·H and that alternates between H and L levels every 2n·H, if the interval between the fall of the gate voltage to the low level and the first change of the CS voltage levels (which will be identified herein by β) is defined so as to satisfy $P_A/4H-1 \leqq \beta < P_A/4H$ with respect to one cycle of oscillation $P_A$ of the first waveform of the CS voltage, the luminance (i.e., effective voltage) of any bright subpixel in every frame can be as high as that of its associated dark subpixel in every frame as shown in FIG. 67, for example. As a result, it is possible to prevent DC voltages from producing flicker or unevenness or decreasing the reliability. That is to say, it can be seen that the first waveform of the CS voltage most preferably has such a cycle of oscillation $P_A$ that makes $P_A/2$ an even number and that the interval β between the fall of the gate voltage to the low level and the first change of the CS voltage levels most preferably satisfies $P_A/4H-1 \leqq \beta < P_A/4H$.

Also, although not described in detail herein, even if the sequence shown in FIG. 56(*b*) is applied to the liquid crystal display device with the Type I pixel division structure, DC voltages are also generated to decrease the reliability just as already described about the liquid crystal display device with the Type II pixel division structure with reference to FIGS. 61(*a*) and 61(*b*).

Embodiment 14

Hereinafter, it will be described with reference to FIGS. 68(*a*) and 68(*b*) what if the sequence shown in FIG. 56(*d*) is applied to the liquid crystal display device with the Type II-1 pixel division structure shown in FIG. 32(*a*). FIG. 68(*a*) shows the waveforms of a gate voltage, CS voltages and voltages applied to the pixel, while FIG. 68(*b*) schematically illustrates display states and synthetic images in respective frames.

Specifically, FIG. 68(*a*) shows the waveforms of the respective voltages in four frames F1 through F4. In this example, the drive polarities are inverted in the order of (+ − + −) with the luminance rankings of the subpixels 1-*a*-A and 1-*a*-B reversed in the orders of (B M D M) and (D M B M), respectively. In each frame, a write operation is started when the gate voltage on the gate bus line G001 goes high after a predetermined amount of time has passed since the application of a gate start pulse GSP. The input video signal is supposed to have one vertical scanning period V-Total of 801H and each CS voltage is supposed to have twelve phases. In this example, the first waveform of each CS voltage is a waveform in which the voltage changes its levels cyclically in the order of H, M, L and M levels (i.e., first, second, third and second voltage levels) every 6H period. That is to say, the CS voltage becomes H and L once apiece and becomes M twice in one cycle of oscillation. The phases of the CS voltages CS1 and CS2 are shifted from each other by 180 degrees.

In the voltage waveform diagram shown in FIG. 68(*a*), the interval between the fall of the gate voltage to low level and the first change of the CS voltage levels is defined to be longer than 2H but shorter than 3H, and the interval between the rise of the gate voltage to high level and the first change of the CS voltage levels is defined to be 3H. The first waveform of the CS voltage CS1 has one cycle of oscillation of 24H and each flat portion with constant amplitude (which may be H, L or M level) lasts 6H. That is why 3H is a half as long as each flat amplitude portion of the CS voltage, i.e., one eighth as long as one cycle of oscillation $P_A$ of the first waveform of the CS voltage. That is to say, in this example, the interval between the fall of the gate voltage to the low level and the first change of the CS voltage levels is defined to be longer than $P_A/8-1$ but shorter than $P_A/8$.

By adopting such settings, when CS1 has L level (i.e., the third voltage level) in the waveform of the voltage applied to the liquid crystal layer of the subpixel 1-*a*-A in the first frame F1, the gate voltage goes low, the sum of the H-level periods becomes 201H (=33×6H+3H), the sum of the L-level periods also becomes 201H and the sum of the M-level periods becomes 399H. Also, when CS2 has L level (i.e., the third voltage level) in the waveform of the voltage applied to the liquid crystal layer of the subpixel 1-*a*-B in the third frame F3, the gate voltage goes low, the sum of the H-level periods becomes 201H (33×6H+3H), the sum of the L-level periods also becomes 201H and the sum of the M-level periods becomes 399H. Thus, the luminance of the subpixel 1-*a*-A in the first frame F1 agrees with that of the subpixel 1-*a*-B in the third frame F3. This relation is also satisfied between the subpixel 1-*a*-B in the first frame F1 and the subpixel 1-*a*-A in the third frame F3.

Meanwhile, when CS1 has M level (i.e., the second voltage level) in the waveform of the voltage applied to the liquid crystal layer of the subpixel 1-*a*-A in the second frame F2, the gate voltage goes low, the sum of the H-level periods becomes 201H (=33×6H+3H), the sum of the L-level periods also becomes 201H and the sum of the M-level periods becomes 399H. Also, when CS2 has M level (i.e., the second voltage level) in the waveform of the voltage applied to the liquid crystal layer of the subpixel 1-*a*-B in the second frame F2, the gate voltage goes low, the sum of the H-level periods becomes 201H (33×6H+3H), the sum of the L-level periods also becomes 201H and the sum of the M-level periods becomes 399H. Thus, the luminance of the subpixel 1-*a*-A in the second frame F2 agrees with that of the subpixel 1-*a*-B in the second frame F2. This relation is also satisfied between the subpixel 1-*a*-A in the fourth frame F4 and the subpixel 1-*a*-B in the fourth frame F4. Consequently, no DC voltages are eventually applied to the liquid crystal layer in any frame.

It can be seen that as described above for the eleventh through fourteenth preferred embodiments of the present invention, to realize the sequences shown in FIGS. 56(*a*), 56(*b*) and 56(*d*) and achieve good display quality without producing any flicker or unevenness in a situation where each pixel is split into two subpixels, the sum of the H-level periods of the first waveform of the CS voltage should be approximately equal to that of the L-level periods thereof. As already described by way of illustrative examples, it is most preferred that in the first waveform of the CS voltage, the sum of the H-level periods be equal to that of the L-level periods in each frame.

Hereinafter, this requirement will be described with reference to FIGS. 69(*a*) through 69(*d*) so that the reader can get an idea of it more easily.

FIG. 69(*a*) schematically illustrates a reference example in which the CS voltage changes its level for the first time just after the gate voltage has gone low. On the other hand, FIG. 69(*b*) illustrates a situation where the interval between the fall of the gate voltage to the low level and the first change of the CS voltage levels is a quarter as long as one cycle of oscillation $P_A$ of the first waveform of the CS voltage, which is represented by $P_A$=2·u·H, where H is one vertical scanning period and u is an arbitrary positive integer. In the examples illustrated in FIGS. 69(*a*) and 69(*b*), $P_A$=20H. And both of these examples correspond to the sequence shown in FIG. 56(*a*).

FIG. 69(*c*) shows the drive polarities (+ + − −) to realize the sequence shown in FIG. 56(*a*) and the first change of the CS voltage levels in each of the subpixels A and B after the gate voltage has gone low in the respective frames F1 through F4, where the UP arrow indicates a voltage increase and the DOWN arrow indicates a voltage decrease. On the other hand, FIG. 69(*d*) shows the drive polarities (+ + − −) to realize the sequence shown in FIG. 56(*b*) and the first change of the CS voltage levels in each of the subpixels A and B after the gate voltage has gone low in the respective frames F1 through F4, where the UP arrow indicates a voltage increase and the DOWN arrow indicates a voltage decrease. As encircled in FIGS. 69(*c*) and 69(*d*), in both of these two situations, the CS voltage applied to the subpixel A (decreases and decreases) in the second and third frames F2 and F3, while the CS voltage applied to the subpixel B (increases and increases) in the second and third frames F2 and F3. This is a unique phenomenon when the polarities are inverted with the luminance ranking between the subpixels reversed.

Now take a look at FIG. 69(*a*) again. First, in the first frame F1, a positive voltage is written and the first change of the CS voltage levels is a voltage increase. In the second frame F2, a positive voltage is written again but the first change of the CS voltage levels is a voltage decrease. To make the CS voltage increase at the beginning of the first frame F1 and decrease at the beginning of the second frame in which a voltage of the same polarity as the one of the first frame is written, the number of H-level periods (i.e., raised portions) needs to be increased by one (i.e., the sum of the H-level periods needs to be increased by 10H). That is to say, in the waveform illustrated in FIG. 69(*a*), the number of L-level periods (i.e., depressed portions) is two but the number of H-level periods (i.e., raised portions) is three.

Next, in the second frame F2 in which a positive voltage is written, the first change of the CS voltage levels is a voltage decrease. In the third frame F3, however, a voltage of the opposite polarity, i.e., a negative voltage, is written and the first change of the CS voltage levels is a voltage decrease. To make both of the first and last changes of the CS voltage levels a decrease in the second frame F2, the number of H-level periods (i.e., raised portions) should be equal to that of L-level periods (i.e., depressed portions). For that reason, as shown in FIG. 69(*a*), an H-level period of 5H and an L-level period of 5H need to be provided so that the sum of the H-level periods is as long as that of the L-level periods.

Next, in the third frame F3, a negative voltage is written and the number of L-level periods (i.e., depressed portions) needs to be increased by one (i.e., the sum of the L-level periods needs to be increased by 10H). Then, to make both of the first and last changes of the CS voltage levels an increase in the fourth frame F4 in which a negative voltage is written again, an H-level period of 5H and an L-level period of 5H need to be provided so that the sum of the H-level periods is as long as that of the L-level periods as in the second frame F2.

As described above, the first change of the CS voltage levels in the first frame F1 is a voltage increase, while the first change of the CS voltage levels in the second frame F2 is a voltage decrease. That is why the CS voltage needs to have L-level at the start point of the first frame F1 and needs to have H-level at the end point thereof. And to fill the interval between the start and end points with a waveform that alternately oscillates between L and H levels, the number of times of increases needs to be greater by one than that of decreases. If the timing is determined such that the first change of the CS voltage levels occurs at the beginning of each frame as shown in FIG. 69(*a*), then the number of H-level periods increases by one (i.e., 10H) in the first frame F1 and that of L-level periods increases by one (i.e., 10H) in the second frame F2.

That is why if the timing is determined such that the first fall of the gate voltage to the low level after the gate voltage has gone high for the first time in each frame is defined at the middle of a flat portion of the CS voltage waveform (i.e., such that the gate voltage goes high at a 5H time that is the middle of each 10H period), the sum of the H-level periods can also be as long as that of the L-level periods in the first and third frames F1 and F3. For example, if attention is paid to the first frame F1, the sum of the H-level periods that is longer by 10H in FIG. 69(*a*) decreases by 5H, while the sum of the L-level periods increases by 5H. As a result, the sum of the H-level periods becomes as long as that of the L-level periods. In the same way, in the third frame F3, the sum of the L-level periods that is longer by 10H in FIG. 69(*a*) decreases by 5H, while the sum of the H-level periods increases by 5H. As a result, the sum of the H-level periods becomes as long as that of the L-level periods. Meanwhile, in each of the second and fourth frames F2 and F4, the CS voltage level at the beginning of the frame is the same as the level at the end thereof. That is why even if the waveform is shifted by 5H, neither the sum of the H-level periods nor that of the L-level periods changes.

As for the sequence shown in FIG. 56(*c*), however, the first changes of the CS voltage levels applied to the subpixel A are not (decrease and decrease) and the first changes of the CS voltage levels applied to the subpixel B are not (increase and increase), either, as encircled in FIGS. 69(*c*) and 69(*d*). That is why the sum of the H-level periods can be as long as that of the L-level periods in each frame without depending on the length of the interval between the fall of the gate voltage to the low level and the first change of the CS voltage levels.

As for the sequence shown in FIG. 56(*d*), by determining the timing such that the interval between the fall of the gate voltage to the low level and the first change of the CS voltage levels satisfies the predetermined relation as in the sequences shown in FIGS. 56(*a*) and 56(*b*), no DC voltages are eventually applied to the liquid crystal layer just as already described with reference to FIGS. 68(*a*) and 68(*b*).

Next, it will be described with reference to FIGS. 70(*a*) and 70(*b*) what requirement should be satisfied by the interval between the fall of the gate voltage and the first change of the CS voltage levels.

FIG. 70(*a*) schematically shows what requirement should be satisfied by the liquid crystal display device with the Type II pixel division structure, which has already been described for the eleventh and twelfth preferred embodiments, in order to realize the sequence shown in FIG. 56(*a*) or 56(*b*) without causing the problem resulting from the DC voltage.

In this example, the first waveform of the CS voltages CS1 and CS2 is supposed to switch its levels between H and L every 6H period (i.e., have one cycle of oscillation $P_A$ of 12H). However, the present invention is in no way limited to this specific example. In a liquid crystal display device of Type II, one cycle of oscillation $P_A$ of the first waveform is 2·K·L·H, where L is the number of electrically independent storage capacitor trunks and is an even number, K is a positive integer and H is one vertical scanning period, as described above. That is why the first waveform of the CS voltage is a waveform in which H and L levels alternate every K·L·H period (i.e., has a duty ratio of one to one). In a liquid crystal display device with the Type II pixel division structure, one cycle $P_A$ is a multiple of four.

If the interval between the fall of the gate voltage to the low level and the first change of the CS signal levels (i.e., a rise from L level to H level in the example shown in FIG. 70) is βH, the inequality $P_A/4H-1-\mathrm{Int}(K/2)\leqq\beta<P_A/4H+\mathrm{Int}(K/2)$, where Int(x) is the integral part of an arbitrary real number x, needs to be satisfied in every pixel. In this case, if $P_A=2\cdot LH$ (i.e., if K=1), one of the three inequalities $P_A/4H-2\leqq\beta<P_A/4H-1$, $P_A/4H-1\leqq\beta<P_A/4H$, and $P_A/4H\leqq\beta<P_A/4H+1$ should be satisfied in every pixel. Then, a CS voltage associated with an arbitrary gate voltage satisfies the inequality $P_A/4H-2\leqq\beta<P_A/4H+1$.

Hereinafter, let us see, with reference to FIGS. 71(*a*) and 71(*b*), if the liquid crystal display device of the eleventh preferred embodiment satisfies the relation. Specifically, FIG. 71(*a*) schematically illustrates the connection structure between the Type II-1 pixel division structure and CS bus lines. FIG. 71(*b*) shows the waveforms of gate voltages, CS voltages and voltages applied to pixels to indicate how long the interval βH between the fall of each gate voltage and the first change of its associated CS signal levels (i.e., rise from L level to H level in the example shown in FIG. 71(*b*)) is. In this example, CS voltages (on CS trunks) CS1 through CS10 are supposed to have ten phases (i.e., L=10) and K is supposed to be one. Thus, one cycle $P_A$ of the first waveform of each CS voltage is 20H.

As shown in FIG. 71(*a*), subpixels on the same row as the subpixel 1-*a*-A of the pixel connected to the gate bus line G1 are connected to CS1, and subpixels on the same row as the subpixel 1-*a*-B are connected to CS2. Likewise, subpixels on the same row as the subpixel 2-*a*-A of the pixel connected to the gate bus line G2 are connected to CS2, and subpixels on the same row as the subpixel 2-*a*-B are connected to CS3. In the same way, subpixels on the same row as the subpixel 3-*a*-A of the pixel connected to the gate bus line G3 are connected to CS3, and subpixels on the same row as the subpixel 3-*a*-B are connected to CS4. And subpixels on the same row as the subpixel 4-*a*-A of the pixel connected to the gate bus line G4 are connected to CS4, and subpixels on the same row as the subpixel 4-*a*-B are connected to CS5.

As described above, the timing is determined such that the first fall of the gate voltage to the low level after the gate voltage has gone high is defined at the middle of a flat portion (which lasts 10H in this example) of the CS voltage waveform. Thus, looking at CS1 and CS2 connected to the pixel 1-*a*, it can be seen that the CS voltage changes its levels at the timing β1 that satisfies $P_A/4H-1\leqq\beta 1<P_A/4$. As for the pixel 2-*a*, the CS voltage changes . . . its levels at the timing β2 that satisfies $P_A/4H-2\leqq\beta 2<P_A/4-1$ in the subpixel 2-*a*-A connected to CS2, and changes its levels at the timing β3 that satisfies $P_A/4H\leqq\beta 3<P_A/4H+1$ in the subpixel 2-*a*-B connected to CS3.

Thus, β1, β2 and β3 all satisfy the inequality $P_A/4H-2\leqq\beta<P_A/4H+1$. Furthermore, β1 satisfies the inequality $P_A/4H-1\leqq\beta<P_A/4H$, β2 satisfies the inequality $P_A/4H-2\leqq\beta<P_A/4H-1$, and β3 satisfies the inequality $P_A/4H\leqq\beta<P_A/4H+1$. Therefore, any CS voltage other than the ones CS1 through CS6 shown in FIG. 71(*b*) has one of β1, β2 and β3. $P_A/4H-2\leqq\beta<P_A/4H+1$ is satisfied in every pixel. And an arbitrary pixel satisfies one of the three inequalities $P_A/4H-1\leqq\beta<P_A/4H$, $P_A/4H-2\leqq\beta<P_A/4H-1$ and $P_A/4H\leqq\beta<P_A/4H+1$.

In this example, $P_A=20$ is supposed to be satisfied. According to the Type II arrangement, however, the minimum value of $P_A$ is 8H. FIG. 71(*c*) shows the relation between a CS voltage, of which $P_A$ is 8H, and two gate voltages (Gate 1 and Gate 2).

When $P_A=8H$, β needs to meet $0\leqq\beta<3$ to satisfy $P_A/4H-2\leqq\beta<P_A/4H+1$. If β=0, however, the fall of the gate voltage to the low level coincides with the first change of the CS voltage levels, thus making it unclear whether the CS voltage has L level or H level when the gate voltage goes low. This is not beneficial. For that reason, if $P_A$ is 8H that is the minimum value, $P_A/4H-2<\beta$ (i.e., excluding a situation where β=0) is preferably satisfied. In that case, β needs to be determined so as to meet the inequality $0.5\leqq\beta\leqq 2.5$. Also, if the allowable timing shift is represented by α and if 0<α<1, then the inequality may be modified into $P_A/4H-2+\alpha\leqq\beta<P_A/4H+1-\alpha$.

Next, look at FIG. 70(*b*), which schematically shows what requirement should be satisfied by the liquid crystal display device with the Type I pixel division structure, which has already been described for the thirteenth preferred embodiment, in order to realize the sequence shown in FIG. 56(*a*) or 56(*b*) without causing the problem resulting from the DC voltage.

In a liquid crystal display device of Type I, one cycle of oscillation $P_A$ of the first waveform of the CS voltage is K·L·H, where L is the number of electrically independent storage capacitor trunks and is an even number, and H is one vertical scanning period, as described above. That is why the first waveform of the CS voltage is a waveform in which H and L levels alternate every K·L·H/2 period (i.e., has a duty ratio of one to one).

If the interval between the fall of the gate voltage to the low level and the first change of the CS signal levels (i.e., a rise from L level to H level in the example shown in FIG. 70) is βH, the inequality $P_A$/4H−1−Int(K/2)≦β<$P_A$/4H+Int(K/2), where Int(x) is the integral part of an arbitrary real number x, needs to be satisfied in every pixel.

In this case, if $P_A$=2·LH (i.e., if K=2), one of the three inequalities $P_A$/4H−2≦β<$P_A$/4H−1, $P_A$/4H−1≦β<$P_A$/4H, and $P_A$/4H≦β<$P_A$/4H+1 should be satisfied in every pixel. Then, a CS voltage associated with an arbitrary gate voltage satisfies the inequality $P_A$/4H−2≦β<$P_A$/4H+1.

On the other hand, if $P_A$=LH (i.e., if K=1), $P_A$/4H−1≦β<$P_A$/4H should be satisfied in every pixel.

Hereinafter, let us see, with reference to FIGS. 72(*a*) and 72(*b*), if the liquid crystal display device of the eleventh preferred embodiment satisfies the relation. Specifically, FIG. 72(*a*) schematically illustrates the connection structure between the Type I-1 pixel division structure and CS bus lines. FIG. 72(*b*) shows the waveforms of gate voltages, CS voltages and voltages applied to pixels to indicate how long the interval βH between the fall of each gate voltage and the first change of its associated CS signal levels (i.e., rise from L level to H level in the example shown in FIG. 71(*b*)) is. In this example, CS voltages (on CS trunks) CS1 through CS12 are supposed to have twelve phases (i.e., L=12) and K is supposed to be one. Thus, one cycle $P_A$ of the first waveform of each CS voltage is 12H.

As shown in FIG. 72(*a*), subpixels on the same row as the subpixel 1-*a*-A of the pixel connected to the gate bus line G1 are connected to CS1, and subpixels on the same row as the subpixel 1-*a*-B are connected to CS2. Likewise, subpixels on the same row as the subpixel 2-*a*-A of the pixel connected to the gate bus line G2 are connected to CS3, and subpixels on the same row as the subpixel 2-*a*-B are connected to CS4. In the same way, subpixels on the same row as the subpixel 3-*a*-A of the pixel connected to the gate bus line G3 are connected to CS5, and subpixels on the same row as the subpixel 3-*a*-B are connected to CS6. And subpixels on the same row as the subpixel 4-*a*-A of the pixel connected to the gate bus line G4 are connected to CS7, and subpixels on the same row as the subpixel 4-*a*-B are connected to CS8.

As described above, the timing is determined such that the first fall of the gate voltage to the low level after the gate voltage has gone high is defined at the middle of a flat portion (which lasts 6H in this example) of the CS voltage waveform. Thus, looking at CS1 and CS2 connected to the pixel 1-*a*, it can be seen that the CS voltage changes its levels at the timing β1 that satisfies $P_A$/4H−1≦β1<$P_A$/4H. Likewise, as for CS3 and CS4 connected to the pixel 2-*a*, the CS voltage also changes its levels at the timing β1 that satisfies $P_A$/4H−1≦β1<$P_A$/4H. In this manner, $P_A$/4H−1≦β1<$P_A$/4H is satisfied in every pixel.

In this example, $P_A$=12H is supposed to be satisfied. According to the Type I arrangement, however, the minimum value of $P_A$ is 4H. FIG. 72(*c*) shows the relation between a CS voltage, of which $P_A$ is 4H, and two gate voltages (Gate 1 and Gate 2).

When $P_A$=4H, $P_A$/4H−1=0 and $P_A$/4H=1. Thus, to satisfy the inequality described above, β needs to meet 0≦β<1. If β=0, however, the fall of the gate voltage to the low level coincides with the first change of the CS voltage levels, thus making it unclear whether the CS voltage has L level or H level when the gate voltage goes low. This is not beneficial. For that reason, if $P_A$ is 4H that is the minimum value, $P_A$/4H−1<β (i.e., excluding a situation where β=0) is preferably satisfied. Also, if 0<α<1, then the inequality may also be modified into $P_A$/4H−1+α≦β<$P_A$/4H−α just as described above.

Next, it will be described with reference to FIGS. 73 through 75 how β changes with K in the Type I arrangement. In FIGS. 73 through 75, the number L of CS trunks is eight in each of the three cases but K is one, two and four, respectively. Such a difference in K is sensible as a difference in connection between CS bus lines and CS trunks as shown in these drawings.

If K=1, one cycle $P_A$ of the CS voltages is 8H as shown in FIG. 73. And to satisfy the inequality $P_A$/4H−1≦β<$P_A$/4H, β should meet 1≦β<2. As can be seen from FIG. 73, 1≦β<2 is satisfied in every pixel.

On the other hand, if K=2, one cycle $P_A$ of the CS voltages is 16H (=2·LH) as shown in FIG. 74. And to satisfy the inequalities $P_A$/4H−2≦β<$P_A$/4H−1, $P_A$/4H−1≦β<$P_A$/4H, $P_A$/4H≦β<$P_A$/4H+1 and $P_A$/4H−2≦β<$P_A$/4H+1, β should meet 2≦β<3, 3≦β<4, 4≦β<5 and 2≦β<5, respectively. As can be seen from FIG. 74, β1 and β2 both satisfy 2≦β<5 and each of β1 and β2 satisfies one of 2≦β<3, 3≦β<4 and 4≦β<5.

Furthermore, if K=4, one cycle $P_A$ of the CS voltages is 32H as shown in FIG. 75. In that case, to satisfy the inequality $P_A$/4H−1−Int(K/2)≦β<$P_A$/4H+Int(K/2) described above, β should meet 5≦β<10. β1, β2, β3 and β4 shown in FIG. 75 all satisfy 5≦β<10. Likewise, four β's to be obtained by advancing the timings of G1 through G4 shown in FIG. 75 1H earlier will also satisfy 5≦β<10.

The relation between K and β in the Type II arrangement will not be described in detail herein. As can be seen from the foregoing description, no matter whether the device is a Type I or a Type II, if $P_A$/4H−1−Int(K/2)≦β<$P_A$/4H+Int(K/2) is satisfied in each pixel, then a liquid crystal display device with good quality, which makes the difference in luminance between subpixels hardly sensible as unevenness even in presenting a still picture and which is free from problems caused by DC voltages, and its driving method are realized as already described for the eleventh through fourteenth preferred embodiments of the present invention.

In the preferred embodiments described above, the number of electrically independent storage capacitor trunks is supposed to be smaller than that of storage capacitor lines (i.e., CS bus lines), which is twice as large as the number of gate bus lines in the case of even split. Naturally, however, an arrangement in which CS voltages are supplied to the respective storage capacitor lines independent of each other may also be adopted. In that case, the waveform of each CS voltage will have an increased number of options as the first waveform and as the second waveform, which is beneficial. Nevertheless, a CS voltage should change its levels at least once after the gate voltage has gone low during one vertical scanning period. Also, in a liquid crystal display device that includes storage capacitor lines that are twice as many as the gate bus lines and has an arrangement for supplying CS voltages to those storage capacitor lines independent of each other, if the CS voltage should change its levels only once after the gate voltage has gone low, then either the interval between the fall of the gate voltage to low level and the first change of the CS voltage levels or the interval between the change of the CS voltage levels and the rise of the gate voltage to high level next time during one vertical scanning period is preferably defined to be the same on every display line.

Conversely, if an arrangement in which a single storage capacitor trunk is provided for multiple storage capacitor lines is adopted, then the CS voltages on those storage capacitor lines that are all connected to a single storage capacitor trunk can have exactly the same amplitude of oscillation. Naturally, the circuit configuration can be simplified compared to a situation where a lot of voltages are provided independent of each other.

INDUSTRIAL APPLICABILITY

The present invention provides a big-size or high-definition liquid crystal display device that has excellent display quality with the viewing angle dependence of the γ characteristic reduced significantly. The liquid crystal display device of the present invention can be used effectively for a TV receiver with a big monitor screen of 30 inches or more.

The invention claimed is:

1. A liquid crystal display device comprising:

a plurality of pixels that are arranged in columns and rows so as to form a matrix pattern, each said pixel including a liquid crystal layer and a plurality of electrodes for applying a voltage to the liquid crystal layer, wherein each said pixel includes a first subpixel and a second subpixel, having liquid crystal layers to which mutually different voltages are applicable, and two switching elements that are provided for the first and second subpixels, respectively, and wherein each of the first and second subpixels includes a liquid crystal capacitor formed by a counter electrode and a subpixel electrode that faces the counter electrode through the liquid crystal layer, and a storage capacitor formed by a storage capacitor electrode that is electrically connected to the subpixel electrode, an insulating layer, and a storage capacitor counter electrode that is opposed to the storage capacitor electrode with the insulating layer interposed between them, and wherein the counter electrode is a single electrode provided in common for the first and second subpixels, while the storage capacitor counter electrodes of the first and second subpixels are electrically independent of each other, and wherein a storage capacitor counter voltage to be applied to each said storage capacitor counter electrode by way of its associated storage capacitor line has a first period (A) with a first waveform during one vertical scanning period, the first waveform oscillating between multiple voltage levels in a first cycle time ($P_A$) that is an integral number of times, and at least four times, as long as one horizontal scanning period (H), each of the multiple voltage levels having a flat portion with a duration TP, and wherein while the two switching elements are both ON, a display signal voltage is applied to the respective subpixel electrodes and respective storage capacitor electrodes of the first and second subpixels; after the two switching elements have been turned OFF, voltages at the respective storage capacitor counter electrodes of the first and second subpixels change; and if an interval between a point in time when the two switching elements in ON state have just been turned OFF and a point in time when the storage capacitor counter voltage changes for the first time is βH, the device satisfies the inequality $TP/4 \leqq \beta < 3 \cdot TP/4$, wherein four display states, in which either the luminance ranking of the first and second subpixels or the combination of polarities of the display signal voltages with respect to the counter electrode changes one after another, appear in each series of four vertical scanning periods, and wherein both the interval at which the first and second subpixels reverse their luminance ranking and the interval at which the polarity of the display signal voltage is inverted with respect to the counter electrode are four vertical scanning periods but have a phase difference of one vertical scanning period between them.

* * * * *